US005754808A

United States Patent [19]

Tanaka et al.

[11] Patent Number: 5,754,808

[45] Date of Patent: May 19, 1998

[54] METHOD FOR IMPLEMENTING A PROGRAM FOR AN OBJECT-ORIENTED PROGRAMMING SYSTEM USING GRAPHICS

[75] Inventors: Yuzuru Tanaka, Sapporo; Koichi Sakamoto; Munechika Nishida, both of Yokohama; Satoshi Kikuchi; Takamoto Imataki, both of Kawasaki, all of Japan

[73] Assignees: Hitachi Software Engineering Co., Ltd; Fujitsu Limited, both of Kanagawa, Japan

[21] Appl. No.: 317,619

[22] Filed: Sep. 29, 1994

[30] Foreign Application Priority Data

| | | | |
|---|---|---|---|
| Sep. 29, 1993 | [JP] | Japan | 5-243379 |
| Sep. 29, 1993 | [JP] | Japan | 5-243380 |
| Sep. 30, 1993 | [JP] | Japan | 5-243465 |
| Sep. 30, 1993 | [JP] | Japan | 5-243479 |
| Sep. 30, 1993 | [JP] | Japan | 5-244201 |
| Sep. 30, 1993 | [JP] | Japan | 5-244520 |
| Sep. 30, 1993 | [JP] | Japan | 5-245060 |
| Sep. 30, 1993 | [JP] | Japan | 5-245607 |

[51] Int. Cl.$^{6}$ .......... G06F 3/00

[52] U.S. Cl. .......... 395/339; 395/967; 395/348

[58] Field of Search .......... 395/155–161, 395/967, 339, 348, 349

[56] References Cited

U.S. PATENT DOCUMENTS

| | | | |
|---|---|---|---|
| 5,394,522 | 2/1995 | Sanchez-Frank et al. | 395/159 |
| 5,404,439 | 4/1995 | Moram et al. | 395/155 |
| 5,408,659 | 4/1995 | Cavendish et al. | 395/335 X |
| 5,461,710 | 10/1995 | Bloomfield et al. | 395/161 |
| 5,546,519 | 8/1996 | Berry | 395/348 X |

OTHER PUBLICATIONS

Henninger, S. et al. "Aknowledge–Based Design Environment for Graphical Network Editors," System Sciences, 1989 Annual Hawaii Int'l Conf. V. II., pp. 881–891.

Borns, L. M., "A Graphical Entity–Relationship Database Browser," System Science, 1988 Annual Hawii Int'l Conf. V. II. pp. 694–704.

Yang, S., "Integrating Computer Aided Software Engineering and User Interface Management Systems", System Sciences, V. II. 2, 1989, pp. 850–859.

"Computer Science", vol. 2, No. 1, 1992, pp. 6–12.

*Primary Examiner*—Raymond J. Bayerl
*Assistant Examiner*—A. Katbab
*Attorney, Agent, or Firm*—Fay, Sharpe, Beall, Fagan, Minnich & McKee

[57] ABSTRACT

An interactive programming system processing method configures an application by combining processes of a plurality of object-oriented components. An object-oriented component is configured by a controller part of an entity as an object of operation for defining a behavior against an external operation, a behavior definition part defines a process of the external operation and holds a result of the process of the external operation, and a view definition part defines a view by a graphic on a display screen. The result of the process obtained by the behavior definition part is acquired, the result of the process is transmitted to another object-oriented component linked with the object-oriented component, and the result of the process is displayed on the display screen in accordance with the definition of the view.

12 Claims, 124 Drawing Sheets

F I G. 2(A)
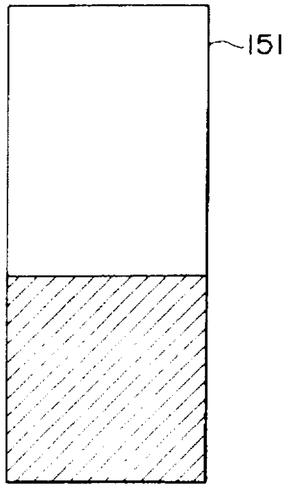
F I G. 2(B)
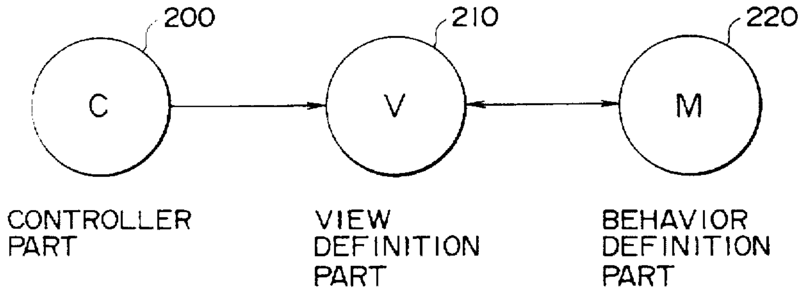

| | |
|---|---|
| COMPONENT NAME | BAR METER |

SLOT TABLE 717

| SLOT NAME | SLOT VALUE |
|---|---|
| Value | 180 |

718

SLOT CONNECTION TABLE 719

| OWN SLOT | Value |
|---|---|
| PARENT SLOT | Sapporo |
| set | ON |
| gime | OFF |
| update | OFF |

PARENT-CHILD TABLE 720

| PARENT | CHILD |
|---|---|
| a | |

| | |
|---|---|
| COMPONENT NAME | NUMERIC DISPLAY DEVICE |

SLOT TABLE 722

| SLOT NAME | SLOT VALUE |
|---|---|
| Value | 180 |

723

SLOT CONNECTION TABLE 724

| OWN SLOT | Value |
|---|---|
| PARENT SLOT | Sapporo |
| set | OFF |
| gime | ON |
| update | ON |

PARENT-CHILD TABLE 725

| PARENT | CHILD |
|---|---|
| a | |

| COMPONENT NAME | PIE CHART |
|---|---|

SLOT TABLE 727

| SLOT NAME | SLOT VALUE |
|---|---|
| Value (728) | * (736) |

SLOT CONNECTION TABLE 729

| OWN SLOT | Value |
|---|---|
| PARENT SLOT | All |
| set | OFF |
| gime | ON |
| update | ON |

PARENT-CHILD TABLE 730

| PARENT | CHILD |
|---|---|
| a | |

| COMPONENT NAME | BUTTON |
|---|---|

SLOT TABLE 732

| SLOT NAME | SLOT VALUE |
|---|---|
| Value | 1 |

SLOT CONNECTION TABLE 734

| OWN SLOT | Value |
|---|---|
| PARENT SLOT | Clear |
| set | ON |
| gime | OFF |
| update | OFF |

PARENT-CHILD TABLE 735

| PARENT | CHILD |
|---|---|
| a | |

F I G. 21(A)
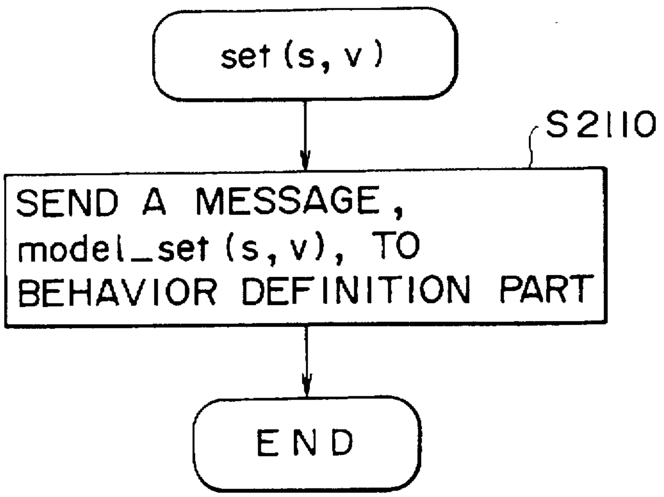
F I G. 21(B)
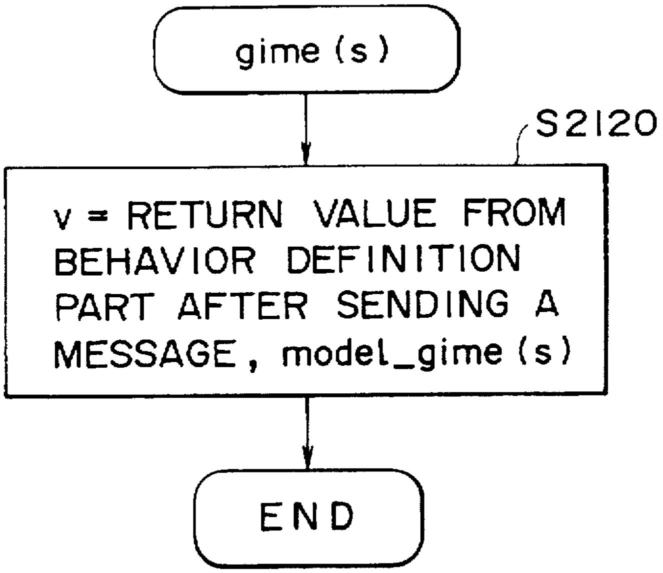

F I G. 26(A)
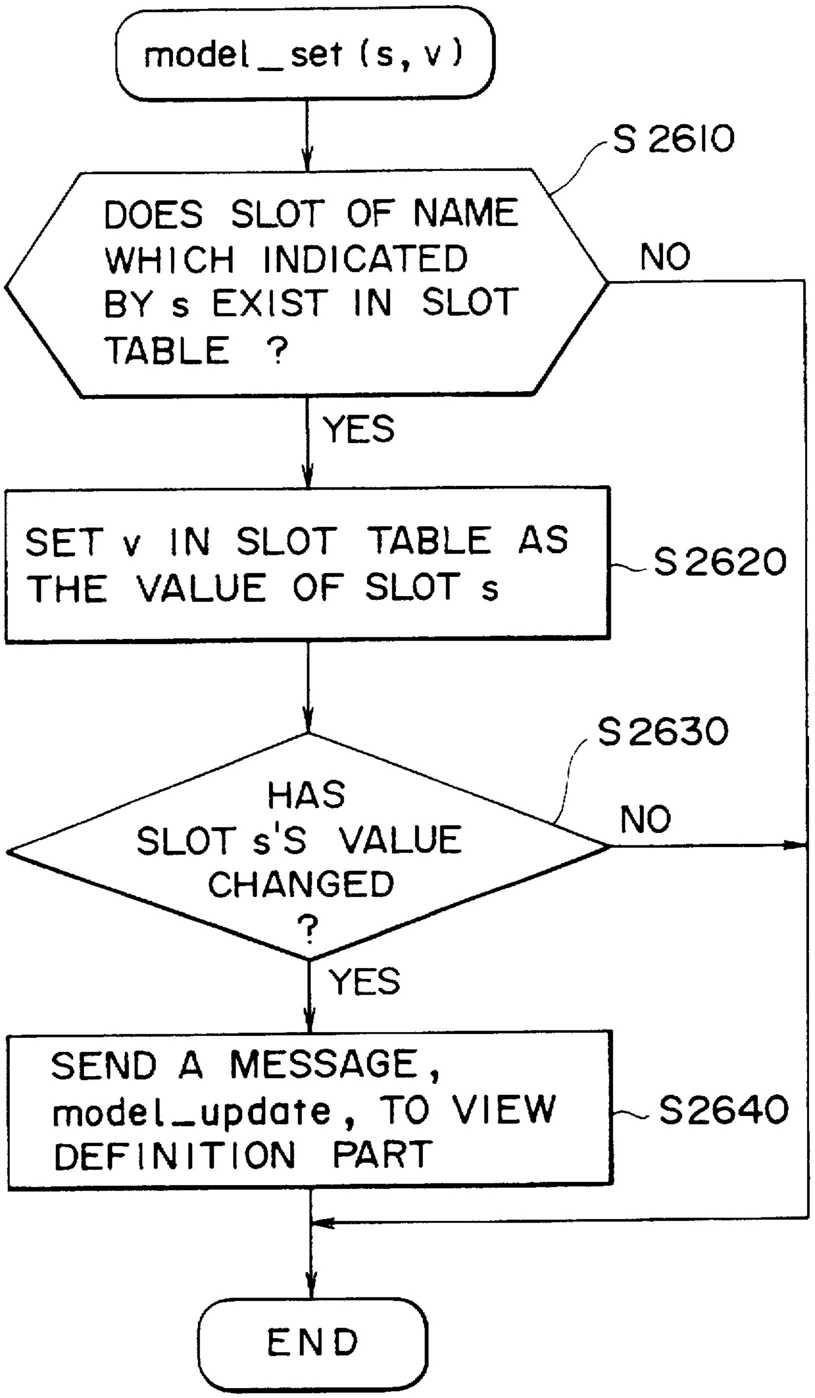

F I G. 26(B)
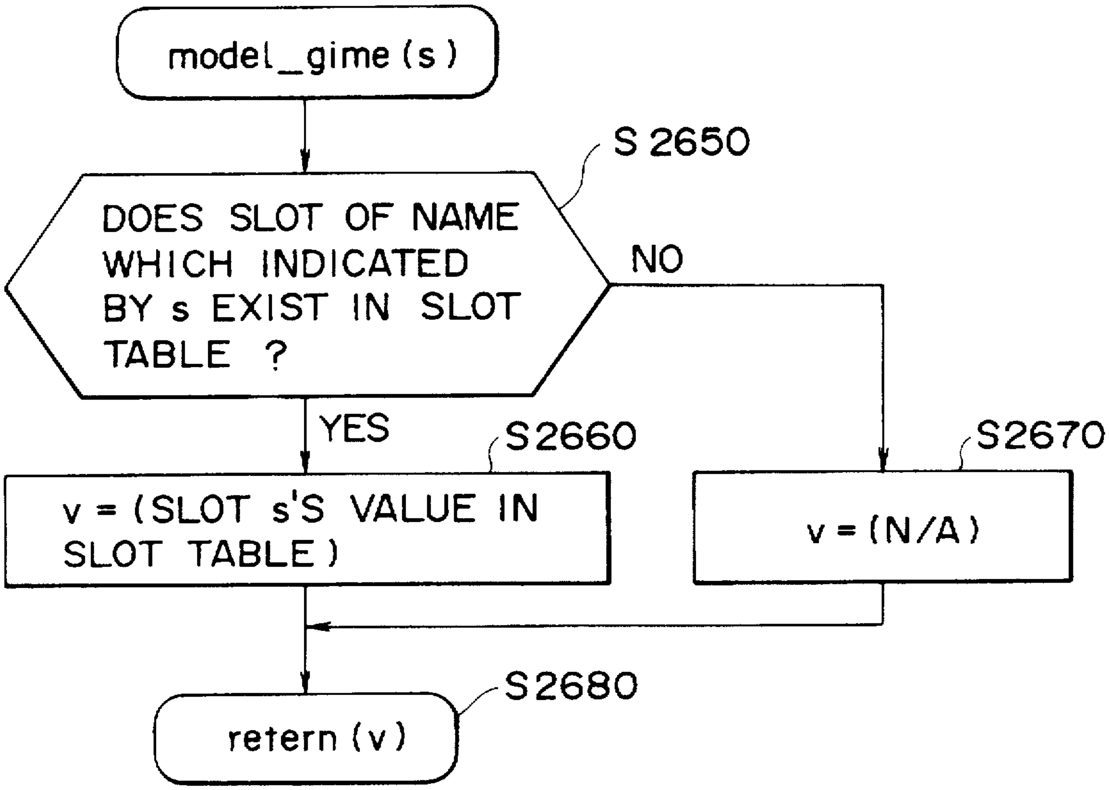

F I G. 28
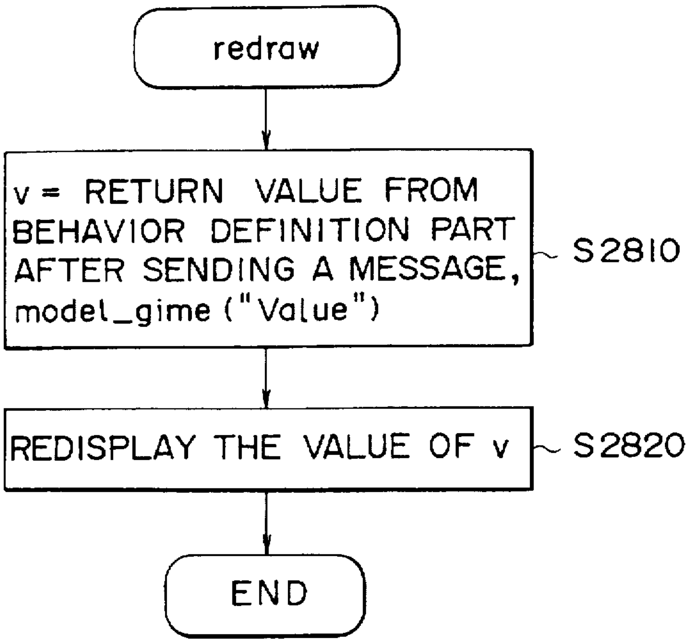
F I G. 29
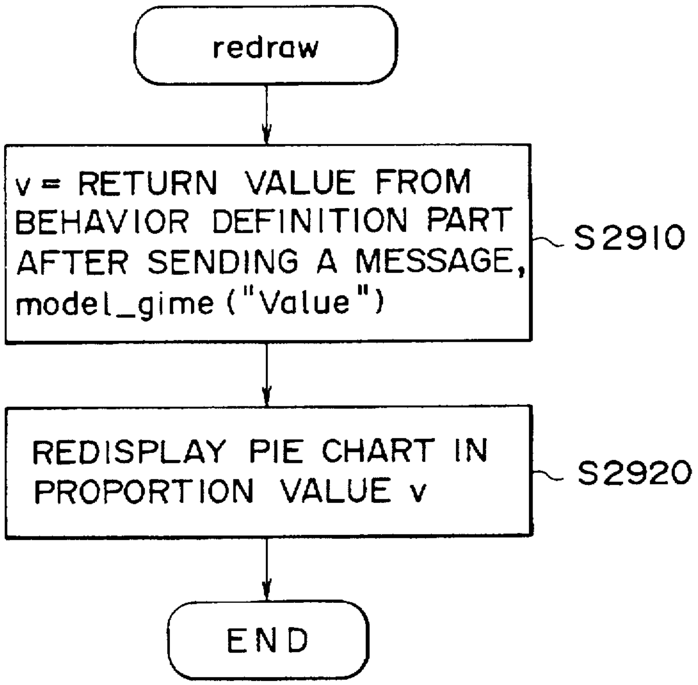

| COMPONENT ADDRESS (4631) | COMPONENT NAME (4632) | PAGE NUMBER (4633) | DISPLAY LOCATIONS OF COMPONENT IN PAGE (4634) |
|---|---|---|---|
| e | "PIE CHART DISPLAY COMPONENT" | 4 | (50, 45) |
| c | "BAR GRAPH DISPLAY COMPONENT" | 2 | (65, 30) |
| d | "CALCULATOR COMPONENT" | 3 | (20, 15) |
| a | "BAR METER COMPONENT" | 1 | (70, 20) |
| b | "BUTTON COMPONENT" | 1 | (40, 130) |
| | | | |

| COMPONENT ADDRESS (4631) | COMPONENT NAME (4632) |
|---|---|
| d | CALCULATOR COMPONENT |
| | |

4641

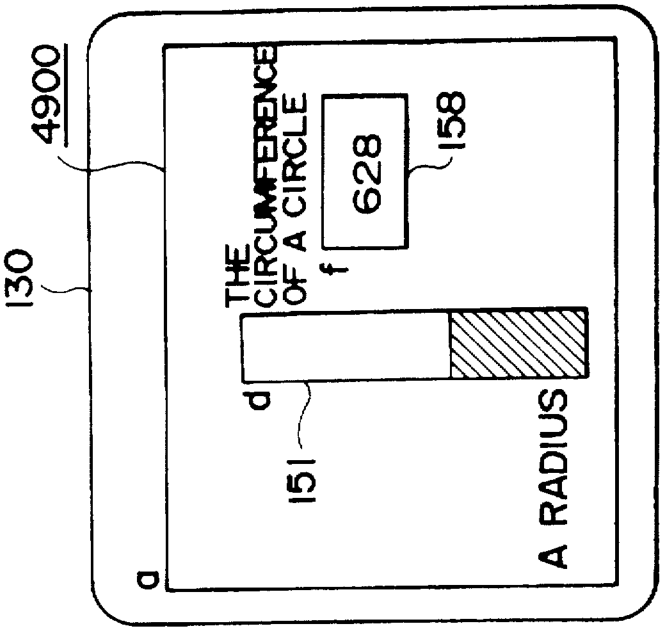
F I G. 49(B)
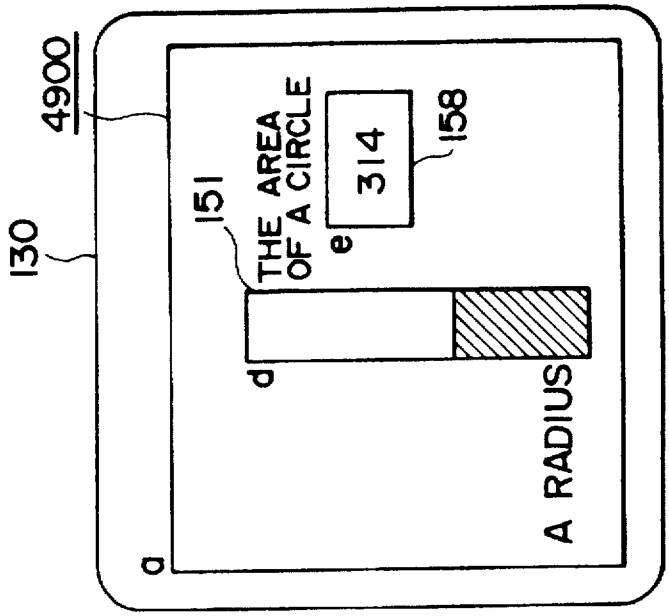
F I G. 49(A)

F I G. 53(A)
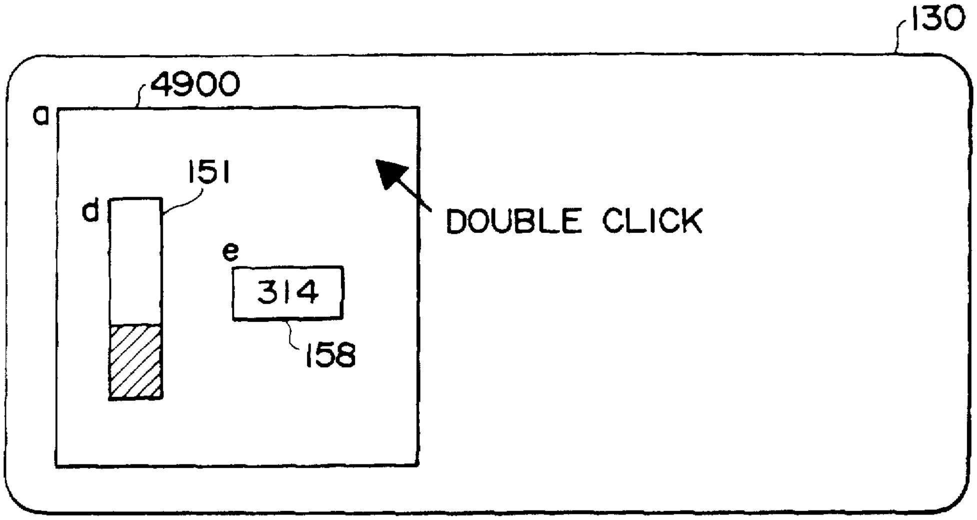
F I G. 53(B)
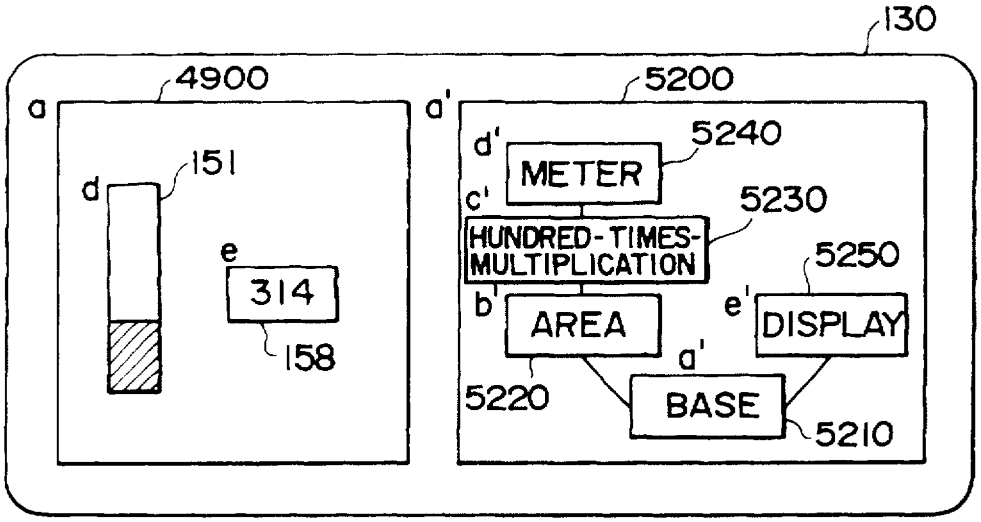

| id (5610) | COMPONENT ADDRESS (5620) | PARENT id (5630) | CHILD id_list (5640) | node_window (5650) |
|---|---|---|---|---|
| 1 | a | NULL | (2,5) | a' |
| 2 | b | 1 | (3) | b' |
| 3 | c | 2 | (4) | c' |
| 4 | d | 3 | ( ) | d' |
| 5 | e | 4 | ( ) | e' |

F I G. 72(A)
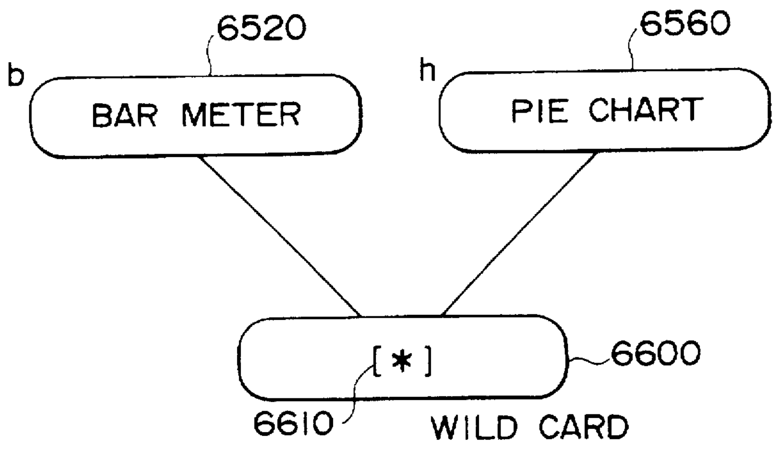
F I G. 72(B)
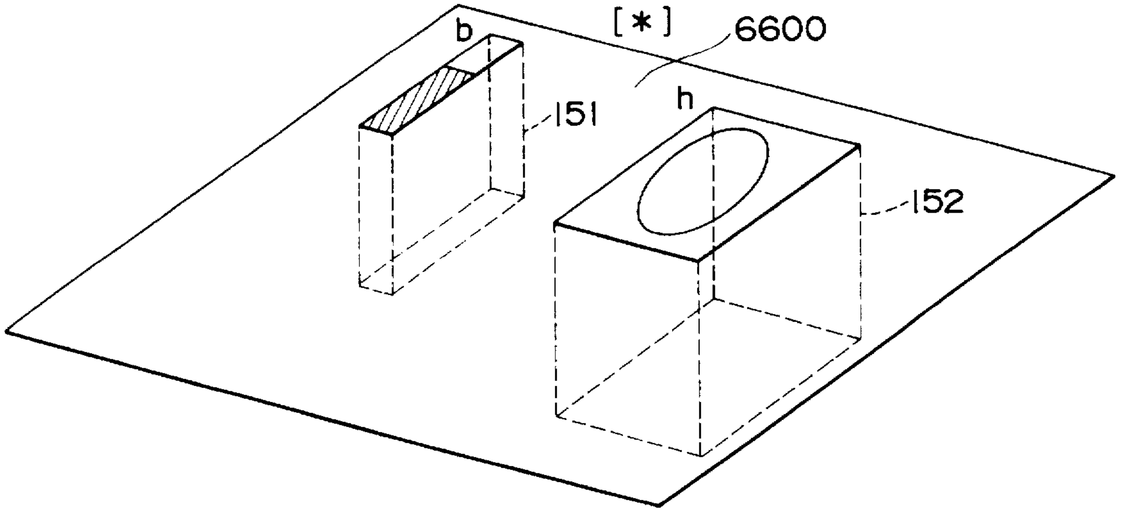

F I G. 74
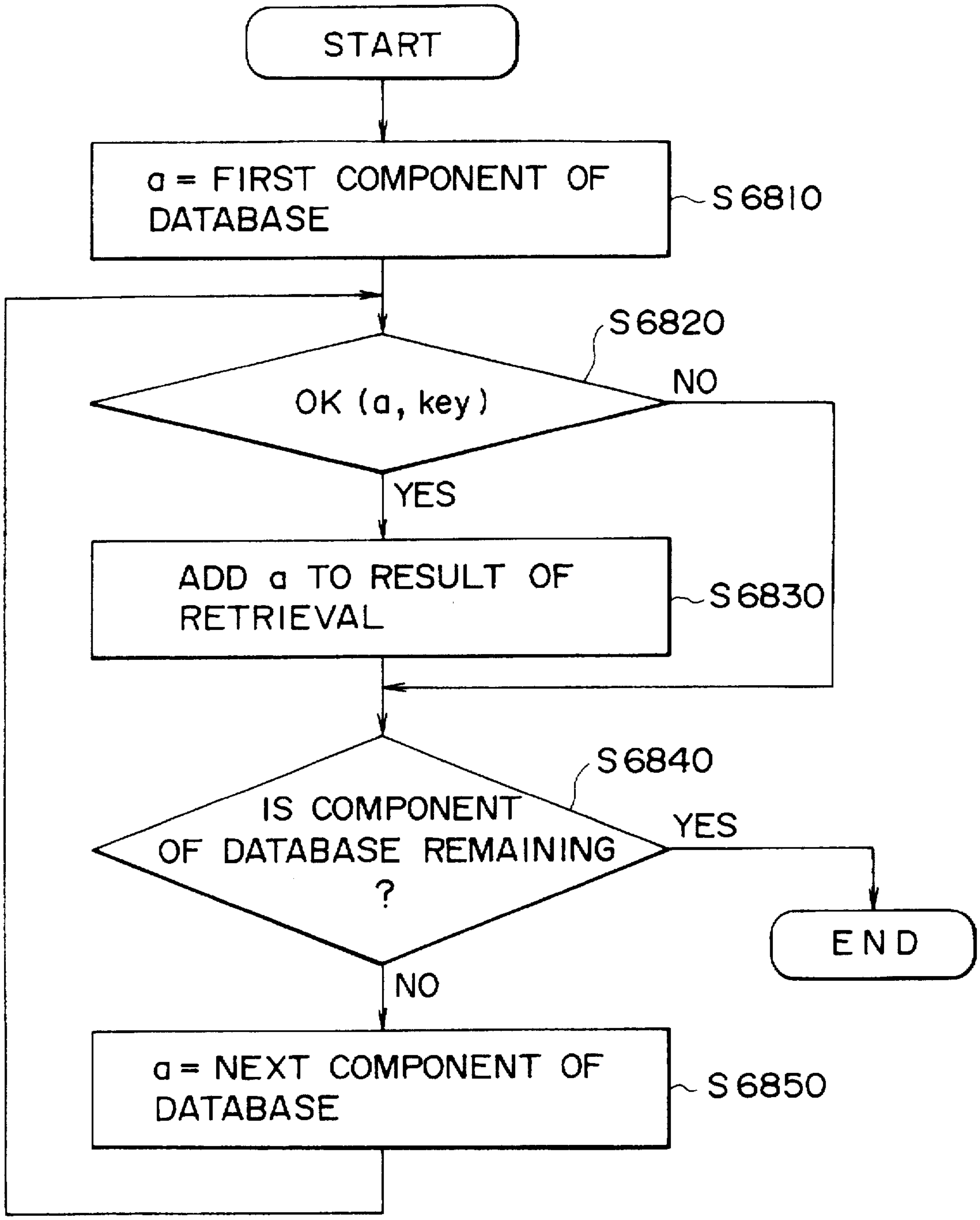

| SLOT NAME (223) | SLOT VALUE (224) |
|---|---|
| Value | 0 (8320) |

FIG. 89(B)

| | OWN SLOT | Value (225) |
|---|---|---|
| 226 | OWN SLOT | Value |
| 227 | PARENT SLOT | SI (8330) |
| 228 | set | ON |
| 229 | gime | OFF |
| 230 | update | OFF |

| | | |
|---|---|---|
| 215 | PARENT | k |
| 217 | CHILD | e, i |

| | 223 SLOT NAME | 224 SLOT VALUE |
|---|---|---|
| 8520 | S1 | 0 |
| 8530 | S2 | 0 |

| | | |
|---|---|---|
| 226 | OWN SLOT | —— |
| 227 | PARENT SLOT | —— |
| 228 | set | —— |
| 229 | gime | —— |
| 230 | update | —— |

9240

9241 9242 9243

| OPERATION POINT | ROLE NAME | LOCATION |
| --- | --- | --- |
| OP1 | Taro | (x1, y1) |
| OP2 | Jiro | (x2, y2) |
| | | |

```
on Start Button click                               9411
        Melody set ("Sound", "do"):                 9412
        Melody set ("Sound", "re"):                 9413
        Melody set ("Sound", "mi"):                 9414

        Problem set ("Reset", Null):                9415
        Summary set("Reset", Null):                 9416
end:                                                9417
on Answer Button click                              9418
        Problem set ("Answer", Null):               9419
end:                                                9420
on Summary Button click                             9421
        Summary set ("Display", Null):              9422
end:                                                9423
on Problem Correct                                  9424
        Summary set ("Correct", 1):                 9425
        Melody set ("Sound","mi"):                  9426
        Melody set ("Sound","fa"):                  9427
        Melody set ("Sound","so"):                  9428
end:                                                9429
on Problem wrong                                    9430
        Summary set ("Wrong", 1)                    9431
        Melody set ("Sound","mi"):                  9432
        Melody set ("Sound","fa"):                  9433
        Melody set ("Sound","so"):                  9434
end:                                                9435
```

F I G. 101(A)
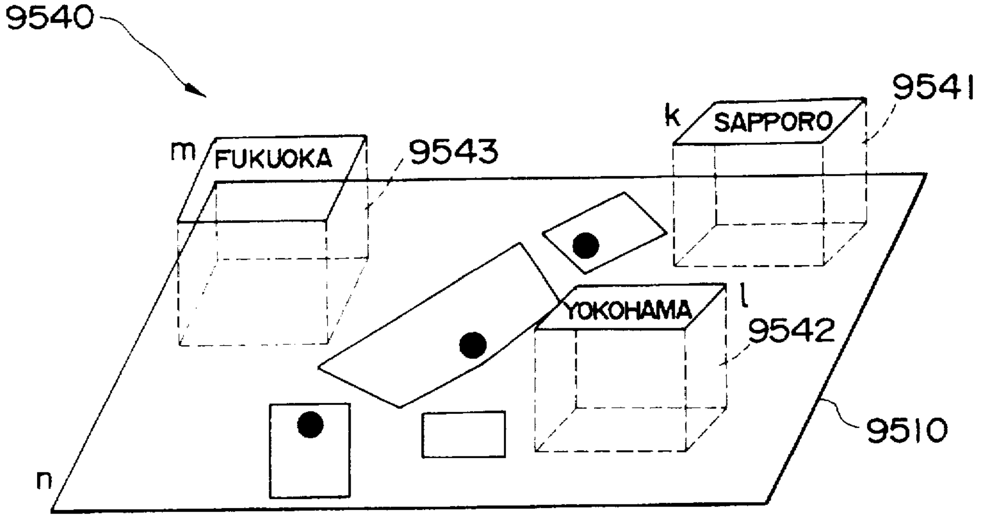
F I G. 101(B)
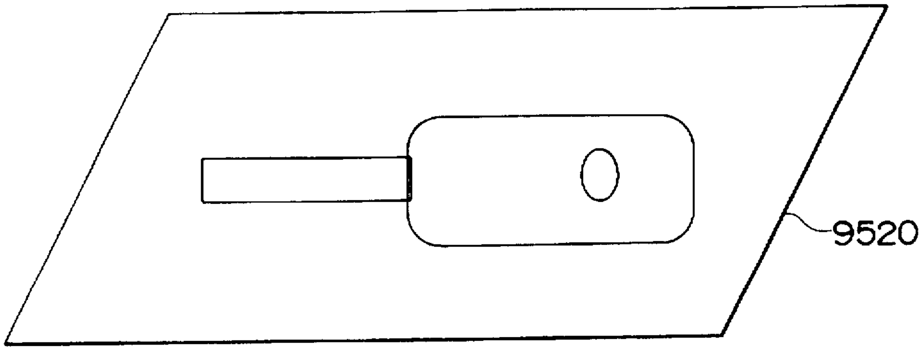
F I G. 101(C)
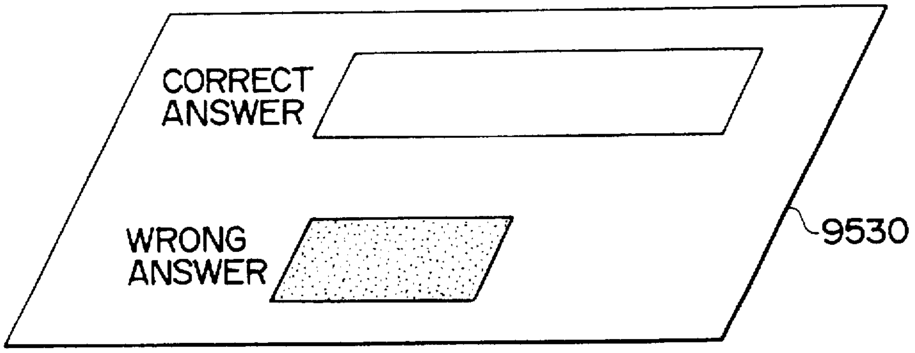

| OPERATION POINT (9611) | ROLE NAME (9612) | LOCATION (9613) | |
|---|---|---|---|
| OP(1) | Problem | (x5, y5) | 9311 |
| OP(2) | Melody | (x4, y4) | 9331 |
| OP(3) | Summary | (x6, y6) | 9341 |
| OP(4) | Start Button | (x1, y1) | 9351 |
| OP(5) | Answer Button | (x2, y2) | 9352 |
| OP(6) | Summary Button | (x3, y3) | 9353 |

9810 (9811, 9812, 9813)

| SLOT NAME | SLOT VALUE |
|---|---|
| Sound | N/A |

9820 (9821, 9822)

| PARENT | CHILD |
|---|---|
| g | |

10010 (10011, 10012, 10013)

| SLOT NAME | SLOT VALUE |
|---|---|
| Sound | N/A |

10020 (10021, 10022)

| PARENT | CHILD |
|---|---|
| g | |

| SLOT NAME | SLOT VALUE |
|---|---|
| Value | "4" |

| PARENT | CHILD |
|---|---|
| d | |

| | |
|---|---|
| CHARACTER-STRING | "4" |

| | |
|---|---|
| OWN SLOT | Value |
| PARENT SLOT | OP 1 |
| set | ON |
| gime | ON |
| update | ON |

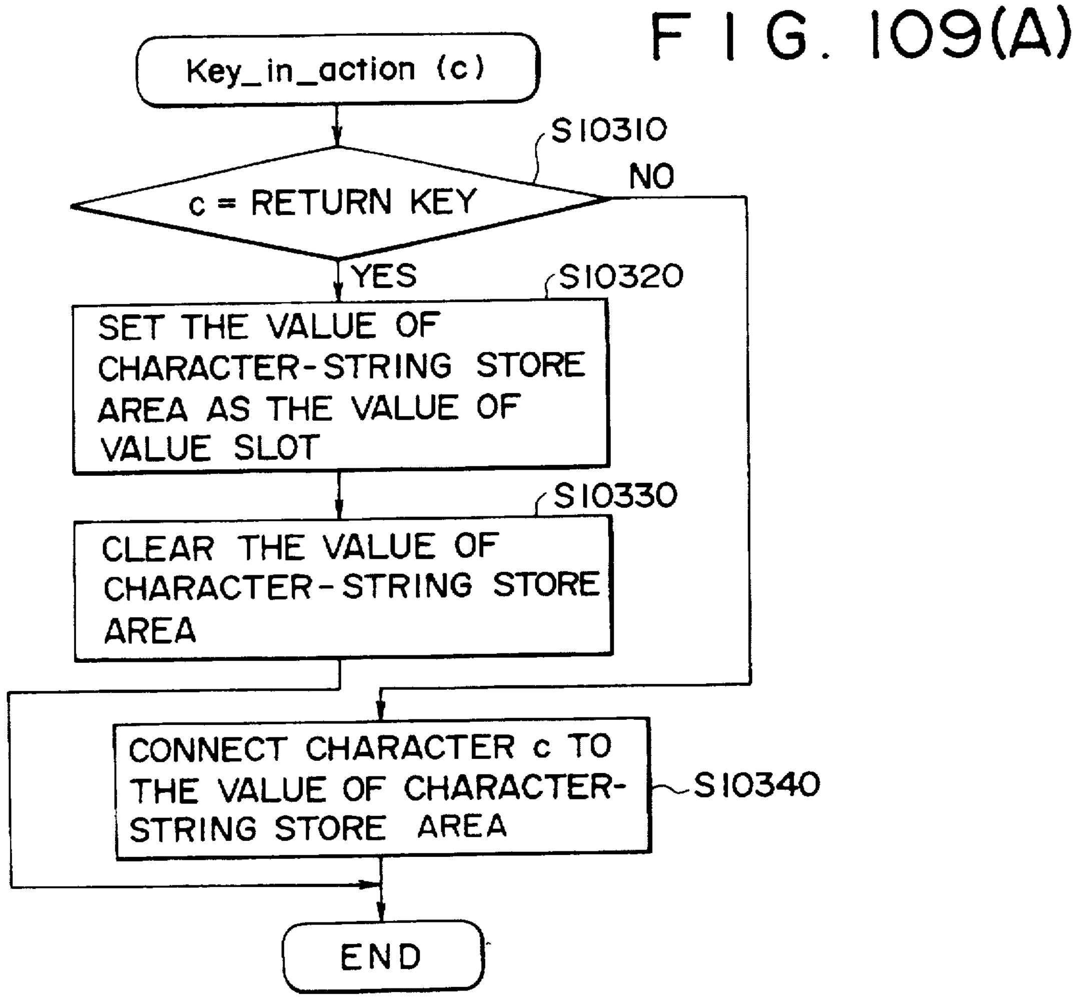
FIG. 109(A)
FIG. 109(B)
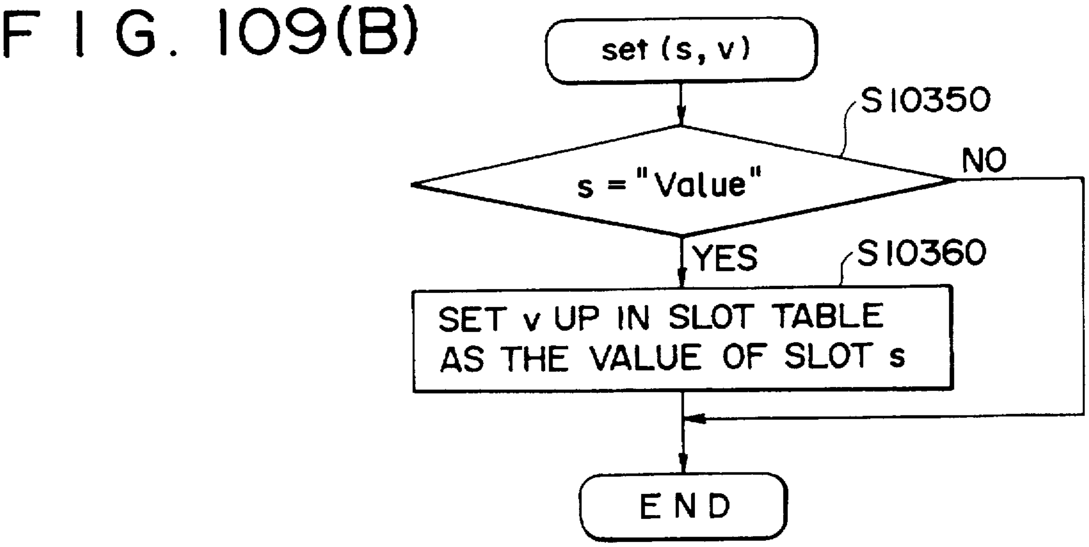

| SLOT NAME | SLOT VALUE |
|---|---|
| Value | "札幌" |

| PARENT | CHILD |
|---|---|
| n | |

| | |
|---|---|
| CHARACTER-STRING | "札" |

| | |
|---|---|
| OWN SLOT | Value |
| PARENT SLOT | Sapporo |
| set | ON |
| gime | ON |
| update | ON |

F I G. 112(A)

10610

| | 10611 SLOT NAME | 10612 SLOT VALUE |
|---|---|---|
| 106111 | P (1) | "4" |
| 106112 | P (2) | "2" |
| 106113 | P (3) | "6" |
| 106114 | Reset | N/A |
| 106115 | Answer | N/A |

F I G. 112(B)

10620

| 10621 PARENT | CHILD 10622 |
|---|---|
| g | a |
| | b |
| | c |
| | |
| | |

F I G. 114(A)

10810

| | 10811 SLOT NAME | 10812 SLOT VALUE |
|---|---|---|
| 108111 | Sapporo | "札幌" |
| 108112 | Yokohama | " " |
| 108113 | Fukuoka | " " |
| 108114 | Reset | N/A |
| 108115 | Answer | N/A |

F I G. 114(B)

10820

| 10821 PARENT | 10822 CHILD |
|---|---|
| g | k |
| | l |
| | m |
| | |
| | |

| SLOT NAME (11011) | SLOT VALUE (11012) | |
|---|---|---|
| Reset | N/A | 110111 |
| Correct | 5 | 110112 |
| Wrong | 3 | 110113 |
| Display | N/A | 110114 |

| PARENT (11021) | CHILD (11022) |
|---|---|
| g | |
| | |
| | |
| | |

| SLOT NAME (11211) | SLOT VALUE (11212) |
|---|---|
| Reset (112111) | N/A |
| Correct (112112) | 5 |
| Wrong (112113) | 3 |
| Display (112114) | N/A |

| PARENT (11221) | CHILD (11222) |
|---|---|
| g | |
| | |
| | |
| | |

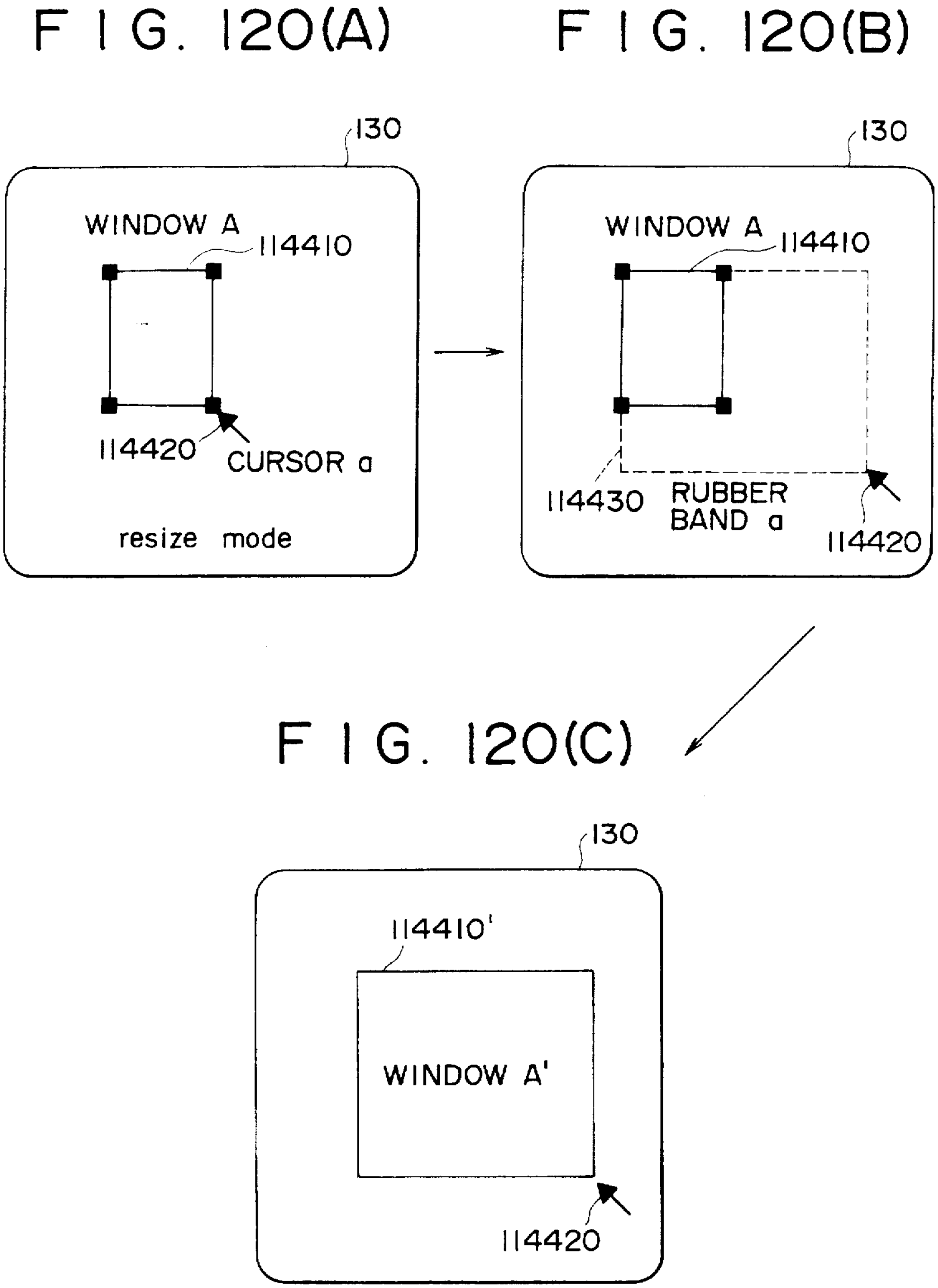
F I G. 120(A)
130
WINDOW A
114410
114420
CURSOR a
resize mode
F I G. 120(B)
130
WINDOW A
114410
114430
RUBBER
BAND a
114420
F I G. 120(C)
130
114410'
WINDOW A'
114420

METHOD FOR IMPLEMENTING A PROGRAM FOR AN OBJECT-ORIENTED PROGRAMMING SYSTEM USING GRAPHICS

BACKGROUND OF INVENTION

1. Field of the Invention

The present invention relates to a method for implementing a program for an object-oriented programming system by using graphics.

2. Description of the Related Art

Hitherto, there has been known an object-oriented programming system, a technique for structuring a program, as an objective, or a component having a new processing function by categorizing data and a process of the data as an object, and by utilizing the object as one unit of an object-oriented component or a process component (hereinafter referred to simply as a "component").

In "Computer Science" (Yuzuru Tanaka: Vol. 2, No. 1, 1992), a method is proposed for displaying a basic component on a display screen as an image of a graphic referred to as a "base", and realizing the composite functions of plural components by pasting or superimposing the basic components while displaying them on the display screen.

More specifically, the technique proposed in the Tanaka publication comprises defining an entity as an object of manipulation by a controller part (controller: C) for defining a behavior of the entity in response to an external operation, by a view definition part (view: V) for defining a view status thereof on a display screen and by a behavior definition part (model: M) for holding a current status thereof, displaying the entity as an object-oriented component of one unit on the display screen in the view status defined by the view definition part, pasting or superimposing a plurality of the object-oriented components displayed thereon while the components are displayed on the display screen, and creating a process component to be employed for carrying out a particular process.

This technique can briefly create a component, for example, a "Japanese map" component, in which a graph or a graphic item is to be described, by pasting or superimposing a desired "graph" component or "meter" component on the "Japanese map" component.

Further, this technique can briefly create a component, for example, a "book" component, in which a graph or a graphic item is described, by pasting or superimposing the desired "graph" component or "graphic" component on the "book" component.

In addition, for example, a "statistics display" tool (or component) for displaying statistical data of a city of Japan, in which a graph or a graphic item is to be described, can readily be created by pasting or superimposing a desired "bar meter" component or "numerical display" component on the "Japanese map" component.

Furthermore, for example, a variety of composite components can be created by pasting or superimposing a first component on a second component acting as a pasting or superimposing source on which the first component is to be pasted or superimposed, and the composite components can be displayed as windows on the display screen.

Further, a CAI (Computer Assisted Instruction) tool can briefly create a "text" component in which a graph or a graphic item is to be described, by pasting or superimposing a desired "graph" component or "graphic" component, in creating such a "text" component which can automatically make a correction decision for certain questions, calculate rates of correct answers, and so on.

In some cases, it is necessary to enlarge or reduce the "Japanese map" component in its X- or Y-direction. The enlarging or reducing operations have hitherto been implemented by creating a program defining the geographical relationship of the X-direction with the Y-direction of each component constituting the "Japanese map" component (re-programming of conversion functions), and then by installing the program into a data processor.

The re-programming of the conversion functions, however, is heavily dependent upon a programmer having professional knowledge and skills. It is thus difficult for general users to create the program for the re-programming of the conversion functions.

Further, when a new composite component, such as a "statistics display" tool (component), is created from a plurality of components, it is necessary to specify a retrieval key word for the retrieval of each of the components structuring the composite component, while taking the possibility of retrieving the composite component into account.

For conventional object-oriented programming systems, however, each of the basic components of the composite component is provided with a retrieval key word in advance and the components utilized therefor are retrieved on the basis of the retrieval key words.

There is also known a method for specifying a retrieval key word for making a retrieval for a newly created composite component by a graph structure comprised of a node or a link.

When a component consisting of plural pages, such as a book, is to be created, an index is added to the component at its end or at its beginning. The index may in many occasions include a description of the components contained therein and the corresponding page numbers on which they are described.

In a conventional method for creating such an index, the components are manually retrieved for every page of the component and the retrieved components are then arranged so as to correspond with the pages on which they appear. This manual work requires a long period of time.

Further, when the component is a composite component created by combining a plurality of basic components, an index is required to be set out and prepared with the relationship between the composite component and the plural basic components taken into consideration. The preparation of such an index requires laborious work.

In addition, when a composite component, such as a book, consisting of a plurality of components, is to be created, the component or components constituting the composite component may be pasted or superimposed on the other component or components in layers while being displayed on the display screen.

Furthermore, there is known a window or the like, which is a component that is capable of being operated and manipulated with ease by conventional techniques. The window component is to be visually confirmable and can be displayed on the display screen.

However, the manipulation of visually confirmable windows suffers from the disadvantage that a visually unrecognizable on-screen window, placed underneath another window component, cannot be operated or manipulated unless the windows pasted or superimposed on the involved window are moved to the top of the display screen.

If the number of windows is large and a large number of windows has to be moved to expose the desired window, the operation of moving the windows to the top of the display screen becomes laborious.

Furthermore, for example, when a "graph" component or a "meter" component is to be pasted or superimposed on a "Japanese map" component, the "Japanese map" component may have to be copied or duplicated, and the copy or duplication then being displayed on the same display screen.

In this case, if a copy or duplication (called a shared copy or duplication) could be created such that, for example, a value of the "meter" component in the copy or duplication of the "Japanese map" component could be varied, too, simply by varying a value of the "meter" component of the "Japanese map" component as a source copy or duplication, the shared duplication or copy could be utilized for a wide variety of applications.

Recently, research on data processing systems has been developing and, in particular, in the CSCW (Computer Supported Cooperative Work), increasing demands have been expressed to share the same status of such a duplication or copy with a plurality of users.

It is to be noted, however, that conventional technology requires programming for associating the component employed as a source copy or duplication with the component employed as a target copy or duplication, in order to create a shared copy or duplication, and such programming work requires a considerably long period of time.

Further, it is to be noted that, when a new composite component is to be created from a plurality of components, such as the "statistics display" tool (component), retrieval key words for retrieving the components constituting the composite component should be specified while taking into account that the composite component is retrieved in the future.

In retrieving the components utilized for conventional object-oriented programming systems, each of the basic components is provided in advance with a retrieval key word, and the component is retrieved on the basis of the corresponding retrieval key word.

It is also known that the retrieval key word for such a newly-created composite component is specified by a graph structure comprised of a node and a link.

If the newly created component is a composite component created by a collection of a plurality of basic components, a retrieval key word should be specified for each combination of the basic components. This task also requires complicated and laborious programming work.

In specifying the retrieval key word for the composite component as the graph structure, however, it becomes difficult to recognize the structure of the composite component in an intuitive way.

On the other hand, when the composite component is to be created, there are many occasions that a certain condition is provided for associating or linking a component with or to another component to be pasted or superimposed thereon. For example, the conditioning may be performed with a hyperlink in such a manner that a window pasted or superimposed on another window is displayed on the display screen only when two windows are clicked.

Such a conventional hyperlink conditioning method, however, suffers from the disadvantage that it is difficult for general users to execute the hyperlink conditioning with high freedom because the condition is fixed to each of the hyperlinks.

On the other hand, when a composite component consisting of a plurality of components, such as a "text" component, is to be created, the process contents corresponding to the user operation should be described in a script for the plural components.

When the process contents are to be described in the script for the components constituting the composite component in conventional manner, a particular component should first be specified as an object of operation, and the process contents corresponding to the user operation are to be described in the script for each of the particular components.

In addition, when the composite component is to be created, a component thereof is replaced with another component, in order to create the composite component.

In this case, conventional technology requires a description of the process contents corresponding to the user operation for each component whenever the component is replaced with another component, even if the same user operation is implemented for the component that is to be replaced with a new and different component.

The particular component, however, is required to be specified at the time of creating the script as the object of operation, and thus the script for specifying the particular component as the object of operating cannot be created during execution of the user operation.

Furthermore, when the same user operation should be implemented for the different components, the task for creating the script becomes complicated and laborious because the script should be created for each of the different components.

SUMMARY OF THE INVENTION

The primary object of the present invention is to provide a method for implementing a program for an object-oriented programming system, which enables a conversion function required by general users to be readily realized by an operation for pasting or superimposing conversion components to be displayed on a display screen.

The present invention has a second object of providing a method for implementing a program for an object-oriented programming system, which readily creates an index for a component existing in a composite component consisting of a plurality of pages.

The present invention has a third object of providing a method for implementing a program for an object-oriented programming system, which readily moves or exchanges a window, in any layer in which the window is located, by displaying the composition structure of the windows as a composition tree structure of components, even if the windows would otherwise be visually unconfirmable due to the superimposition of a plurality of windows to be displayed on the display screen.

The present invention has a fourth object of providing a method for implementing a program for an object-oriented programming system, which enables the user to make reference to the status of an information management system located on one display screen or at a plurality of locations.

The present invention further has a fifth object of providing a method for implementing a program for an object-oriented programming system, which readily specifies a retrieval key word for retrieving a basic component of a composite component comprised of a plurality of the basic components on the basis of a pasted or composite structure of the composite component.

The present invention has a sixth object of providing a method for implementing a program for an object-oriented programming system, which readily retrieves a necessary composite component using a retrieval key word specified by the pasted or composite structure of the plural basic components.

The seventh object of this invention is to provide a method for implementing a program for an object-oriented programming system, which enables even general users to readily execute the conditioning by a hyperlink with freedom simply by implementing a pasting or superimposing operation of the components displayed on the display screen.

In addition, the present invention has an eighth object of providing a method for implementing a program for an object-oriented programming system, which requires neither a component object of an operation to be specified in advance, nor a script to be created for each of the components, even if the different components are manipulated by the same user operation.

In order to achieve the primary object, a conversion component for converting a user operation is displayed in advance on the display screen, and an object-oriented component prepared by pasting or superimposing another object-oriented component on the conversion component is subjected to the process defined for the conversion component and then displayed on the display screen.

Further, in order to achieve the second object, a table is created for associating or linking a name of a first object-oriented component, pasted or superimposed on a second object-oriented component consisting of plural pages, with or to a page number of the second component, for pasting or superimposing the first object-oriented component on the second object-oriented component, and so that the page number of the second component is created as an index on the basis of said table.

In addition, in order to achieve the third object, for an operation of pasting or superimposing a first object-oriented component on a second object-oriented component, a composition tree structure of the components, indicating a state in which the first object-oriented component is pasted or superimposed on the second object-oriented component, is created from an association or link relationship of the name of the first object-oriented component with the second object-oriented component, the composition tree structure of the components is displayed on the display screen, and the first component is operated through the composition tree structure displayed thereon.

In order to achieve the fourth object, a copy or duplication of a component obtained by copying or duplicating a component shares a behavior definition part with the component from which the copy or duplication is obtained by copying or duplicating the object-oriented component.

Further, in order to achieve the fifth object, a retrieval key word for specifying a portion or a whole of a component structure of an object-oriented component, as an object of retrieval, is created by pasting or superimposing a plurality of object-oriented components, and the retrieval key word is specified as a component retrieval key word for retrieving the component of the object-oriented component as the object of retrieval.

In order to achieve the sixth object, the retrieval key word for specifying a portion or a whole of the component structure of an object-oriented component as an object of retrieval is created by a pasting operation for pasting a plurality of object-oriented components, and the retrieval key word is specified as a component retrieval key word for retrieving the component of the object-oriented component as the object of retrieval, thereby retrieving the object-oriented component as an objective.

In order to achieve the seventh object, when a previously defined condition has been established, a plurality of conditioned components for performing a particular process defined in advance are combined with each other by pasting or superimposing on the display screen, and a condition for operating a particular component is defined by the combinations.

In addition, in order to achieve the eighth object, the operation contents of operation of the object-oriented component displayed on the display screen, and the position on the display screen in which the operation contents are to be executed, are described in a script, and the object-oriented component disposed in the position is subjected by user operation to the operation contents.

With the arrangement of the means and processes in the manner as described hereinafter, the process for converting the user operation defined in the pasted or superimposed conversion component is executed by a pasting or superimposing operation to be implemented for the conversion component for converting the user operation on the display screen in advance.

This arrangement makes it unnecessary to perform the re-programming work that conventionally requires a programmer having professional knowledge and skills, in order to realize the conversion functions for enlarging, contracting or the like. Further, it enables even general users to realize the necessary conversion functions readily by the pasting or superimposing operation to be implemented on the display screen.

Further, with a focus placed on the association relationship of the view definition part with others, an indexing table is to be created which includes the names of the object-oriented component that is pasted or superimposed on the target object-oriented component, which consists of plural pages. The indexing table is caused to correspond with the page numbers of the target object-oriented component when the first object-oriented component is pasted on the target object-oriented component, and an index is created on a predetermined page of the target object-oriented component on the basis of the indexing table.

Further, the arrangements according to this invention can readily create the index of the other object-oriented components existing in the plural-page object-oriented component.

In addition, the association relationship between or among the basic components constituting the composite component is held in a holding area of the view definition part so that the index can be created without taking the mutual association of the basic components into consideration.

Furthermore, when the pasting or superimposing operation for pasting or superimposing the plural object-oriented components is to be implemented with the relationship in association of the view definition part with the other components taken into consideration, a component-composition tree structure indicating the pasted or superimposed state can be created on the basis of the association relationship between the name of the pasted object-oriented component and the target object-oriented component. The resultant component-composition tree structure is then displayed on the display screen, and the pasted or superimposed component can be operated through the component-composition tree structure.

This arrangement of the tasks allows even the visually unconfirmable component on the display screen, i.e. the component placed underneath the other pasted components, to be moved or exchanged without difficulty.

Further, when the object-oriented component is subjected to a copy or duplication operation with a focus placed upon the association relationship of the view definition part with the pasted object-oriented component, the pasted object-oriented component as a source copy or duplication is arranged so as to share a behavior definition part with the target object-oriented component as a copy or duplication.

With this arrangement, the contents of a behavior definition part of the target object-oriented component can be confirmed by the view definition part of at least one of the other object-oriented components pasted or superimposed on the target object-oriented component, and even users located at plural locations can utilize the target copy or duplication displayed on the same display screen and make reference to the same status of the information management system.

In addition, when the pasting or superimposing operation for pasting or superimposing the first object-oriented component on the plural object-oriented components is to be implemented, the retrieval key word can be created for specifying a part or a whole of the pasted or superimposed structure of the components, and the retrieval key word created in this matter can be specified as a component retrieval key word for retrieving the component of the object-oriented component as the object of retrieval.

Furthermore, the arrangements of the processes according to this invention can make a retrieval for the object-oriented component, as an objective, which has been created by the pasting or superimposing operation on the display screen, and whose pasted or superimposed structure is specified as the component retrieval key word by specifying a part or a whole of its pasted or superimposed structure as the component retrieval key word.

This retrieval method can readily specify the component retrieval key word for making a retrieval for the component of the composite component consisting of the plurality of basic components.

Further, the necessary component can easily be retrieved by specifying the part or whole of the pasted or superimposed structure of the object-oriented component as a component retrieval key word.

In addition, when the condition defined in advance has been established, the component provided with the condition, which is subjected to the particular process previously defined, is displayed on the display screen. The conditioned component displayed is then subjected to the pasting or superimposing operation on the display screen, and a condition for operating a particular component is defined by a combination of the conditioned components.

These processes can allow the object-oriented components to be provided with a hyperlink condition simply by subjecting the object-oriented components on the display screen to the pasting or superimposing operation.

Further, only the process contents to be provided for the component displayed on the display screen by the user operation, and the position in which the user operation is to be implemented, are described in the script.

In addition, the operation contents described in the script can be provided at the time of execution of the user operation by moving the object component to the operation point on the display screen.

With the arrangement of the processes in the manner as described hereinabove, the process contents described in the script can be executed simply by moving the necessary component to the operation point on the display screen without specifying the component as the object of operation in advance.

Further, even when the same operation is subjected to different components, the same process contents described in the script can be executed simply by moving any of the different components to the operation point on the display screen, even though the script fails to describe any particular component.

Other objects, features and advantages of the present invention will become apparent in the course of the description of the specification which follows, with reference to the accompanying drawings.

BRIEF DESCRIPTION OF THE DRAWINGS

FIGS. 2(A) and 2(B) are schematic representations showing a view status of a component on a display screen and an internal structure of components, respectively, according to an embodiment of this invention.

FIGS. 7(A) through 7(E) are a slot table, a slot connection table and a parent-child table of components.

FIGS. 21(A) through (E) are flow charts showing process steps to be performed when a view definition part of the component has received a variety of messages.

FIGS. 22(A) and 21(B) are each a flow chart showing process steps to be performed when a view definition part of the component has received a message, move_action.

FIGS. 26(A) and 26(B) are each a flow chart indicating process steps to be performed when a component according to an embodiment of this invention has received a message, model_set (s, v).

FIG. 28 is a flow chart indicating process steps to be performed when the numeric display component according to an embodiment of this invention has received a message, redraw.

FIG. 29 is a flow chart indicating process steps to be performed when the pie chart component according to an embodiment of this invention has received a message, redraw.

FIGS. 46(A) and 46(B) are each a table structure diagram showing an index table according to an embodiment of the invention.

FIGS. 49(A) and 49(B) are illustrations respectively showing an example of a calculation display tool for calculating the area of a circle and an example of a calculation display tool for calculating the circumference of a circle in accordance with an embodiment of this invention.

FIGS. 53(A) and 53(B) are illustrations for describing display operations for displaying a composition tree of the components according to the present invention.

FIG. 56 is an illustration showing a tree structure table according to an embodiment of the present invention.

FIGS. 72(A) and 72(B) are illustrations showing a method for specifying a pasted or superimposed structure by utilizing a wild card component in accordance with an embodiment of this invention.

FIG. 74 is a flow chart showing a series of process steps for the retrieval method for retrieving the component in accordance with an embodiment of this invention.

FIGS. 89(A) and 89(B) are each an internal table of a button component according to an embodiment of the invention.

FIGS. 91(A) through 91(C) are each an internal table of an AND component according to an embodiment of the invention.

FIG. 100 is a schematic representation showing a description of a script according to an embodiment of the invention.

FIGS. 101(A), 101(B) and 101(C) are illustrations indicating examples of exchange components according to an embodiment of the invention.

FIG. 102 is a table indicative of an operation points list of the script component according to an embodiment of the invention.

FIGS. 108(A) through 108(D) are illustrations respectively showing the configuration of a slot table, a parent-child table, a character-string store table and a slot connection table of a numeric value input/output component according to an embodiment of the invention.

FIGS. 109(A) and 109(B) are each a flow chart showing a series of process steps to be performed when the numeric value input/output component has received a message.

FIGS. 110(A) through 110(D) are illustrations respectively indicating the configuration of a slot table, a parent-child table, a character-string store table and a slot connection table of a character-string input/output component according to an embodiment of the invention.

FIGS. 112(A) and 112(B) are illustrations respectively indicating the configuration of a slot table and a parent-child table of an arithmetic text component according to an embodiment of the invention.

FIGS. 114(A) and 114(B) are illustrations respectively indicating the configuration of a slot table and a parent-child table of a place text component according to an embodiment of the invention.

FIGS. 116(A) and 116(B) are illustrations respectively indicating the configuration of a slot table and a parent-child table of a table type total component according to an embodiment of the invention.

FIGS. 118(A) and 118(B) are illustrations respectively showing the configuration of a slot table and a parent-child table of a graph form total component according to an embodiment of the invention.

FIGS. 120(A) through 120(C) are illustrations describing a conventional method for canceling a resize operation of resizing a window.

Figure 121:
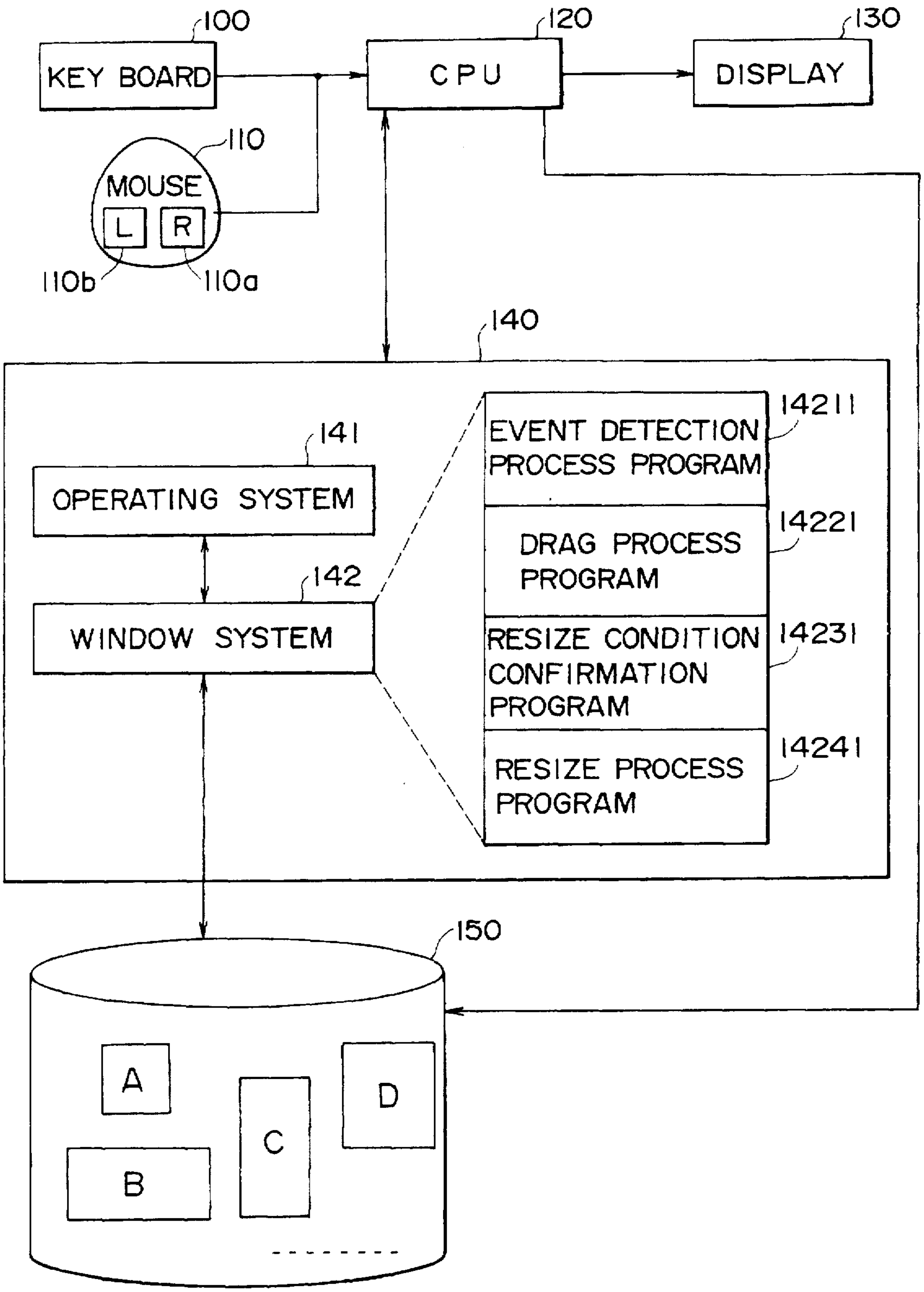

FIG. 121 is a system configuration diagram showing an example of the method for canceling a resize operation of resizing a window.

FIGS. 122(A) through 122(D) are illustrations indicating the method for canceling the window resize operation in accordance with an embodiment of this invention.

Figure 123:
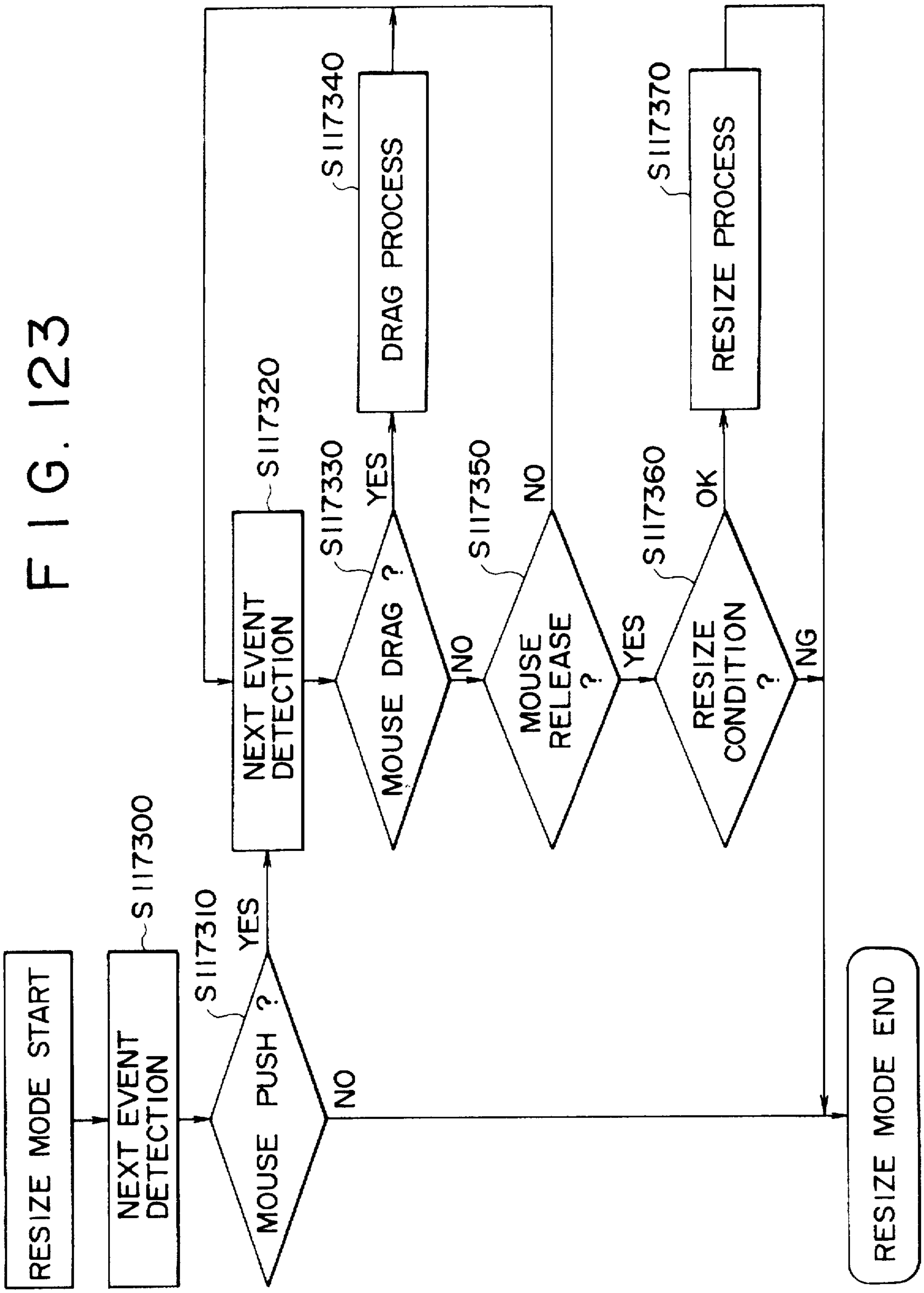

FIG. 123 is a flow chart showing a series of process steps to be performed for canceling the window resize operation according to an embodiment of the invention.

DESCRIPTION OF THE PREFERRED EMBODIMENTS

First, a description will be made of an example of the background of an object-oriented programming system using a graphic in terms of its configuration and basic operations. In all figures to be referred to herein, the same elements are provided with the same reference symbols and numerals for brevity of explanation.

Figure 1:
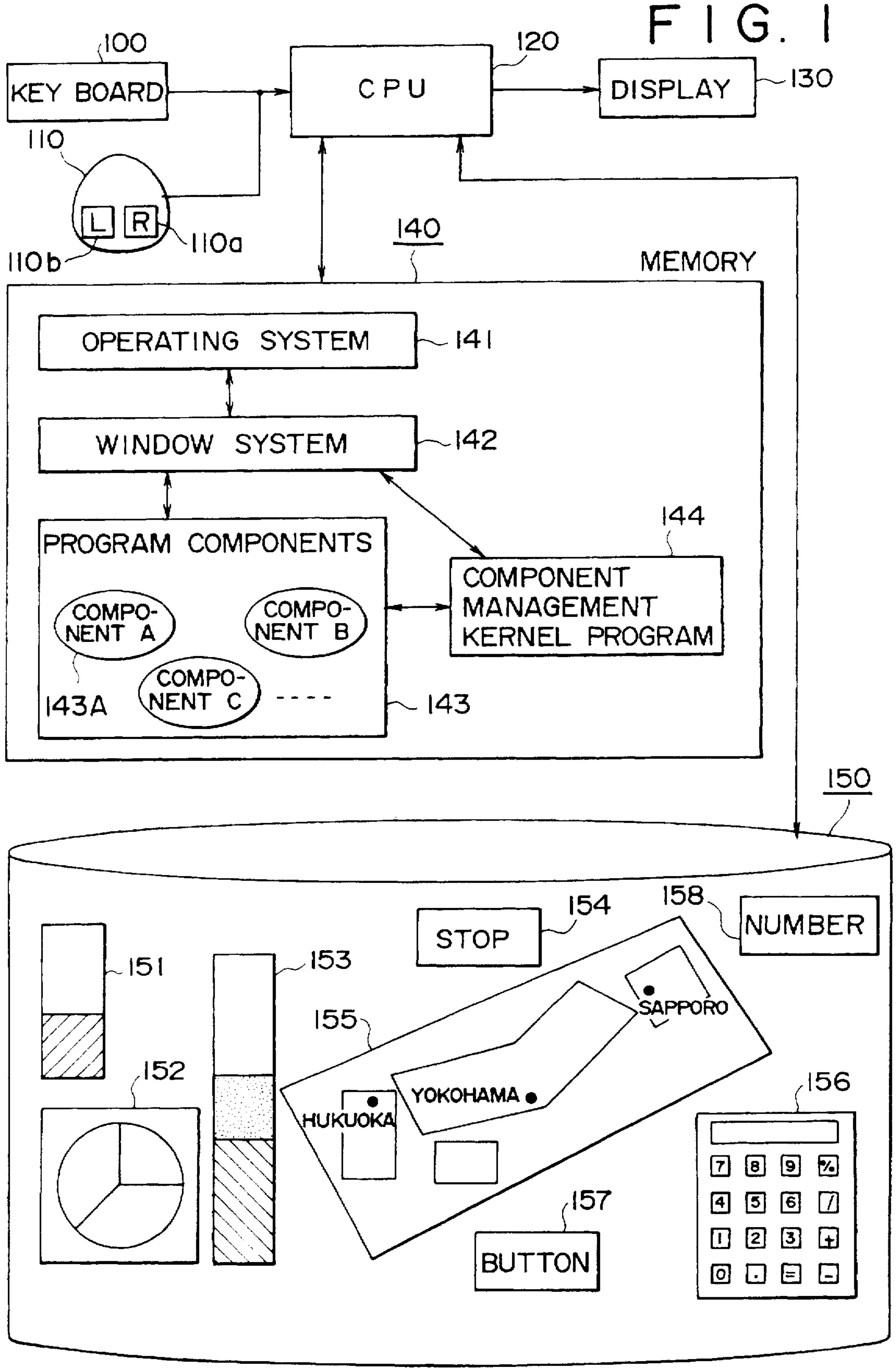
FIG. 1 is a schematic representation showing an outline of an embodiment of the object-oriented programming system to which the present invention is applied.

FIG. 1 shows an outline of an object-oriented programming system using a graphic in accordance with an embodiment of the present invention.

The system according to this invention mainly comprises a keyboard 100 for implementing an input operation for entering commands, characters and so on, a mouse 110 (a pointing device) for implementing an operation to a component displayed on the display screen, a central processing unit 120 for executing operations, a display 130 for displaying a variety of components on the display screen, a memory 140 for storing a variety of processing programs, and a component object database 150 for storing a variety of component objects.

The mouse 110 is provided with a right button **110*a* and a left button 110*b***.

In the memory 140 are stored an operating system 141 for controlling various operations for the components to be displayed on the display screen of the display 130 and a window system 142 for displaying the various components as windows on the display screen of the display 130. These systems 141 and 142 utilize the state of the art known to those skilled in this technology field.

Further, the memory 140 stores program components 143, which define a behavior of each of the various components in response to an external operation and a view status thereof in the form of a "process program", and a component management kernel program 144 for managing connections among the various components.

The component object database 150 stores, as components, a bar meter component 151, a pie chart component 152, a bar graph component 153, a STOP button component 154, a Japanese map component 155, a calculator component 156, a button component 157 and the like.

FIG. 2 shows the basic structures of the various components. For example, FIG. 2(A) shows a view status of the bar meter component 151 on the display screen and FIG. 2(B.) shows the internal structure of the bar meter component. It should be noted herein that, although the bar meter component 151 is referred to merely as an example in FIG. 2, the basic structure of each of the object-oriented components to be operated by this invention can be structured in substantially the manner shown in FIG. 2(B).

As shown in FIG. 2(B), each of the components to be manipulated by this invention is defined by a controller part (a controller: C) 200 defining a behavior of a component in response to an external operation; a view definition part (a view: V) 210 for defining a view by a graphic on a display screen having a holding territory for holding a connection relationship of a component with another component and a definition territory defining a view status of each of the components displayed on the display screen; and a behavior definition part (a model: M) 220 for defining a process response to an external operation and holding its own name and its current state in the form of a "slot".

Figure 3:
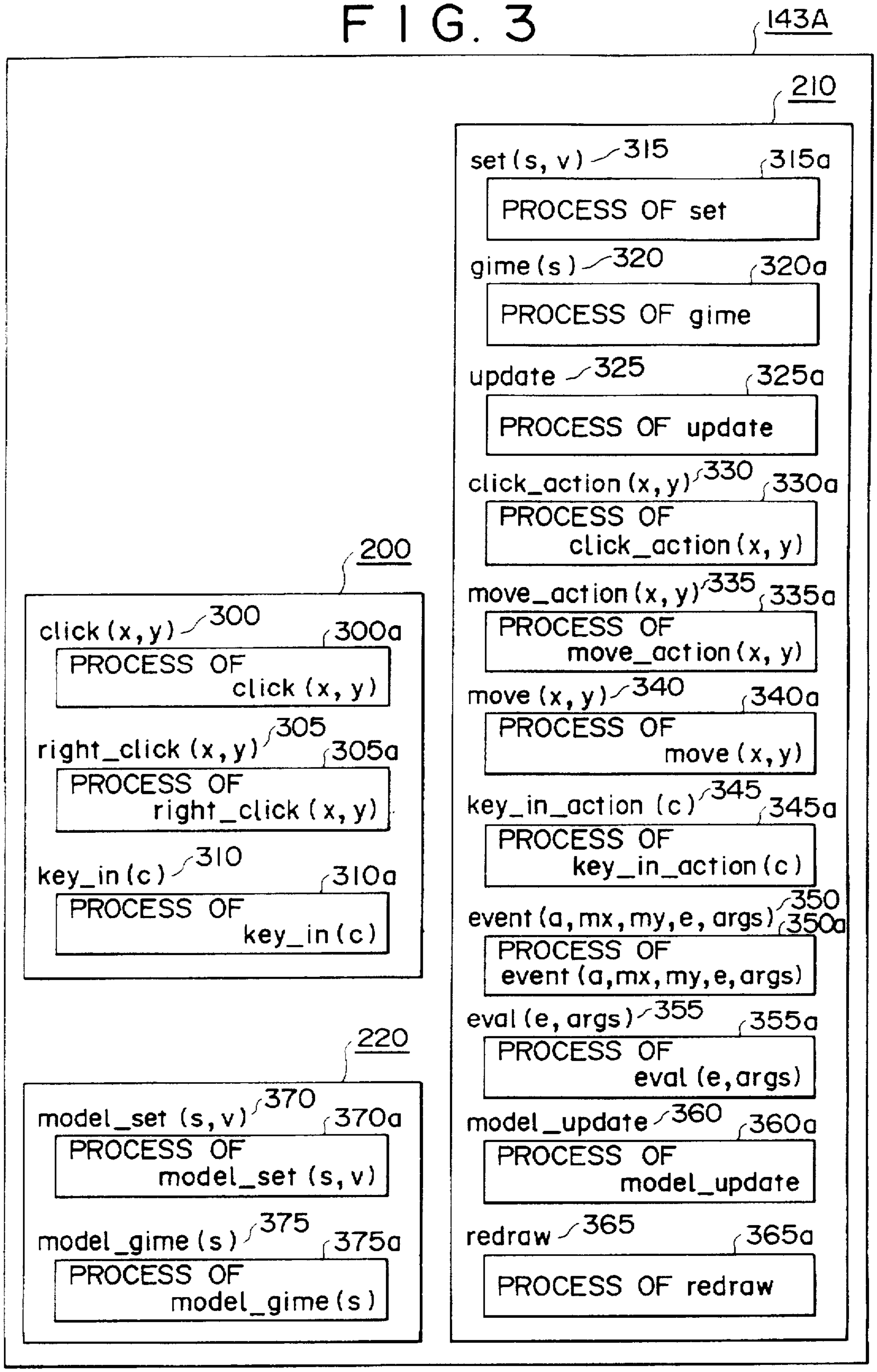
FIG. 3 is a program configuration diagram showing the configuration of a program of components according to an embodiment of this invention.

FIG. 3 shows the configuration of each of the parts (C, V and M) of the component. Each part is constituted by a plurality of processes described in a program type as illustrated therein, and is stored in one of the program components 143.

As shown in FIG. 3, the controller part 200 contains a description of a user operation for executing a process 300$a$ of a message, click (x, y) 300 for pressing the left button 110$b$ of the mouse 110, a process 305$a$ of a message, right_click (x, y) 305 for pressing the right button 110$a$ of the mouse 110, and a process 310$a$ of a message, key_in (c) 310 for executing a key input operation by the keyboard 100.

The messages described in the view definition part 210 and the processes of the messages include, for example:

1. set (s, v) 315: a message stating to set a value "v" to the "slot" indicated by reference symbol "s" and a process 315$a$ of this message;
2. gime (s) 320: a message requiring a value of the "slot" indicated by reference symbol "s" and a process 320$a$ of this message;
3. update 325: a message reporting on the changes of the status of an own component to another component and a process 325$a$ of this message;
4. click_action 330: a message when the own component was clicked and a process 330$a$ of this message;
5. move_action 335: a message when a move operation for the own component was executed and a process 335$a$ of this message;
6. move (x, y) 340: a message requiring a move operation for the own component and a process 340$a$ of this message;
7. key_in_action (c) 345: a message of a key input operation from the keyboard 100 and a process 345$a$ of this message;
8. event (a, mx, my, e, args) 350: a message reporting on the occurrence of an event and a process 350$a$ of this message;
9. eval (e, args) 355: a message requesting an evaluation of a message and a process 355$a$ of this message;
10. model_update 360: a change report message from the behavior definition part 220 and a process 360$a$ of this message; and
11. redraw 365: a message for redisplaying a numeric value, a height of a meter or the like on the display screen and a process 365$a$ of this message.

In addition, the behavior definition part 220 is described by a process 370$a$ of a message, model_set (s, v) 370 for setting a value of the "slot" indicated by reference symbol "s", and with a process 375$a$ of a message, model_gime (s) 375 for requiring a value of the "slot" indicated by the reference symbol "s".

Figure 4:
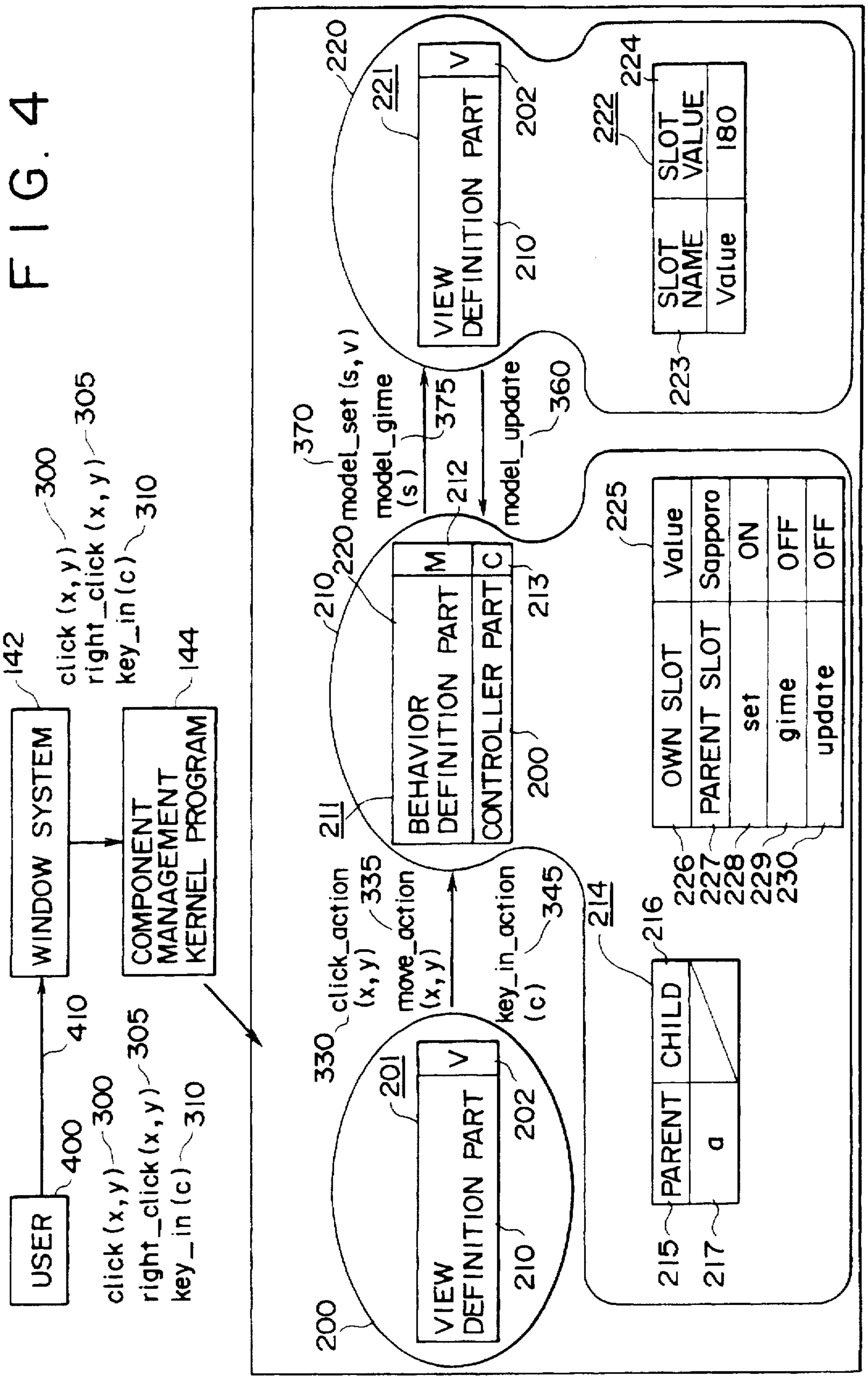
FIG. 4 is a schematic representation showing operations by a user and a transmission sequence of messages to a windows system, a component management kernel program and components.

FIG. 4 shows courses of the various messages. As shown in FIG. 4, one component 420 comprises a controller part 200, a view definition part 210 and a behavior definition part 220. The controller part 200 has an address area 201 holding an address V 202 of the corresponding view definition part 210 of the own component.

The view definition part 210 has an address area 211 holding an address C 213 of the corresponding controller part 200 of the own component and an address M 212 of the corresponding behavior definition part 210 thereof, and a parent child table 214 holding a parent-child relationship with another component. The parent-child table 214 holds parent and child components of the own component. For example, given a bar meter component 151$b$ of "Sapporo" (a city in Japan), a Japanese map component 155 is indicated as a parent component and an address is "a", while no child component exists.

Further, the view definition part 210 is provided with a slot connection table 225 holding information on the connection relationship with other components.

The slot connection table 225 comprises an area 226 for storing the name of the own slot, an area 227 for storing the name of the parent slot, a set field 228 for executing "ON" and "OFF" actions of a message, set (s, v) 315, from the child component, a gime field 229 for executing "ON" and "OFF" actions of a message, gime (s) 320, therefrom, and an update field 230 for executing "ON" and "OFF" actions of a message, update 325, to be sent to the child component.

On the other hand, the behavior definition part 220 contains an address area 221 holding an address V 202 of the corresponding view definition part 210 of the own component and a slot table 222 consisting of a slot name 223 and a slot value 224 of the own component.

Now, a description will be made of the operations of one component having the configuration as indicated in FIG. 4. Referring first to FIG. 4, the user 400 implements various operations 410, such as a click operation and the like, on the display 130. The operation 410 is sensed first by the window system 142 and a message including a click (x, y) message 300, a right_click (x, y) message 305 or a key_in (c) message 310, is created in response to the operation 410 implemented by the user 400 on the display screen. The message created is then transmitted from the window system 142 to the component management kernel program 144.

The component management kernel program 144 transmits the click (x, y) message 300, the right_click (x, y) message 305 or the key_in (c) message 310, to the controller part 200 of the component involved in accordance with the operation transmitted.

When it has received the message from the component management kernel program 144, then the controller part 200 sends the click_action (x, y) message 330, the move_ action (x, y) message 335 or the key_in action (c) 345 to the corresponding view definition part 210 of the own component.

In response to the message from the controller part 200, the view definition part 210 further sends a message including a model_set (s, v) message 370, a model_gime (s) message 375 or the like, to the corresponding behavior definition part 220 of the own component.

Thereafter, the behavior definition part 220 sends a message, model_update message 360, to the view definition part 210 as the corresponding process from the contents of the message sent from the view definition part 210, and sends to the view definition part a report on the changes of the values.

Figure 5:
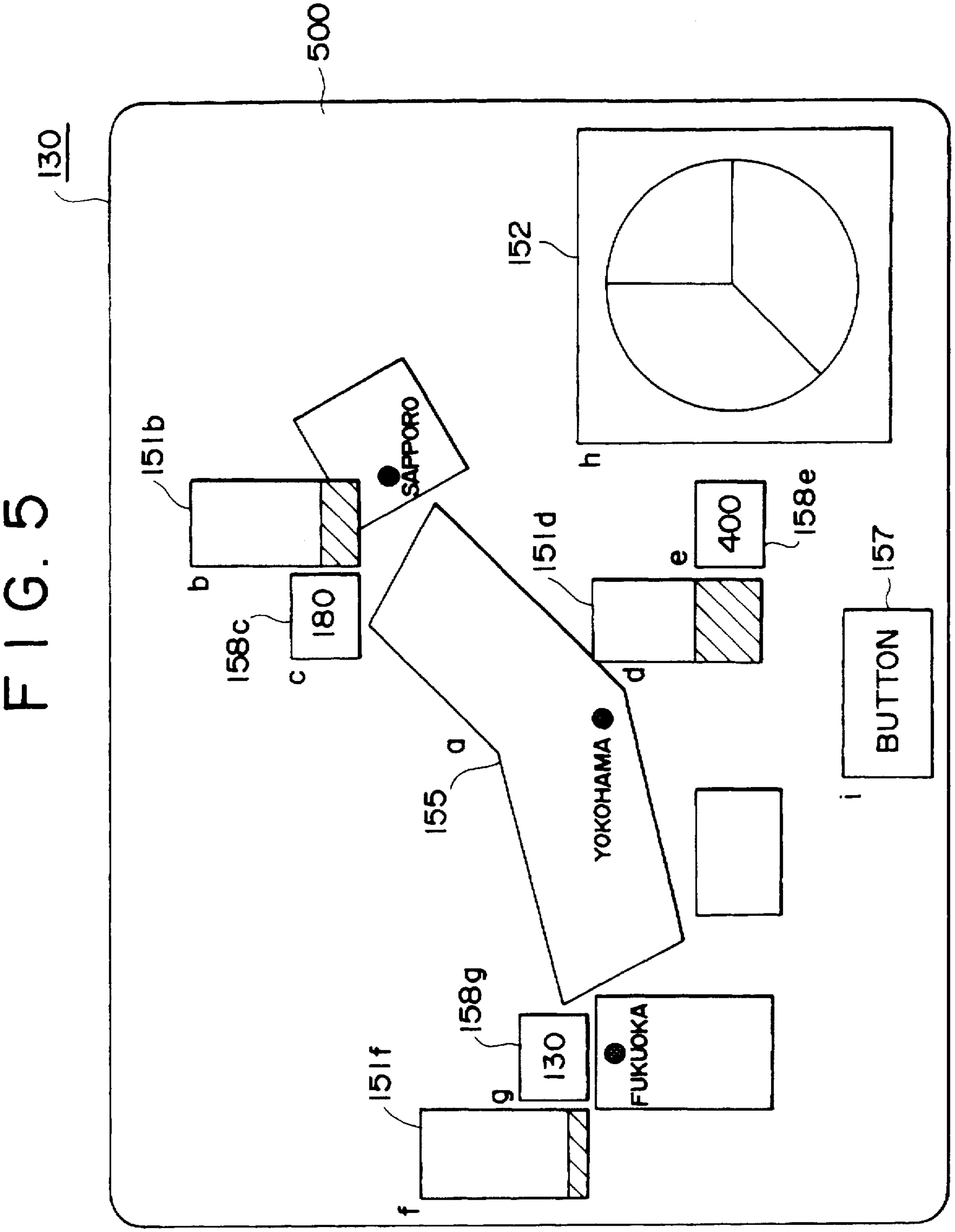
FIG. 5 is a schematic representation showing an example of a statistics data display tool according to an embodiment of this invention.

FIG. 5 shows an example of a statistics data display tool for displaying, a statistics data display table of each city created using the various components having the configurations and the operations as described hereinabove. The statistics data display tool 500 comprises a variety of components such as Japanese map 155, bar meter 151, numeric display device 158, pie chart 152 and so on.

The statistics data display tool 500 is so arranged as to allow a value of a numeric display device 158*c* corresponding to the "Sapporo" bar meter component 151*b* to vary in association therewith when a hatched portion of the "Sapporo" bar meter 151*b* is highlighted with a cursor of the mouse 110 and the hatched portion is clicked so as to move the mouse cursor in the direction in which the bar meter value becomes larger.

Next, a description will be made of arrangements and operations of each of the components as well as the internal configuration of each component for creating the statistics data display table, in the order of the figure numbers.

Figure 6:
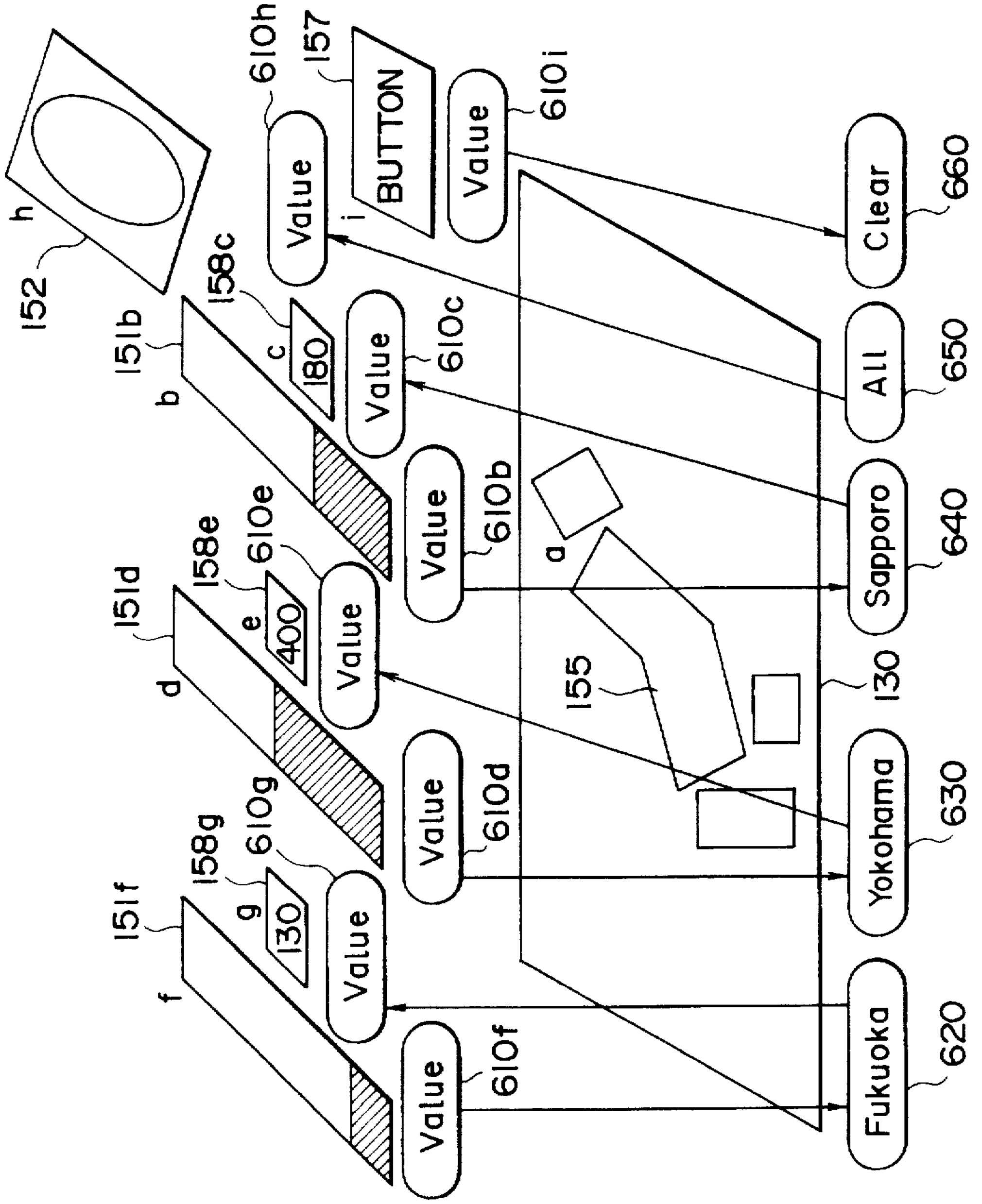
FIG. 6 is a schematic representation showing internal arrangements of the statistics data display tool according to an embodiment of this invention.

FIG. 6 shows the arrangements of the internal configuration of the statistics data display tool.

As shown in FIG. 6, the Japanese map component 155 is provided, for example, with a "Fukuoka" slot 620, a "Yokohama" slot 630, a "Sapporo" slot 640, an All slot 650 and a Clear slot 660.

The bar meter components 151*b*, 151*d* and 151*f* have Value slots 610*b*, 610*d* and 610*f*, and the numeric display devices 158*c*, 158*e* and 158*g* have Value slots 610*c*, 610*e* and 610*g*, respectively.

The pie chart 152 has a Value slot 610*h*, and the button 157 has a Value slot 610*i*.

Each of the slots is connected with each other by a transmission bus for data and messages. For example, the value slot 610*b* corresponding to the "Sapporo" bar meter component 151*b* is connected to the "Sapporo" slot 640 of the Japanese map component 155. Further, the value slot 610*c* of the "Sapporo" numeric display device 158 is connected to the "Sapporo" slot 640 of the Japanese map component 155. The arrows as shown in the drawing indicate the directions in which data and the message are transmitted.

FIGS. 7(A)–7(E) show the internal structure of each of the various components as shown in FIG. 6. It is to be noted herein that the bar meter components 151*b*, 151*d* and 151*f* as well as the numeric display device components 158*c*, 158*e* and 158*g* are represented as an example, by the component indicative of the "Sapporo" statistics data display table.

Figure 7A:
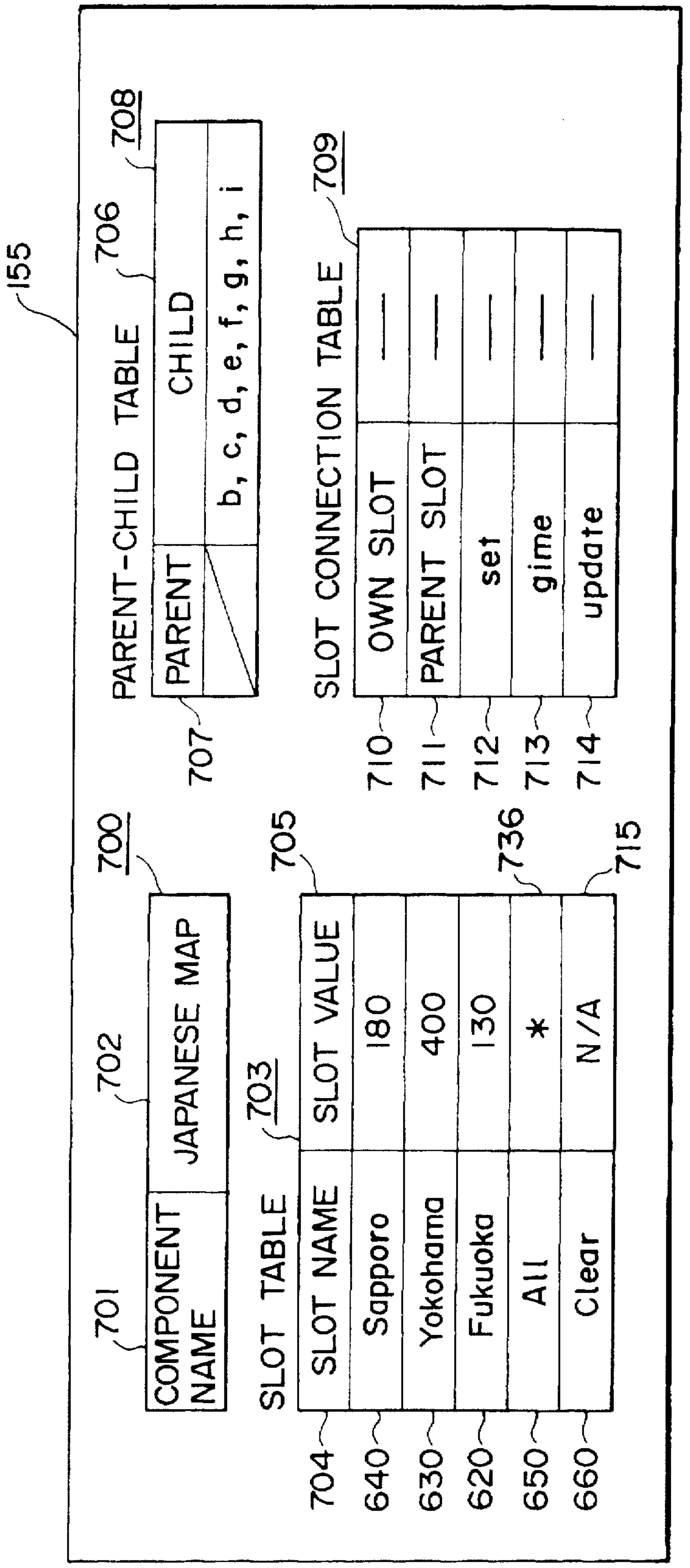

FIG. 7(A) shows the internal structure of the Japanese map component 155 which in turn comprises an index 700 having a Japanese map 702 stored by the own component name 701, a slot table 703, a slot connection table 709 and a parent-child table 708. The slot name 704 of the slot table 703 is stored with the slot names 640, 630, 620, 650 and 660, as shown in FIG. 6, and the slot value 705 is stored with "180", "400", "130", "*" and "N/A". In addition, nothing is stored in each of territories 710 through 714 of the slot connection table 709.

FIGS. 7(B) through 7(E) show the internal structure of each of the components including the bar meter component, the numeric display device component, the pie chart component and the button component, which in turn comprise indexes 716, 721, 726 and 731, each storing the own component name 701, slot tables 717, 722, 727 and 732, the slot connection tables 719, 724, 729 and 734 as well as the parent-child tables 720, 725, 730 and 735, respectively.

Among the slots, there is a slot called a "command slot", which is a "slot having no value". For example, the slot value 224 for the Clear slot 660 of the Japanese map component 155 is referred to as "N/A", indicating that the slot has no value.

Such a command slot can execute only a particular operation in response to the corresponding message. For example, when the Clear slot 660 has received the set (s, v) message 315, the data of every city is set to "0", i.e. only the clear process is executed.

Further, as shown in FIG. 7(A), the mark "*" 736 described in each of the columns indicative of the slot values 705 and 727 in the slot tables 703 and 726 for the Japanese map component 155 and the pie chart component 152 represents a collective value of the slot values, i.e. ("Sapporo" 180), ("Yokohama" 400) and ("Fukuoka" 130).

Further, a description will be made of the pasting operation (or superimposing operation) of the components for creating the statistics data display table as shown in FIG. 5 to be implemented on the display screen of the display 130 by utilizing the various components having the internal structures as described hereinabove.

FIGS. 8(A) through 8(D) show illustrations for describing the pasting operation (or superimposing operation) of each of the components. A description will be made of the pasting operation (or superimposing operation) for pasting or superimposing the bar meter component 151 at the upper left side in FIG. 8(A) on the Japanese map component 155 at the lower right side of the display screen (hereinafter, wherever either "pasting" or "superimposing" is mentioned, the other is implied as well).

For a description of the pasting or superimposing operation, the "Yokohama" bar meter d is taken as an example. First, the cursor 800 (as indicated by the arrow in the drawing) of the mouse 110 is positioned on the "Yokohama" bar meter 151*d* and the mouse 110 is moved while the right button 110*a* is being held down. This operation is referred to as a drag operation.

Figures 8A, 8B, 8C:
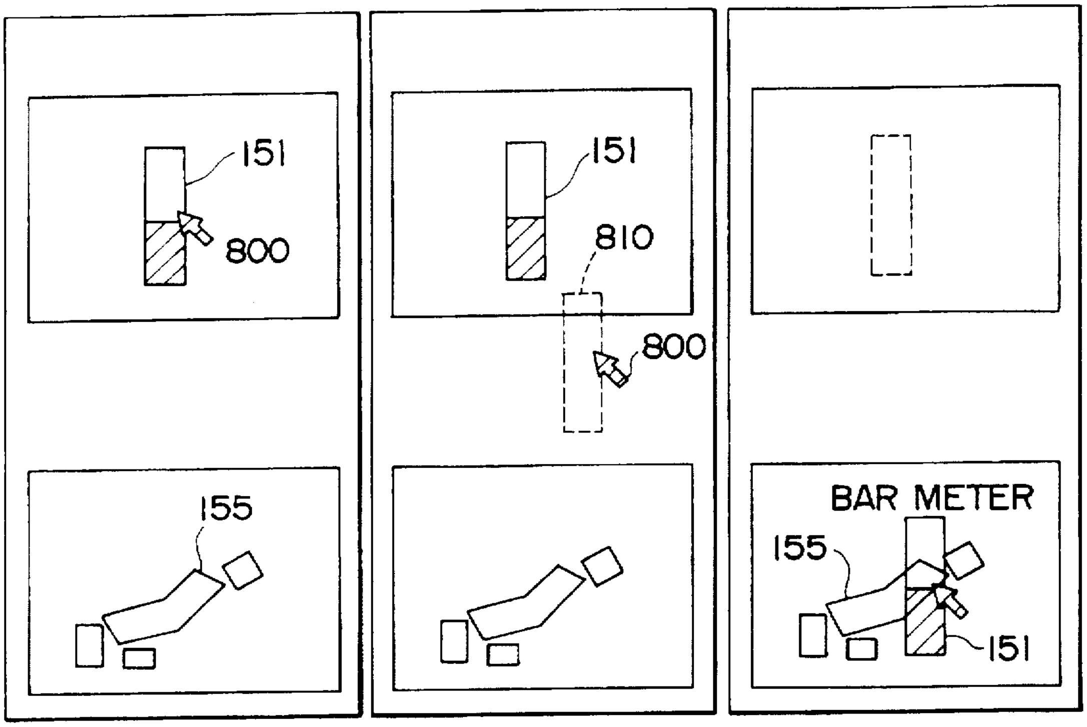
FIGS. 8(A) through 8(D) are each a schematic representation showing a move operation of the component according to an embodiment of this invention.

While the mouse 110 is in the process of the drag operation, a rectangular form of a frame indicated by broken lines, which indicates the "Yokohama" bar meter 151*d*, as shown in FIG. 8(B), is displayed on the display screen. The rectangular form of the frame is referred to as a rubber band 810.

Then, the rubber band 810 is moved in this state onto the Japanese map component 155 in the manner as shown in FIG. 8(C), and the right button 110*a* of the mouse 110 is released as the rubber band 810 has reached a target destination, thereby establishing the position of the target destination of the bar meter 151*d*.

Figure 8D:
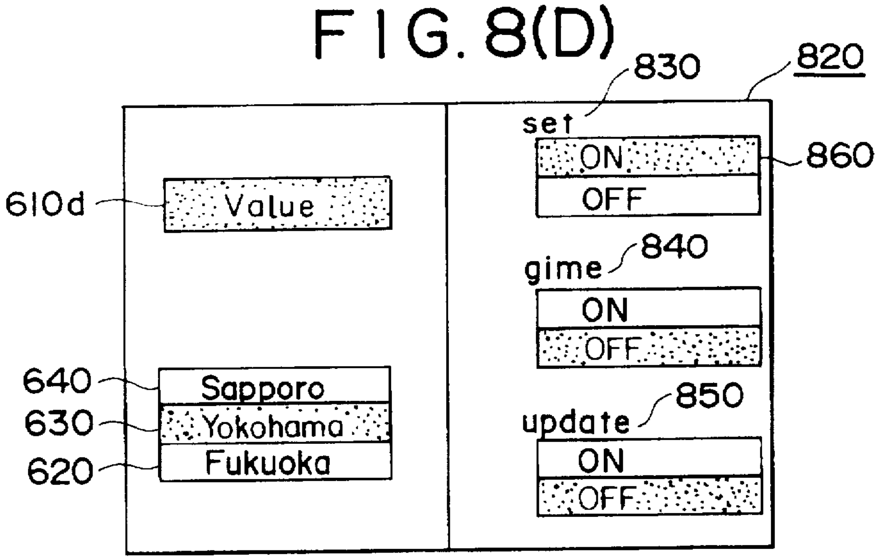

This move operation produces a parent-child relationship between the "Yokohama" bar meter component 151*d* and the Japanese map component 155, and this parent-child relationship connects the "Yokohama" slot 630 of the Japanese map 155 as a parent component with the value slot 610*d* of the "Yokohama" bar meter component 151*d* as a child component in a slot menu screen 820 as shown in FIG. 8(D).

More specifically, the value slot 610*d* of the "Yokohama" bar meter component 151*d* displayed on the slot menu screen 820 is connected with the "Yokohama" slot 630 of the Japanese map component 155.

The method for this combination comprises clicking the value slot 610*d* of the "Yokohama" bar meter component 151*d* and the "Yokohama" slot 630 of the Japanese map component 155 with the left button 110*b* of the mouse 110 on the slot menu screen 820, and further clicking an "ON" selection of the set field 830 with the mouse 110. This connection creates a parent-child relationship between the Japanese map component 155 and the "Yokohama" bar meter component 151*d* in such a manner that the former functions as the parent component and the latter functions as the child component.

Further, "OFF" selections of the gime field 840 and the update field 850 are clicked (in FIG. 8(B), each of the clicked selections is indicated by a screen).

Figure 9:
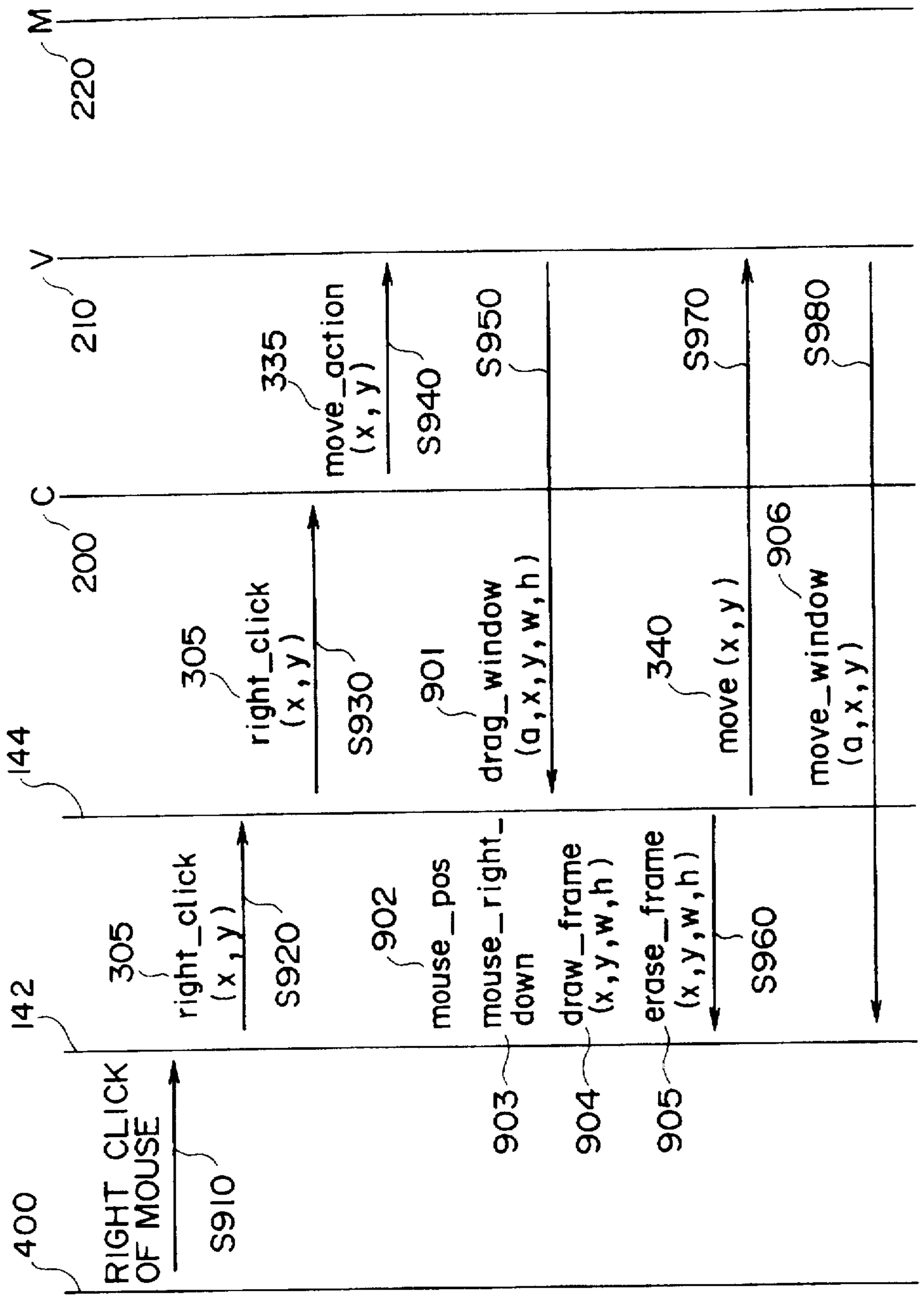
FIG. 9 is a schematic representation showing transmission sequences of messages of the move operation of the components according to an embodiment of this invention.

FIG. 9 shows the transmission sequences of messages and data among the program components 143, the window system 142 and the component management kernel program 144 at the time of the move process of the component.

As shown in FIG. 9, the user positions the cursor 800 of the mouse 110 on the component displayed as a window on the display screen and clicks the right button 110*a*. The information on this click operation is given to the window system 142 (S910).

Once this click information has been received, the window system 142 sends the message, right_click (x, y) 305, indicative of a move operation, to the component management kernel program 144 (S920).

Then, the component management kernel program 144 transmits the right_click (x, y) message 305 to the controller part 200 of the component (S930).

Further, the controller part 200 of the component sends the message, move_action (x, y) 335, to the view definition part 210 of its own component, in response to the right_click (x, y) message 305 (S940).

Upon receipt of the move_action (x, y) message 335, the view definition part 210 sends the message, drag window (a, x, y, w, h) 901 to the component management kernel program 144 as the process 335*a* of the move_action (x, y) message 335, thereby requesting the start of the drag operation (S950).

Once the component management kernel program 144 has received the drag_window message 901, it sends to the window system 142 a message, mouse_pos 902 for acquiring the cursor position of the mouse 110, a message, mouse right_down 903 for acquiring the status of the right button 110*a* of the mouse 110, a message, draw_frame (x, y, w, h) 904 for drawing a rectangular frame corresponding to the rubber band 810 of the bar meter 151, and a message, erase_frame (x, y, w, h) 905 for erasing the rectangular frame corresponding thereto, thereby requesting the operations involved (S960).

Once the user has stopped holding down the right button 110*a* of the mouse 110 and dragging it, the component management kernel program 144 sends the message, move (x, y) 340, to the view definition part 210 of the component (S970). As a result, the component starts to comply with the move message (FIG. 3: 340*a*). The contents of the process will be described hereinafter with reference to FIG. 23.

Upon receipt of the message move (x, y) 340, the view definition part 210 sends a message, move_window (a, x, y) 906, indicative of a request for the move of a window of its own component, to the window system 142 in accordance with the process 340*a* of the move message 340, requiring the move operation of the window of its own component.

In response to the request, the bar meter 151 is moved to its destination position. The parameters as referred to herein can be defined as follows:

a: a source component (window) required to be dragged: 910;

x: an x-location at the upper left corner of the window of the source component required to be dragged;

y: a y-location at the upper left corner of the window of the source component required to be dragged: (x, y) 920;

w: a width of the window of the source component required to be dragged: 930; and h: a height of the window of the source component required to be dragged: 940.

Figure 10:
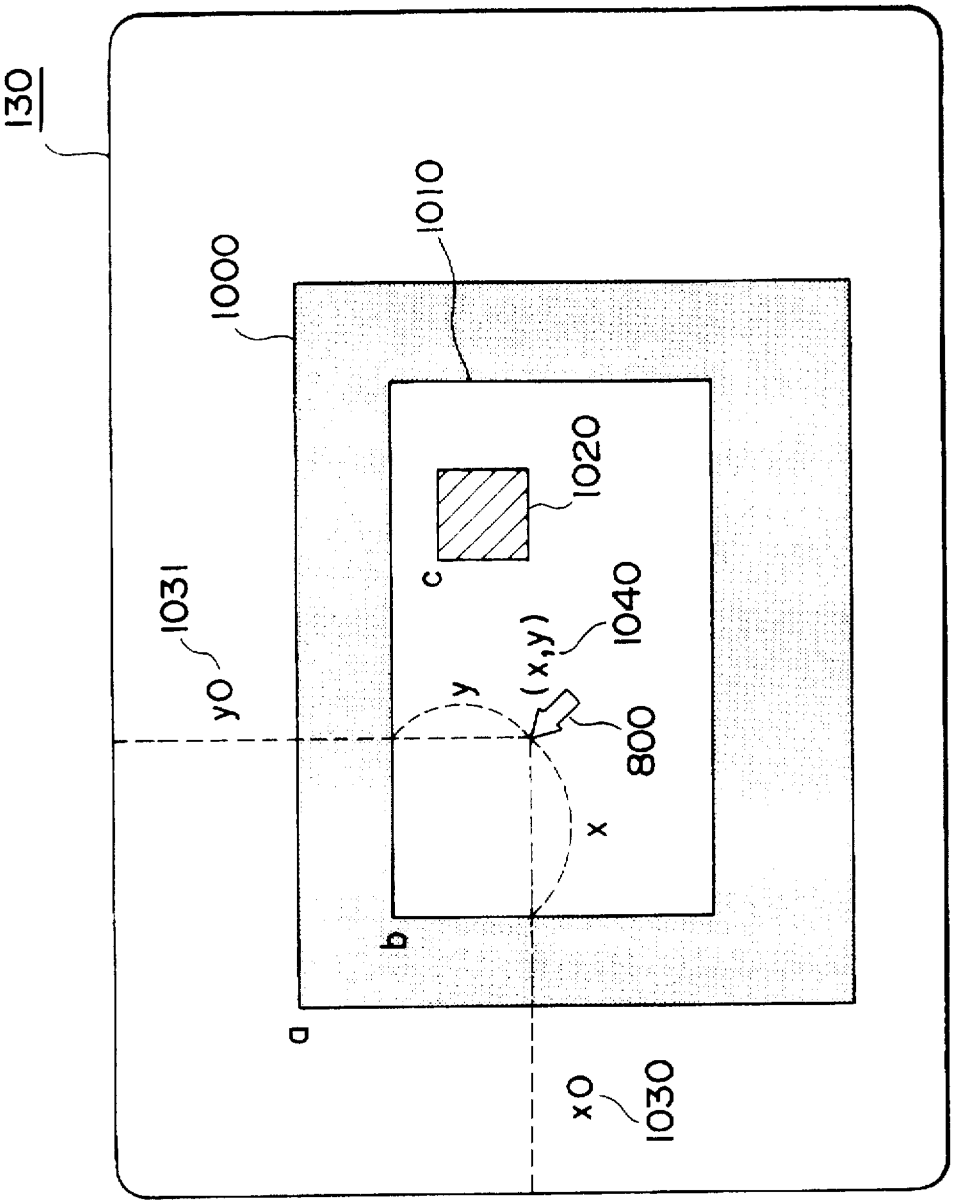
FIG. 10 is a schematic representation showing a mouse-click operation according to an embodiment of this invention.

The following is a description of the method for making a decision to determine the destination to which the message is to be sent at the time of the move of the component with reference to FIGS. 10 and 11.

FIG. 10 describes the method for the decision of the window to be moved. On the display screen 130, a window 1010 of a component, referred to as "b", is first superimposed on a window 1000 of a component, referred to as "a", and a window 1020 of a component, referred to as "c", is then superimposed on the window 1010 of the component "b".

Given a selection of the window 1010 of the component "b" to be moved, the user first positions the cursor 800 of the mouse 110 on the window 1010 of the component "b" sought to be moved and clicks the right button 110*a*.

Upon clicking the right button 110*a* of the mouse 110, the location (x0, y0) defining the upper left corner of the display screen as the origin of the click position is detected by the window system 142.

Figure 11A:
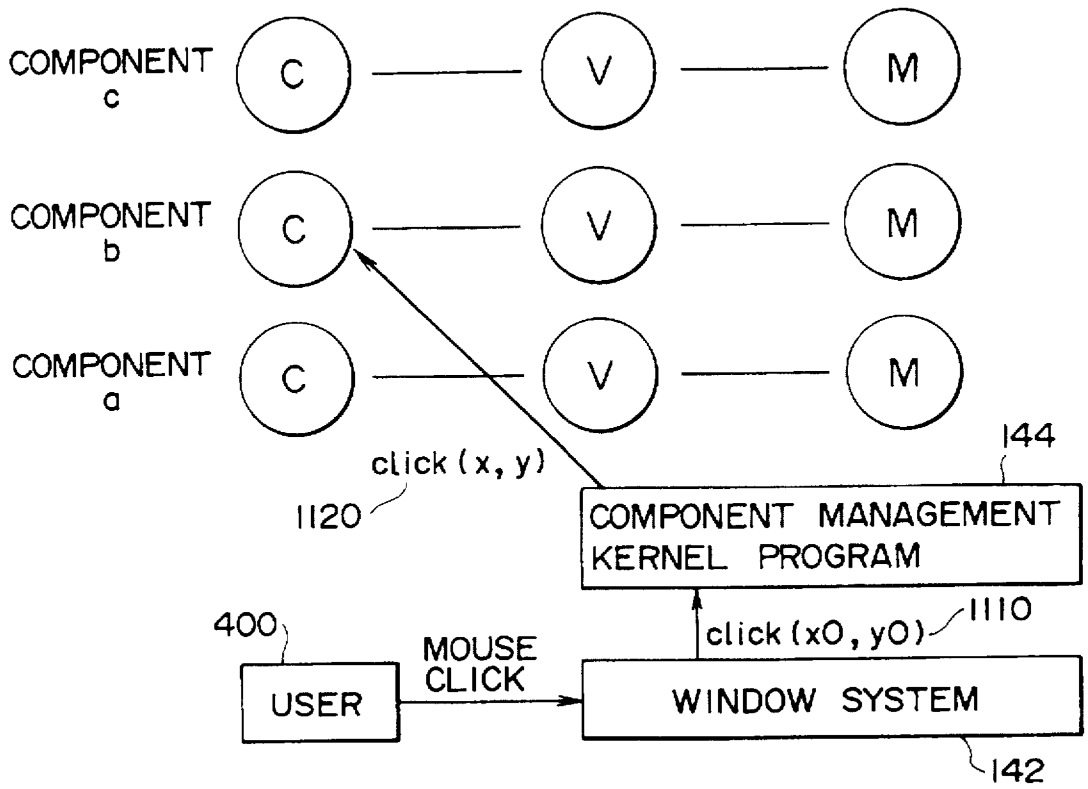
FIGS. 11(A) and 11(B) are each a schematic representation describing a method for the decision of a sendee of a message at the time of the move operation of a component by the component management kernel program according to an embodiment of this invention.

The window system 142 creates a message, click (x0, y0), 1110, by constructing the detected location "x0" 1030 and the detected location "y0" 1031 as shown in FIG. 11(A), and then sends the click message 1110 to the component management kernel program 144. Then, the component management kernel program 144 recognizes the clicked window as the window 1010 of the component "b" from the information on the location existing in the click message, and sends a message, click (x, y) 1120, to the controller part 200 of the component 1010. It can be noted herein that reference to (x, y) in the click message 1120 indicates location values of the mouse-click position in which the upper left corner of the window 1010 of the component "b" is defined as the origin.

With the arrangements as described hereinabove, the component "b" allows the start of the transmission and the receipt of the various messages referred to above between the view definition part 210 and the component management kernel program 144 of the own component.

Figure 11B:
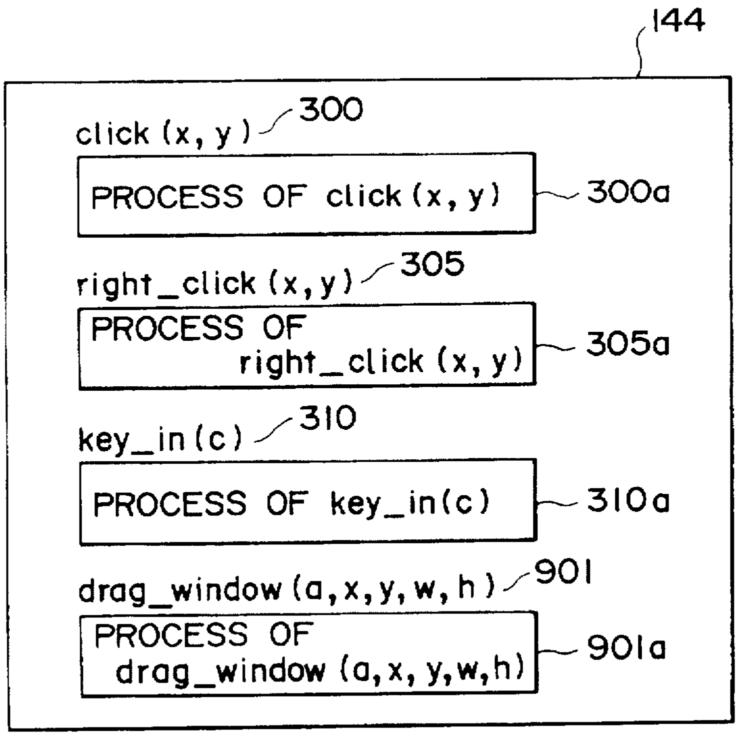

FIG. 11(B) indicates a process program described in the component management kernel program 144. As shown in FIG. 11(B), more specifically, there are described the process 300*a* of the click (x, y) message 300, the process 305*a* of the right_click (x, y) message 305, the process 310*a* of the key_in message 310, and the process 901*a* of the drag-window (a, x, y, w, h) message 901.

Figure 12:
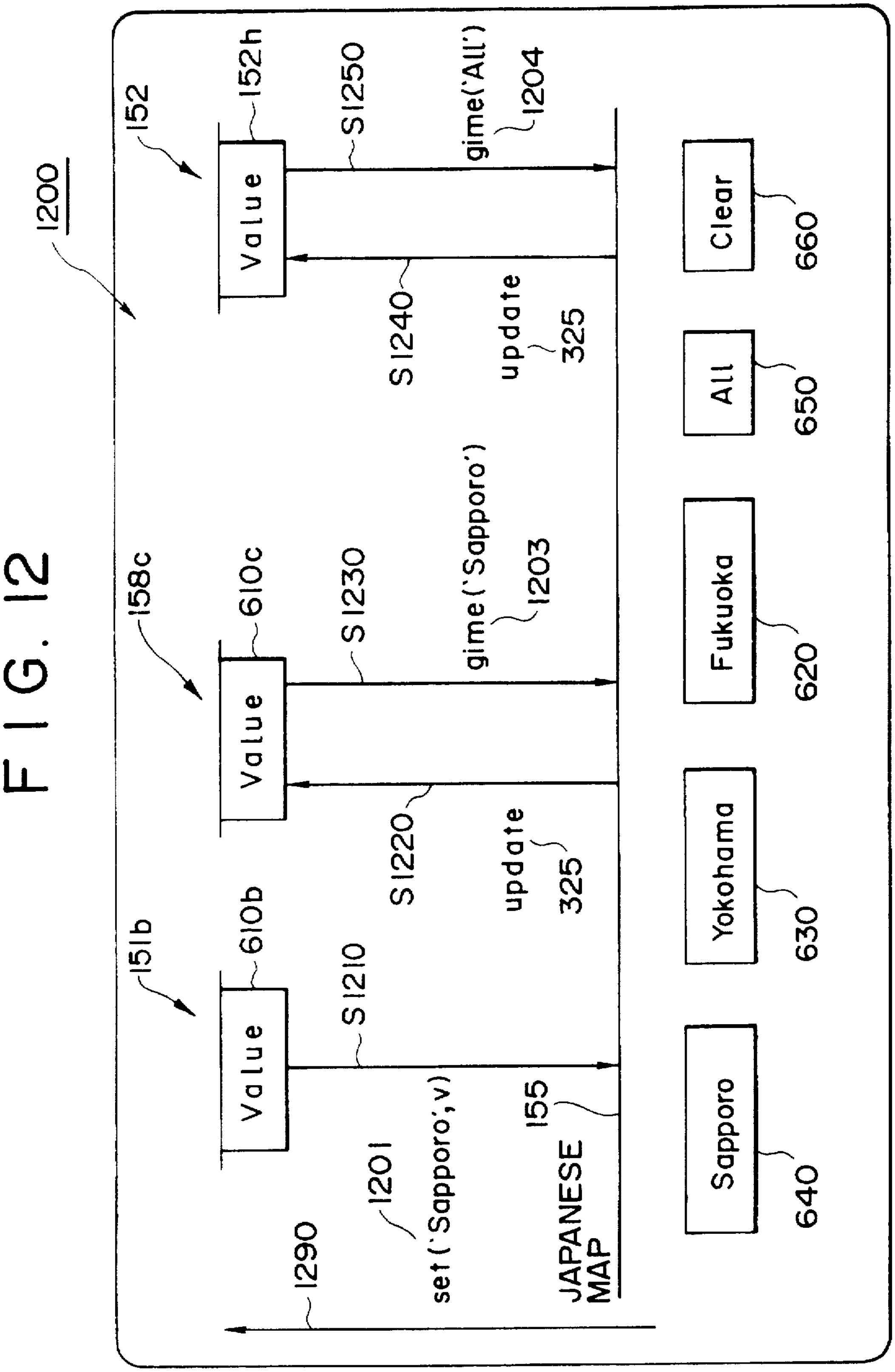
FIG. 12 is a schematic representation showing a transmission sequence of messages of a bar meter, a numeric display and a pie chart as well as a Japanese map according to an embodiment of this invention.

FIG. 12 shows an example of the transmission sequences of the messages of each of the components. Specifically, FIG. 12 indicates, as one example, a view of a statistics display component 1200 for displaying statistics values of "Sapporo" in the statistics data display tool as shown in FIG. 5, when looked at from the side of the display 130. In FIG. 12, the direction pointed by the arrow 1290 indicated by broken lines is indicative of the direction of the display screen of the display 130. More specifically, FIG. 12 shows a view such that the bar meter 151*b*, the numeric display device 158*c* and the pie chart 152 of "Sapporo" are superimposed on the Japanese map component 155.

Referring to FIG. 12, the user first positions the cursor of the mouse 110 on the hatched portion of the "Sapporo" bar meter 151*b* and clicks it, thereby executing an operation for changing the value (height) of the hatched portion. Once this operation has been executed, the value of the "Sapporo" value slot 610*b* is changed and a message, set ("Sapporo", v) 1201, for sending a report on the changes of the value of the "Sapporo" value slot 610*b* is sent to the Japanese map component 155 (S1210).

The "Sapporo" slot 640 of the Japanese map component 155 changes a value of the own slot to a slot value "v" in response to the set message 1200 and sends the message, update 325, for reporting this change to the "Sapporo" numeric display device 158*c* (S1220). Upon receipt of this update message 325, the "Sapporo" numeric display device 158*c* sends to the Japanese map component 155 a message, gime ("Sapporo") 1203, for requiring the changed value (S1230).

On the other hand, the Japanese map component 155 likewise sends the message, update 325, to the pie chart 152 (S1240). The pie chart 152 in turn sends a message, gime ("All") 1204, for acquiring values of all cities to the Japanese map component 155 in order to vary rates of graphs in proportion to the changes of the value of "Sapporo" (S1250).

As a consequence, the value of the "Sapporo" bar meter 151*b* of "Sapporo" is transmitted to the "Sapporo" numeric display device 158*c* and the pie chart 152 of "Sapporo", via the "Sapporo" slot 640 of the Japanese map component 155. The direction of transmitting the message is decided by making an "ON" selection from options (i.e. a set option, a gime option and an update option) on the slot menu screen 820 of FIG. 8(D).

Figure 13:
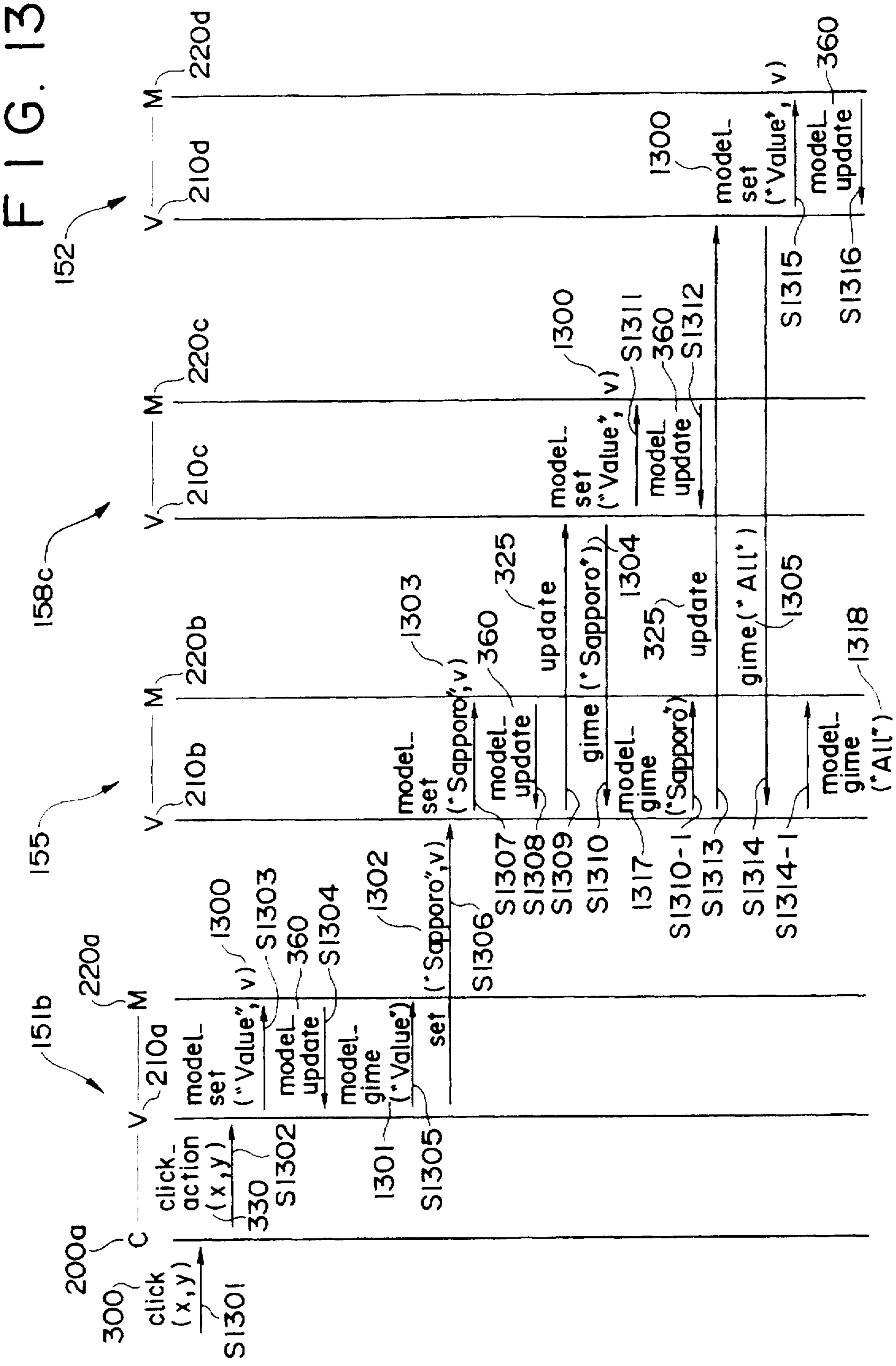
FIG. 13 is a schematic representation for describing the transmission and receipt of messages inside the bar meter component, the numeric display component and the pie chart component as well as the Japanese map component.

FIG. 13 shows the details of the transmission sequences as shown in FIG. 12. Referring to FIG. 13, the user clicks the hatched portion of the "Sapporo" bar meter 151*b* and moves the mouse cursor in the direction in which the bar meter value becomes larger. This click operation is reported to the controller part 200*a* of the "Sapporo" bar meter 151*b* as the message, click (x, y) 300 (S1301).

Upon receipt of this click message, the controller part 200*a* of the "Sapporo" bar meter 151*b* sends the message, click_action (x, y) 330, to its own view definition part 210*a* in order to give a notice that the own component has been clicked (S1302). The view definition part 210*a* of the "Sapporo" bar meter 151*b* sends to the own behavior definition part 220*a* a message, model_set ("Value", v) 1300, stating "Change the slot value "v" of the slot name "Value" 718", in accordance with the process 330*a* of the click_action (x, y) message 330. The slot value "v" is obtained by the view definition part 210*a* on the basis of the height (h) of the "Sapporo" bar meter 151*b* and the click position (x, y).

When the model_set ("Value", v) message 1300 has been received, the behavior definition part 220*a* of the "Sapporo" bar meter 151*b* changes its own slot value 717 to a value "v" on the basis of this message, and sends the message, model_update 360, for giving the notice to the view definition part 210*a* stating that the slot value "v" has been changed (S1304).

After the model_update ("Value") message 360 has been received, the view definition part 210*a* of the "Sapporo" bar meter 151*b* sends to its own behavior definition part 220*a* a message, model_gime 1301, for requiring the updated value and receives a return value (S1305).

Then, the view definition part 210*a* of the "Sapporo" bar meter 151*b* sends to the view definition part 210*b* of the Japanese map component 155 a message, set ("Sapporo", v) 1302 for changing the values of the "Sapporo" slot 640 (S1306).

Upon receipt of the set ("Sapporo", v) message 1302, the view definition part 210*b* of the Japanese map component 155 sends to its own behavior definition part 220*b* a message, model_set ("Sapporo", v) 1303, for changing the slot value 705 (S1307).

Then, the behavior definition part 220*b* of the Japanese map component 155 changes the value of the "Sapporo" slot 640 of its own slot table 703 to a slot value "v" and sends to its own view definition part 210*b* the message, model_update 360, giving notice of the changes of the value (S1308).

Further, the view definition part 210*b* of the Japanese map component 155 sends the message, update 325, for giving notice of the changes of the slot value 705 of the own component to the view definition part 210*c* of the numeric display device 158*c* having the "child" relationship with the own component (S1309).

The view definition part 210*c* of the "Sapporo" numeric display device 158*c* which has received the update message 325 then sends to the view definition part 210*b* of the Japanese map component 155 a message, gime ("Sapporo") 1304 for requiring the updated value, and requires the value of the "Sapporo" slot 640 of the Japanese map component 155 (S1310).

Upon receipt of the gime ("Sapporo") message 1304, the view definition part 210*b* of the Japanese map component 155 reads the value of the "Sapporo" slot 640 by sending the model_gime ("Sapporo") to the behavior definition part 220*b* of the Japanese map component 155 (S1310-1).

Then, the view definition part 210*c* of the "Sapporo" numeric display device 158*c* sends the model_set ("Value", v) message 1300, for giving the notice of the read updated value, to the behavior definition part 220*c* for changing its slot value 722 (S1311).

Upon receiving the model_set ("Value", v) message 1300, the behavior definition part 220*c* of the "Sapporo" numeric display device 158*c* changes its own slot value 722 to a new value "v" and sends to its own view definition part 210*c* the message, model_update 360, for giving notice of the changes (S1312).

Further, the view definition part 210*b* of the Japanese map component 155 sends to the view definition part 210*d* of the pie chart 152 having a "child" relationship with the other component, the message, update 325, for giving notice of the changes of the slot value 705 of its own component (S1313).

When it has received the update message 325, the view definition part 210*d* of the pie chart 152 sends to the view definition part 210*b* of the Japanese map component 155 a message, gime ("All") 1305 for requiring the updated value, and requires the value of the All slot 650 of the Japanese map component 155 (S1314).

Upon receipt of the gime ("All") message 1305, the view definition part 210*b* of the Japanese map component 155 sends to the behavior definition part 220*b* of the Japanese map component 155 a message, model_gime ("All") 1306, thereby reading the value of the All slot 650 (S1314-1).

Thereafter, the view definition part 210*d* of the pie chart 152 sends to its own behavior definition part 220*d* the model_set ("Value", v) message 1300, for giving a notice of the read and updated value to the behavior definition part 220*d* in order to change the slot value 727 of its own behavior definition part 220*d* (S1315).

When the behavior definition part 220*d* of the pie chart 152 has received the model_set ("Value", v), message 1300, it changes its slot value 727 to a value "v" and sends to its own view definition part 210*d* the message, model_update 360, for giving notice of the changes (S1316).

Figure 14:
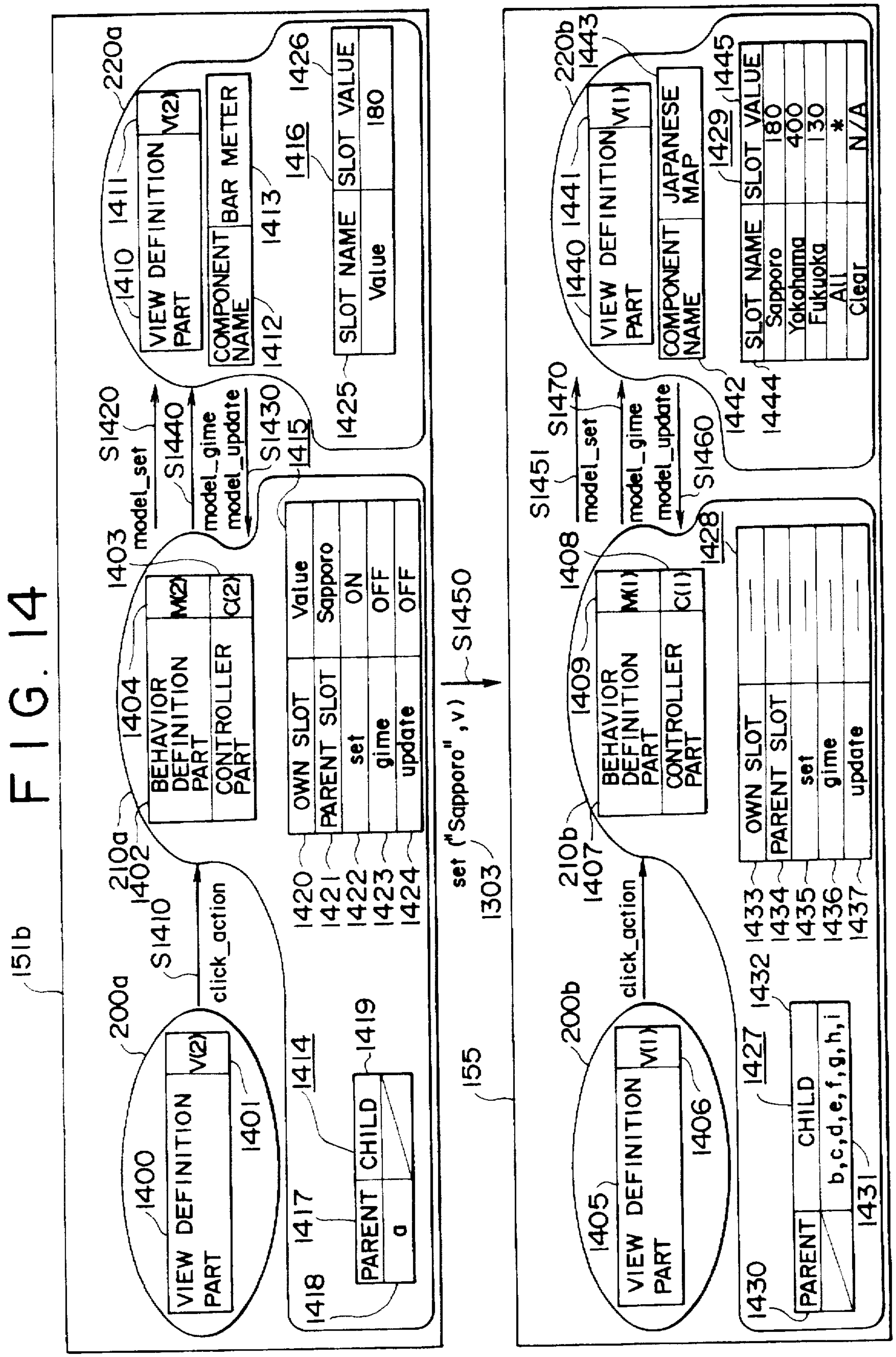
FIG. 14 is a schematic representation for describing an example of the transmission and receipt of messages in the parts M, V and C in the bar meter component, the numeric display component and the pie chart component as well as the Japanese map component in accordance with an embodiment of this invention.
Figure 15:
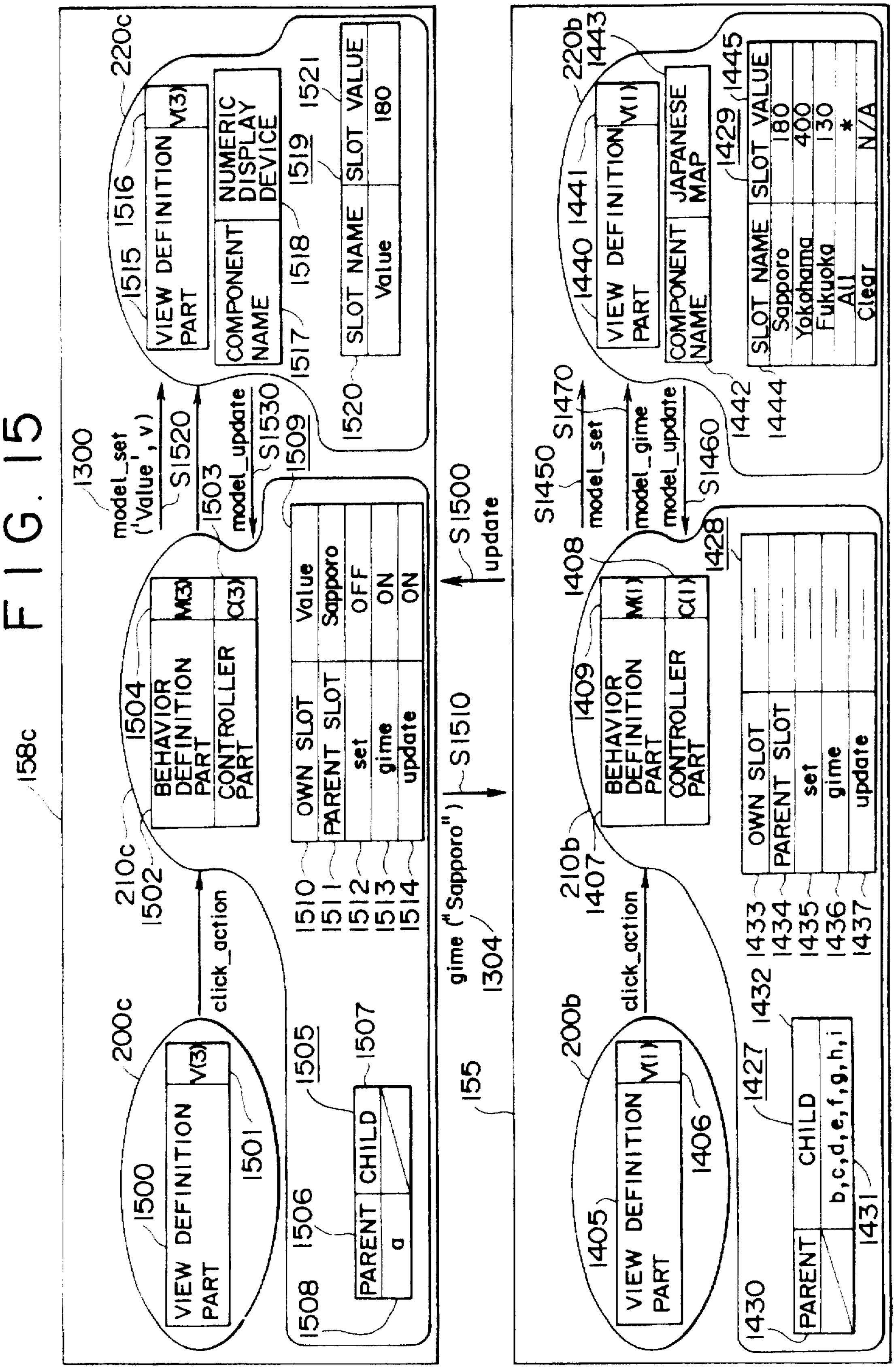
FIG. 15 is a schematic representation for describing an example of the transmission and receipt of messages of the parts M, V and C in the bar meter component, the numeric display component and the pie chart component as well as the Japanese map component in accordance with an embodiment of this invention.

FIGS. 14 and 15 indicate the message transmission sequences inside each of the components.

FIG. 14 shows the relationship of the Japanese map component with the bar meter component, in which the "Sapporo" bar meter component 151*b* comprises a controller part 200*a*, view definition part 210*a* and behavior definition part 220*a*.

The controller part 200*a* of the "Sapporo" bar meter 151*b* is provided with an address territory V(2) 1400 holding an address V(2) 1401 of its own view definition part 210*a*.

Likewise, the view definition part 210*a* of the "Sapporo" bar meter 151*b* has an address territory (M2, C1) 1402 holding an address C(2) 1403 of its own controller part 200*a* and an address M(2) 1404 of its own behavior definition part 220*a*. Further, it has a parent-child table 1414 holding a parent-child relationship with another component and a slot connection table 1415 having a connection relationship with the other component. The parent-child table 1414 stores a code name "a" indicating that a parent 1417 of a bar meter 1516 is the Japanese map component 155, while the slot connection table 1415 stores a name "Value" in a name territory 1420 of its own slot, a name "Sapporo" in a name territory 1412 of its parent slot, a code "NO" in its set field 1422, a code "OFF" in its gime field 1423, and a code "OFF" in its update territory 1424.

The behavior definition part 220*a* of the "Sapporo" bar meter 151*b* is provided with an address territory V(2) 1406 holding an address V(2) 1411 of its own view definition part 210*a* and an index 1412 holding its own component name 1413. Further, it has a slot table 1416 consisting of its own slot name 1425 and its own slot values 1426.

The controller part 200*b* of the Japanese map component 155 is likewise provided with an address territory V(1) 1405 holding an address V(1) 1406 of its own view definition part 210*b*.

In addition, the view definition part 210*b* of the Japanese map component 155 is provided with an address territory (M1, C1) 1407 holding an address C(1) 1408 of its own controller part 200*b* and an address M(1) 1409 of its own behavior definition part 220*b*. Further, it has a parent-child table 1427 holding a parent-child relationship with another component and a slot connection table 1428 holding a connection relationship with the other component. The parent-child table 1427 is stored with codes indicating that a parent 1430 of the Japanese map component 155 does not exist, and that a child 1432 has components referred to as "b" through "i". Further, nothing is stored in each of the territories of the slot connection table 1428.

Furthermore, the behavior definition part 220*b* of the Japanese map component 155 is provided with an address territory V(1) 1440 holding an address V(l) 1441 of its own view definition part 210*b*, and an index 1442 holding its own component name 1443. It is further provided with a slot table 1429 holding its own slot name 1444 and its own slot value 1445.

Referring to FIG. 14, for example, the user clicks an operation for changing the height of the "Sapporo" bar meter 151*b*, and the click operation causes the controller part 200*a* of the "Sapporo" bar meter 151*b* send to its own view definition part 210*a* the message, click_action (x, y) 330, for giving notice of the changes of the value of the "Sapporo" bar meter 151*b* (S1410).

Upon receipt of the click_action (x, y) message 330, the view definition part 210*a* of the "Sapporo" bar meter 151*b* sends to its own behavior definition part 220*a* a message, model_set ("Value", v), stating 'Change the "Value" slot value to a slot value "v"', as a result of the process 330*a* of the click_action (x, y) message 330 (S1420).

Upon receipt of this message, the behavior definition part 220*a* of the "Sapporo" bar meter 151*b* processes the changes of the slot value 1426 of the slot table 1416 in accordance with that message, and sends to its own view definition part 210*a* the message, model update, for giving the notice of the changes of the slot value 1426 (S1430).

Thereafter, the view definition part 210*a* of the "Sapporo" bar meter 151*b* sends to its own behavior definition part 220*a* a message, model_gime ("Value"), stating 'Send the updated "Value" slot value', and receives the updated value "v" as a return value (S1440).

Then, the view definition part 210*a* of the "Sapporo" bar meter 151*b* recognizes from its own parent-child table 1414 that the Japanese map component 155 is a parent and, thereafter, from reference to its own slot connection table 1415 that the Value slot 610*b* of the own slot 1420 is connected with the "Sapporo" slot 640 of the parent slot 1421, thereby sending to the view definition part 210*b* of the Japanese map component 155 a message, set ("'Sapporo"', v), stating 'Change the "Sapporo" slot value to a value "v"', for changing the value of the "Sapporo" slot 640 of the Japanese map component 155 (S1450).

Upon receipt of the set ("'Sapporo"', v) message, the view definition part 210*b* of the Japanese map component 155 in turn sends to its own view definition part 220*b* a message, model_set ("'Sapporo"', v), for changing the "'Sapporo"' slot value 1445 of the slot name 1444 in the slot table 1429 to a value "v" (S1451).

Thereafter, the behavior definition part 220*b* of the Japanese map component 155 changes the "Sapporo" slot 640 in its own slot table 1429 to the slot value "v", and sends to its own view definition part 210*b* the message, model_update, for giving notice of the changes of the slot value 1445 (S1460).

When the view definition part 210*b* of the Japanese map component 155 has received the model_update message, it sends to its own view definition part 220*b* the message, model_gime ("Value"), stating 'Send the updated "Value" slot value', and requires the updated slot value, thereby receiving the updated slot value "v" as a return value (S1470).

Next, a description will be made of the relationship of the Japanese map with the numeric display.

FIG. 15 indicates the relationship of the Japanese map with the "Sapporo" numeric display device. As shown in FIG. 15, the "Sapporo" numeric display device 158*c* consists of its controller part 200*c*, view definition part 210*c* and behavior definition part 220*c*.

The controller part 200*c* of the "Sapporo" numeric display device 158*c* is provided with an address territory V(3) 1500 holding an address V(3) 1501 of its own view definition part 210*c*.

The view definition part 210*c* of the "Sapporo" numeric display device 158*c* is likewise provided with an address territory (M3, C3) 1502 holding an address C(3) 1503 of its own controller part 200*c* and an address M(3) 1504 of its own behavior definition part 220*c*. Furthermore, it has a parent-child table 1505 holding a parent-child relationship with another component and a slot connection table 1509 holding a connection relationship with the another component. The parent-child table 1505 is stored with a code referred to as "a", indicating that the Japanese map component 155 is a parent 1506 of the "Sapporo" numeric display device 158*c*, and with no code indicating that a child 1507 exists. Further, the slot connection table 1509 is stored with a name "Value" in a name territory 1510 of its own slot, a name "Sapporo" in a name territory 1511 of the parent slot, a code "OFF" in its set field, a code "ON" in a gime field 1513, and a code "ON" in an update field 1514.

Furthermore, the behavior definition part 220*c* of the "Sapporo" numeric display device 158*c* is provided with an address territory V(3) 1515 holding an address V(3) 1516 of its own view definition part 210*c* and an index 1517 holding its own component name 1518. It is further provided with a slot table 1519 holding its own slot name 1520 and its own slot value 1521.

Likewise, the controller part 200*b* of the Japanese map component 155 is provided with the address territory V(1) 1405 holding the address V(1) 1406 of its own view definition part 210*b*.

In addition, the view definition part 210*b* of the Japanese map component 155 is provided with the address territory (M1, C1) 1407 holding the address C(1) 1408 of its own controller part 200*b* and the address M(1) 1409 of its own behavior definition part 220*b*. Furthermore, it has the parent-child table 1427 holding a parent-child relationship with another component and the slot connection table 1428 holding a connection relationship with the other component.

Furthermore, the behavior definition part 220*b* of the Japanese map component 155 is provided with the address territory V(1) 1440 holding the address V(1) 1441 of its own view definition part 210*b* and the index 1442 holding its own component name 1443. It is further provided with the slot table 1429 holding its own slot name 1444 and its own slot value 1445. A description of the details of each of the tables is omitted in order to avoid a duplication of the above description of the tables in FIG. 14.

In substantially the same manner as in FIG. 14, the view definition part 210*b* of the Japanese map component 155 receives notice of the changes of the slot value 1426 from the view definition part 210*a* of the "Sapporo" bar meter 151*b* and changes the slot value 1445 of its own behavior definition part 220*b*. Thereafter, the view definition part 210*b* sends to the "Sapporo" numeric display device 158*c*, having the child relationship with the Japanese map component 155, the update message for giving notice of the changes of the slot value 1445 (S1500).

Upon receipt of the update message, the view definition part 210*c* of the "Sapporo" numeric display device 158*c* sends to the view definition part 210*b* of the Japanese map component 155 the message, gime ("Sapporo") 1304, requiring the updated value "v" and receives the updated value "v" as a return value (S1510).

Once it has received the return value, the view definition part 210*c* of the "Sapporo" numeric display device 158*c* sends the model_set ("Value", v) message 1300, for changing the slot value 1521 to its own view definition part 220*c* (S1520).

When it has received the model_set ("Value", v) message 1300, the behavior definition part 220*c* of the "Sapporo" numeric display device 158*c* changes the slot value 1521 of its own slot table 1519 and sends to its own view definition part 210*c* the message, model_update, to give notice of the changes of the slot value 220*d* (S1530).

In the manner as described hereinabove, the changes of the value of the "Sapporo" bar meter 151*b* are transmitted to the "Sapporo" numeric display device 158*c* via the view definition part 210*b* of the Japanese map component 155. Although a detailed description with reference to the drawings will be omitted, changes of the values of the pie chart 152 can be likewise notified via the Japanese map component 155 to thereby change the rates of the pie chart 152.

Figure 16:
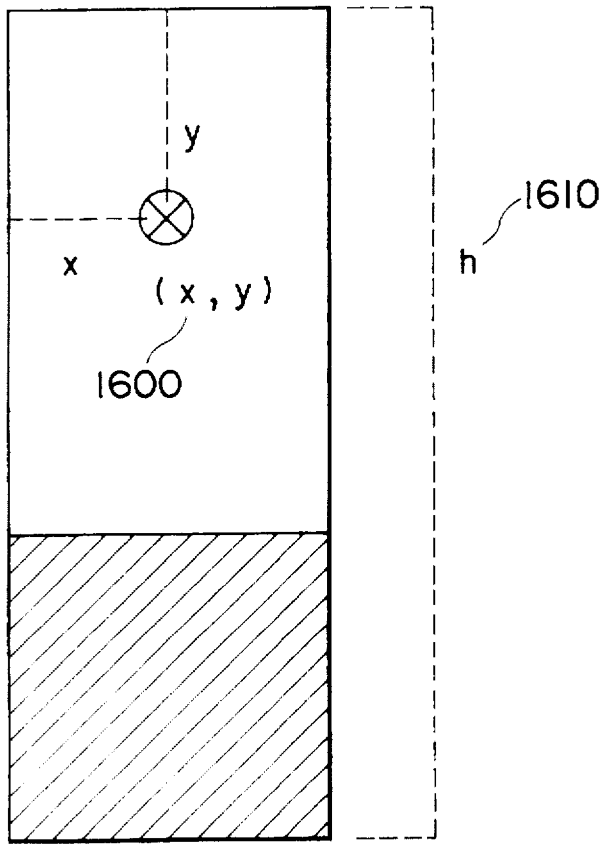
FIG. 16 is a schematic representation for describing parameters of the bar meter component according to an embodiment of the invention.
Figure 17:
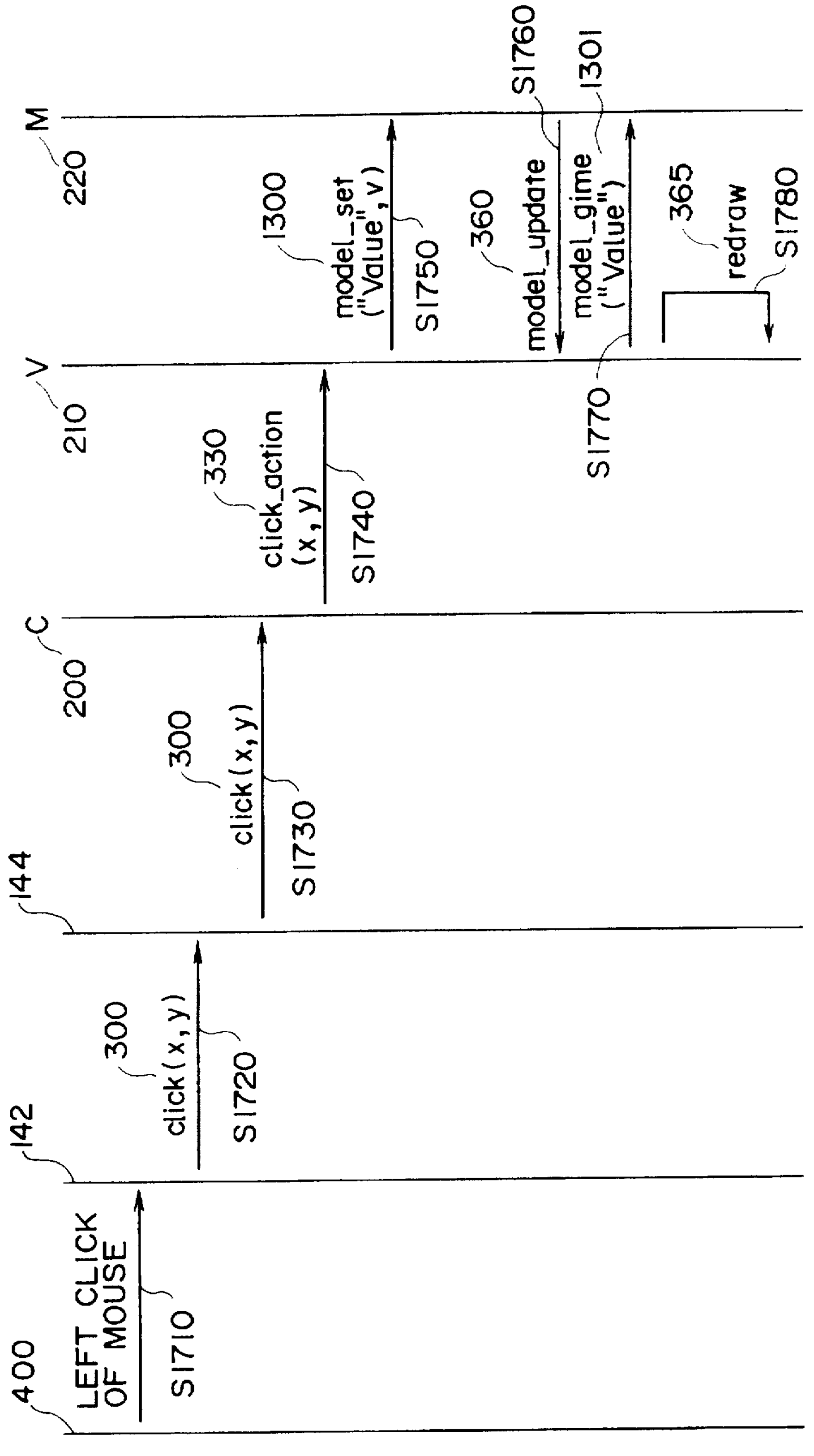
FIG. 17 is a schematic representation showing a transmission sequence of messages among the windows system, the component management kernel program and the components during the move operation of the component according to an embodiment of this invention.

FIG. 16 indicates the parameter of the bar meter and FIG. 17 indicates the transmission sequences of the click (x, y) message to the window system, the component management kernel program and the bar meter component.

As shown in FIG. 16, reference to (x, y) 1600 indicates the location or coordinate position of the bar meter 151 and reference symbol "h" denotes the height of the bar meter 151.

Referring to FIG. 17, the user positions the cursor 800 of the mouse 110 on the location (x, y) 1600 and clicks the left button 110*b* thereof, thereby allowing the window system 142 to detect this click operation (S1710). The window system 142 in turn sends the message, click (x, y) 300, to the component management kernel program 144 (S1720).

Then, the click (x, y) message 300 is transmitted to the controller part 200 of the bar meter 151 (S1730).

Upon receipt of the click (x, y) message 300, the controller part 200 of the bar meter 151 sends to its own view definition part 210 the message, click_action (x, y) 330, for giving notice to the effect that the click operation was implemented on the own component (S1740).

Thereafter, the view definition part 210 carries out the process 330*a* of the click_action (x, y) message 330 and sends the model_set ("Value", v) message 1300 to its own behavior definition part 220 (S1750).

When it has received the model_set ("Value", v) message 1300, the behavior definition part 220 of the bar meter 151 changes its own slot value 717 to a slot value "v" and sends to its own view definition part 210 the model_update message 360 for giving notice of the changes (S1760).

Upon receipt of the model_update message 360, the view definition part 210 of the bar meter 151 sends to its own behavior definition part 220 the model_gime ("Value") message 1301, for reading the updated value (S1770) and changes its display value by issuing the message, redraw 360, to itself, in order to change its on-screen value on the basis of the read and updated value (S1780).

Figure 18:
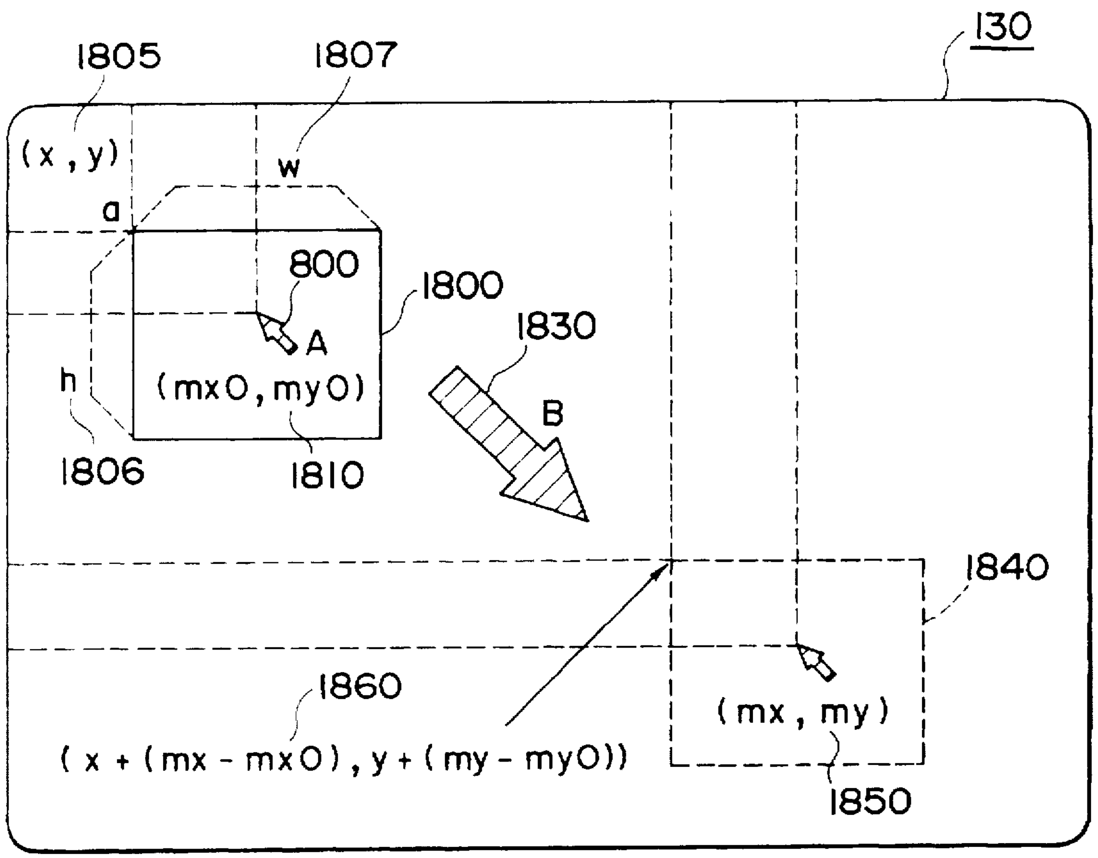
FIG. 18 is a schematic representation for describing the move operation of windows in accordance with an embodiment of this invention.
Figure 19:
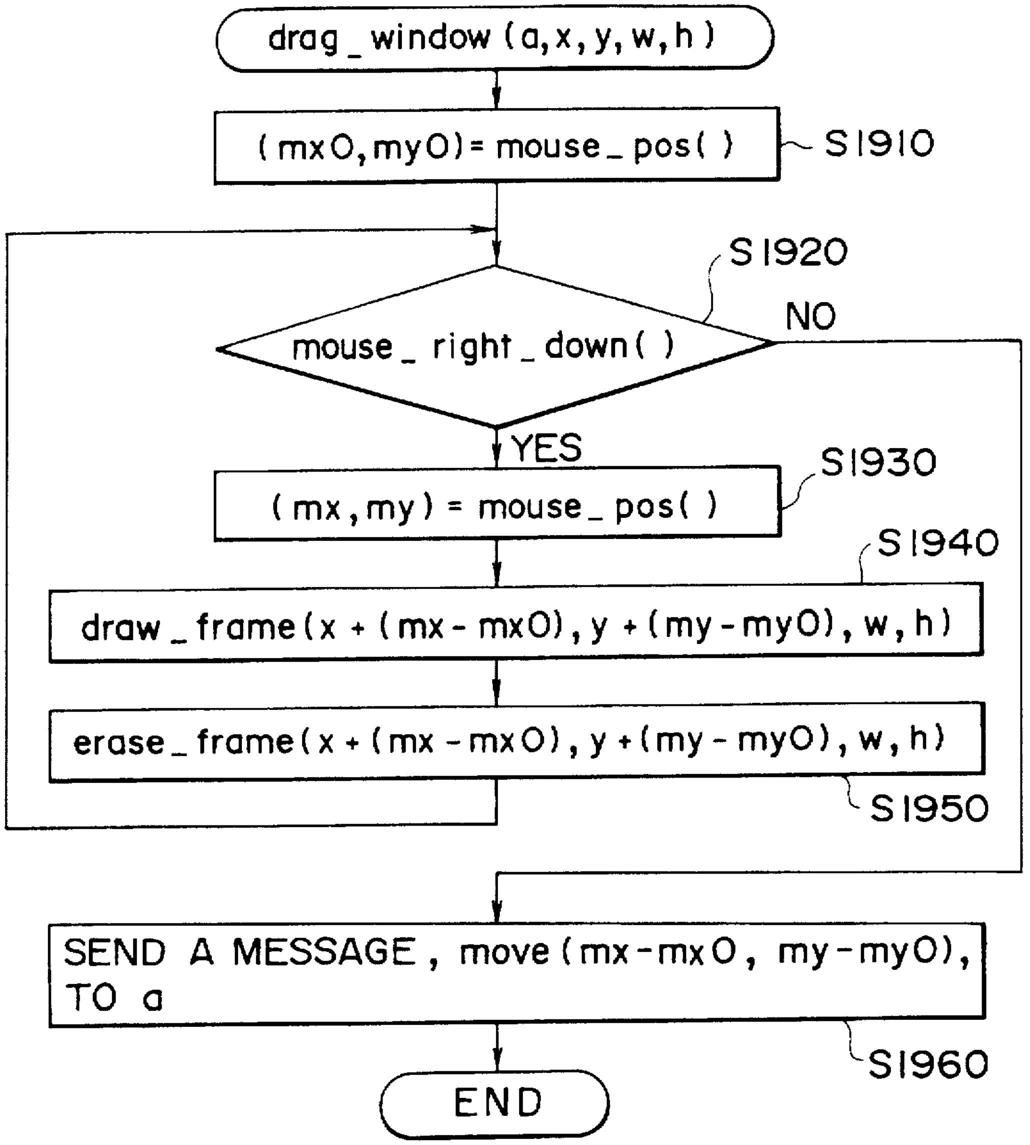
FIG. 19 is a flow chart showing a drag_window routine in accordance with an embodiment of this invention.

FIG. 18 shows the move operation of windows and FIG. 19 shows a flow chart for a draw_window routine of the component management kernel program.

Referring to FIG. 18, when a window 1800 of a component referred to as "a", located at an upper left corner of the display screen 130, is sought to be moved to its lower right corner, the cursor 800 of the mouse 110 (as indicated by the arrow "A" in this drawing) is positioned on the location (mx0, my0) of the window 1800 before the start of the move of the window 1800. While the right button 110*a* of the mouse 110 is being held down, the cursor 800 is moved in the direction as indicated by the arrow referred to as "B" 1830. While the mouse 110 is being dragged in the state in which its right button 110*a* is being held down, the operations for drawing and erasing the rubber band 1840 are repeated.

Once the window has been moved to the objective position (mx, my) 1850, the right button 110*a* of the mouse 110 is released, thereby allowing the rubber band 1840 to disappear and the window 1800 to appear. It can be noted herein that the location of the left corner of the current window "a" 1800 is indicated by the location or coordinates, (x+(mx−mx0), y+(my−my0)) 1860.

FIG. 19 is a flow chart showing process steps of the drag_window routine of the component management kernel program 144.

In FIG. 19, the set parameters are described as follows:

a: a source component (window) 1800 required to be dragged: 1800;

(x, y): the location 1805 of the upper left corner of the window as the source component required to be dragged;

h: the height 1806 of the window as the source component required to be dragged; and w: the width 1807 of the window as a source component required to be dragged.

Upon the start of the drag_window routine, the location of the mouse 110 is set to the location or coordinates (mx0, my0) as the position from which the drag operation starts (S1910) and a decision is made to determine if the right button 110*a* of the mouse 110 is being held down (S1920).

When it is decided that the right button 110*a* of the mouse 110 is being held down (S1920: Yes), the location (mx, my) is decided as the position of the mouse 110 (S1930), and this position of the mouse 110 is maintained until the decision at step S1920 is made while the operations for drawing the rubber band "a" 1840 (S1940) and erasing it (S1950) have been repeated during the move operation of the window 1800 in the manner as described in FIG. 18.

Once the right button 110*a* of the mouse 110 is released (S1920: No), the window system 142 sends a message, move (mx−mx0, my−my0), to the window 1800 (S1960).

Now, a description will be made of the process for handling the various messages for each of the components, with reference to the flow charts as shown in FIGS. 20 through 31.

Figure 20A:
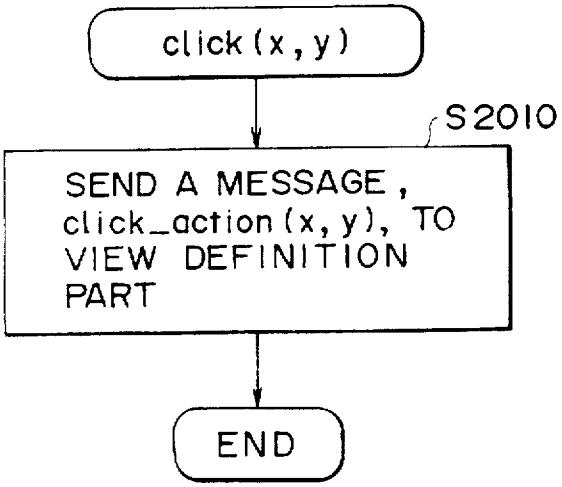
FIGS. 20(A), 20(B) and 20(C) are each flow chart indicating process steps to be performed when a controller part of the component has received a variety of messages.
Figure 20B:
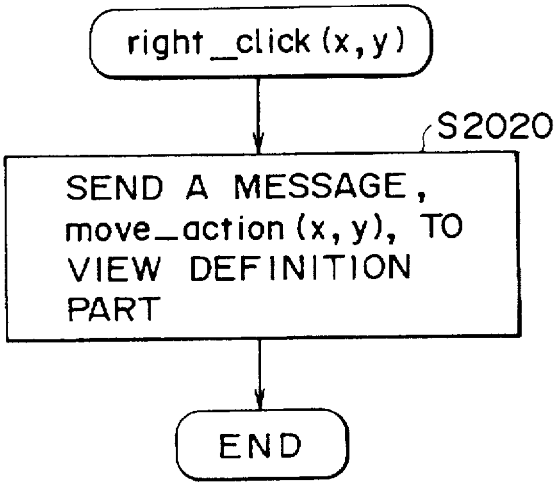

FIGS. 20(A) and 20(B) are flow charts showing the process steps for processing the user operations to be executed by the controller part of each of the components. As shown in FIG. 20(A), the controller part 200 of each of the components sends the message, click action (x, y) 300 to its own view definition part 210 when it receives the click (x, y) message 300 from the window system 142 by the click operation implemented by the user (S2010).

Further, as shown in FIG. 20(B), the controller part 200 of each of the components sends a message, move action (x, y) 335 to its own view definition part 210 when it has received the right_click (x, y) message 305 from the window system 142 by the click operation implemented by the user (S2020).

Figure 20C:
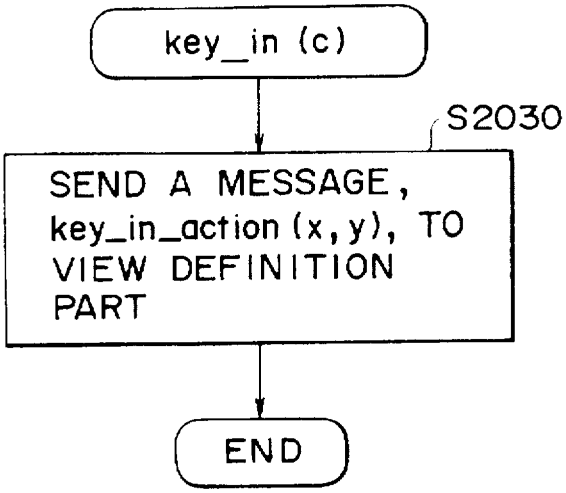

In addition, as shown in FIG. 20(C), the controller part 200 of each of the components sends the message, key_in_action (c) 345 to its own view definition part 210 when it receives the key_in (c) message 310 from the window system 142 by the key input operation implemented by the user (S2030).

FIGS. 21(A) through 21(E) show flow charts indicative of the process steps for processing the various messages by the view definition part of each of the components.

As shown in FIG. 21(A), the view definition part 210 of each of the components sends to its own behavior definition part 220 the message, model_set (s, v) 370, stating 'Set a slot value indicated by reference to symbol "s" to reference to a slot value "v"', when it has received the set (s, v) message 315 (S2110).

Further, as shown in FIG. 21(B), the view definition part 210 of each of the components sends to its own behavior definition part 220 the message, model_gime (s) 375, stating 'Send the slot value of the slot indicated by reference to symbol "s"', when it has received the gime (s) message 320 and receives the returned value as a return value (S2120).

Figure 21C:
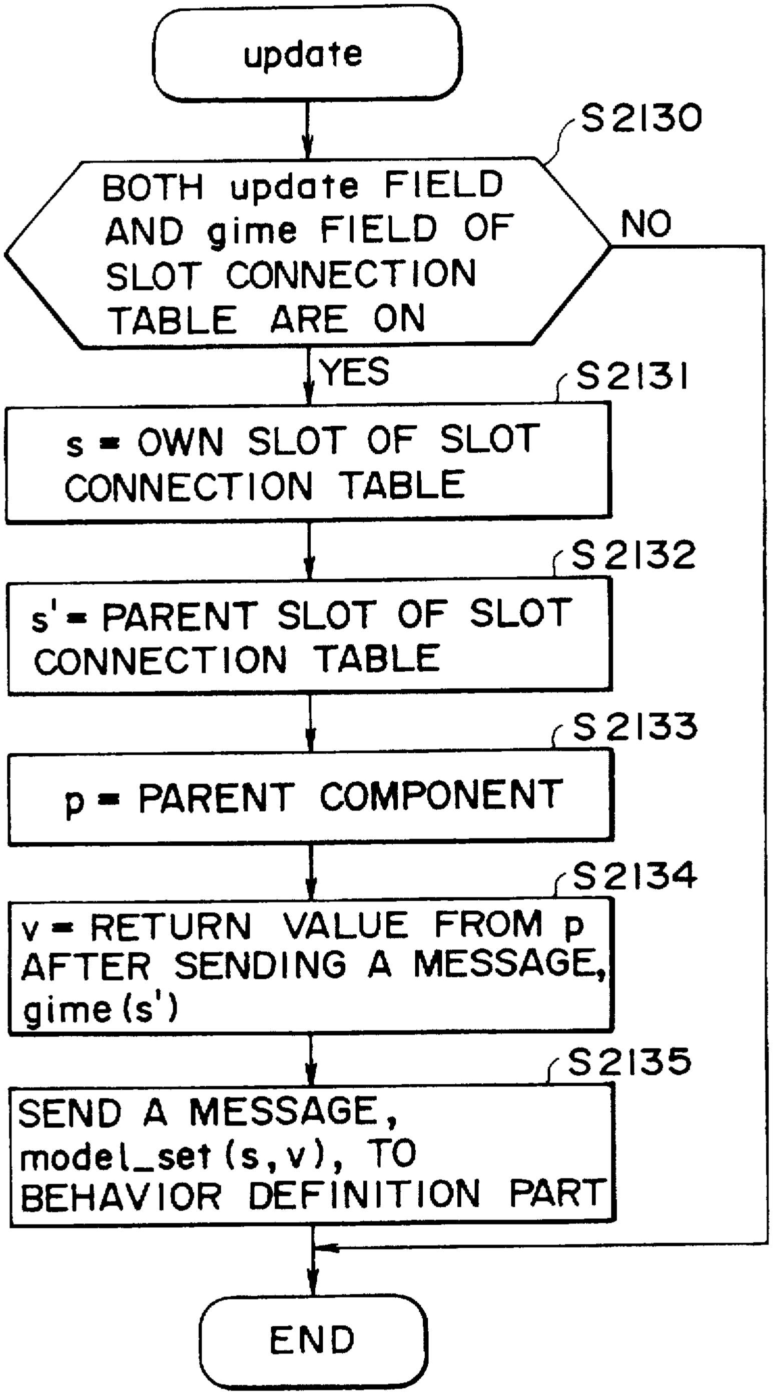

As shown in FIG. 21(C), when the view definition part 210 of each of the components has received the update message 325, it is then determined if both of the gime field 229 and the update field 230 are indicated by "ON" (S2130). When it is decided that both of the gime field 229 and the update area 230 are set to "ON" (S2130: Yes), then slot "s" is set as the own slot 226 of the slot connection table 225 (S2131); the slot "s'" is set as the parent slot 227 of the slot connection table 225 (S2132); and the component "p" is set as the parent component (S2133).

Thereafter, the value "v" is set to the return value from the parent component "p" after sending the gime (s') message (S2134) and the message, model_set (s, v) 370 is sent to its own behavior definition part 220 (S2135), following the end of the process.

It is decided in step S2130 that, when both of the gime field 229 and the update field 230 of the slot connection table 225 are not set to "ON" (S2130: No), then the process is allowed to end as it is.

Figure 21D:
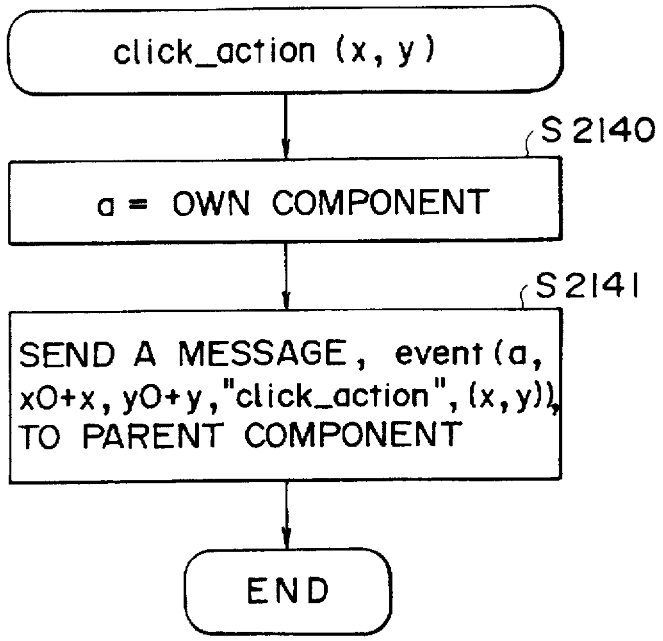

As shown in FIG. 21(D), when the view definition part 210 of each of the components has received the message, click_action (x, y) 300, it sets the own component to "a" (S2140) and then sends to the parent component a message, event (a, x0+x, y0+y, "click action", (x, y)), informing of the appearance of an event (S2142). In the message, reference to "a" indicates the own component and reference to (x0, y0) indicates the location of the upper left corner of the own component "a".

Figure 21E:
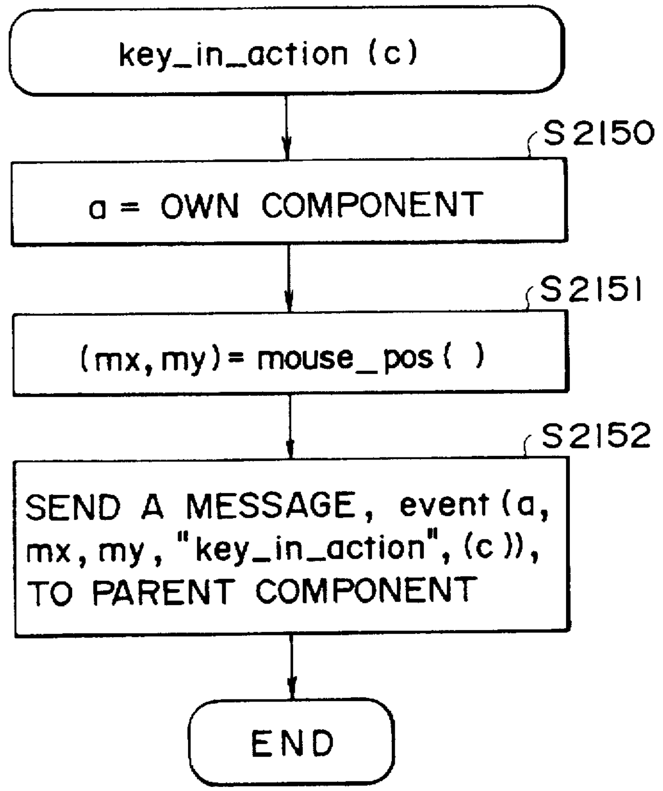

Referring to FIG. 21(E), when the view definition part 210 of each component has received the message, key_in_action (c) 310, it sets the own component to "a" (S2150) and acquires the mouse position at the location (mx, my) (S2151). Thereafter, it sends to the parent component a message, event (a, x0+x, y0+y, "key_in action", (c)), informing of the appearance of an event (S2152). In this message, reference to symbol "a" indicates the own component.

Figure 22A:
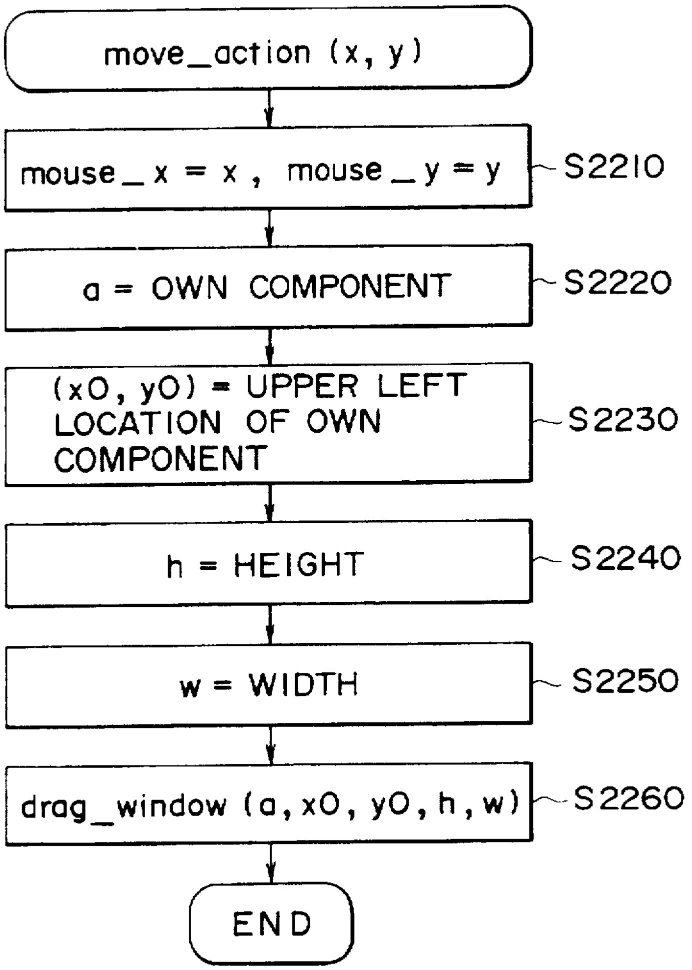

Turning now to FIG. 22(A), when the view definition part 210 of each of the components has received the message, move_action (x, y) 335, from its own controller part 200, the x- and y-locations of the mouse 110 is first set to (x, y) (S2210) and then the view definition part 210 sets its own component to "a" (S2220). Further, it sets the location (x0, y0) as the upper left location of the own component "a" (S2230). Thereafter, it set parameters to the effect that reference to "h" is set as the height of the window of the own component "a" (S2240) and reference to "w" is set to the width of the window of the own component "a" (S2250), thereby following the start of the drag_window routine of the component management kernel program 144 (S2260).

Figure 22B:
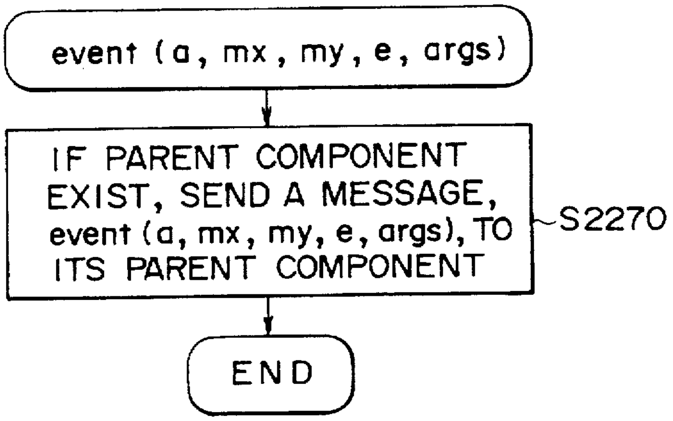

Further, as shown in FIG. 22(B), when the view definition part 210 of each component has received a message, event (a, mx, my, e, args) 350, it transfers the message 350, as it is, to the parent component, if it exists (S2270).

Figure 23:
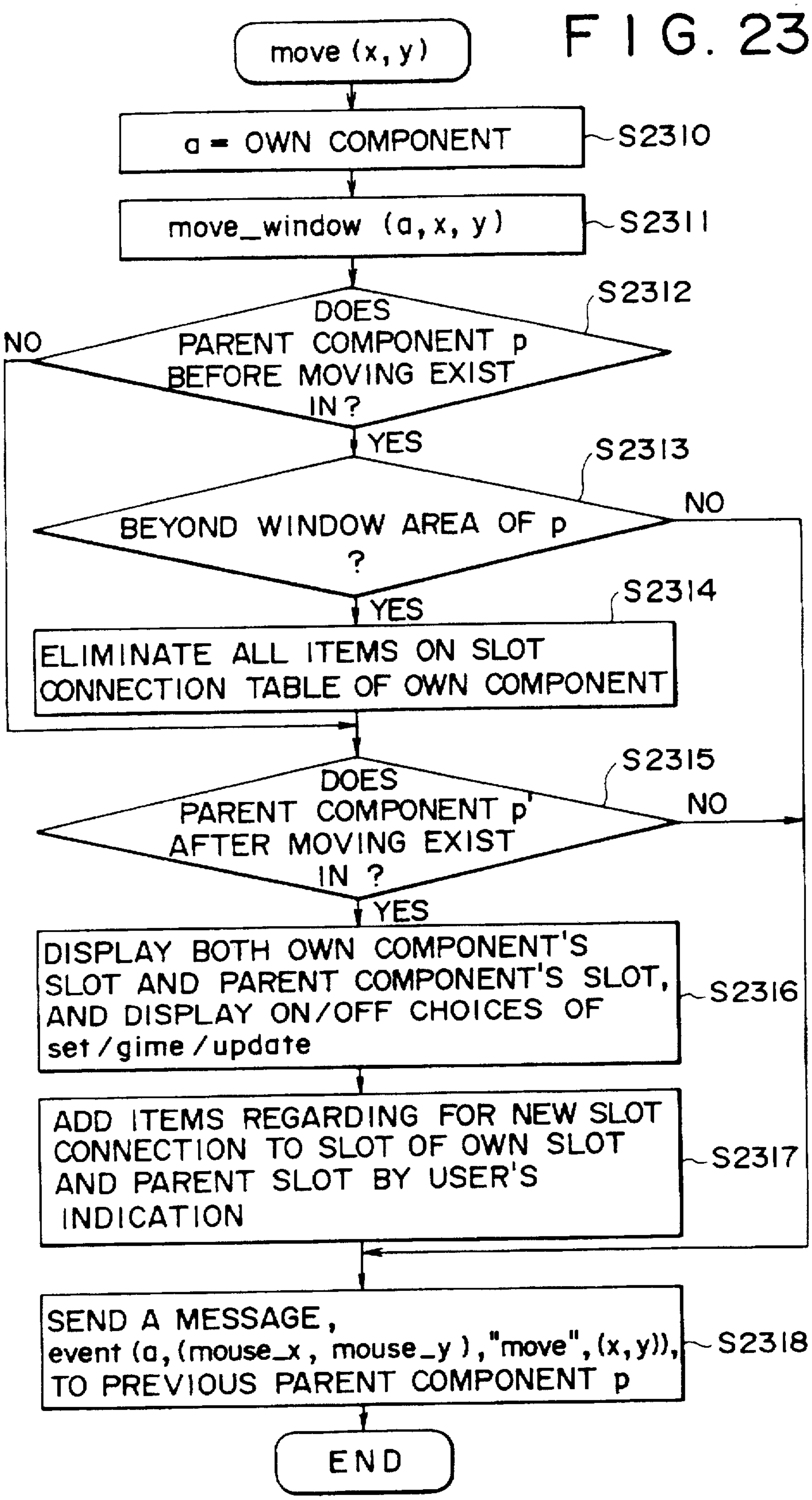
FIG. 23 is a flow chart indicating process steps to be performed when a view definition part of the component according to an embodiment of this invention has received a message, move(x, y).

FIG. 23 shows a flow chart of the process steps to be performed when the view definition part of each component has received the message, move (x, y), from the component management kernel program.

As shown in FIG. 23, when the message, move (x, y) 340, has been received from the component management kernel program 144, reference to "a" is first set as an own component (e.g. window) (S2310) and the view definition part sends a message, move_window (a, x, y) 906, to the window system 142 (S2311), thereby requiring the move of the own component (e.g. window).

Then, it is decided to determine if the parent component prior to the move of the own component exists (S2312). If it is decided that the parent component "p" exists (S2312: Yes), it is then decided to determine if the own component exists beyond the territory of the parent component "p" (S2313). If it is decided that it exists beyond the territory of the parent component "p" (S2313: Yes), then all items in the slot connection table 225 of the own component (window) are eliminated (S2314).

Thereafter, it is further decided to determine if a new parent component "p'" exists in the position to which the own component was moved and in which it exists (S2315). If it is decided that the new parent component "p'" exists therein (S2315: Yes), both of a slot menu of the own component and the parent component "p'" and ON/OFF choices of options, a set option 830, a gime option 840 and an update option 850, are displayed on the display screen 130 (S2316).

Then, the user adds items regarding new slot connections to the slot connection table 225 of the own component (window) by utilizing the keyboard 100 or the mouse 110 (S2317).

After the addition of the items of the new slot connections, a message, event (a, mouse_x, mouse_y, "move", (x, y)), informing of the occurrence of an event, is sent to the previous parent component "p" (S2318).

Figure 24:
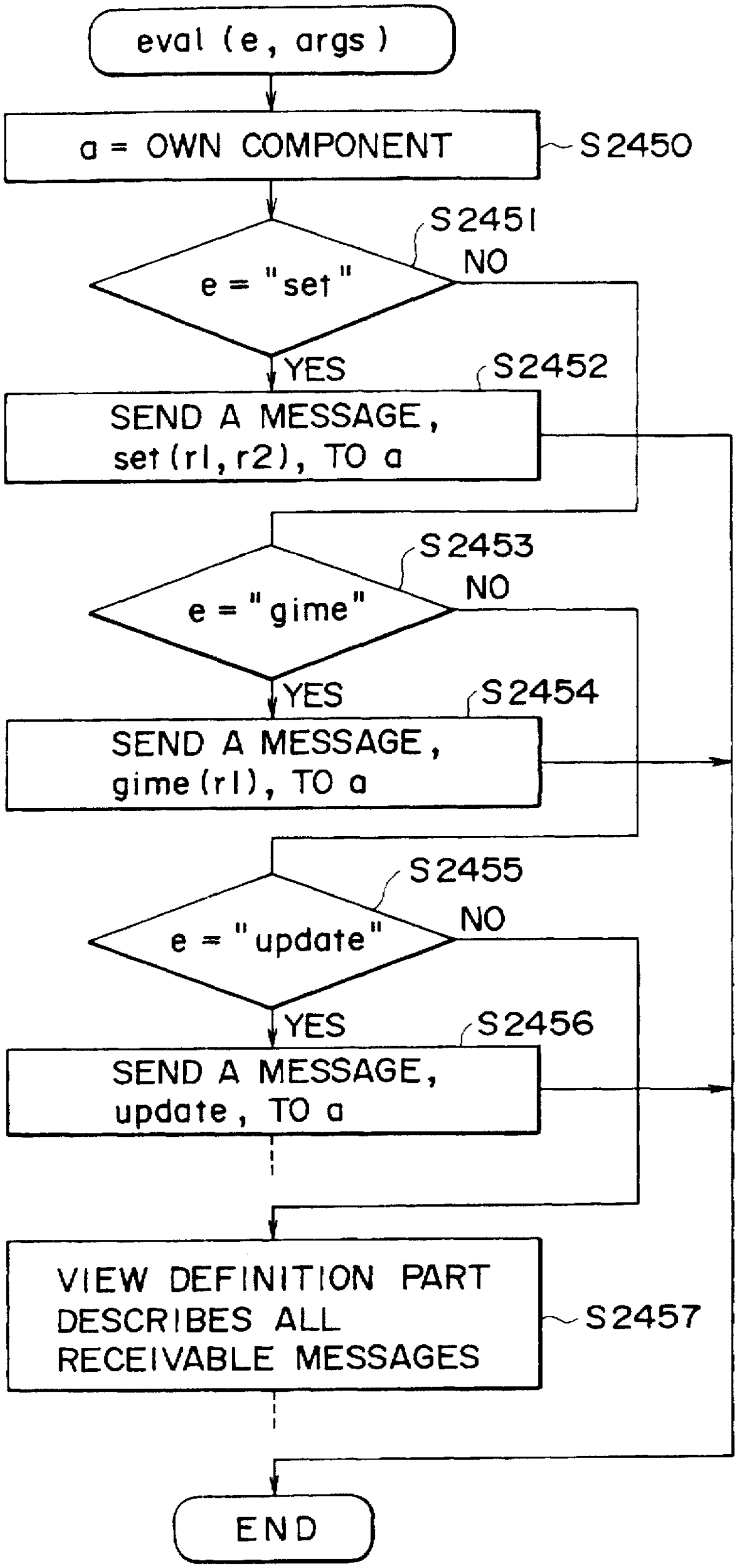
FIG. 24 is a flow chart indicating process steps to be performed when a component according to an embodiment of this invention has received a message, eval(e, args).

FIG. 24 shows a flow chart for the process steps to be performed when the component has received a message, eval (e, args). As shown in FIG. 24, the own component is first provided with reference symbol "a" (S2450), and it is then decided to determine if the message class referred to as "e" is the message, set (s, v) 315 (S2451). When it is decided that the message class "e" is the set (s, v) message 315 (S2451: Yes), then a message, set (r1, r2) 2410, is sent to its own component "a" (S2452), followed by the end of the process.

On the other hand, when it is decided that the message class "e" is not the set (s, v) message 315 (S2451: No), then it is decided to determine if the message class "e" is the message, gime (s) 320 (S2453). When it is decided that the message class "e" is the gime (s) message 320 (S2453: Yes), a message, gime (r1) 2420 is sent to the own component "a" (S2454), followed by the end of the process.

When it is decided that the message class "e" is not the gime (s) message 320 (S2453: No), on the other hand, then it is decided to determine if the message class "e" is the message, update 325 (S2455). When it is decided that the message class "e" is the update message 325 (S2455: Yes), then the update message 325 is sent to the own component "a" (S2456), followed by the end of the process.

On the other hand, when it is decided that the message class "e" is not the update message 325, then the view definition part of each of the components describes all receivable messages (S2457), followed by the end of the process. Further, a different process is implemented for each component.

Figure 25A:
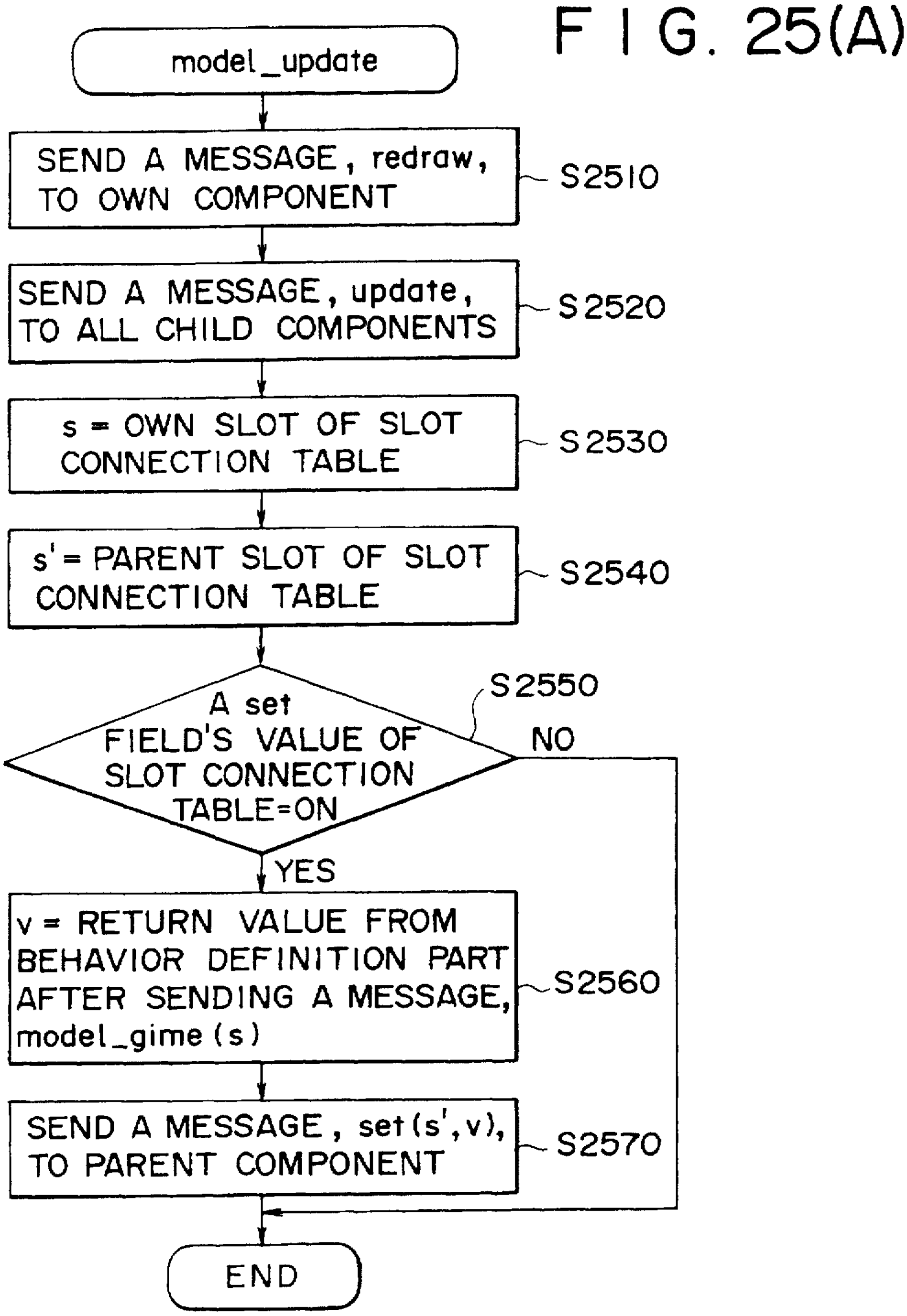
FIGS. 25(A) and 25(B) are each a flow chart indicating process steps to be performed when a component according to an embodiment of this invention has received a message, model_update.
Figure 25B:
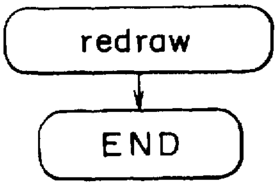

FIGS. 25(A) and 25(B) are flow charts for the process steps to be performed when the view definition part of each of the components has received the message, model_update, for giving notice of the changes of the slot value from its own behavior definition part.

As shown in FIG. 25(A), when the view definition part 210 of each component has received the model_update message 360 from its own behavior definition part 220, it issues the message, redraw 365, to the own component (S2510) and then it sends the message, update 325, to all the child components (S2520).

Thereafter, the slot "s" is set as its own slot 226 of the slot connection table 225 (S2530) and the slot "s'" is set as the parent slot 227 of the slot connection table 225 (S2540).

Then, it is decided to determine if the set field 228 of the slot connection table 225 is set to an "ON" selection (S2550). When it is decided that the set field 228 is set to the "ON" selection (S2550: Yes), it sends the message, model_gime (s) 375, to the behavior definition part 220 and receives a value "v" as a return value from the behavior definition part 220 (S2560).

Further, the set field 228 sends to the parent component the message, set (s', v), 315, stating to 'Change the slot value indicated by the parent slot "s'" to a slot value "v"' (S2570).

As shown in FIG. 25(B), the message, redraw 365, is the one to be issued to the own component when the view definition part 210 of each of the components has received the model_update message 360 from its own behavior definition part 220.

FIGS. 26(A) and 26(B) are flow charts for the process steps to be performed when the behavior definition part of each component has received the messages.

FIG. 26(A) shows the process steps to be performed when the behavior definition part 220 of each component has received the message, model_set (s, v) 370 from its own view definition part 210. Upon receipt of the model_set (s, v) message 370, it is first decided to determine if the slot having the name indicated by reference symbol "s" exists in the slot table 222 (S2610).

When it is decided that the slot name of the slot "s" exists therein (S2610: Yes), then the slot value of the slot name 223 indicated by reference symbol "s" is set to a value "v" in the slot table (S2620). Further, it is decided to determine if the slot value of the slot "s" has changed (S2630).

When it is decided that the slot value of the slot "s" has changed (S2630: Yes), the behavior definition part 220 sends to its own view definition part 210 the message, model_update 360, for giving notice of the changes of the status of the behavior definition part 220 (S2640), followed by the end of the process. On the other hand, when it is decided that no slot value of the slot "s" has changed (S2630: No), then the process is terminated.

Further, when it is decided that the slot name of the slot "s" does not exist in the slot table 222 (S2610: No), the process is then terminated.

FIG. 26(B) shows the process steps to be performed when the behavior definition part 220 of each of the components has received the message, model_gime (s) 375, from its own view definition part 210. As shown in FIG. 26(B), it is first decided to determine if the slot having the slot name indicated by reference symbol "s" exists in the slot table 222 (S2650).

When it is decided that the slot name "s" does not exist (S2650: No), the value "v" is indicated by the sign "–" (N/A) representing no set value (S2670), followed by the return of the slot value "v" to its own view definition part 210 (S2680).

On the other hand, when it is decided that the slot name of the slot indicated by reference symbol "s" exists in the slot table 222 (S2650: Yes), then the slot value of the slot having the slot name 223 indicated by reference symbol "s" is set to a value "v" (S2660), followed by the return of the slot value "v" to its own view definition part 210 (S2680).

Figure 27A:
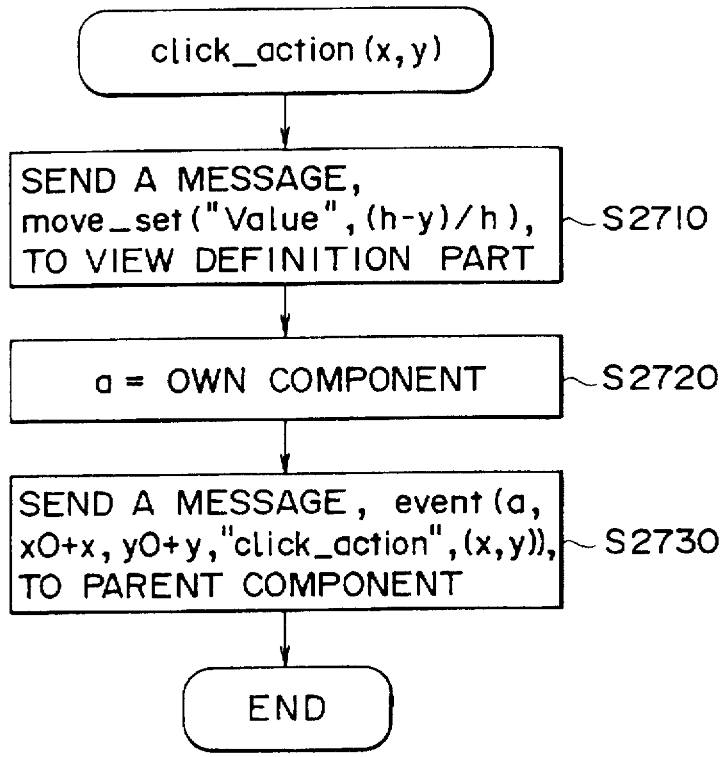
FIGS. 27(A) and 27(B) are each a flow chart indicating process steps to be performed when a bar meter component according to an embodiment of this invention has received a variety of messages.

FIG. 27(A) shows a flow chart for the process steps to be performed when the view definition part 210 of the bar meter 151 has received the click_action (x, y) message 330 from its own controller part 200. Upon receipt of the click_action (x, y) message 330, the view definition part 210 of the bar meter 151 sends a message, model_set ("Value", (h−y)/h), to its own behavior definition part 220 (S2710).

Then, the own component is provided with reference symbol "a" (S2720) and the view definition part 210 sends to the parent component the message, event (a, x0+x, y0+y, "click", (x+y)) 300, for informing of the occurrence of an event (S2730), followed by the end of the process. It is to be noted herein that reference to (x0, y0) indicates the location of the upper left corner of the own component "a", i.e. the origin of the upper left corner of the display screen.

Figure 27B:
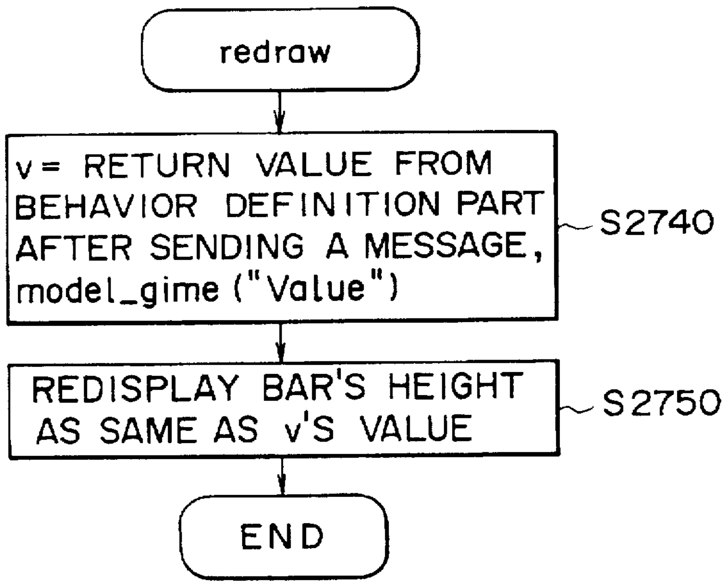

FIG. 27(B) shows the process steps to be performed when the view definition part 210 of the bar meter 151 has issued the redraw message 365 to its own component. The view definition part 210 sends to its own behavior definition part 220 the model_gime ("Value") message 375 in accordance with its process 365a, and then receives a return value "v" from the behavior definition part 220 (S2740).

Thereafter, the height of the bar meter 151 is redisplayed so as to become the return value "v" (S2750), followed by the end of the process.

FIG. 28 shows the process steps to be performed when the view definition part 210 of the numeric display device 158 has issued the redraw message 365 to its own component. In this process 365a, the view definition part 210 sends to its own behavior definition part 220 the model_gime ("Value") message 375 in accordance with its process 365a and then receives the return value "v" from the behavior definition part 220 (S2810).

Then, the return value "v" is redisplayed (S2820), followed by the end of the process.

FIG. 29 shows the process steps to be performed when the view definition part 210 of the pie chart has issued the redraw message 365 to its own component. In this process 365a, the view definition part 210 sends to its own behavior definition part 220 the model_gime ("Value") message 375 in accordance with its process 365a, and then receives the return value "v" from the behavior definition part 220 (S2910).

Then, the pie chart is redisplayed in accordance with the return value "v" (S2920), followed by the end of the process.

Figure 30A:
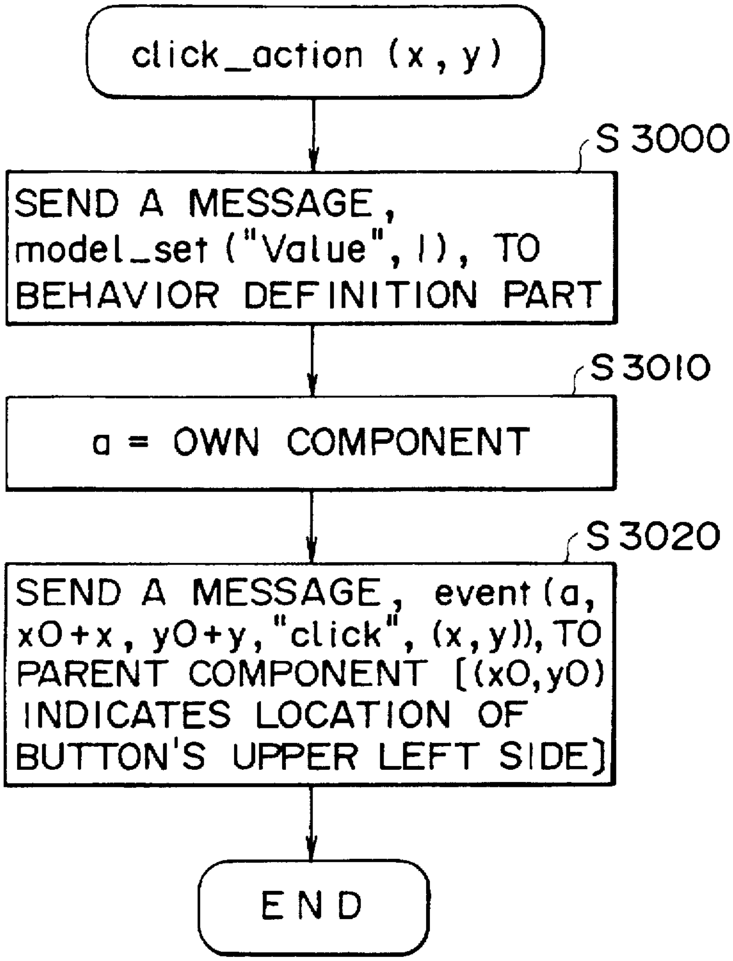
FIGS. 30(A) and 30(B) are each a flow chart indicating process steps to be performed when the button component according to an embodiment of this invention has received a variety of messages.
Figure 30B:
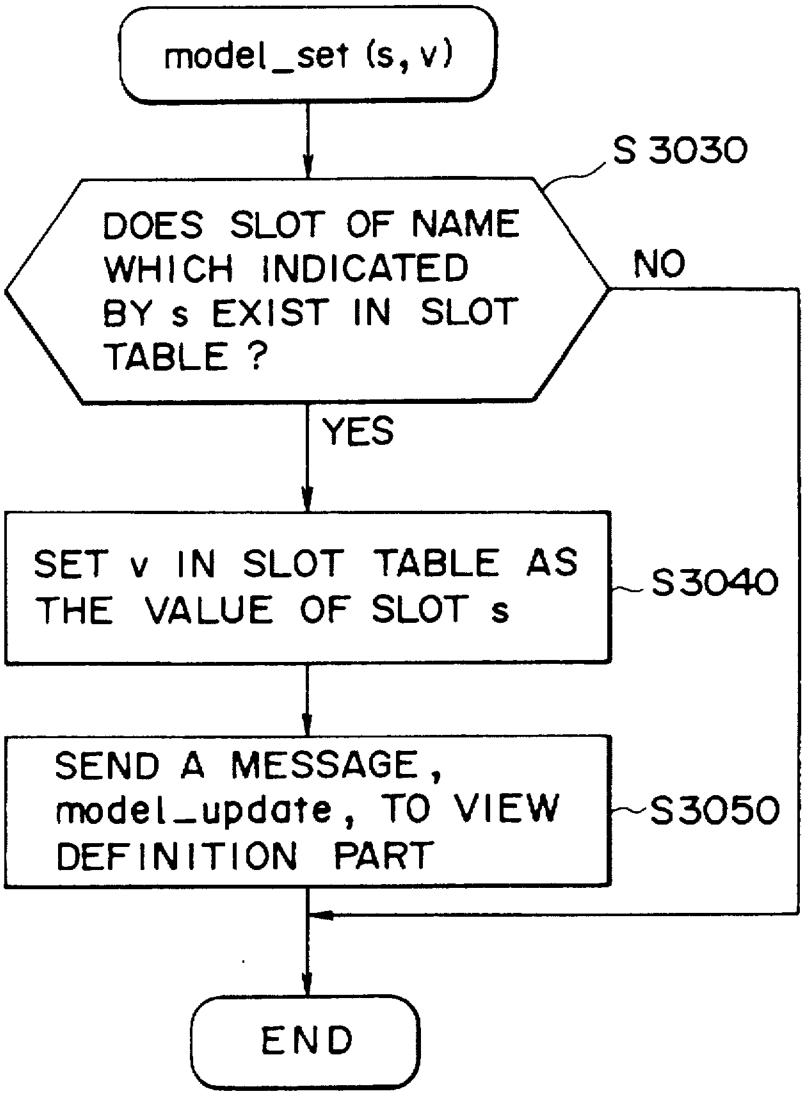

FIGS. 30(A) and 30(B) show flow charts for the process steps to be performed when the messages have been received by the button (FIG. 1). As shown in FIG. 30(A), the view definition part 210 of the button 157 sends a message, model_set ("Value", 1) 3000, to its own behavior definition part 330, when it has received the click_action (x, y) message 330 from its own controller part 200 (S3000).

Then, the own component is provided with reference symbol "a" (S3010), followed by sending to the parent component the message, event (a, x0+x, y0+y, "click", (x, y)) 3010, for giving notice of the occurrence of an event (S3020), followed by the end of the process. In this process, reference to x0 and y0 indicates the locations of the upper left corner of the button 157.

As shown in FIG. 30(B), when the behavior definition part 220 of each of the buttons 157 has received the message, model_set (s, v) 370, from its own view definition part 210, it is first decided to determine if the slot having the slot name indicated by reference symbol "s" exists in the slot table 222 (S3030). When it is decided that the slot name of the slot indicated by reference symbol "s" exists in the slot table 222 (S3030: Yes), then the slot value of the slot having the slot name 223 indicated by reference symbol "s" is set to a value "v" (S3040), followed by sending the model_update message 360 to its own view definition part 210 (S3050), followed by the end of the process.

When it is decided that the slot name "s" does not exist (S3030: No), the process is caused to end.

Figure 31:
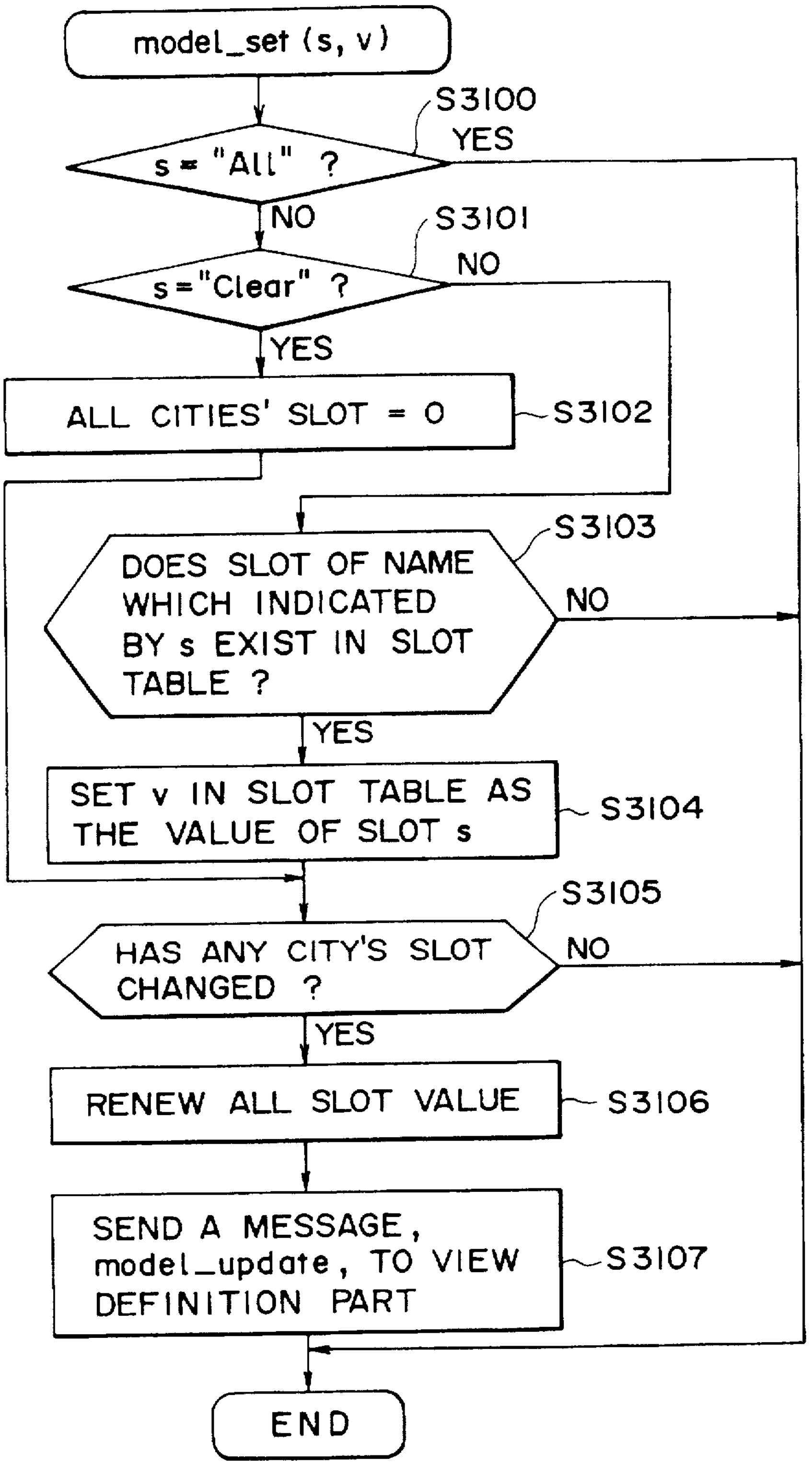
FIG. 31 is a flow chart indicating process steps to be performed when the behavior definition part of the Japanese map component according to an embodiment of this invention has received a message, model_set (s, v).

FIG. 31 shows a flow chart for the process steps to be performed when the behavior definition part of the Japanese map has received the message, model_set (s, v), from its own view definition part.

As shown in FIG. 31, it is first decided to determine if the slot name 223 of the slot indicated by reference symbol "s" is set to "All" (S3100). When it is decided that the slot name "s" is set to "All" (S3100: Yes), then the process is allowed to end.

On the other hand, when it is decided that the slot name 310 as indicated by reference symbol "s" is not set to "All" (S3100: No), it is then decided to determine if the slot name 223 of the slot indicated by reference symbol "s" is set to "Clear" (S3101). When it is decided that the slot name 223 of the slot "s" is set to "Clear" (S3101: Yes), the slot value 224 for all cities is cleared to "0" (S3102) and then it is decided to determine if the slot value 224 for any cities is changed (S3105). If it is decided that the slot value 224 for any cities is changed (S3105: Yes), the slot value 224 for the slot name 223 indicated by "All" is updated (S3106).

Then, the model_update message 360 is sent to its own view definition part 210, a message giving notice of the changes of the slot value 224 (S3107).

On the other hand, when it is decided that the slot name 223 of the slot indicated by reference symbol "s" is not set to "Clear" (S3101: No), it is further decided to determine if the slot having the slot name indicated by reference symbol "s" exists in the slot table 222 (S3103). When it is decided that the slot name for the slot "s" does not exist therein (S3103: No), then the process is allowed to end.

On the other hand, when it is decided that the slot name for the slot indicated by reference symbol "s" exists in the slot table 222 (S3103: Yes), the slot value 224 of the slot "s" as the slot name 223 is set to a slot value "v" (S3104), followed by proceeding to steps S3105 et seq. in which the processes are implemented in substantially the same manner as described hereinabove.

It can be noted herein that a variety of tools and programs can be created with ease by connecting the slots of each of the components as a parent and a child in object-oriented design in the fashion as described hereinabove.

Further, it can be noted that the creation of such tools and programs can be made with readiness by executing the pasting (or superimposing) operation or the move operation of the visualized windows (components) on the display screen.

The following is a description of the method for the programming process for converting the user operation for the object-oriented components connected or associated with each other in the manner as described hereinabove.

Figure 32:
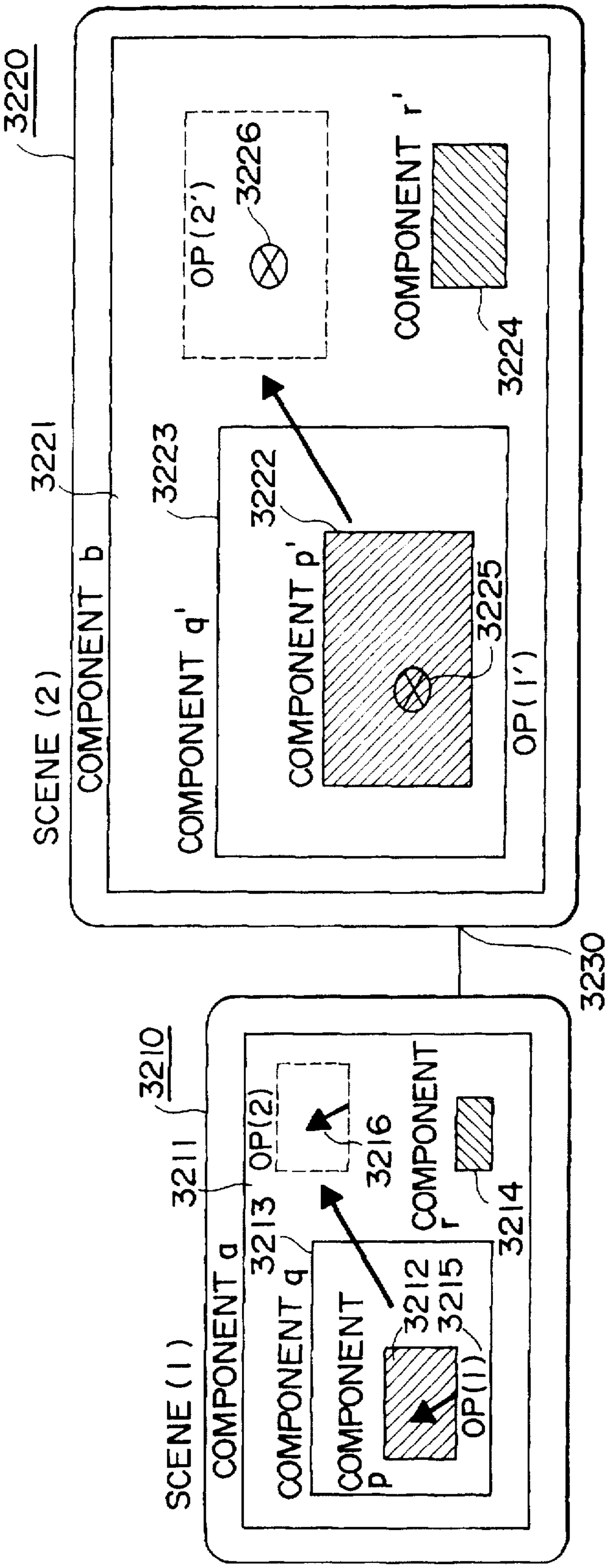
FIG. 32 is a schematic representation describing location conversions in the latitudinal and transverse directions in accordance with an embodiment of this invention.

FIG. 32 shows scenes for a description of the conversion of the locations in the latitudinal and transverse directions. As shown in FIG. 32, each of the windows in a scene (1) 3210 and a scene (2) 3220 is referred to as a component. In the two scenes, a group of the same components exists in the form of the same layout.

In each of the two scenes, reference numeral 3211 denotes a user operation transmission component "a" (hereinafter referred to as 'transmission component "a"') and reference numeral 3221 denotes a user operation reception component "b" (hereinafter referred to as 'reception component "b"').

The reception component "b" 3221 is so arranged as to have a size larger in the latitudinal direction by two times and in the transverse direction by three times the corresponding lengths of the transmission component "a" 3211. Accordingly, each component in the reception component "b" 3221 also has a size larger in the latitudinal direction by two times and in the transverse direction by three times the corresponding component in the transmission component "a" 3211.

When the user moves, for example, a component "p" 3212 to the upper right corner in the transmission component "a" 3211, a component "p'" 3222 is also allowed to move to the upper right corner in the reception component "b" 3221. It is to be noted herein that the distance of moving of the component "p'" 3222 in the reception component "b" 3221 is longer in the latitudinal direction by two times and in the transverse direction by three times than that of moving the component "p" in the transmission component "a" 3211.

Likewise, each of a component "q" 3213 and a component "r" 3214 in the scene (1) 3210 is displayed in an enlarged state in the scene (2) 3220 in such a manner that each of the component "q'" 3223 and the component "r'" 3224 is larger in the latitudinal direction by two times and in the transverse direction by three times the corresponding sizes of the former components in the scene (1) 3210.

By moving the components to the scene (2) 3220 after the operation in the scene (1) 3210 has been subjected to location conversion, the components in the two scenes can sustain the same layouts without a difference in multiplication rate.

This means that the user operation in the scene (1) 3210 is equivalent to the location conversion in the latitudinal and transverse directions (by three times the x-location and by two times the y-location).

In order to carry out substantially the same process by a conventional user operation replay method, however, it should be realized by a combination of a latitudinal location conversion program and a transverse location conversion program and some reprogramming is required.

On the other hand, the embodiments of this invention can realize the location conversion in both of the latitudinal and transverse directions simply by pasting or superimposing a location conversion component in the latitudinal direction on a location conversion component in the transverse direction, or vice versa, on the display screen.

Figure 33:
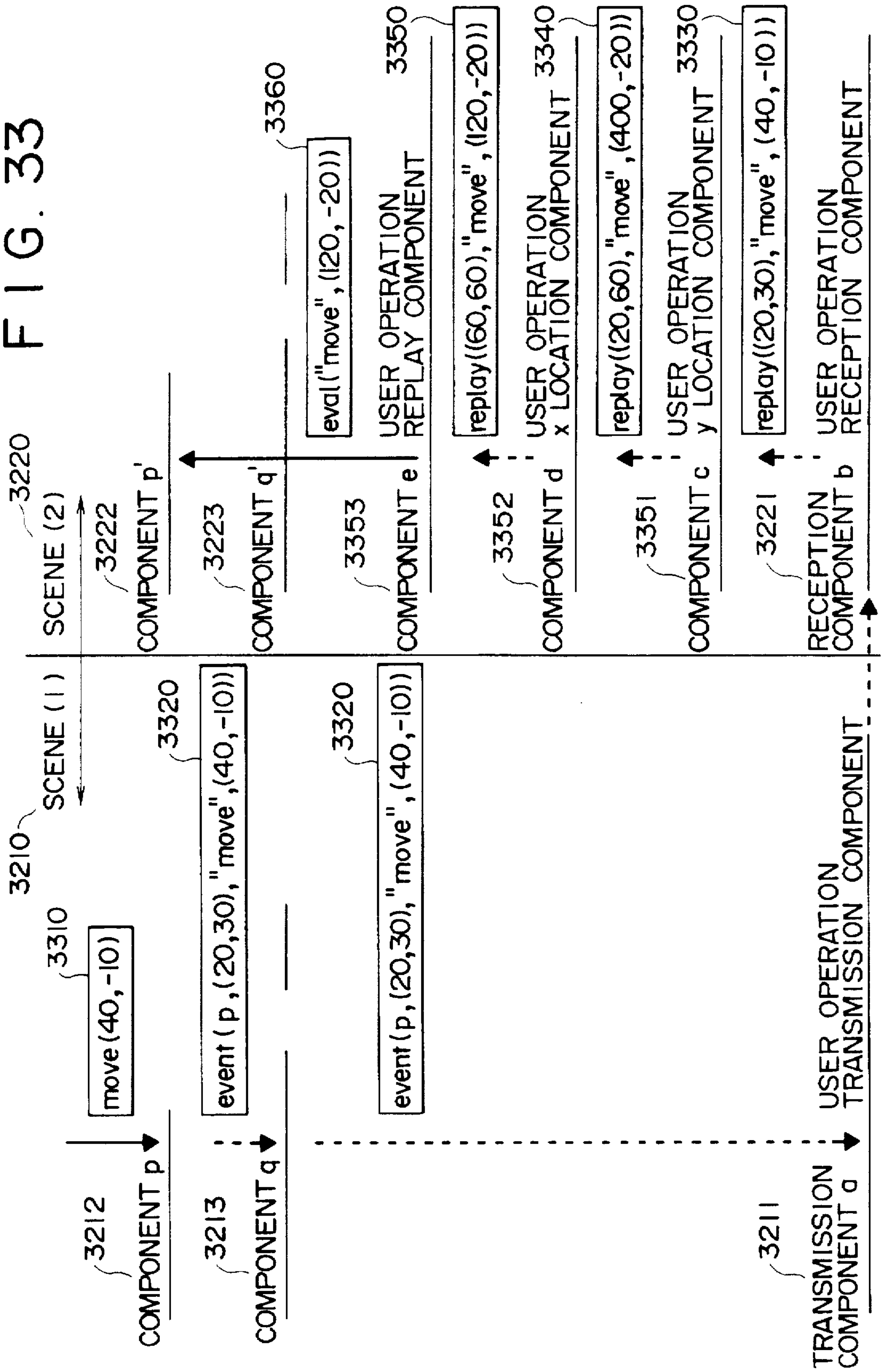
FIG. 33 is a schematic representation for describing a method for realizing the location conversions in accordance with an embodiment of this invention.

FIG. 33 shows the method for realizing the location conversion. As shown in FIG. 33, when the user carries out a move operation of the component "p" 3212 on the scene (1) 3210, the window system 142 sends a message, for example, move (40, −10) 3310, to the component "p" 3212. In this message, a parameter (40, −10) refers to a move amount (offset) or distance (FIG. 9).

Upon receipt of the move (40, −10) message 3310, the component "p" 3212 sends to the component "q" 3213 as a parent component a message, event (20, 30), "move", (40, −10)) 3320, for giving notice of the implementation of the move operation. In this message, a parameter (20, 30) refers to the location of the mouse 110 in the position in which the move operation of the component "p" 3212 has been started.

When it has received the event (20, 30), "move", (40, −10)) message 3320, the component "q" 3213 transmits the message to the transmission component "a" 3211 working as the parent component of the component "q" 3213. When it has received the message, event (20, 30), "move", (40, −10)) 3320, the transmission component "a" 3211 transmits the message to the reception component "b" 3221 through a line 3230.

Upon receipt of the message, event (20, 30), "move", (40, −10)) 3320, the transmission component "a" 3211 converts the message into a message, replay ((20, 30), "move", (40, −10)) 3330 and sends this message to a component "c" 3351 (a user operation y location component) working as a child component.

On the other hand, the component "c" 3351 sends a message, replay ((20, 60), "move", (40, −20)) 3340, to a component "d" 3352 (a user operation x location component) working as a child component, after either of the parameters of the locations in the message, replay ((20, 30), "move", (40, −10)) 3330 has been changed (in this example, by enlarging the y-location of the parameters (20, 30) and (40, −10) to a two-fold larger size).

Then, the component "d" 3352 sends a message, replay ((60, 60), "move", (120, −20)) 3350, to a component "e" 3353 (a user operation x replay component) working as a child component, after either of the parameters of the locations in the message, replay ((20, 60), "move", (40, −20)) 3340, has been changed (in this example, by enlarging the x-location of the parameters (20, 60) and (40, −20) to a three-fold larger size)).

When it has received the message, replay ((60, 60), "move", (120, −20)) 3350, it sends a message, eval ("move", (120, −20)) 3360, to the locations indicated by the first parameter (in this example, to the component "q'" 3222 on the locations (60, 60)).

As a result, the process of the move (120, −20) message in the eval("move", (120, −20)) message 3360 is executed. Therefore, once the component "p" 3212 has been moved from the position of OP(1) 3215 to the position of OP(2) 3216, the component "p'" 3222 is moved from the position of OP(1') 3225 to the position of OP(2') 3226 in association with the move of the component "p" 3212.

It is to be noted herein that the messages as described hereinabove are all sent to and received by the view definition part 210 of each of the components.

Figure 34:
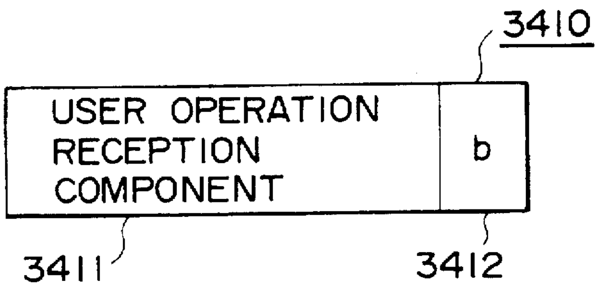
FIG. 34 is a table showing a transmission component "a" according to an embodiment of this invention.

FIG. 34 indicates a table held by the view definition part of the transmission component "a" 3211. As shown in FIG. 34, a table 3410 is comprised of a territory holding a destination name 3411 (in this example, a user operation transmission component) and its address 3412, when various messages have been received.

Figure 35:
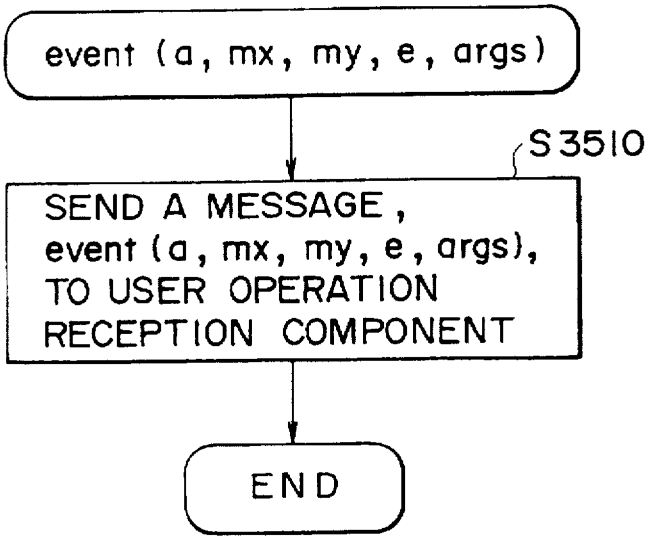
FIG. 35 is a flow chart indicating process steps to be performed when the transmission component "a" has received a message, event.

FIG. 35 is a flow chart for the process steps to be performed when the transmission component "a" 3211 has received a message, "event". Once this message has been received, the transmission component "a" 3211 sends a message, replay (mx, my, e, args), to the reception component "b" 3221 (S3510), as the process of the even message.

Figure 36:
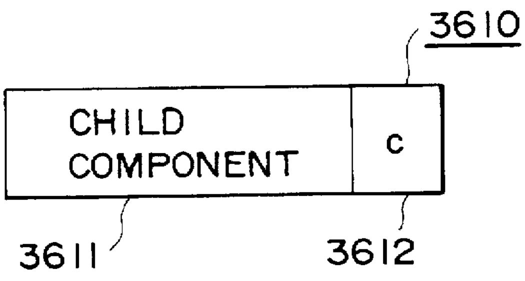
FIG. 36 is a table showing a reception component "b" according to an embodiment of this invention.

FIG. 36 indicates a parent-child table held by the view definition part of the reception component "b" 3221. As shown in FIG. 36, a table 3610 is comprised of a territory holding an address 3612 of the child component (in this example, the component referred to as "c").

Figure 37:
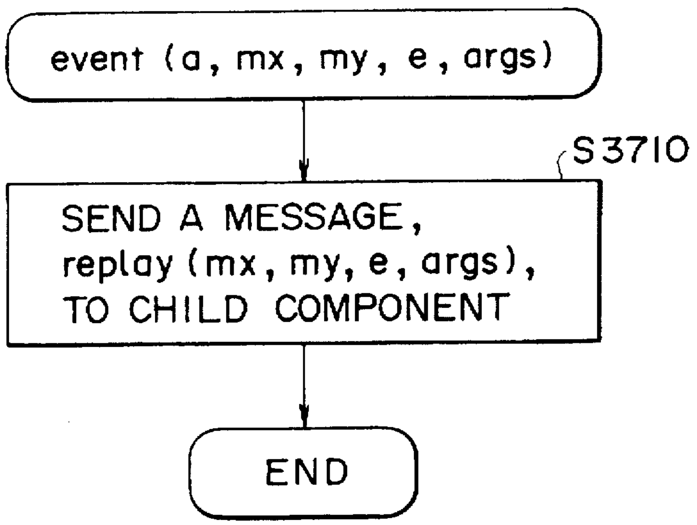
FIG. 37 is a flow chart indicating process steps to be performed when the reception component "b" has received a message, event.

FIG. 37 is a flow chart for the process steps to be performed when the reception component "b" 3221 has received a message, "event". Once this message has been received, the reception component "b" 3221 sends a message, replay (mx, my, e, args), to the child component "c" 3351 (S3710), as the process of the event message.

Figure 38:
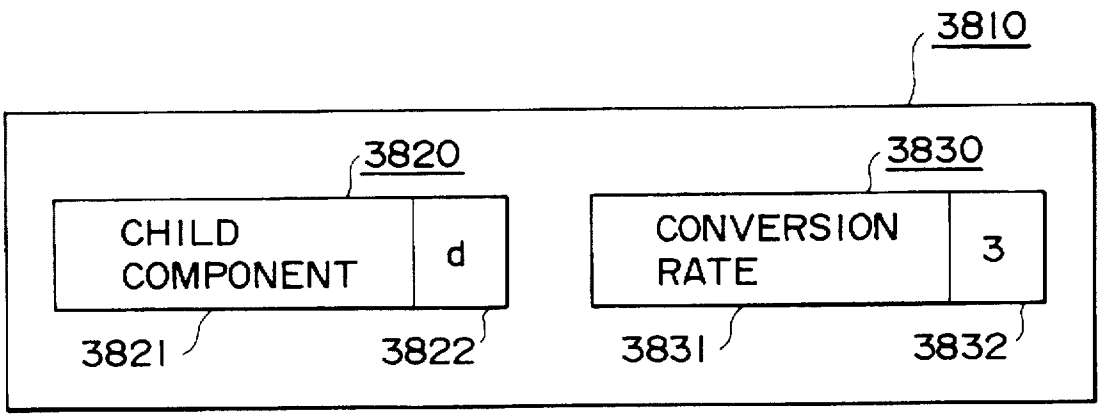
FIG. 38 is a table showing a component "c" according to an embodiment of this invention.

FIG. 38 indicates a table held by the component "c" 3351. As shown in FIG. 38, a table 3810 is comprised of a territory 3820 holding an address 3622 of the child component (in this example, the component referred to as "d") and a territory 3830 holding a y-location multiplication rate 3832.

Figure 39:
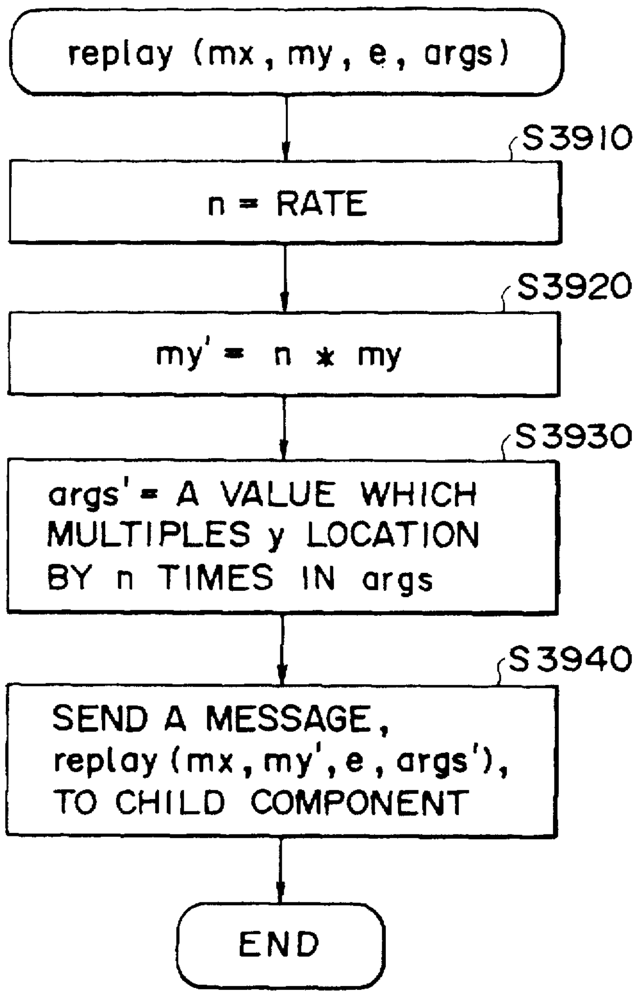
FIG. 39 is a flow chart indicating process steps to be performed when the component "c" has received a message, replay.

FIG. 39 is a flow chart for the process steps to be performed when the component "c" 3351 has received a message, "replay". Once this message has been received, the component "c" 3351 sends a message, replay (mx, my', e, args'), to the child component "d" 3352 (S3940), after the y-location of the location data in the parameter is multiplied by n times (S3910, S3920 and S3940).

Figure 40:
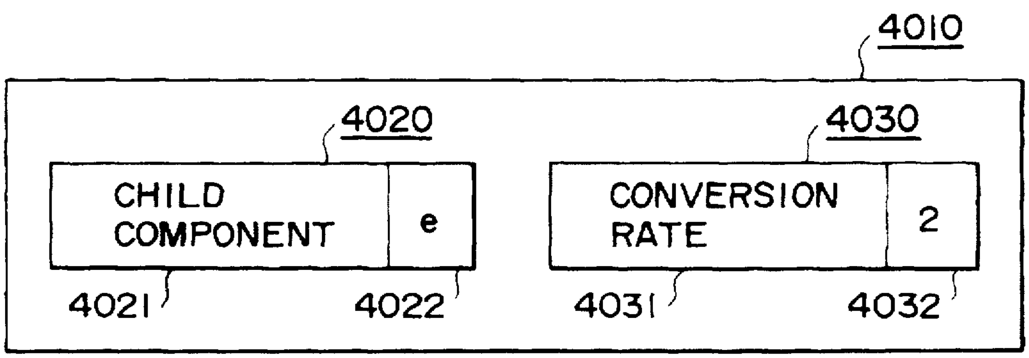
FIG. 40 is a table showing a component "d" according to an embodiment of this invention.

FIG. 40 indicates a table held by the component "d" 3352. As shown in FIG. 40, a table 4010 is comprised of a territory 4020 holding an address 4022 of the child component (in this example, the component as referred to as "e") and a territory 4030 holding an x-location multiplication rate 4032.

Figure 41:
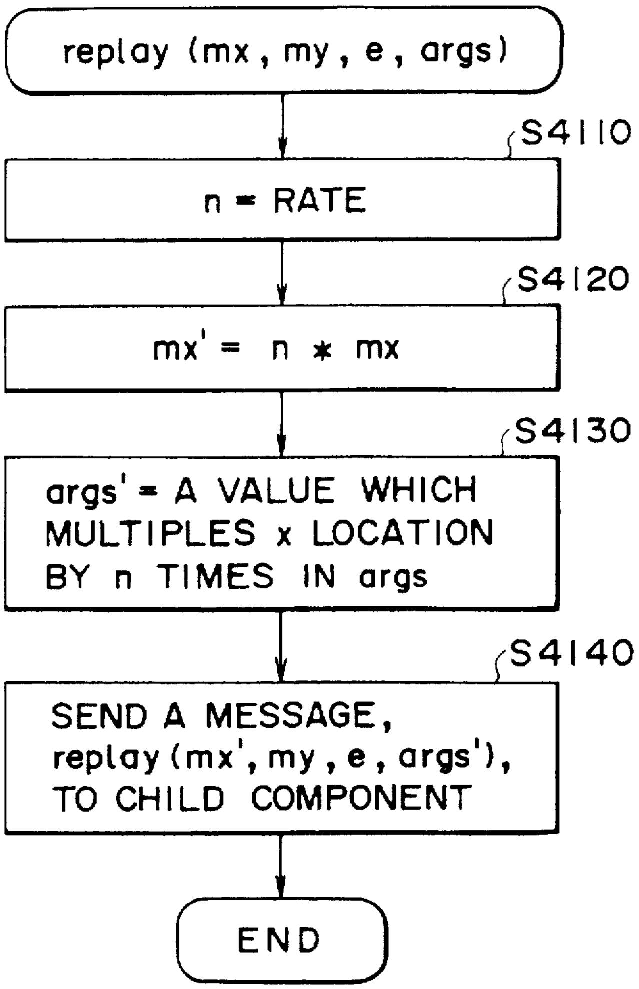
FIG. 41 is a flow chart indicating process steps to be performed when the component "d" has received a message, replay.

FIG. 41 is a flow chart for the process steps to be performed when the component "d" 3352 has received the "replay" message. Once this message has been received, the component "d" 3352 sends a message, replay (mx', my, e, args'), to the component "d" 3352 (S4140), after the x-location of the locations data in the parameter is multiplied by n times (S4110, S4120 and S4130).

Figure 42:
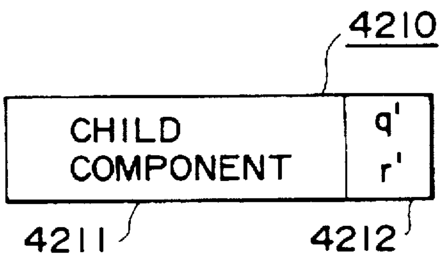
FIG. 42 is a table showing a component "e" according to an embodiment of this invention.

FIG. 42 indicates a table held by the component "e" 3353. As shown in FIG. 42, a table 4210 is comprised of a territory 4210 holding an address 4212 of the child component (in this example, the component as referred to as "q"').

Figure 43:
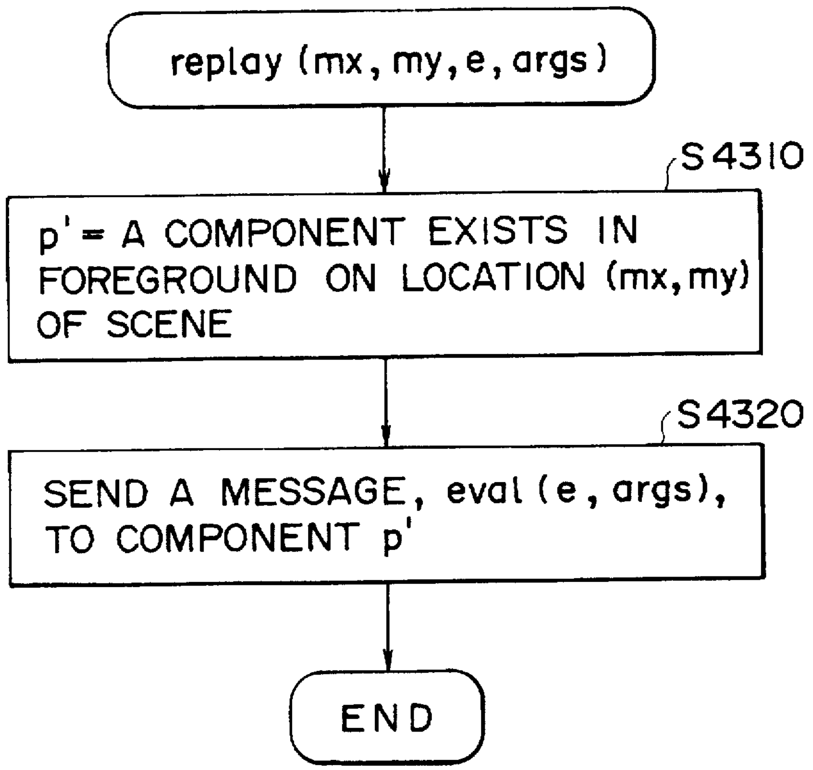
FIG. 43 is a flow chart indicating process steps to be performed when the component "e" has received a message, replay.

FIG. 43 is a flow chart for the process steps to be performed when the component "e" 3353 has received the "replay" message. When the component "e" 3353 has received the message, replay (mx, my, e, args), the component "e" 3353 sends a message, eval (e, args), to the component that exists at the locations (mx, my) in the foreground of the display screen (in this example, the component "p"' 3222) (S4310).

It can be noted herein that, by the transmission and reception of a variety of the messages between the controller part, the view definition part and the behavior definition part, each of the components can be connected with each other as a parent-child relationship in an object-oriented design, and a variety of tools and programs can be configured in the fashion as described hereinabove.

In particular, it can be noted herein that the conversion functions required by general users can be realized with ease simply by a superimposing operation by superimposing conversion components on the display screen, because the conversion components for converting the user operation are displayed in advance on the display screen, another object-oriented component is superimposed on the conversion component displayed on the screen, and the superimposed object-oriented component is displayed after being subjected to the process defined for the conversion component.

Further, it can be noted herein that a composite conversion component consisting of a plurality of conversion components can be created with ease.

As a result, the prior art need for reprogramming by a professional programmer is no longer required in order to realize the conversion functions. Moreover, even general users can readily create new conversion components.

Next, a description will be made of the automatic method for indexing the components associated with each other.

Figure 44A:
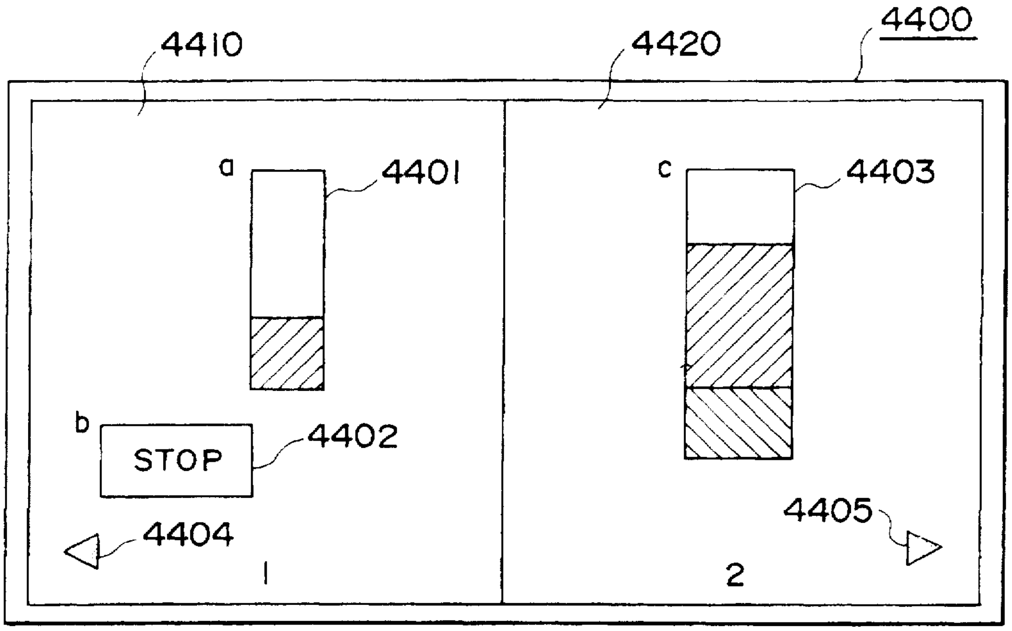
FIGS. 44(A) and 44(B) are each a schematic representation for describing the pasting operation (or superimposing operation) of each of various components in a book component in accordance with an embodiment of this invention.
Figure 44B:
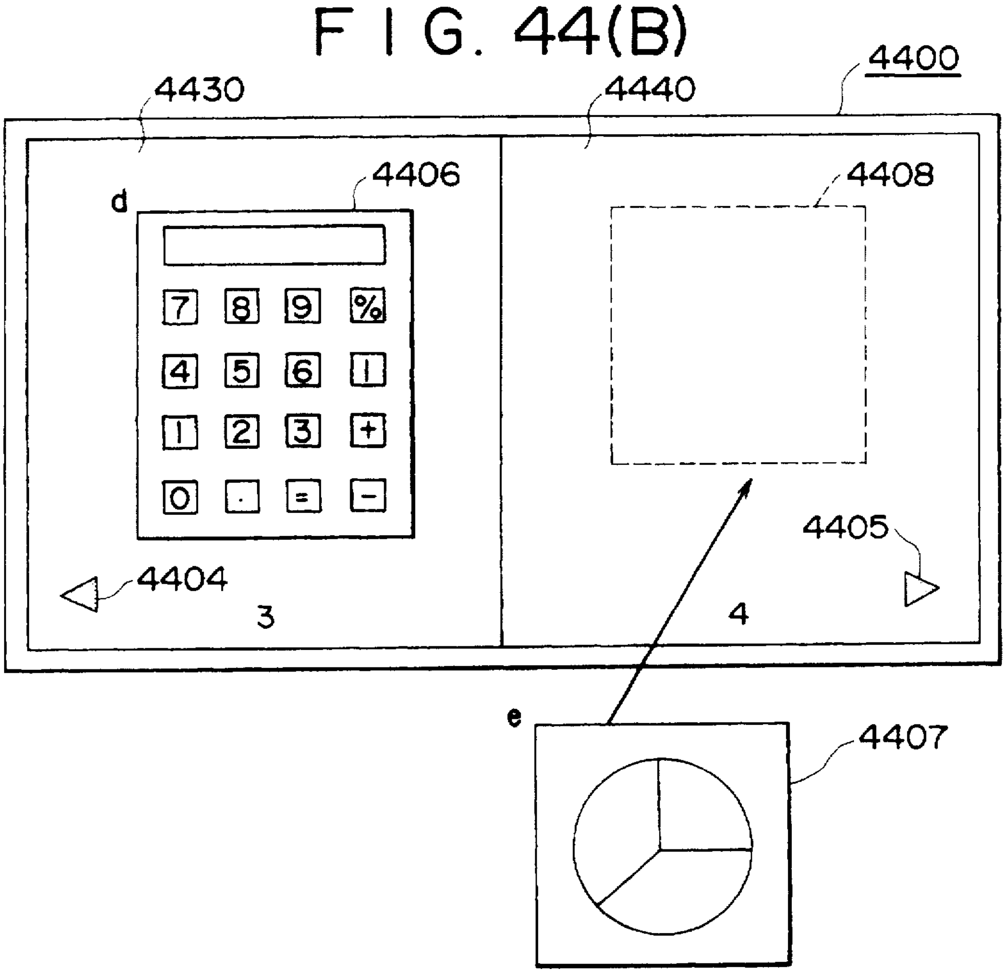

FIGS. 44(A) and 44(B) indicate scenes for describing the method for the indexing of the components.

As shown in FIG. 44(A), a bar meter component "a" 4401 and a STOP button component "b" 4402 are superimposed on the first page 4410 of a book component 4400, and a bar graph component "c" 4403 is superimposed on the second page 4420 thereof.

The small alphabetical letters, such as "a", "b", "c" and "d", written above and to the left of the components on the display screen, indicate the addresses of the corresponding components, and they are utilized in distinction from the others. Further, they are automatically provided inside the system although they are not displayed visually on the display screen.

As shown in FIG. 44(A), a triangular mark 4404 at the lower left corner of the book component 4400 and a triangular mark 4405 at the lower right corner thereof are provided for changing the pages of the book. When the left triangular mark 4404 is clicked by the mouse 110, the left page is turned to the previous page in the left direction. On the other hand, when the right triangular mark 4405 is clicked, the right page is turned to the subsequent pages in the right or normal direction.

FIG. 44(B) shows an example of the subsequent pages, for example, the third page 4430 on the left side of the scene and the fourth page 4440 on the right side thereof, that are opened when the right page, i.e. the second page 4420, is turned by clicking the right triangular mark 4405 with the mouse 110. In the third page 4430 is pasted a calculator component "d" 4406. On the other hand, in order to paste a pie chart display component "e" 4407 existing outside a frame of the book component 4400 in the fourth page 4440 of the book component 4400, the pasting operation can be implemented simply by moving the component "e" 4407 in an area 4408 enclosed by a broken line on the fourth page 4440 as shown in FIG. 44(B), in substantially the same manner as described hereinabove.

This process allows the pie chart display component "e" 4407 to be registered in the index table of the book component 4400 (referring to FIG. 46(B)).

Figure 45A:
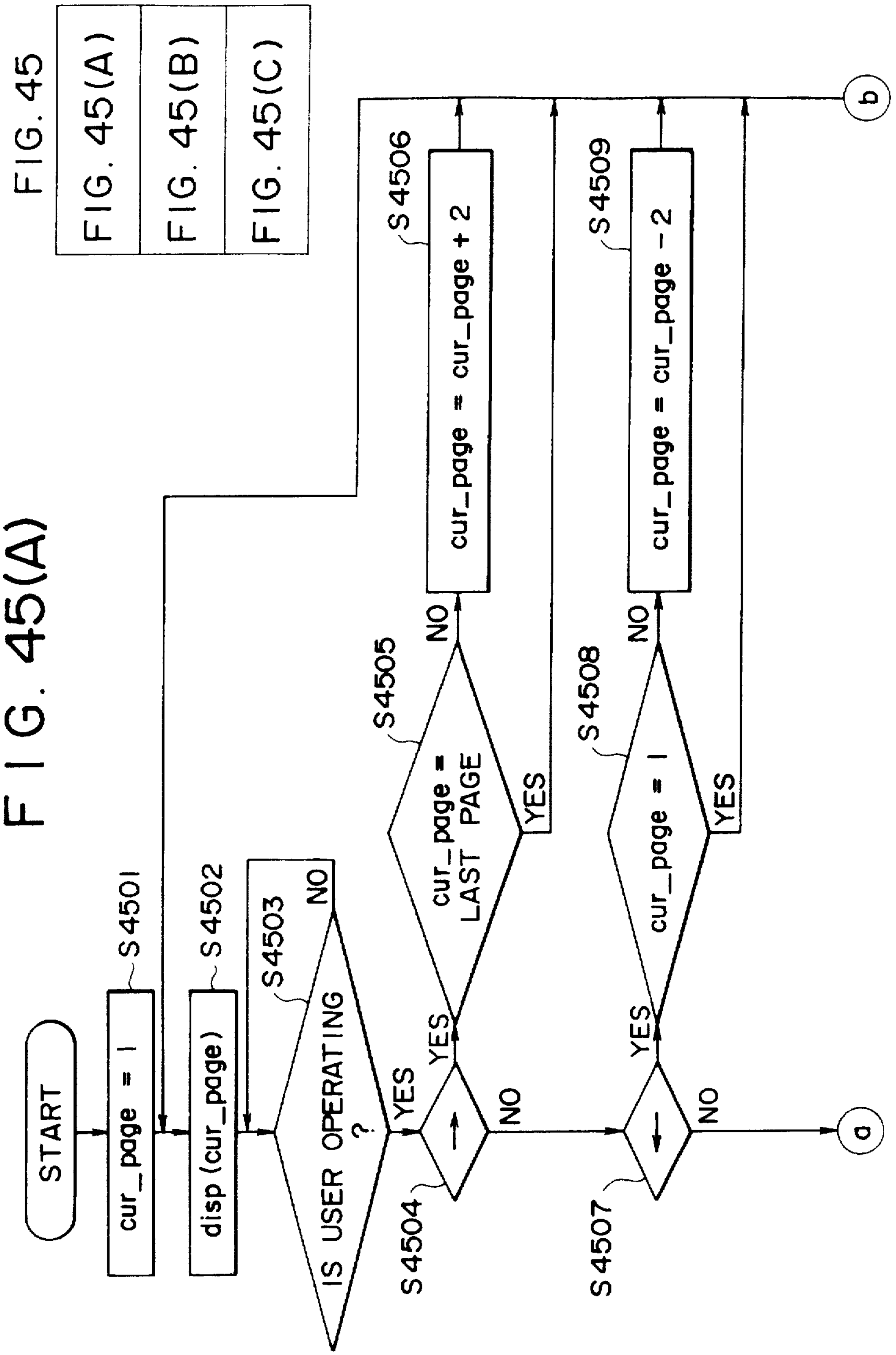
FIGS. 45(A) through 45(C) show the pasting operation (or superimposing operation) of each of the various components in the book component in accordance with an embodiment of this invention.
Figure 45B:
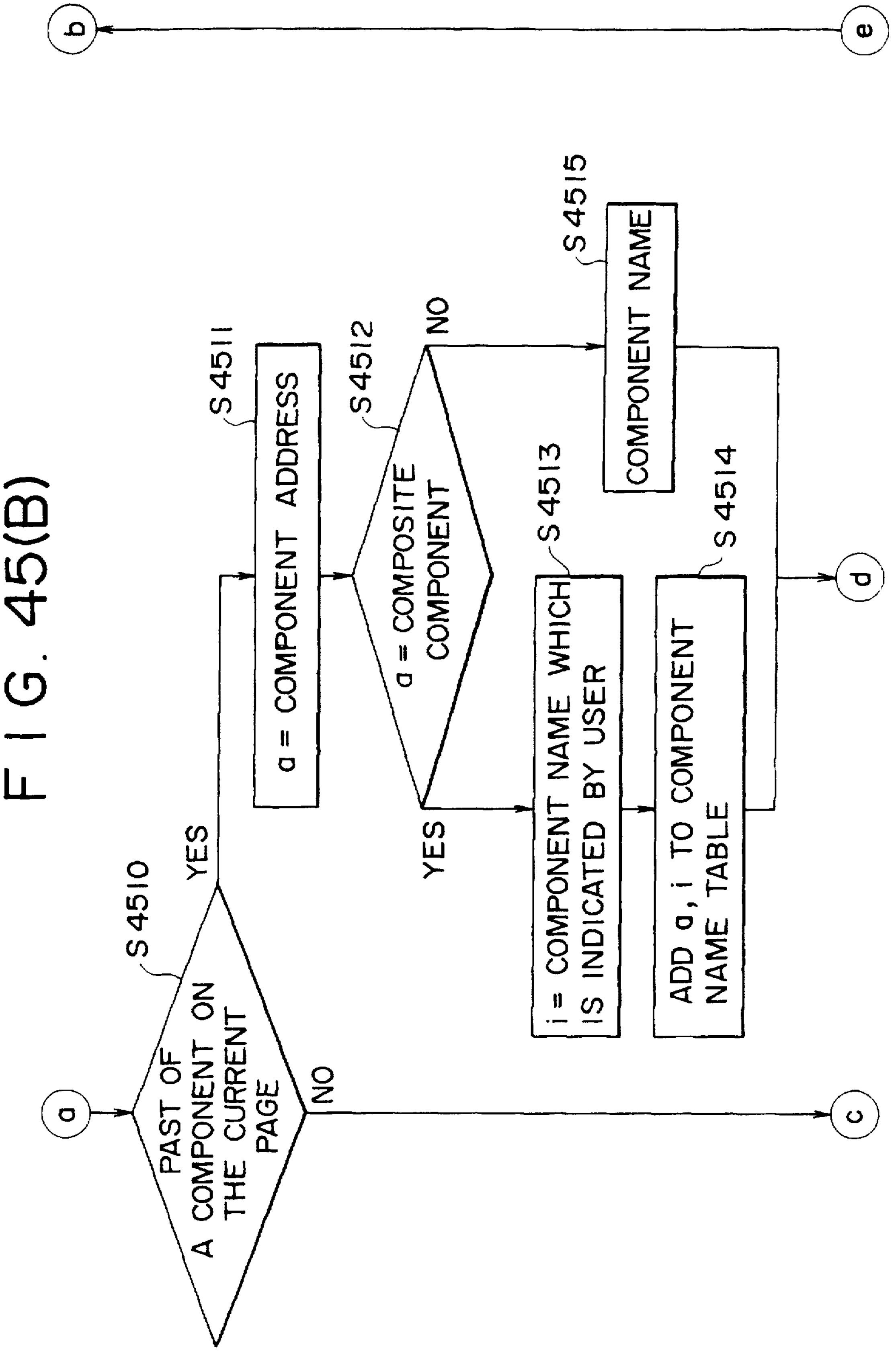
Figure 45C:
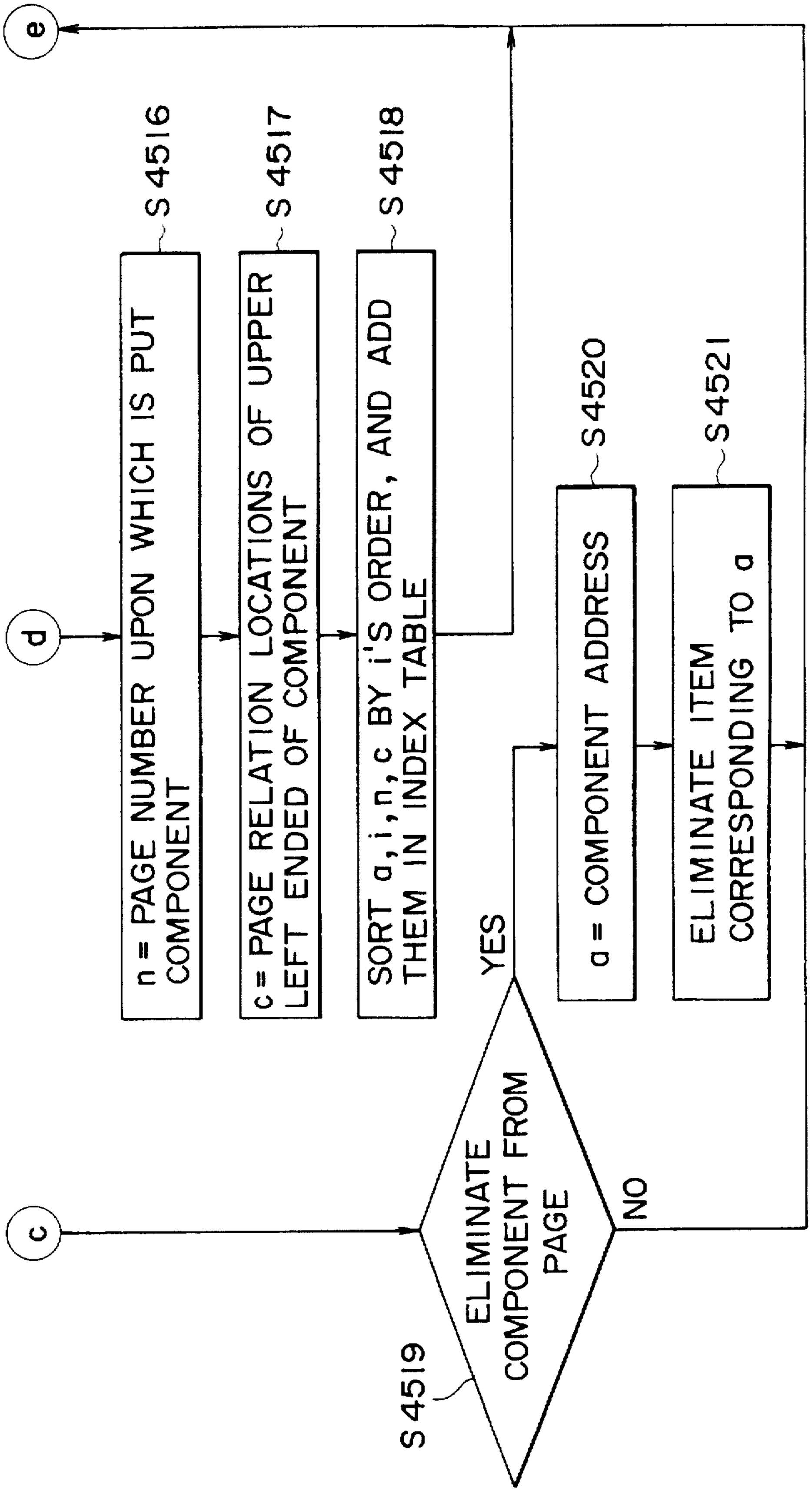

FIGS. 45(A) through 45(C) constitute a flow chart for the process steps to be performed for automatically indexing the book component 4400 created in the manner as described hereinabove.

As shown in FIGS. 45(A) through 45(C), after the automatic indexing program for the components is started, a page display routine is started by setting the current page of the book component 4400 (cur_page: a page number 4633 on the left side of a currently open spread consisting of two pages) to "1" (S4501) and the top two-page spread is displayed on the display 130 (S4502).

Then, the current status is waiting for a subsequent user operation (S4503). When the user is in the process of operating (S4503: Yes), then it is decided to determine if the user intends to turn the spread and the pages in the right or normal direction (S4504). When the user intends to turn the pages to the right (S4505: right arrow), then it is decided to determine if the currently opened pages are the last ones (S4505). When it is decided that the pages are left still unopened (S4505: No), then an increment of "2" is added to the current page (cur_page) (S4506), followed by the return to S4502 and the repeat of the processes.

On the other hand, when it is decided that the currently opened spread or pages are the last ones (S4505: Yes), the program is returned to S4502 and the processes et seq are repeated.

When the user intends to turn the pages in the opposite direction, i.e. to the left (S4507: left arrow), it is then decided to determine if the currently displayed and open pages (cur_page) are the top ones (S4508). When it is decided that the currently displayed and open pages (cur_page) are not the top ones (S4508: No), i.e. that pages are left unopened in the opposite direction, a decrement of "2" is subtracted from the currently open pages (cur_page) (S4509), followed by the return to S4502 and the repeat actions of the processes.

On the other hand, when it is decided that the currently opened spread or pages are the top ones (S4508: Yes), the program is returned to S4502 and the processes et seq are repeated.

Then, the user decides to determine if a new component is to be superimposed on the currently displayed page (S4510). When the new component is to be superimposed on the current page (S4510: Yes), then an address for the pasted (or superimposed) component, indicated by reference symbol "a", is given (S4511), followed by a decision to be made to determine if the component is a composite component (S4512). This decision can be made by making a decision to determine if the component has a component of the child 217.

When it is decided that the component is the composite component (S4512: Yes), a component name "i" is indicated by the user (S4513), followed by an addition of reference symbols "a" and "i" added to the composite component name registration table 4640 (referring to FIG. 46(B)) (S4514). On the other hand, when it is decided that the component is not the composite component (S4512: No), the component name is utilized as it is and it is registered in the index table 4630 (referring to FIG. 46(A)) (S4515).

Then, the page number "n" of the page on which the component is pasted (or superimposed) is determined (S4516). If the page with the component pasted (or superimposed) thereon is at the left side of the currently open pages, the page number "n" is set to "cur_page". On the other hand, if the page with the component pasted (or superimposed) thereon is at the right side thereof, the page number "n" is set to "cur_page+1".

Thereafter, the display locations "c" of the components in pages are determined from the component addresses 4631 of the alphabetical small letters provided at the upper left corners of each of the components (referring to FIG. 46(A)) (S4517), although they are not displayed on the screen.

Then, the alphabetical small letters "a", "i", "n" and "c" are sorted by i's order and added to the index table 4630 (S4518), followed by the return to step S4502 and the repeat actions of the processes.

On the other hand, when the user has eliminated the component from the displayed and current page number (S4519: Yes), the component address "a" 4631 is determined for the component eliminated from the current page number (S4520), followed by the elimination of the item corresponding to the component address "a" of the involved component from the index table 4630 (S4521).

The processes as described hereinabove can create the index table 4630 as shown in FIG. 46(A) and the composite component name registration table 4640 as shown in FIG. 46(B).

Further, the index table 4630 and the composite component name registration table 4640 can be created when each of the components are superimposed on the book component 4400.

As shown in FIG. 46(A), the index table 4630 comprises a component address 4631, a component name 4632, a page number 4633 and display locations of components in pages, referred to as 4634. As shown in FIG. 46(B), the composite component name registration table 4640 comprises a component address 4631 and a component name 4632.

For example, when the pie chart display component "e" 4407 is pasted in or on the fourth page 4440 of the book component 4400, as shown in FIG. 44(B), the index table 4630 of FIG. 46(A) is provided with and registered as reference symbol "e" for a component address 4631 of the pie chart display component 4407, as "pie chart display component" for a component name 4632, as "4" for a page number 4633 and "(50, 45)" for the display location of components in pages, referred to as 4634.

Further, the composite component name registration table 4640 is registered, for example, as the calculator component 4641 comprised of a button 157, a numeric display component 158 and the like.

With the arrangement of the index table 4630 and the composite component name registration table 4640, the user can extract, for example, the button 157, the numeric display component 158 or the like as a single component or the calculator 4641 as a composite component.

The composite component name may be provided for the composite component when the user has created it or when the created composite component is added to, for example, a book component 3200.

By creating the index table 4630 and the composite component name registration table 4640 in the manner as described hereinabove, each of the components can be indexed with ease, thereby simplifying the registration work and the retrieval work for the components.

Figure 47:
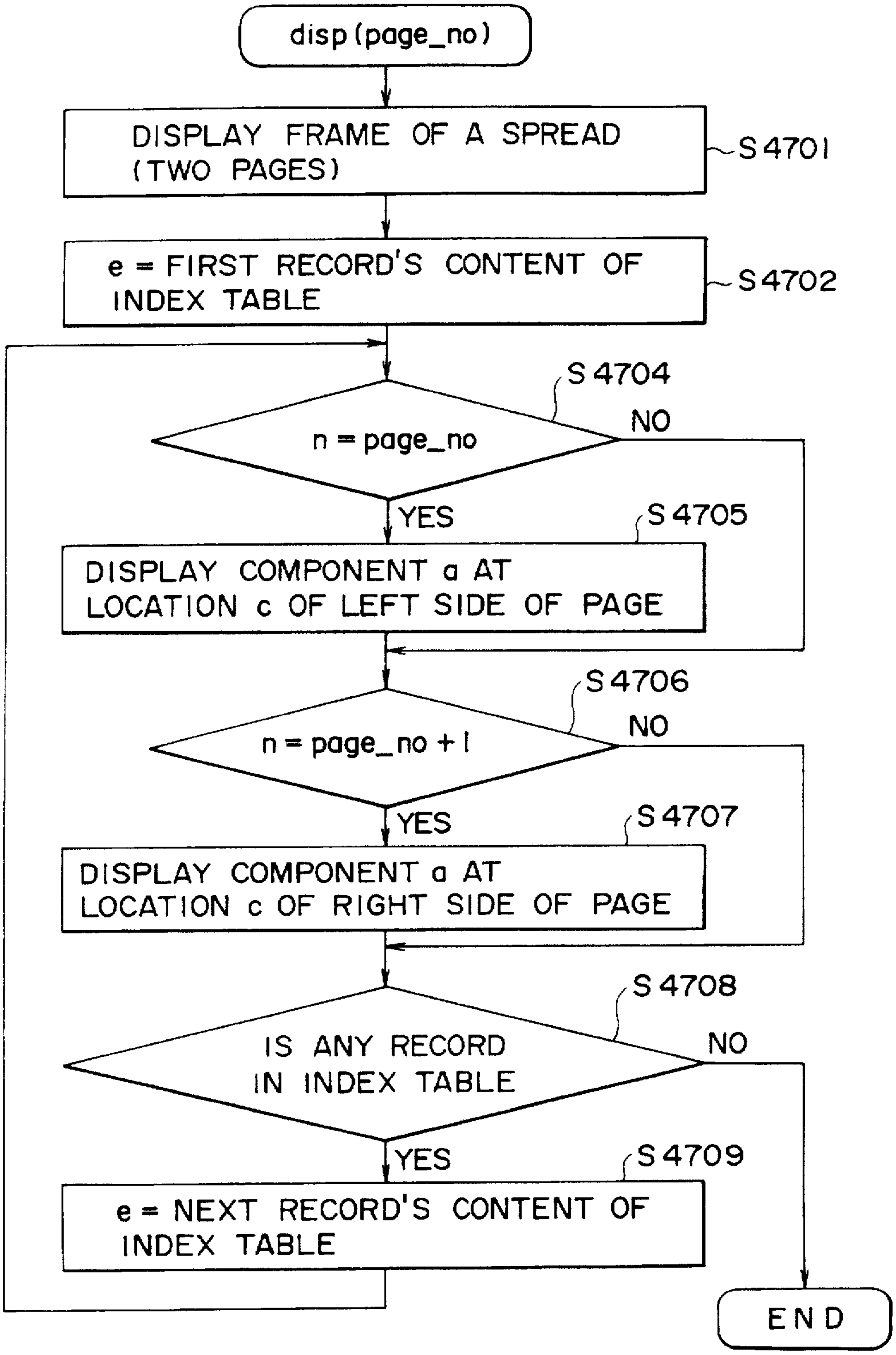
FIG. 47 is a flow chart showing process steps for displaying an index page according to an embodiment of the invention.

FIG. 47 shows the process for displaying a spread indicated by reference to "page_no".

As shown in FIG. 47, the page number "page_no" to be displayed is first specified, followed by a display operation of a frame of the spread consisting of two pages (S4701) and then by a read operation of the contents of the first record of the index table 4630 and by a setting operation of the first record's contents to reference symbol "e" (S4702). In this process, it is assumed that the records of the index table 4630 comprise a component address "a", a component name "i", a page number "n" and display locations "c" of components in pages.

Then, it is decided to determine if the page number "n" of the first record's contents "e" agrees with reference to "page_no" (S4704). When the page number "n" of the first record's contents "e" agrees with reference to "page_no" (S4704: Yes), the component "a" on the involved page is displayed at the display location "c" on the left side of the spread pages (S4705).

On the other hand, when the process has been implemented at step S4705 or when it is decided that the page number "n" of the first record's contents "e" does not agree with reference to "page_no" (S4704: No), then it is further decided to determine if the page number "n" of the first record's contents "e" agrees with reference to "page_no+1" (S4706).

In this case, when the page number "n" of the first record's contents "e" agrees with reference to "page no+1" (S4706: Yes), then the component "a" is displayed at the display location "c" on the right side of the spread pages (S4707).

When any record is left in the index table 4630 (S4708: Yes), the contents of the next record of the index table 4630 are read and they are indicated by reference symbol "e" (S4709), followed by the return of the process to step S4703 and by the repeat actions of the processes for all the records of the index table 4630 in substantially the same manner as described hereinabove.

Figure 48:
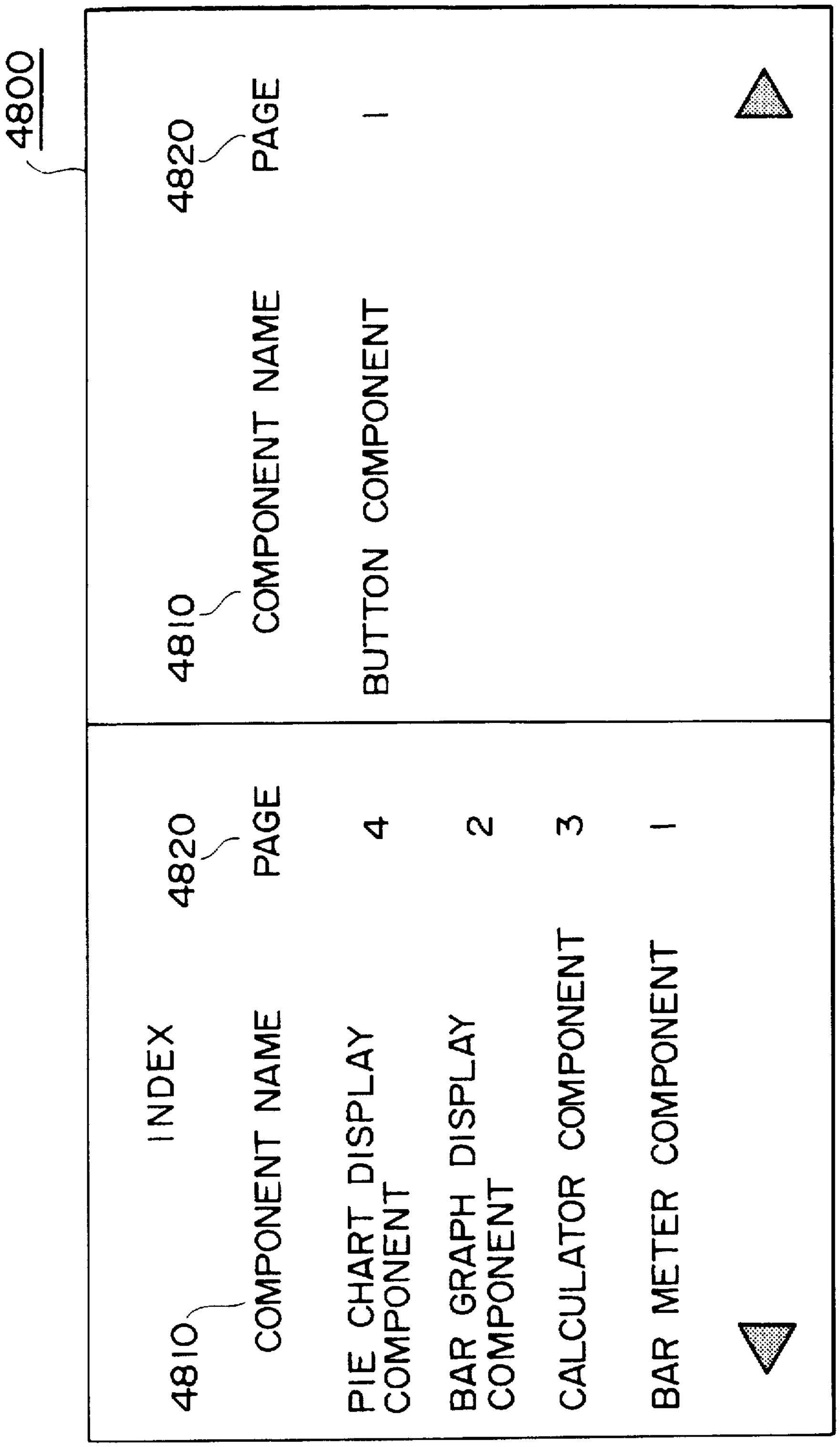
FIG. 48 is an example of index pages created by the application of this invention.

It is to be noted herein that the index table 4630 and the composite component name registration table 4640 can be created in the manner as described hereinabove at the time of the pasting (or superimposing) operation of the various components, and that an index table 4800, as shown in FIG. 48, can also be created from the index table 4630 and the composite component name registration table 4640, thereby displaying correspondence between component names 4810 and page number 4820.

When the pasting or superimposing operation is implemented for pasting or superimposing the other object-oriented components on the component consisting of plural pages in the manner as described hereinabove, an index of the other components existing in the component consisting of the plural pages can readily be created on the index table 4630 by creating the index table 4630 so as to allow the names of the pasted components to correspond to the page numbers of the destinations on which the other components are pasted or superimposed.

Further, it is to be noted herein that, for a composite component, the connection relationship of the basic components of the composite component is registered on the composite component name registration table 4640, an index can readily be created even without paying attention to the mutual relationship of the basic components.

In addition, it is to be noted herein that, although the above embodiments of this invention describe the "book" component as an example, this invention is not restricted as a matter of course to that component and it can be applied to all components and every component consisting of plural pages.

Furthermore, it is to be noted herein that the names of the other components to be superimposed may be set at the time of the superimposing operation or they may be set in advance at the time of determining them. In particular, when they are set at the time of the superimposing operation, their index can be created without paying attention to the mutual relationship of the components involved. Further, when the names of the other components are set at the time when they are defined, it is not necessary to add the names at the time of the superimposing operation.

Now, a description will be made of the method for the manipulation of the component through a composition tree of components for the components associated or connected with each other in the manner as described hereinabove.

FIGS. 49(A) and 49(B) show a calculation display tool for calculating the area of a circle and a calculation display tool for calculating the circumference of the circle as a result of modification.

FIG. 49(A) shows the calculation display tool for calculating the area of the circle from the value input from the bar meter. As shown in FIG. 49(A), an area calculation component is superimposed on a base 4900, although the area calculation component cannot be seen in FIGS. 49(A) and 49(B), because the bar meter 151 is pasted or superimposed thereon. Further, a hundred-times-multiplication component is superimposed on the area calculation component although the hundred-times-multiplication component cannot be seen in FIGS. 49(A) and 49(B) because it is placed under the bar meter 151.

As shown in FIGS. 49(A) and 49(B), the bar meter 151 representing a radius of the circle is pasted or superimposed on the hundred-times-multiplication component and the numeric display device 158 representing a calculation result of calculating the area of the circle is superimposed on the base 4900. Reference numeral 131 denotes the display on which the components are displayed.

Now, a description will be made of the manipulation processes of modifications of the calculation display tool for the area of the circle as shown in FIG. 49(A) into the calculation display tool for the circumference of the circle as shown in FIG. 49(B) with reference to the composition tree of the components. It should be noted herein that the manipulation processes can be reduced and simplified to a great extent by carrying them out through the composition tree.

Figure 50A:
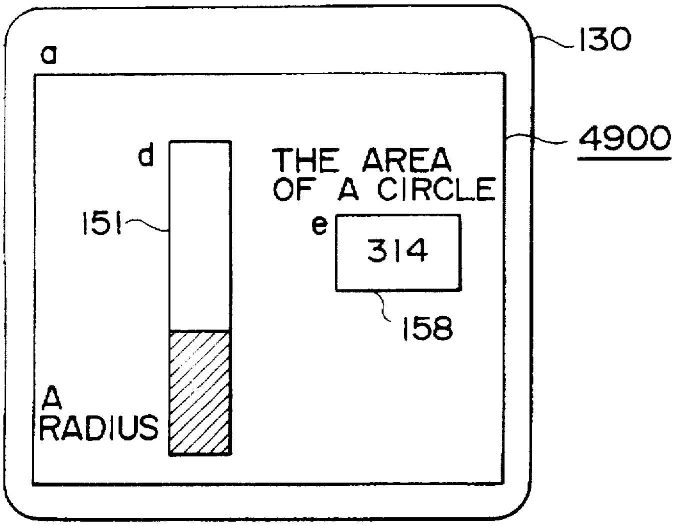
FIGS. 50(A) and 50(B) are illustrations showing an example of the on-screen status of the calculation display tools for calculating the area of a circle and for calculating the circumference of the circle and the pasted or superimposed structure of component, respectively.
Figure 50B:
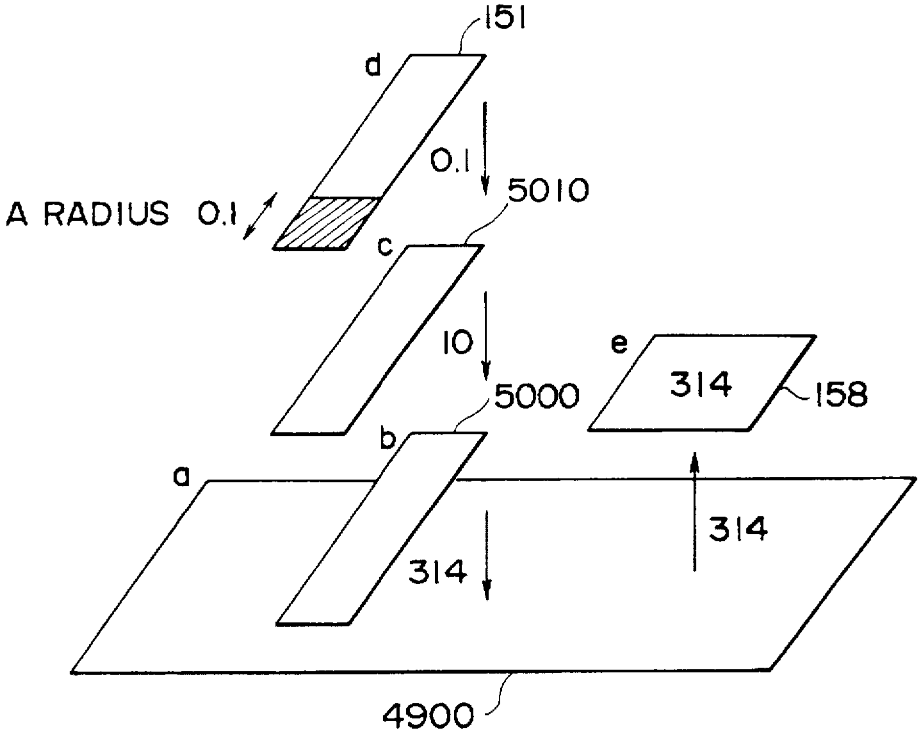

FIG. 50(A) indicates the status of the calculation display tool for calculating the area of a circle on the display screen, and FIG. 50(B) indicates the structure of superimposition of each of the components of the calculation display tool. Referring to FIG. 50(A), only the bar meter 151 and the numeric display device 158 can be visually seen on the base 4900 through the display 130 because the other components are placed under those components.

The alphabetical small letters provided outside the upper left corner of each component indicate the corresponding addresses of the components and they are not displayed on the display 130.

FIG. 50(B) indicates the structure of the components superimposed on the base 4900. As shown in FIG. 50(B), a circle-area calculation component 5000 is superimposed on the base 4900 and a hundred-times-multiplication component 5010 is then superimposed on the circle-area calculation component 5000. On the hundred-times-multiplication component 5010 is superimposed the bar meter 151. Likewise, the numeric display device 158 for displaying the area of the circle is superimposed on the base 4900.

Referring to FIG. 50(B), given the setting of the value (representing the radius of a circle) of the hatched portion of the bar meter 151 to "0.1", this value is multiplied by one hundred times to "10" by the hundred-times-multiplication component 5010 placed under the bar meter 151. Furthermore, this value is calculated by the circle-area calculation component 5000 placed under the hundred-times-multiplication component 5010 by multiplying the radius by radius by 3.14 to give the area "314" that in turn is transmitted to the base 4900.

Then, the result of calculation of the area of the circle is displayed as "314" through the base 4900 on the numeric display device 158 superimposed on the base 4900.

In order to modify the circle-area calculation display tool for calculating the area of a circle into the calculation display tool for calculating the circumference of the circle, the circle-area calculation component 5000 for calculating the area of a circle can be exchanged for a circle-circumference calculation component for calculating the circumference of the circle.

Figure 51A:
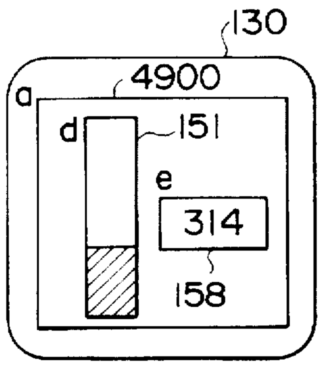
FIGS. 51(A) through 51(G) are illustrations showing an example of a series of conventional process steps for exchanging components.

FIGS. 51(A) through 51(G) show a series of conventional steps for exchanging components. FIG. 51(A) shows an initial scene in which the bar meter 151 and the numeric display device 158 are superimposed on the base 4900 and displayed on the display 130.

Figure 51B:
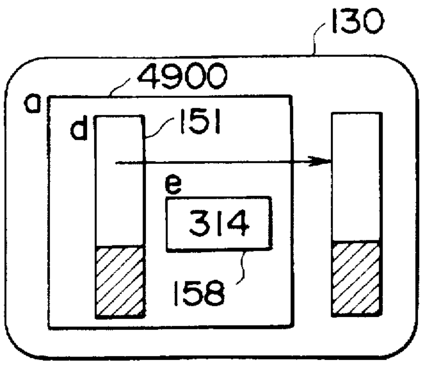
Figure 51C:
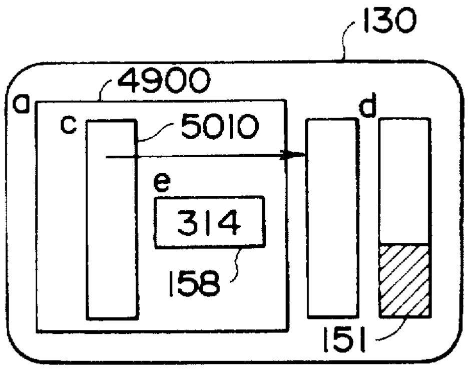

First, the bar meter 151 is moved beyond the territory of the base 4900 from the initial display screen as shown in FIG. 51(A) (as shown in FIG. 51(B)). Next, the hundred-times-multiplication component 5010 placed under the bar meter 151 is moved beyond the territory of the base 4900 (as shown in FIG. 51(C)), followed by moving the circle-area calculation component 5000 placed under the base 4900 beyond the territory of the base 4900 (as shown in FIG. 51(D)).

Figure 51D:
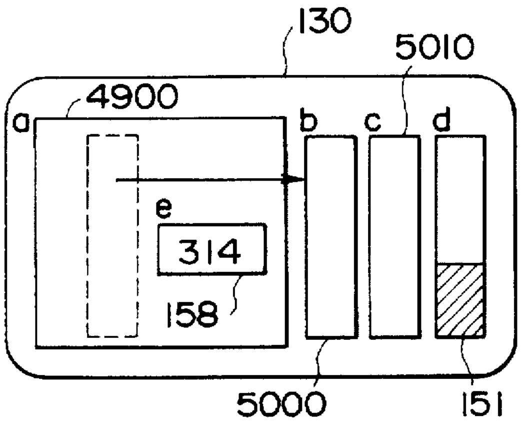
Figure 51E:
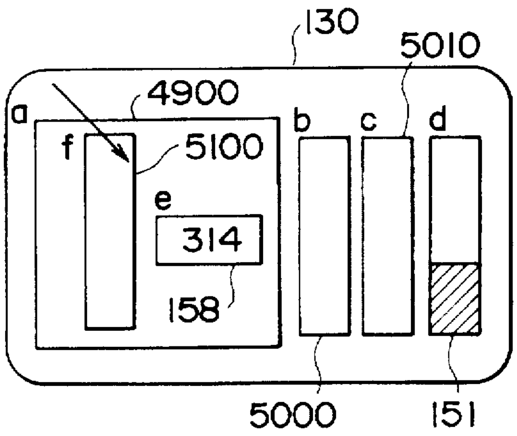
Figure 51F:
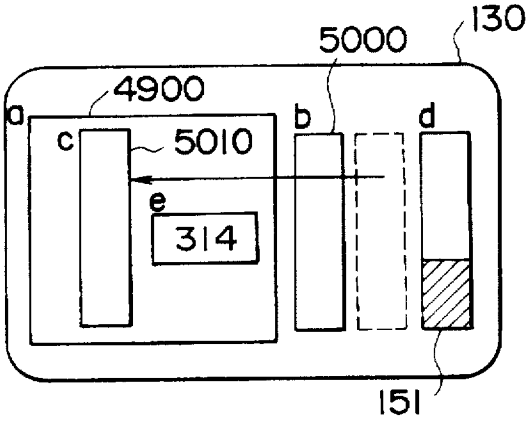

In the status as shown in FIG. 51(D), a circle-circumference calculation component 5100 is extracted from the component object database 150 and moved so as to be pasted or superimposed on the base 4900 (as shown in FIG. 51(E)). Then, the hundred-times-multiplication component 5010 which is moved and placed temporarily beyond the territory of the base 4900 is then superimposed on the circle-circumference calculation component 5100 (as shown in FIG. 51(F)).

Figure 51G:
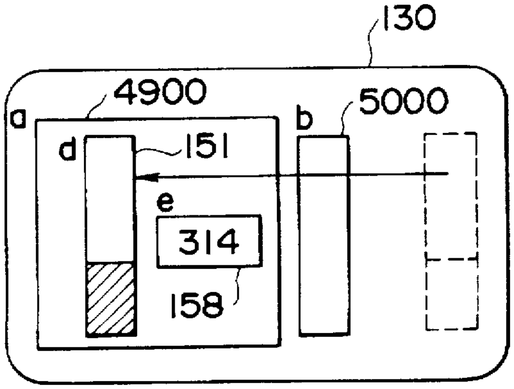

Finally, the bar meter 151 moved and placed temporarily beyond the territory of the base 4900 is pasted or superimposed on the hundred-times-multiplication component 5010 (as shown in FIG. 51(G)).

Hitherto, for example, the circle-area calculation tool for calculating the area of the circle is modified into the circle-circumference calculation tool for calculating the circumference of the circle in the manner as described hereinabove. This conventional technique requires the move operations to be implemented a total of six times.

Generally, when a total number "n" of components are superimposed on the component sought to be exchanged, the components superimposed thereon are required to be temporarily moved one after another (a total number of the temporary move operations being "n" times), followed by making exchanges of the old component for the new component (a total of two move operations being required for the exchange operations) and then by returning all the components moved temporarily to their original positions (a total number of the move operations required for the return operations being "n" times). As is apparent from the above description, the conventional techniques require a total number of 2("n"+1) times the move operations.

On the other hand, a description will be made of the techniques for implementing the substantially similar exchange operations through the composition tree of the components in accordance with an embodiment of this invention. FIGS. 52(A) through 52(D) show the steps for executing the exchange operations of exchanging the old component for the new component through the composition tree of the components.

Figure 52A:
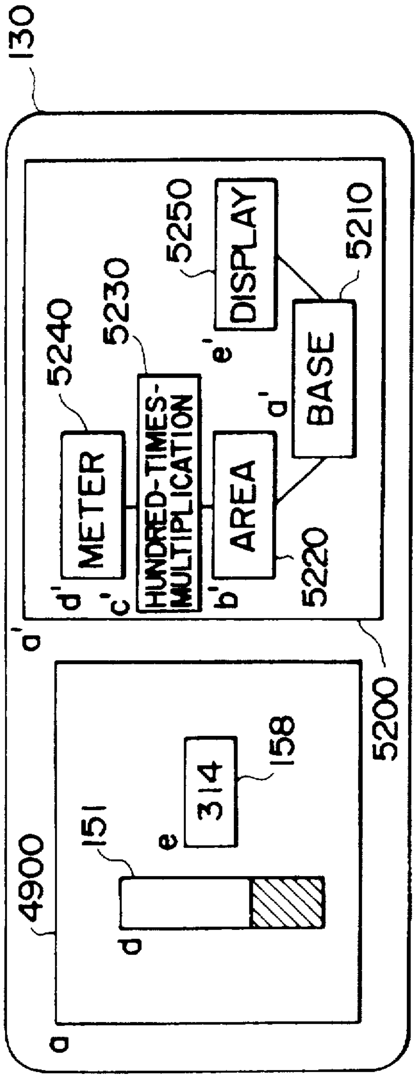
FIGS. 52(A) through 52(D) are illustrations showing an example of a series of process steps for exchanging components in accordance with an embodiment of this invention.

A composition tree of the components is displayed on the initial display screen as shown in FIG. 52(A). In this operation, no components are moved and exchanged. As shown in FIG. 52(A), the composition tree of the components is displayed as a node window 5200 and an area component 5220, a hundred-times-multiplication component 5230 and a meter component 5240 are connected with a base component 5210. Further, a display device is connected with the base component 5210.

Figure 52B:
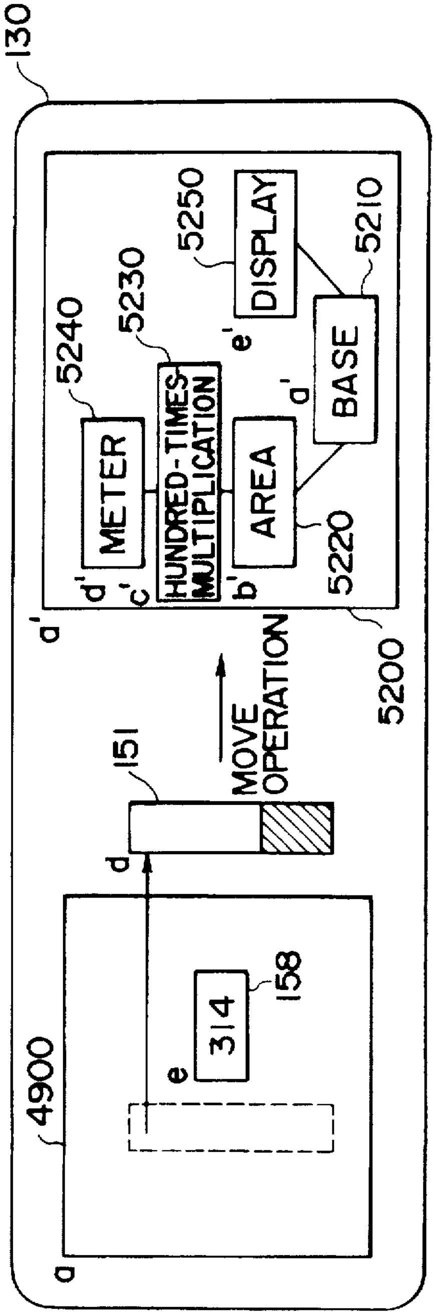

Then, as shown in FIG. 52(B), when the mouse 110 is positioned on the area component 5220 in the node window 5200 and is clicked to move it, the structure tree connected to and existing above the area component 5220 is cut off from the base component 5210 and moved to another location on the node window 5200 (this move operation being the first one).

Figure 52C:
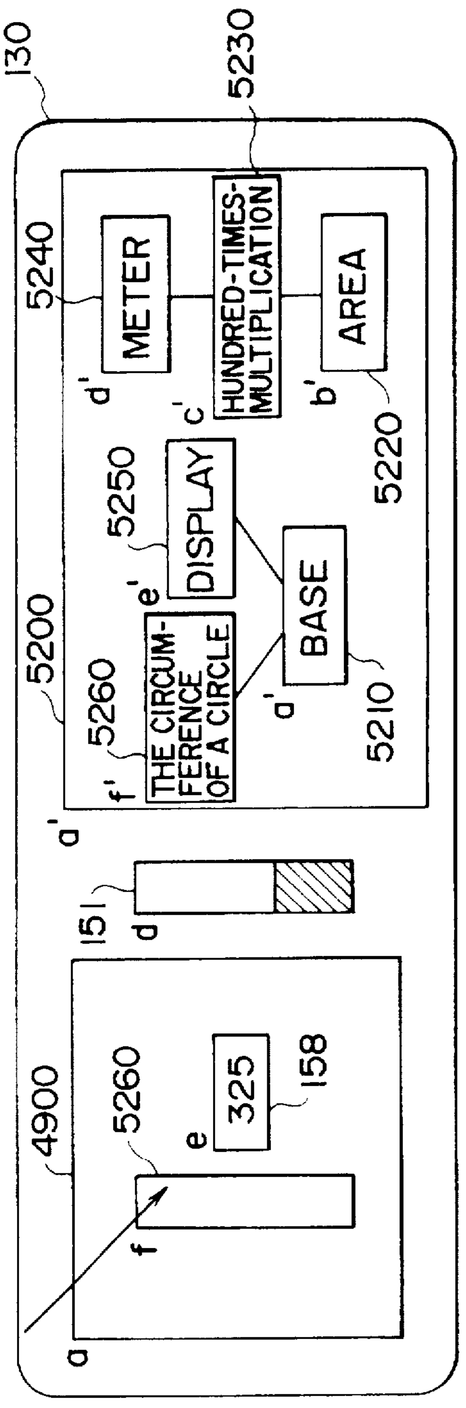
Figure 52D:
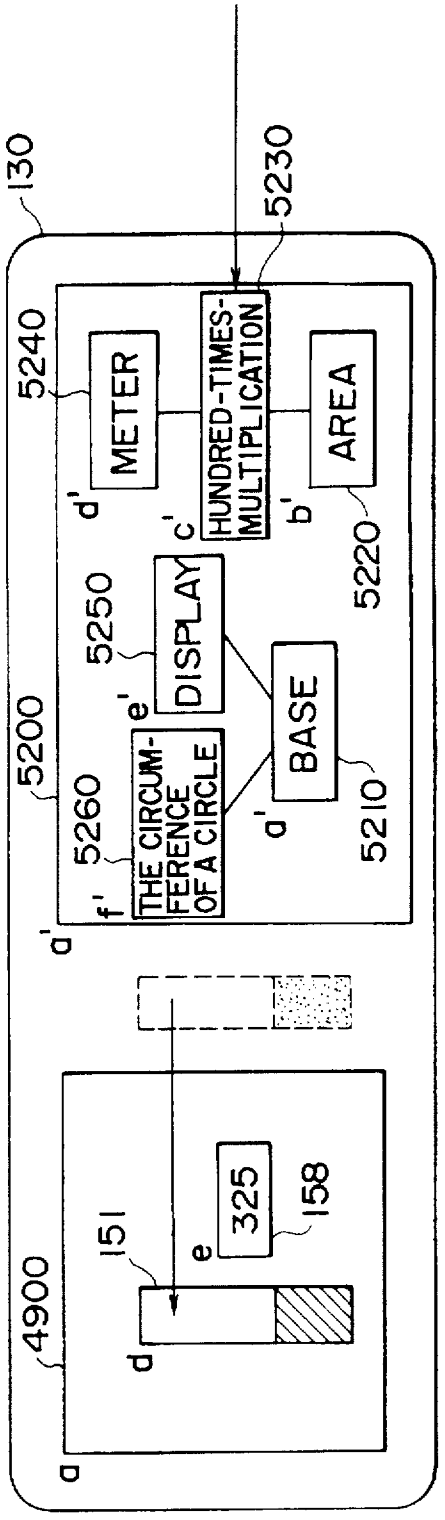

Thereafter, as shown in FIG. 52(C), a circle-circumference component 5260 working as a circle-circumference calculation component is superimposed on the base component 5210 (this move operation being the second one). Finally, as shown in FIG. 52(D), a composition tree consisting of the hundred-times-multiplication component 5230 and the meter component 5240 is selected from the components previously cut off and moved so as to be pasted or superimposed on the circle-circumference component 5260 (this move operation being the third one). As described hereinabove, this embodiment of the invention enables the circle-circumference calculation display tool for calculating the circumference of the circle to be created only by three times the number of move operations.

In other words, the embodiments of the present invention enable the exchange operation for exchanging the old component for the new component to be completed only by three times the number of move operations by utilizing the composition tree of the components in the manner as described hereinabove, regardless of the number of pages pasted or superimposed.

It is to be noted herein that the alphabetical small letters indicative of their addresses of the components displayed as a composition tree are provided with symbol "'" (apostrophe) in order to make a distinction from the components to be displayed as windows.

FIGS. 53(A) and 53(B) show scenes for describing the screen operation for displaying the composition tree of the components. As shown in FIG. 53(A), the mouse 110 is positioned on the component existing at the bottom of the components superimposed and displayed on the display screen (in this embodiment, the base 4900), and the base 4900 is double-clicked to thereby display the composition tree of the components as the node window 5200, as shown in FIG. 53(B).

Figure 54:
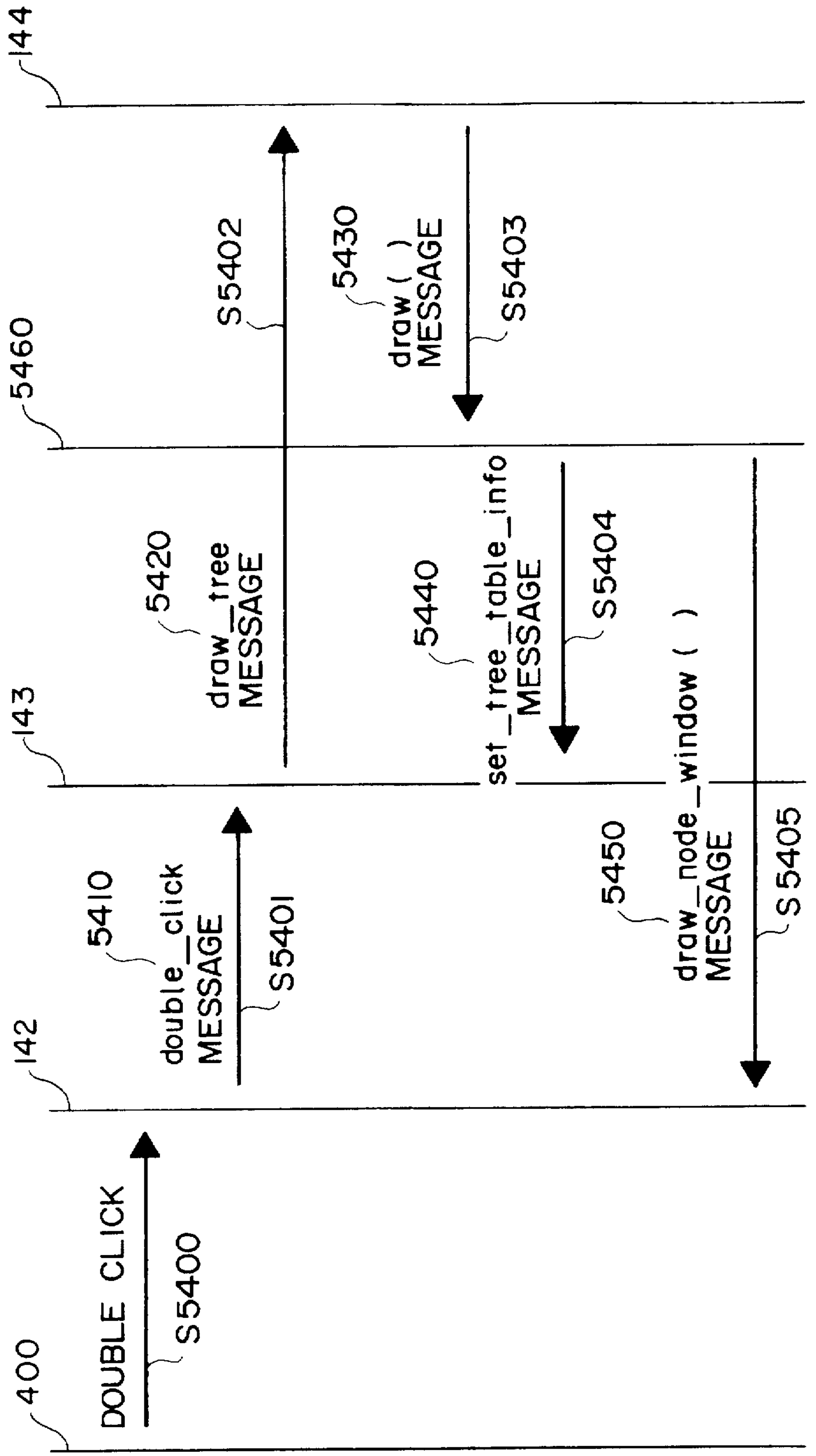
FIG. 54 is a schematic representation showing a sequence of transmission steps for transmitting messages at the time of executing a move operation of components through a component-composition tree structure in accordance with the present invention.

FIG. 54 is a flow chart indicating a series of process steps for displaying the composition tree of the components by double-clicking the mouse 110. In FIG. 54, first, when the user double-clicks the mouse 110 on the component existing at the bottom of the display screen (in this embodiment, the base 4900) (S5400), the double-click operation is detected by the window system 142 which in turn sends a message, double_click 5410, to the component program 143 for the components existing at this location (S5401).

Upon receipt of the double_click message 5410, the components program 143 sends a message, draw_tree 5420, to the component management kernel program 144 (S5402) which in turn sends a message, draw, to a composition-tree-of-components display program 5460, so as to display the composition tree of the components (S5403).

Then, the composition-tree-of-components display program 5460 sends to the component program 143 of the composition tree of the components a message, set_tree_table_info 5440, in response to the draw message 5430 (S5404). It is to be noted herein that the set_tree_table_info message 5440 is a message for giving an instruction to create a tree structure table as a source data for displaying the structure of the composition tree of the components.

At the same time, the composition-tree-of-components display program 5460 of the component sends a message, draw_node_window 5450, to the window system 142 (S5405).

Upon receipt of the draw_node_window message 5450, the window system 142 displays the node window 5200 in an appropriate position of the display screen in accordance with the tree structure table.

Figure 55A:
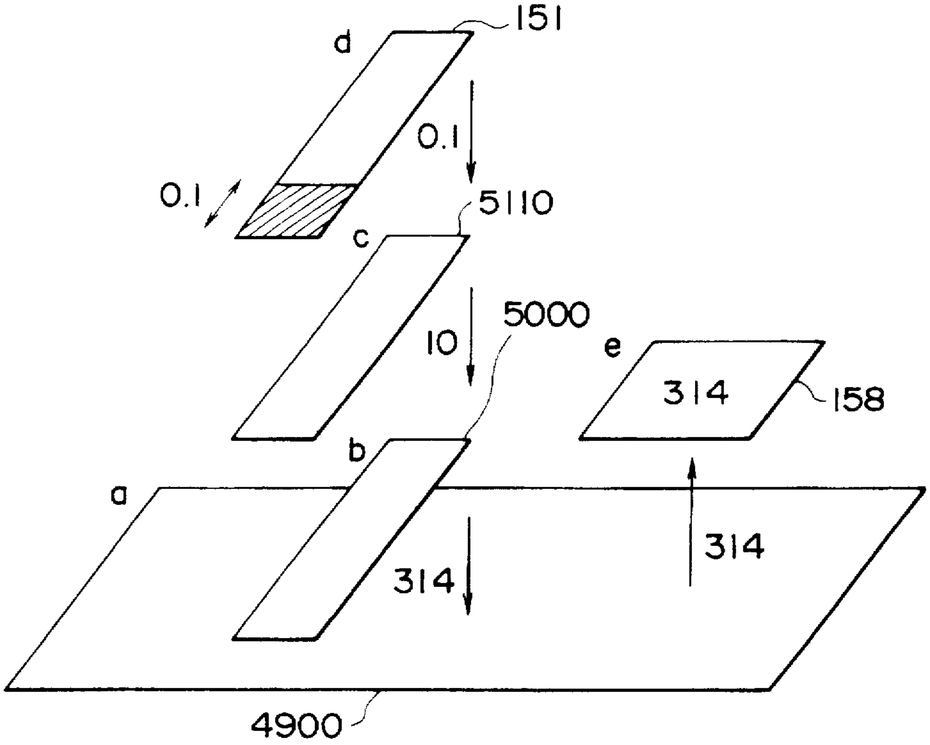
FIG. 55(A) and 55(B) are illustrations showing a pasted or superimposed structure and a composition tree of the components according to this invention.
Figure 55B:
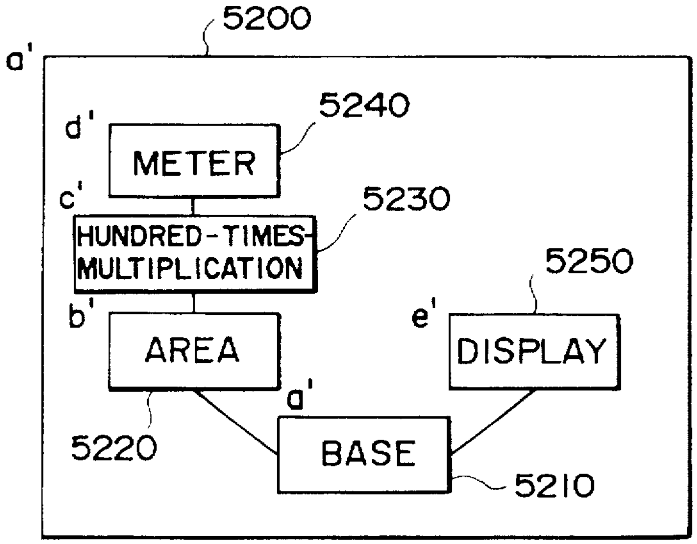

FIG. 55(A) shows the superimposed structure of the components according to the embodiment of this invention, and FIG. 55(B) shows the structure of the composition tree of the components. In FIG. 55(A), the bar meter 151 is superimposed on the hundred-times-multiplication component 5110, which in turn is superimposed on the circle-area calculation component 5000. Further, the base 4900 is placed under the circle-area calculation component 5000. In addition, the numeric display device 158 is superimposed on the base 4900.

FIG. 55(B) shows the structure of the composition tree of the components. As shown in FIG. 55(B), on the one hand, the base 5210 is connected with the area component 5220 which in turn is connected with the hundred-times-multiplication component 5230. Further, the meter component 5440 is connected with the hundred-times-multiplication component 5230 on the basis of the pasted or superimposed structure as shown in FIG. 55(A). In addition, on the other hand, the base 5210 is connected with the display component 5250.

FIG. 56 shows a tree structure table 5600 which in turn comprises a column "id" 5610, indicative of the identification number of the component to be displayed as windows, a column "Component Address" 5620, indicative of addresses of the component, a column "Parent id" 5630, indicative of the identification number of the parent component of each component, a column "Child id_list" 5640, indicative of the identification number of the child components of each component, and a column "node_window" 5650, corresponding to node portions of the tree structure.

Figure 58A:
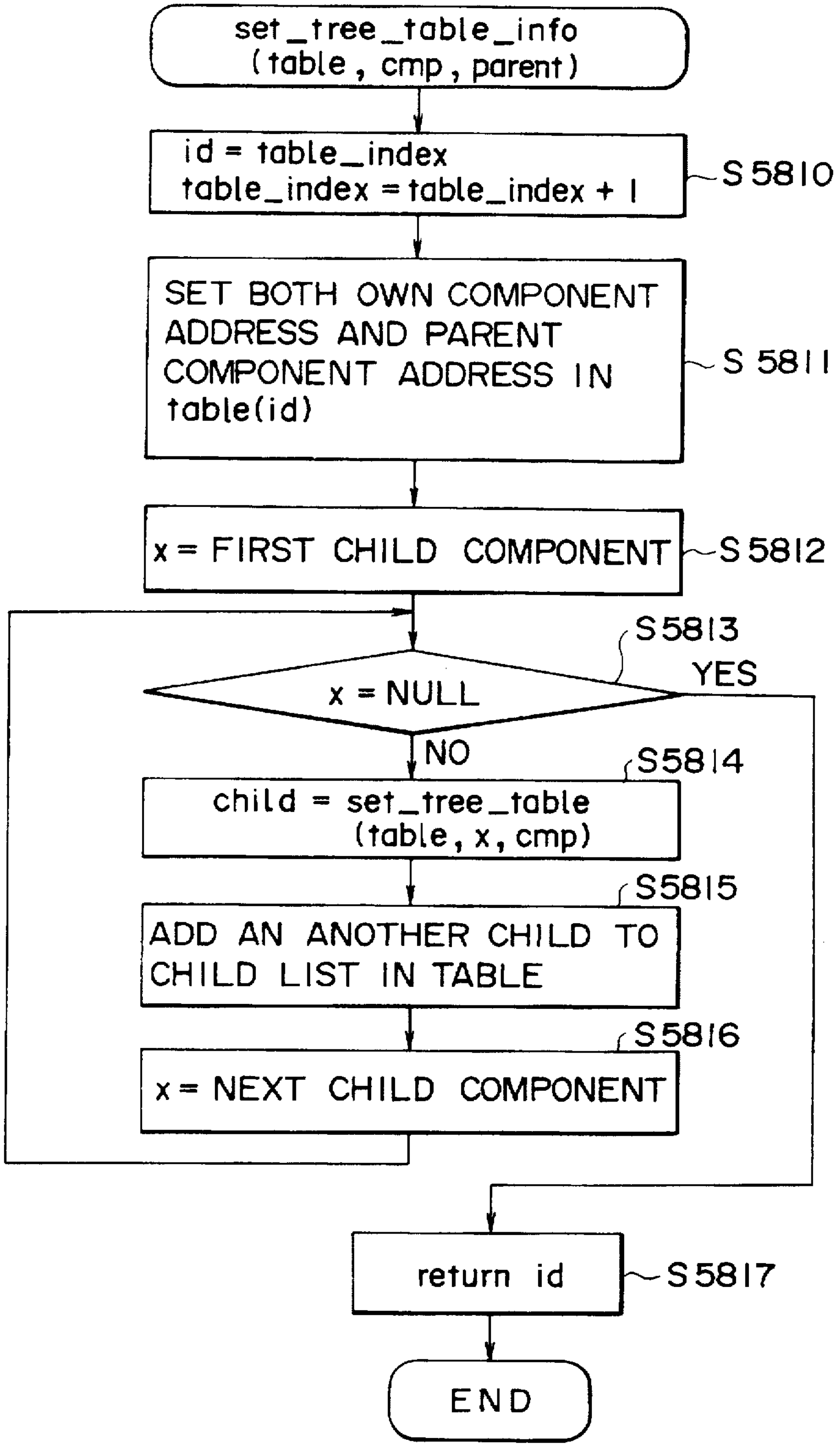
FIGS. 58(A) and 58(B) are each a flow chart showing a series of process steps to be executed until the component-composition tree structure is displayed by the move operation of the components in accordance with an embodiment of this invention.
Figure 58B:
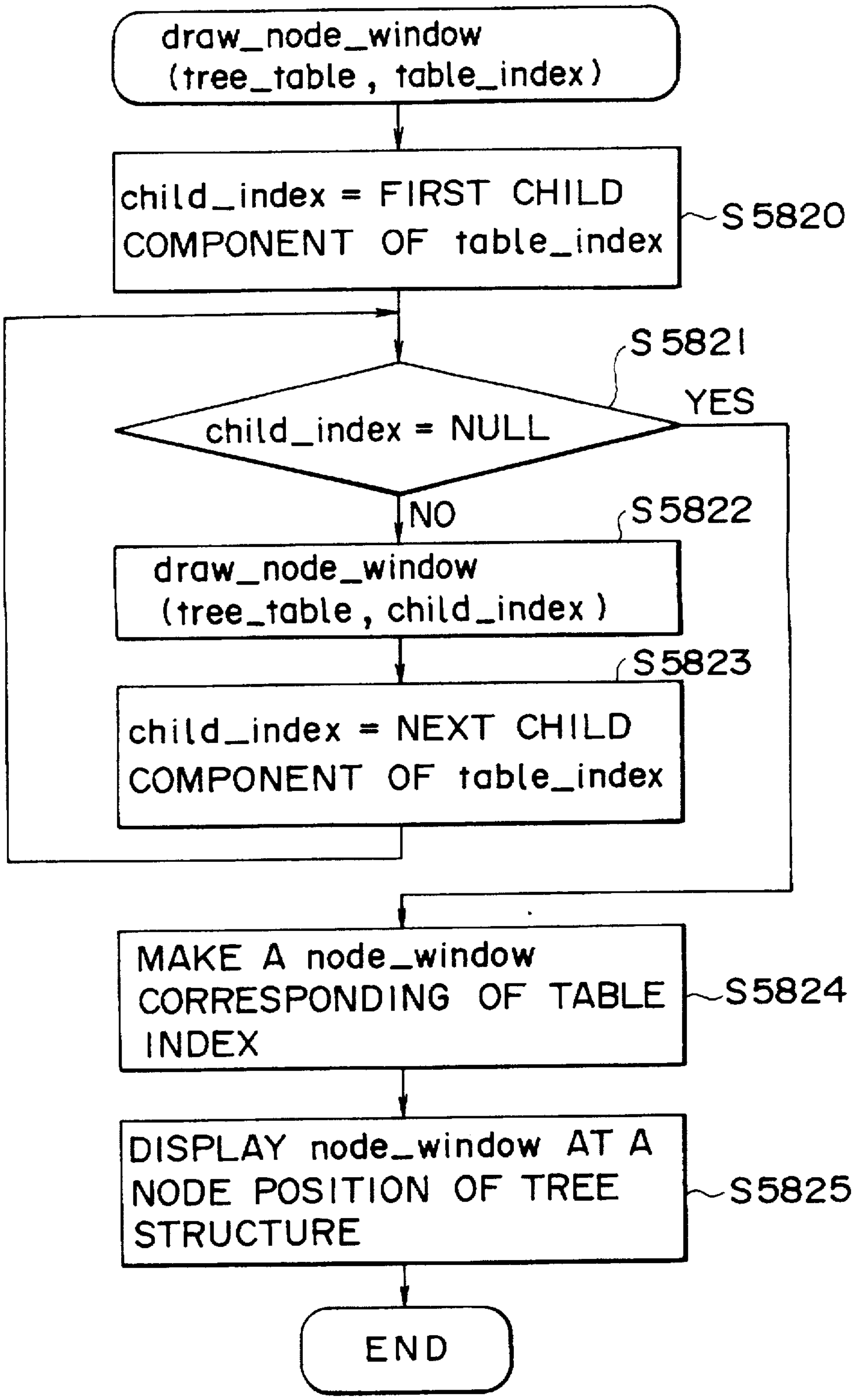
Figure 59:
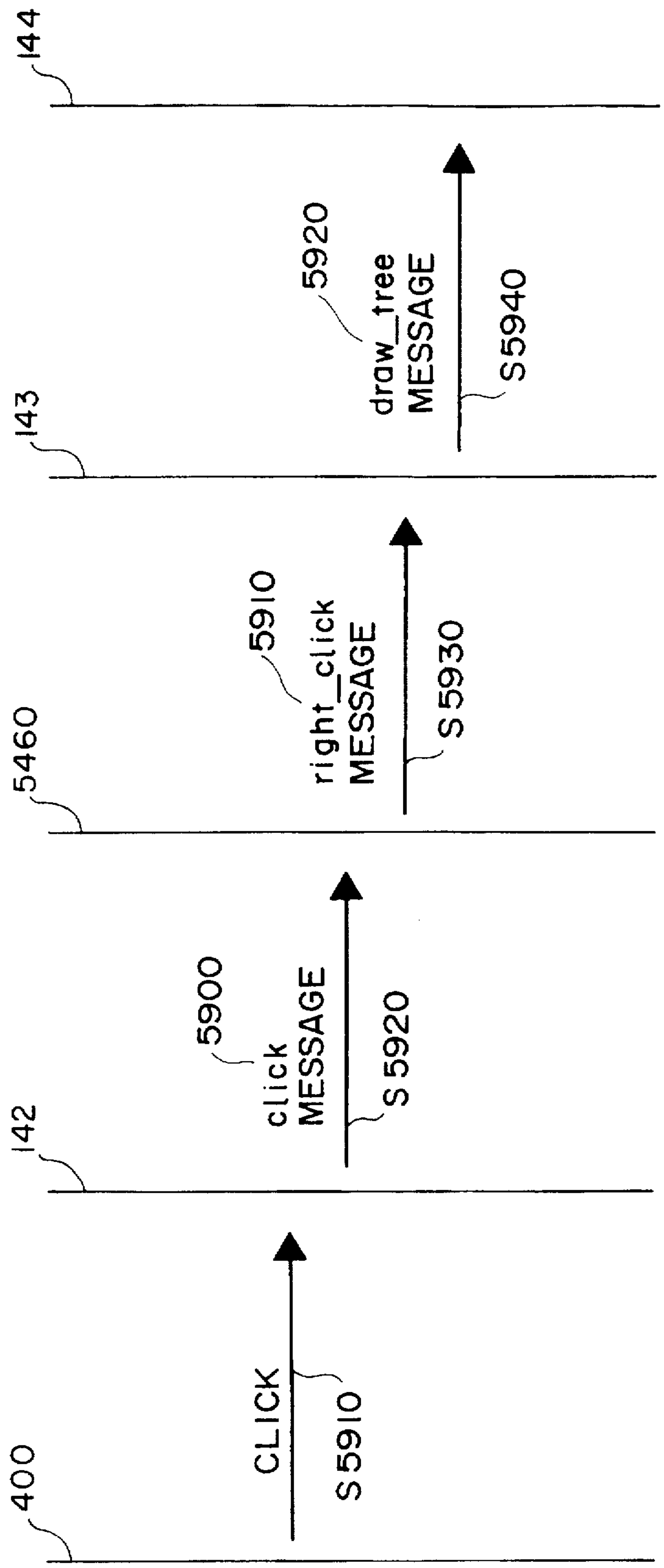
FIG. 59 is a schematic representation showing a sequence of process steps for transmitting messages in accordance with the present invention.

FIGS. 57 through 59 are flow charts showing process steps for a series of processes from the double-click operation for the component to the display of the node window.

Figure 57A:
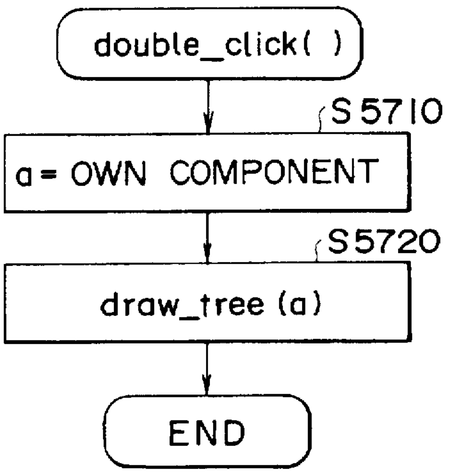
FIGS. 57(A) through 57(C) are each a flow chart showing a series of process steps to be performed when each of the components has received a message in accordance with an embodiment of this invention.

First, as shown in FIG. 57(A), when the component is double-clicked, the own component is indicated by reference symbol "a" (S5710) and a message, draw_tree (a), is sent to the component management kernel program 144 as the process for creating the composition tree by making the own component as a root node (S5720).

Figure 57B:
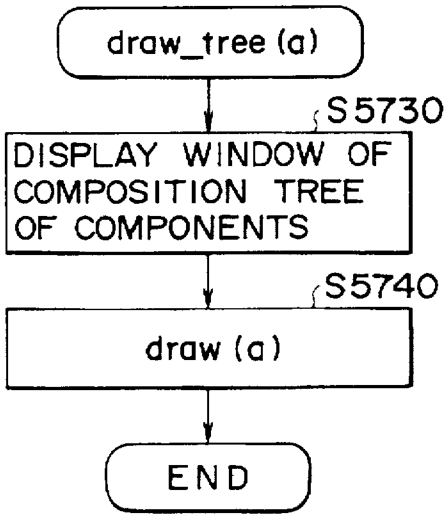

As shown in FIG. 57(B), when it has received the draw_tree (a) message, the component management kernel program 144 displays a window of the composition tree of the components and executes the process of a message, draw (a).

Figure 57C:
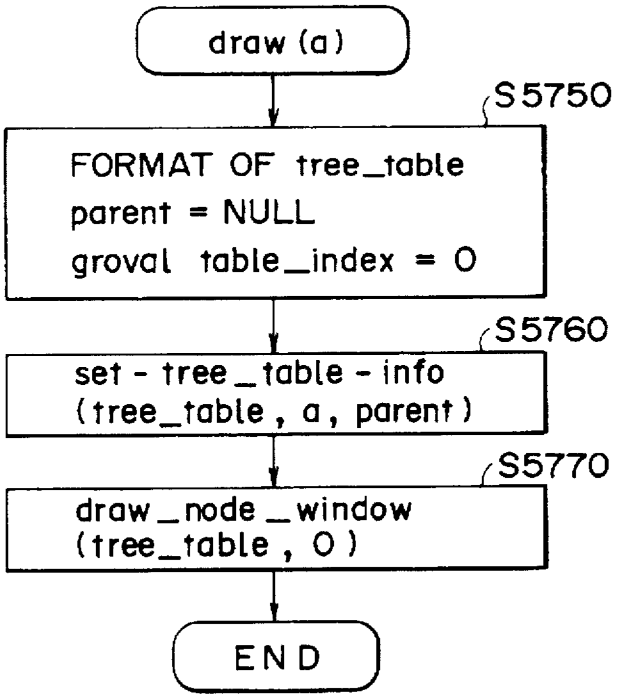

Referring to FIG. 57(C), the tree structure table 5600 of FIG. 56 is first initialized (S5750). In this case, the column "Parent id" 5630 for the first node is set to "NULL" and the column "Child id_list" 5640 of the tree structure table 5600 is set to "0". Further, a variable, table_index, indicative of the number of records in the tree structure table 5600, is initialized to "0".

After initialization, the process of the set tree_table_info message, i.e. an instruction for creating the tree structure table 5600 as a source data for displaying the structure of the composition tree of the components, is executed for a root component (S5760). The root component as referred to herein is intended to mean a component on which the double-click operation is implemented.

Thereafter, the composition tree of the components is displayed by the draw_node_window message in accordance with the created tree structure table 5600 (S5770).

FIG. 58(A) is a flow chart indicating a series of process steps to be performed when the component program has received the set_tree_table_info message from the composition tree display program of the components. As shown in FIG. 58(A), first, the column "id" is set to table_index and the column "table_index" is set to table index+1 (S5810), followed by setting the component address 5620 of the tree structure table 5600 and the column "Parent id" 5630 of the address of the parent component (S5611). Then, the first child component is extracted as a parameter "x" (S5812) and it is decided to determine if the parameter "x" is set to "x=NULL" (S5813).

When the parameter "x" is not set to "NULL" (S5813: No), the process of the set_tree_table_info message is recursively executed for the item "Child id list" 5640 of the tree structure table 5600 (S5814) and another child component is added to the item "Child id list" 5640 of the tree structure table 5600 (S5815).

Then, the next child component is set as a parameter "x" (S5816), followed by repeating the processes at steps S5813 et seq and adding child components to the tree structure table 5600.

FIG. 58(B) is a flow chart indicating a series of process steps to be performed when the window system has received the draw_node_window message from the composition tree display program of the components.

As shown in FIG. 58(B), first, the column "child index" is set to the item "Child id_list" 5640 of the first child component (S5820) and it is decided to determine if the item of the "Child id_list" 5640 of the first child component is set to "NULL" (S5821). When it is not set to "x=NULL" (S5821: No), the process of the draw node_window message is executed (S5822) and a parameter "Child id_list" 5640 of another child component is extracted (S5823), followed by returning the program to step S5821 and repeating the processes recursively in the manner as described hereinabove.

On the other hand, when the item of the column "Child id_list" 5640 of the first child component is set to "x=NULL" (S5821: Yes), a node window corresponding to the parameter "Child id_list" 5640 of the child component is created (S5824) and this node window is displayed on the tree structure node location (S5825).

FIG. 59 shows a sequence of the transmission procedures for the messages for the move operation of the composition tree of the components.

As shown in FIG. 59, when the user clicks the component as an object of the move operation on the node window 5200 of the composition tree of the components (S5910), the window system 142 detects the click operation and sends a click message 5900 to the composition-tree-of-components display program 5460 (S5920).

Upon receipt of the click message 5900, the composition-tree-of-components display program 5460 makes a retrieval for the clicked node window from the clicked location. Then, it acquires an address of the component corresponding to the node window involved and, thereafter, a right_click message 5910 is executed for the searched component for which the retrieval has been made (S5930).

It is to be noted herein that the execution of the right_click message means a drag operation for the component involved, as described in association with FIG. 8.

Figure 60:
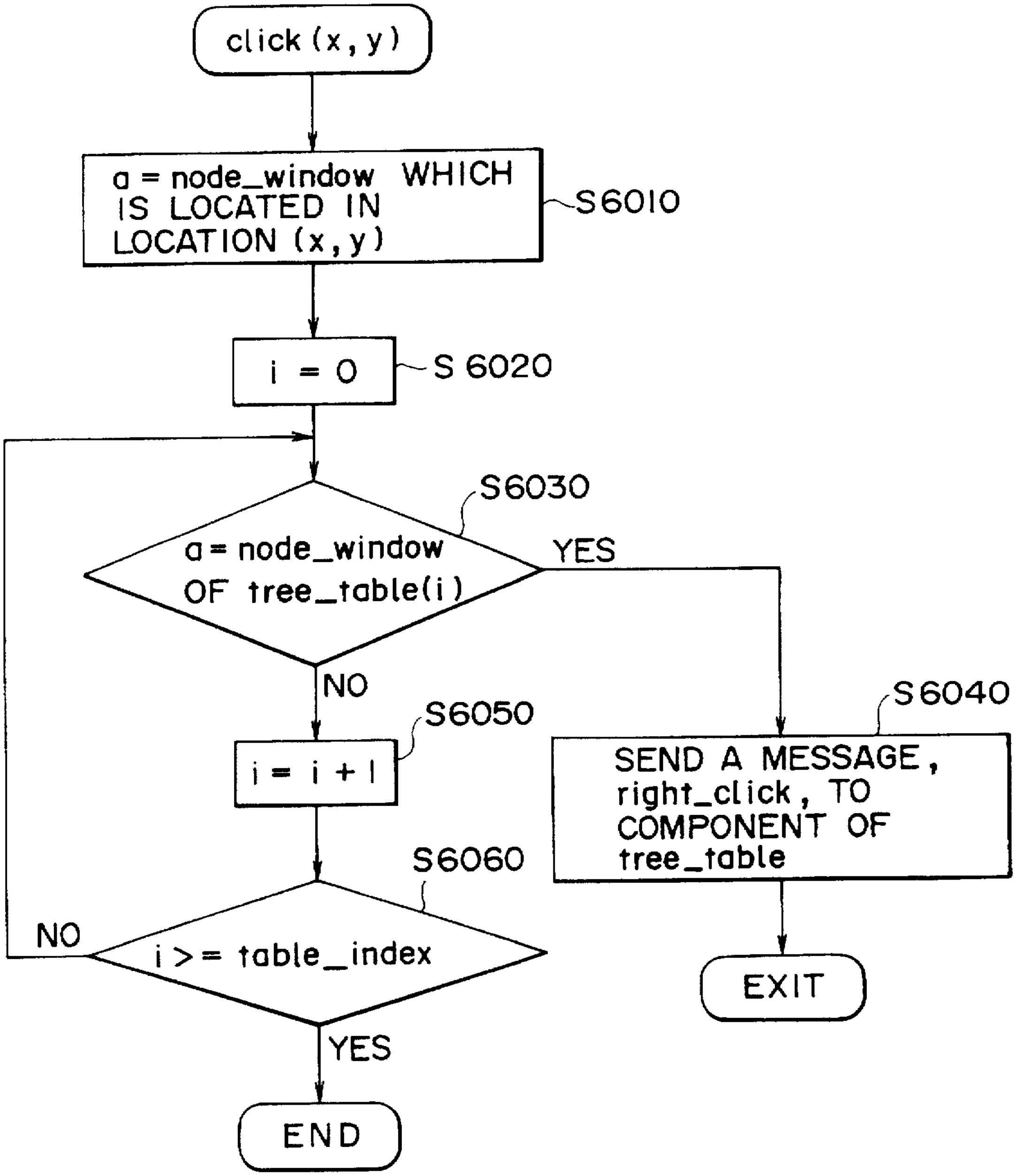
FIG. 60 is a flow chart showing a series of process steps to be performed when a component-composition tree display program has received a click message.

When it has received the right_click message 5910, the component program 143 sends to the component management kernel program 144 a message, draw_tree 5920 (S5940) and allows the component management kernel program 144 to start the draw_tree program to thereby display the composition tree of the components FIG. 60 is a flow chart indicating a series of process steps when the composition tree program of the components has received the click message. In FIG. 60, a parameter "a" refers to a node window located in the location (x, y) on the display 130 (S6010).

First, a retrieval is made for the node window clicked. In other words, the tree structure table 5600 is retrieved for "i=0" (S6020), thereby acquiring an address of the corresponding component, node_window.

Then, it is decided to determine if a parameter "a" is an i-th node window of the tree structure table 5600 (S6030). When the parameter "a" is the i-th node window (S6030: Yes), the right_click message 5910 is sent to the i-th component (S6040), after which the program is allowed to exit.

On the other hand, when the parameter "a" is not the i-th node window (S6030: No), an increment "1" is added to the parameter "i" (S6050) and it is decided to determine if the parameter "i" is equal to or larger than "table_index" (i.e. i>=table_index ?) (S6060). The processes at steps S6030 through S6060 are repeated until the parameter "i" becomes equal to or larger than "table index".

It should be noted herein that, even if some of the plural components displayed as windows would be visually unconfirmable due to the fact that the windows are pasted or superimposed on each other, the visually unconfirmable windows (components) can be exchanged or moved with ease by representing the components as the structure of the composition tree in the manner as described hereinabove.

Next, a description will be made of the method for making a shared copy or duplication of the components.

Figure 61:
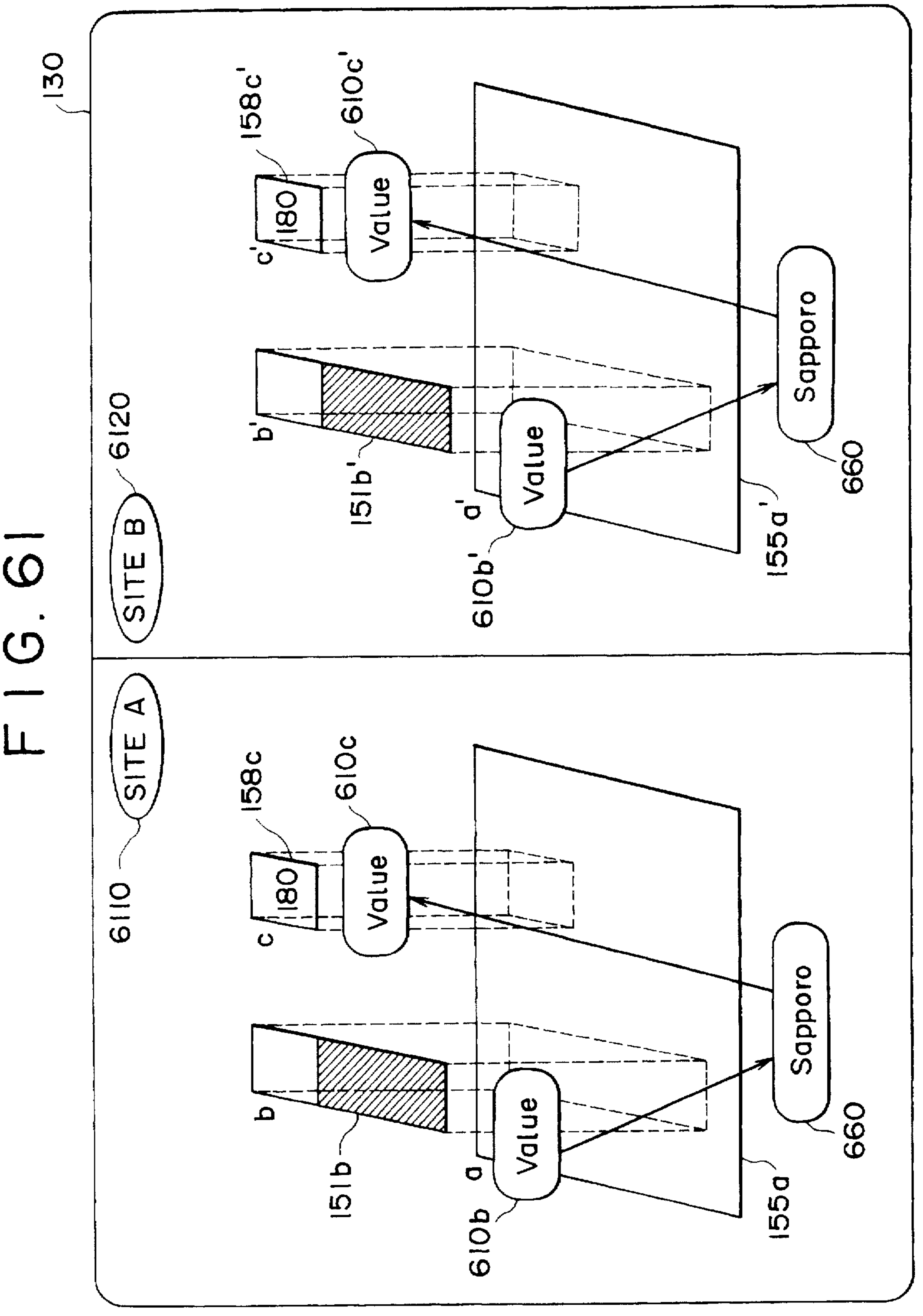
FIG. 61 is an illustration indicating a shared copy or duplication.

FIG. 61 illustrates the method of the shared copy or duplication on the display screen.

As shown in FIG. 61, each of the components displayed on a site B 6120 on the display screen 130 is a copy or duplication from each of the corresponding components on a site A 6110 displayed thereon. For example, a bar meter 151b' on the site B 6120 is a shared copy or duplication of the bar meter 151b displayed on the site A 6110.

The term "shared copy or duplication" referred to herein is intended to mean an event that, for example, when a value of the bar height of the bar meter 151b is changed by clicking the mouse 110, the height of the bar is also changed in association with the changes of the value of the bar meter 151b' of a shared copy or duplication On the contrary, it is to be noted herein that a usual copy or duplication does not change the value of the bar meter copied or duplicated even if the value of the bar meter as a source copy or duplication would be changed.

In FIG. 61, the bar meter 151*b*' is a shared copy or duplication of the bar meter 151*b*, while a Japanese map 155*a*' is a usual copy or duplication of the Japanese map component 155*a* and a numeric display device 158*c*' is a usual copy or duplication of the numeric display device 158*c*. The method of connection of the slots of the components is substantially the same as in FIGS. 14 and 15.

For example, if the user changes the value of the "Sapporo" bar meter 151*b*, the contents of the changes are propagated to the bar meter 151*b*' as a shared copy or duplication. To the contrary, for example, the "Sapporo" slot 660 of each of the Japanese map component 155*a* and the Japanese map component 155*a*' connected with the respective bar meters can hold the same values and the value of "Sapporo" is shared between the two sites, i.e. the site A 6110 and the site B 6120.

On the other hand, for the cities which do not require to share any value between two sites, a usual copy or duplication is to be created in a conventional manner.

As a result, it is possible to make a shared copy or duplication, or usual copy or duplication selections, as needed, in the manner as described hereinabove.

FIGS. 62(A) through 62(D) are illustrations indicating a series of procedures of user operations for creating the bar meter 151*b*' as a shared copy or duplication of the bar meter 151*b* on a Japanese map component "a1" on another Japanese map component "b1".

First, the user positions the cursor 800 of the mouse 110 on the bar meter 151*b* of the Japanese map component "a1" on the display screen and double-clicks the right button 111*a* of the mouse 110.

This double-click operation corresponds to a Shared Copy Creation command. Next, the position of the cursor 800 of the mouse 110 is moved in such a state that the right button 110*a* thereof is kept being held down. During the move operation, there is displayed the rubber band 810 in the form of a rectangle indicated by broken lines representing a frame of the bar meter 151*b*, as shown in FIG. 12(B).

Figure 62A:
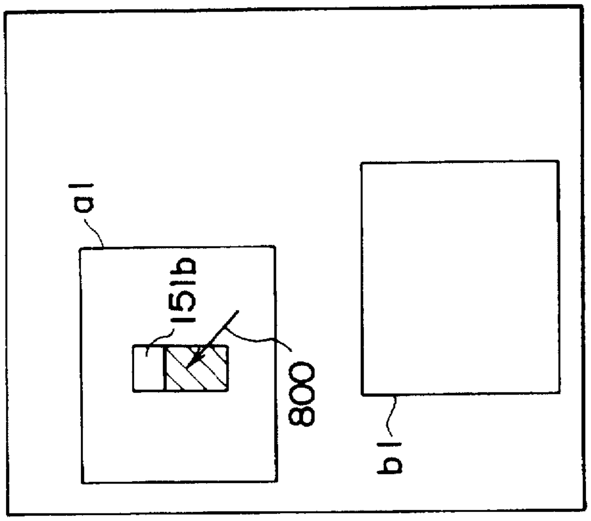
FIGS. 62(A) through 62(D) are illustrations showing a series of process steps for the operations when a shared copy or duplication is to be created.
Figure 62B:
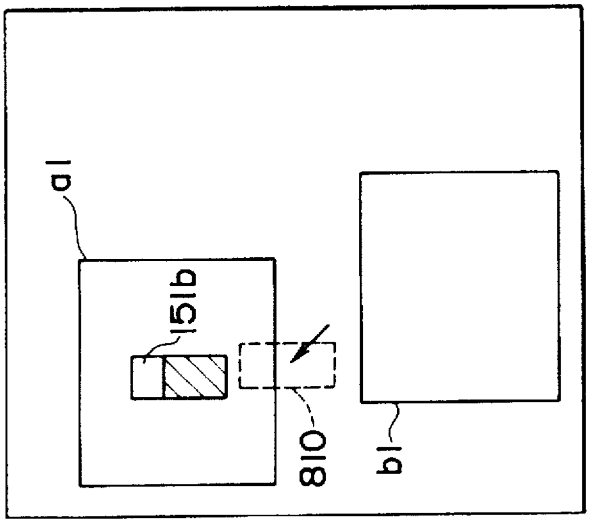
Figure 62C:
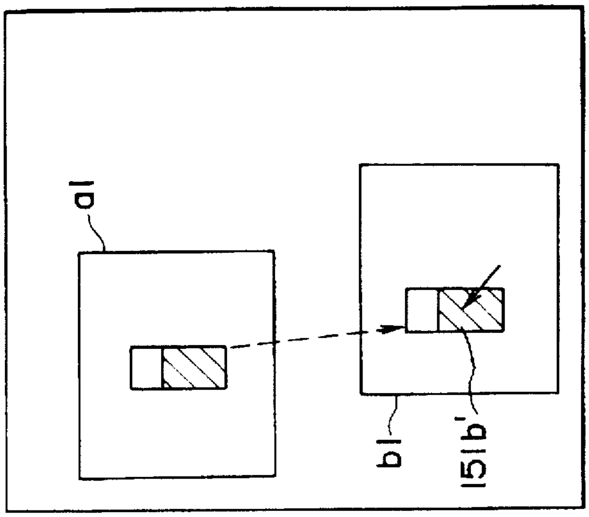

The rubber band 810 is moved onto the other Japanese map component "b1" in the held-down state as indicated in FIG. 62(C) and the right button 110*a* of the mouse 110 is released at the desired position. This release action establishes the position of a copy or duplication destination of the bar meter 151*b* and creates the bar meter 151*b*' as a shared copy or duplication of the bar meter 151*b*.

Figure 62D:
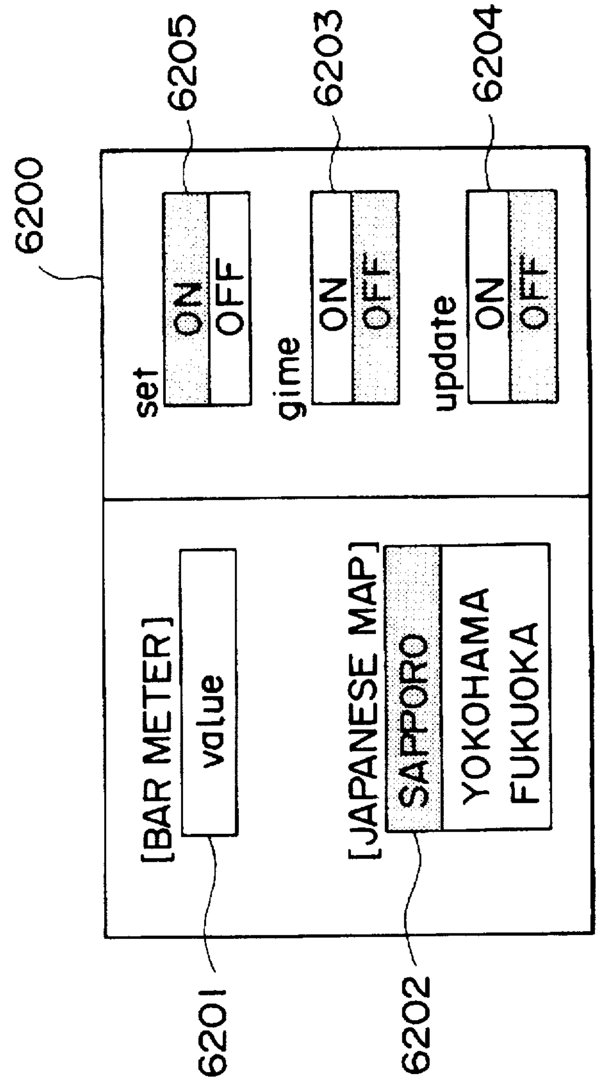

When the shared copy or duplication is created in the manner as described hereinabove, a connection window 6200 is displayed on the display screen as shown in FIG. 62(D). On the connection window 6200, a value slot 6201 of the "Sapporo" bar meter 151*b* is connected with a SAPPORO slot 6202 of the Japanese map component "b1".

More specifically, the value slot 6201 of the "Sapporo" bar meter 151*b* and the SAPPORO slot 6202 of the Japanese map component "b1" are double-clicked by the left button 110*b* of the mouse 110, followed by clicking an "ON" selection of a SET field 6205. These actions create a parent-child relationship between the Japanese map component "b1" as the parent component and the "Sapporo" bar meter 151*b*' as a shared-copy or duplication of the "Sapporo" bar meter 151.

In this case, on the connection window 6200, "ON" selections are clicked on both of a gime field 6203 and an update field 6204.

Figure 63:
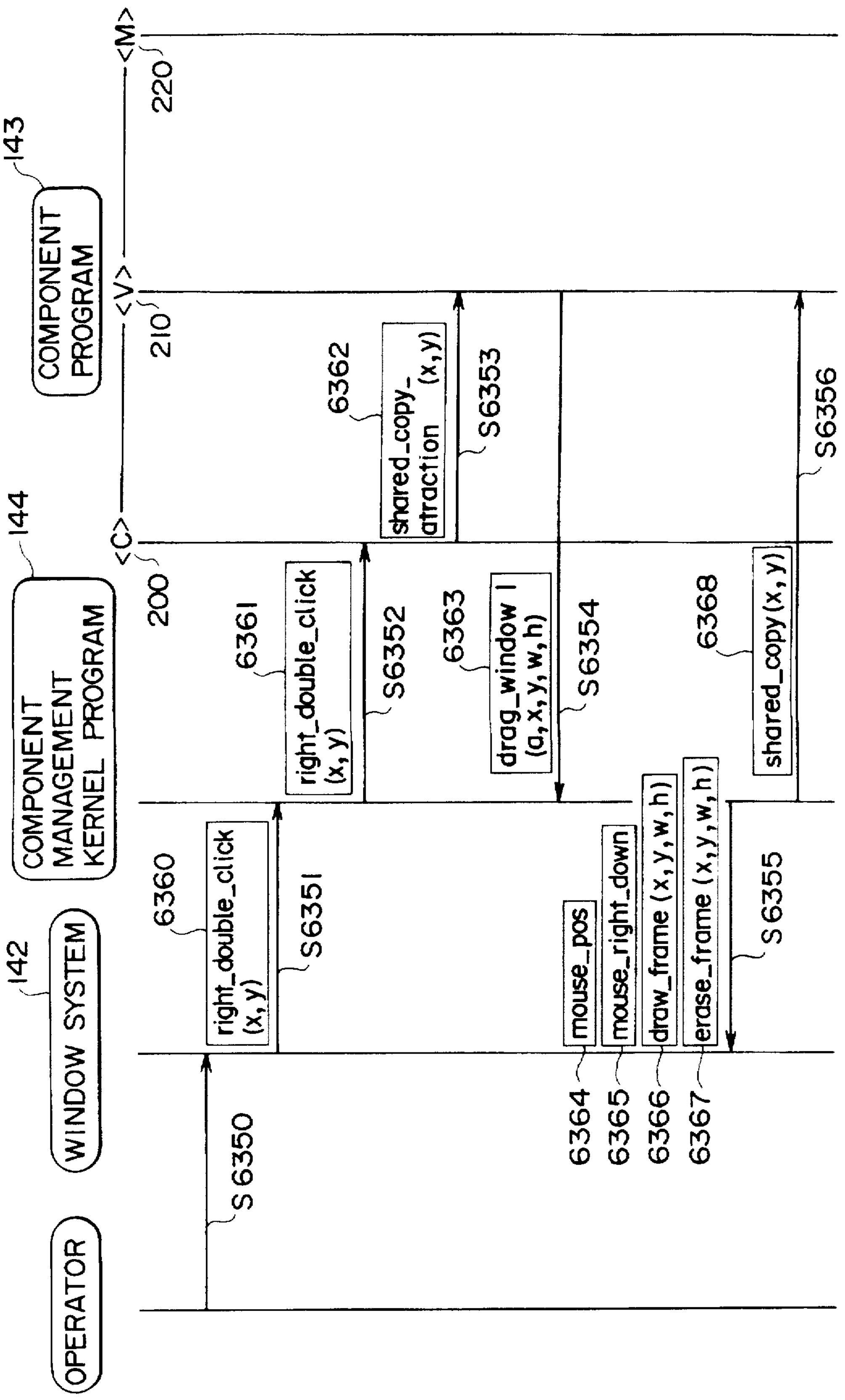
FIG. 63 is a schematic representation showing a course of messages between programs when the shared copy or duplication is to be created.

FIG. 63 shows the courses of the messages between the programs after an instruction has been given to create a shared copy or duplication by double-clicking the right button 110*a* of the mouse 110.

In FIG. 63, the operator positions the rubber band 810 of the mouse 110 on the bar meter 151*b* of the Japanese map component "a1" and double-clicks the right button 110*a* thereof (S6350). This double-click operation is detected by the window system 142.

Next, the window system 142 sends a message, right_double_click (x, y) 6360, to the component management kernel program 144 (S6351).

Upon receipt of the right_double_click (x, y) message 6360, the component management kernel program 144 sends the right_double_click (x, y) message 6361 to the controller part 200 of the component program 143 of the bar meter 151*b* existing at the position in which the double-click operation has been executed (S6352).

When it has received the right_double_click (x, y) message 6361, the controller part 200 of the bar meter 151*b* recognizes the message 6361 as a Shared Copy command and sends a message, shared_copy_action (x, y) 6362, to the view definition part 210 of its own component (S6353).

Then, the view definition part 210 sends to the component management kernel program 144 a message, drag window 1 (a, x, y, w, h) 6363, in order to display the rubber band 810 (S6364).

In this message, the parameters indicated by the alphabetical small letters "a", "x", "y", "w" and "h" are the same as in FIG. 19.

In response to the drag_window message 6363, the component management kernel program 144 sends to the window system 142 a message, mouse_pos 6364, for acquiring the cursor position of the mouse 110, a message, mouse right_down 6365, for acquiring the status of the right button 110*a* of the mouse 110, a message, draw_frame (x, y, w, h) 6366, for drawing a rectangular frame corresponding to the rubber band 810 of the bar meter 151*b*, and a message, erase_frame (x, y, w, h) 6367, for erasing the rectangular frame corresponding to the rubber band 810 of the bar meter 151*b* (S6355).

Upon the finish of the drag operation by releasing the right button 110*a* of the mouse 110, the component management kernel program 144 sends a message, shared_copy (x, y) 6369, to the view definition part 210 of the component (S6356).

When it has received the message 6361, the view definition part 210 creates a copy or duplication of the controller part 200 and the view definition part 210 of the bar meter 151*b* in accordance with the process of the shared copy or duplication for the message 6361. Further, the copy or duplication of the controller part 200 and the view definition part 210 is connected with the behavior definition part. The copy or duplication process will be described later in more detail with reference to FIG. 67.

Figure 64:
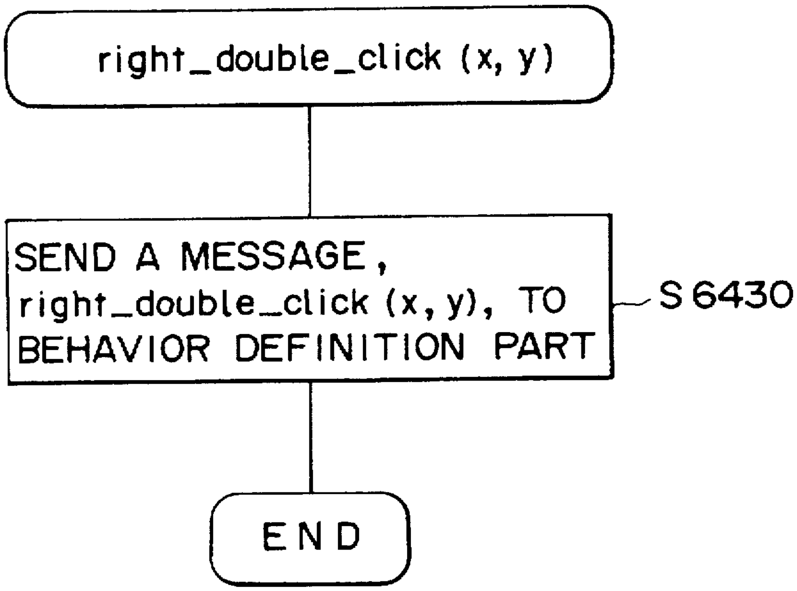
FIG. 64 is a flow chart indicating a series of process steps to be performed when the component management kernel program has received a message, right double_click, when the shared copy or duplication is to be created.

FIG. 64 is a flow chart indicating a series of process steps when the component management kernel program 144 has received the right_double_click (x, y) message 6360 from the window system 142. Upon receipt of the message 6360, the component management kernel program 144 transmits the message 6360 intact to the component program 143 of the bar meter 151*b* as a right_double-click (x, y) message 6361 (6430), followed by the end of the process.

Figure 65:
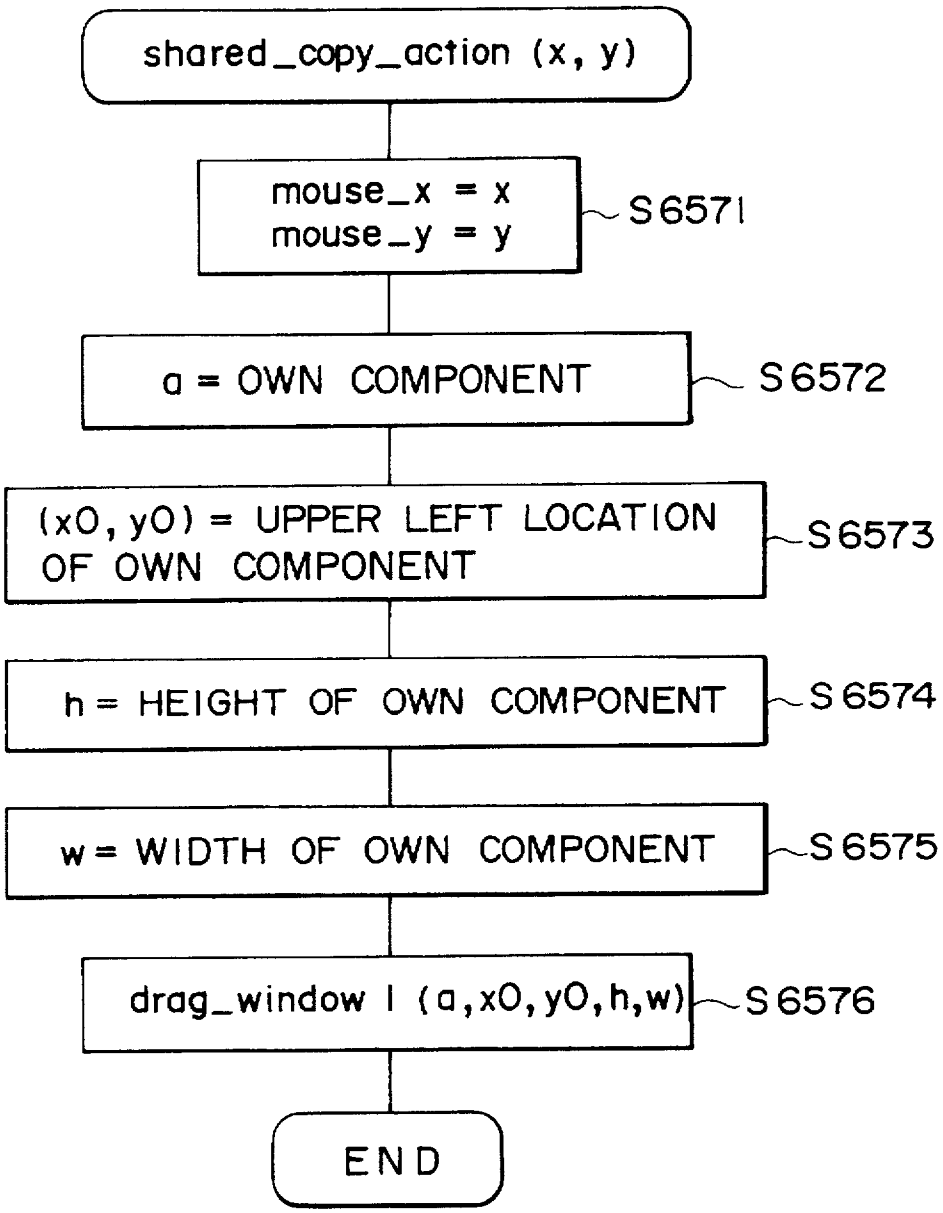
FIG. 65 is a flow chart indicating a series of process steps to be performed when the view definition part of a source copy or duplication component has received a message, shared_copy_action.

FIG. 65 is a flow chart indicating a series of process steps to be performed when the view definition part 210 of the bar meter 151*b* has received a message, shared_copy_action (x, y) 6362, from the controller part 200. Upon receipt of this message 6362, the view definition part 210 sets the x- and y-locations of the mouse 110 to (x, y) (S6571). Thereafter, a parameter "a" is set as the own component (S6572) and reference to (x0, y0) is set as the upper left location of the own component "a" (S6573). Further, a parameter "h" is set as a height of the window of the own component "a" (S6574) and a parameter "w" is set as a width of the window of the own component "a" (S6575). Thereafter, the drag_window 1 routine in the component management kernel program 144 is started (S6576), followed by the end of the process.

Figure 66:
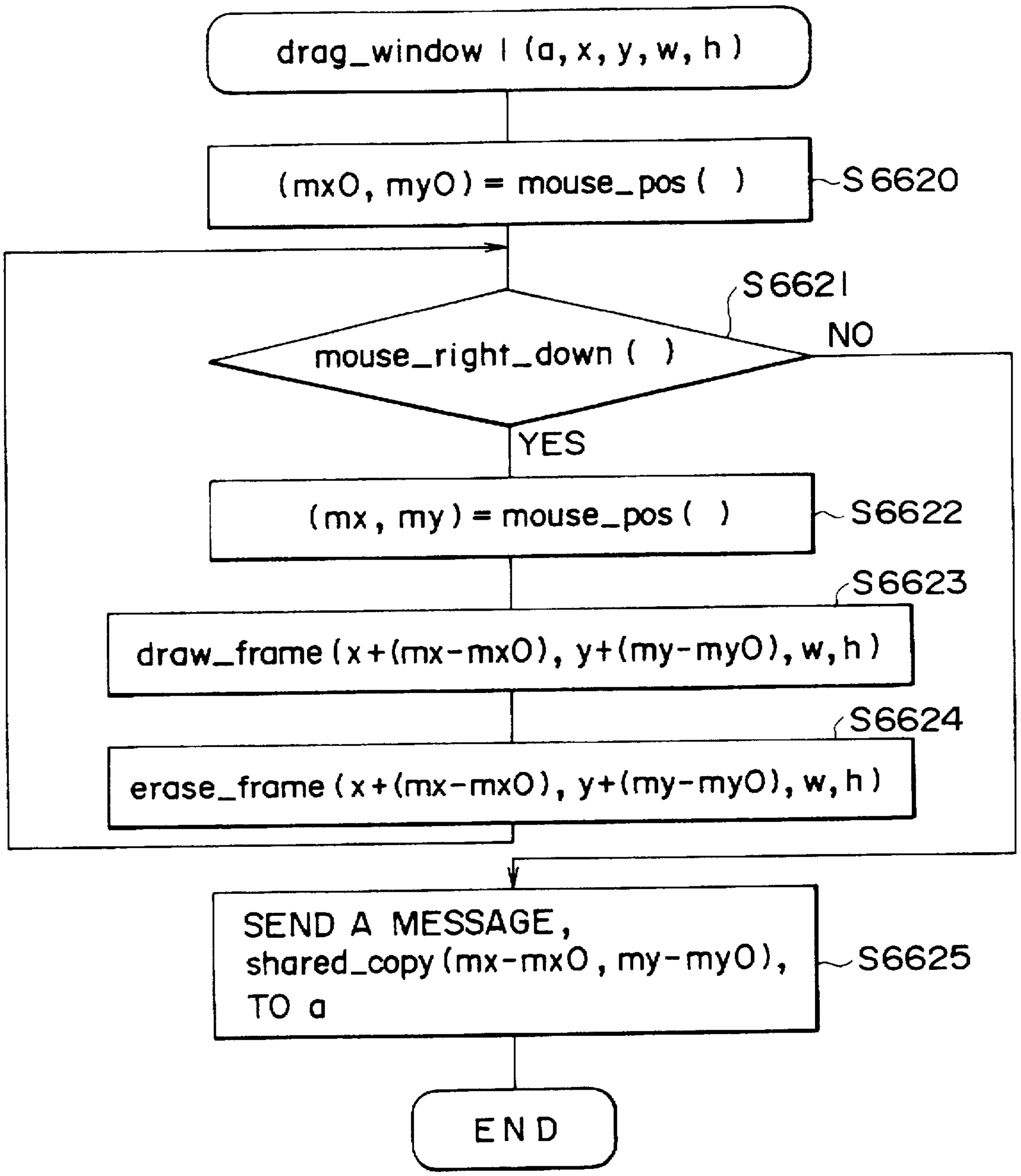
FIG. 66 is a flow chart indicating a series of process steps to be performed when the components management kernel program has received a message, drag window, at the time of creating the shared copy or duplication.

FIG. 66 is a flow chart indicating a series of process steps to be performed for processing the drag window 1 routine in the component management kernel program 144.

In FIG. 66, the parameters to be set are as follows:

a: a source component (window) 1800 required to be dragged (bar meter 151*b*);

(x, y): the location of the upper left corner of the source component required to be dragged;

h: the height of the source component required to be dragged; and w: the width of the source component required to be dragged.

Once the drag_window 1 routine has been started, the location of the mouse 110 at the time of the start is set to (mx0, my0) (S6620) and it is then decided to determine if the right button 110*a* of the mouse 110 is held down (S6621).

When the right button 110*a* of the mouse 110 is being held down (S6621: Yes), the location (mx, my) is set as the location of the mouse 110 (S6622) and the actions to draw the rubber band 810, indicative of the move action of the bar meter 151*a* (S6623), and to erase the rubber band 810 (S6624) are repeated in the same manner as in FIG. 18, thereby bringing the status into a condition under which a decision at step S6621 is made.

On the other hand, when the right button 110*a* of the mouse 110 has been released (S6621: No), the window system 142 sends to the view definition part 210 of the bar meter 151*b* a message, shared_copy (mx-mx0, my-my0) 6368 (S6625).

Figure 67:
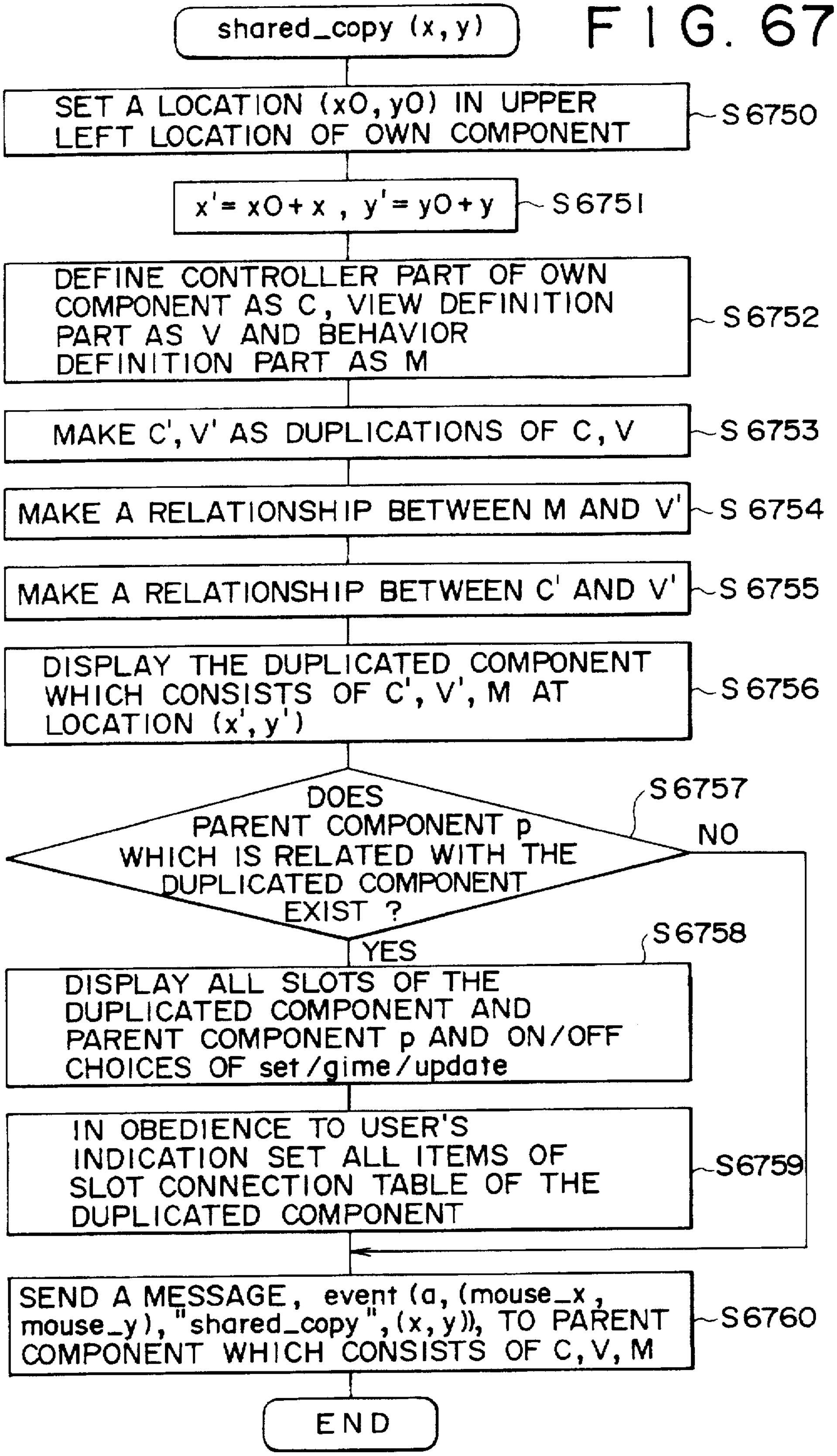
FIG. 67 is a flow chart indicating a series of process steps to be performed when the view definition part of a source copy or duplication component has received a message, shared_copy_action.

FIG. 67 is a flow chart indicating a series of process steps to be performed when the view definition part 210 of the bar meter 151*b* has received the shared copy (x, y) message 6368 from the component management kernel program 144 for creating the bar meter 151*b*' as a shared copy or duplication of the bar meter 151*b*.

First, the view definition part 210 sets a location of the upper left corner of the own component (bar meter 151*b*) to (x0, y0) (S6750).

Next, the location, (x', y'), of the upper left corner of the bar meter 151*b*' as a shared copy or duplication is set to x'=x0+x, y'=y0+y', respectively (S6751).

Then, the controller part, the view definition part and the behavior definition part of the own component (bar meter 151*b*) are defined as C, V and M, respectively (S6752) and the controller part C and the view definition part V are copied or duplicated to C' and V', respectively (S6753).

Thereafter, in order to connect the behavior definition part M with the controller part C' and the view definition part V' of the copied or duplicated component (bar meter 151*b*'), the copied or duplicated view definition part V' is added, in addition to the view definition part V, as the view definition part corresponding to the behavior definition part for a source copy or duplication (bar meter 151*b*) (S6754).

Further, the controller part corresponding to the copied or duplicated view definition part V' is set as C' and the view definition part corresponding to the duplicated controller part C' is set as V' (S6755).

Then, the copied or duplicated component (bar meter 151*b*') is displayed at the location (x', y') (S6756).

Thereafter, it is decided to determine if a parent component P (the Japanese map component "b1") for the copied or duplicated component exists (S6757).

If it is decided that the parent component P exists (S6757: Yes), there are displayed a list of all the slots of the copied or duplicated component and the parent component P, as well as ON/OFF selections of a set option, a gime option and an update option (S6758).

Further, all the items of the slot connection table of the copied or duplicated component are set in obedience of the user's indication (S6759).

Finally, a message, event (a, (mouse_x, mouse y), "shared_copy", (x, y)), is sent to the parent component (the Japanese map component "a1") of the component non-copied or duplicated, i.e. which consists of C, V and M (S6760).

On the other hand, when the parent component P of the copied or duplicated component does not exist (S6757: No), the process at step S6760 is executed without the execution of the processes at steps S6758 and S6759.

In summary, the double-click operation of the right button 110*a* of the mouse 110 is recognized by the view definition part 210 of the involved component (i.e. the component existing in the location of the component on which the mouse 110 clicks) as a Shared Copy command. Upon this recognition, the view definition part 210 creates the view definition part V' as a copy or duplication of the own view definition part V and the controller part C' as a copy or duplication of the own controller part C, and connects the copy or duplications V' and C' with the behavior definition part M as a source copy or duplication destination. These actions create a shared copy or duplication, that is, the component having the behavior definition part M shared with each other. On the other hand, it can be noted herein that, when a usual copy or duplication, not a shared copy or duplication, is to be created, the left button 111*b* of the mouse 110 is double-clicked. These operations allow shared copy or duplications as well as usual copy or duplications to be created without difficulty.

Figure 68:
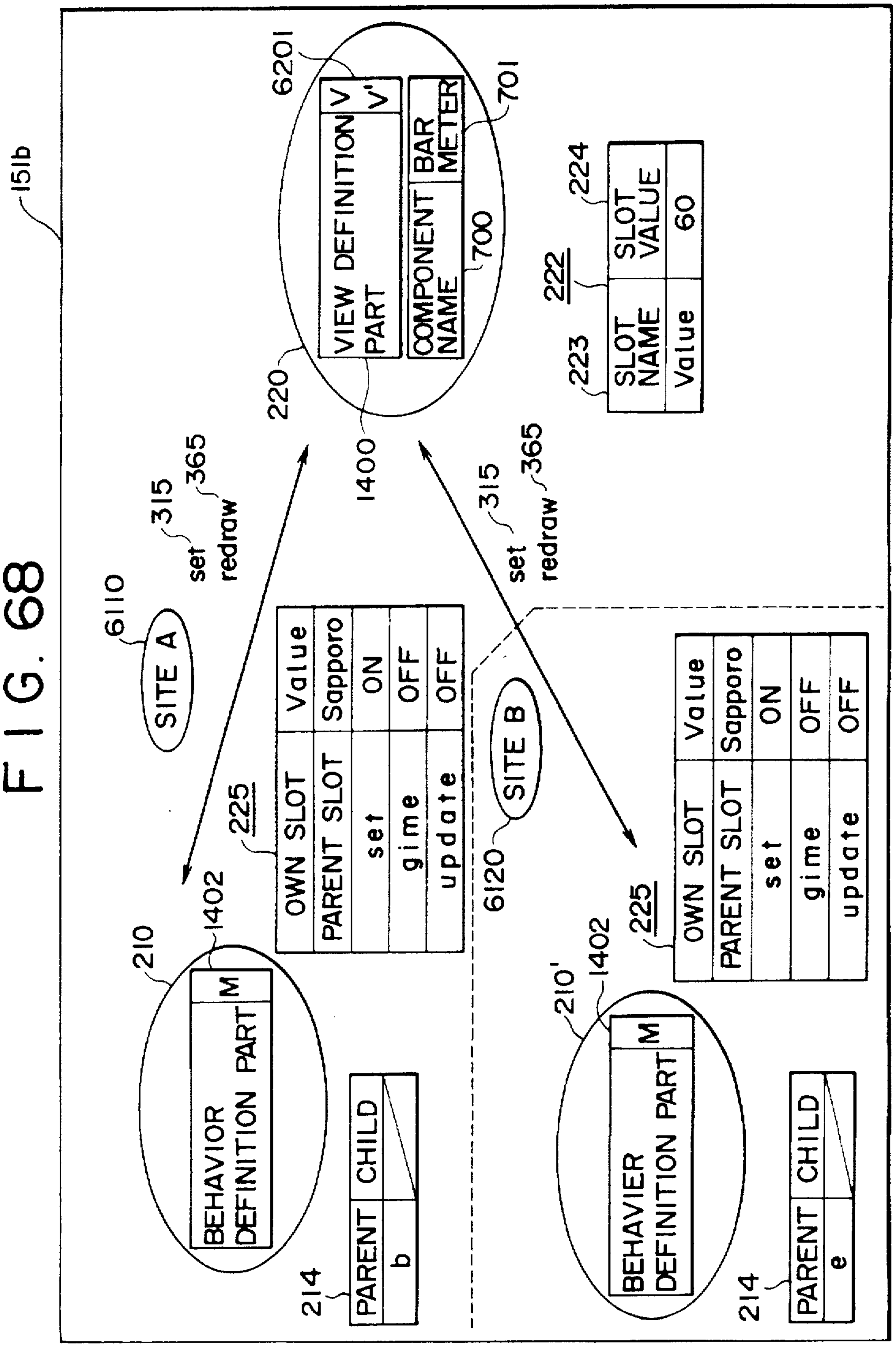
FIG. 68 is an illustration indicating a method for realizing the shared copy or duplication in accordance with an embodiment of this invention.

FIG. 68 illustrates the internal structure of a shared copy or duplication of the component which is created by the method for making copy or duplications of the components displayed on the site A 6110 as a shared copy or duplication of the component displayed on the site B 6120 in the manner as described hereinabove.

In FIG. 68, a component is described usually as having one view definition part 210 and one behavior definition part 220. A description of the controller part 200 will be omitted for brevity of explanation.

In a shared copy or duplication in this embodiment of the invention, two view definition parts 210 and 210' share the one behavior definition part 220, as shown in FIG. 62.

In FIG. 68, the view definition parts 210 and 210' have the functions of displaying the states of the respective components, and each of their internal structures comprises a parent-child table 214 holding the parent-child relationship between the components, a slot connection table 225 holding a connection relationship between the components and a territory holding an address 1402 of the corresponding behavior definition part 220.

The behavior definition part 220 has functions holding the states of the component, and the inside thereof comprises a slot table 222 and an address 3301 of the corresponding view definition part 210.

For instance, the view definition parts 210 and 210' of FIG. 68 display the height "h" of the bar meter 151 on the display screen in accordance with the value of the slot name "Value" 223 of the behavior definition part 220. Further, the behavior definition part 220 holds the value in the territory of the slot value 224 for the slot name "Value" 223.

The two view definition parts 210 and 210' as well as the one behavior definition part 220 send and receive the various messages and data between each other and from the others, for example, by the set message 315 or by the redraw message 365.

In FIG. 68, the shared copy or duplication can be realized by sharing the one behavior definition part 220 with the plural view definition parts, for example, the view definition part 210 and the view definition part 210'. As a consequence, these components are displayed in the equal appearance on the display screen.

Figure 69:
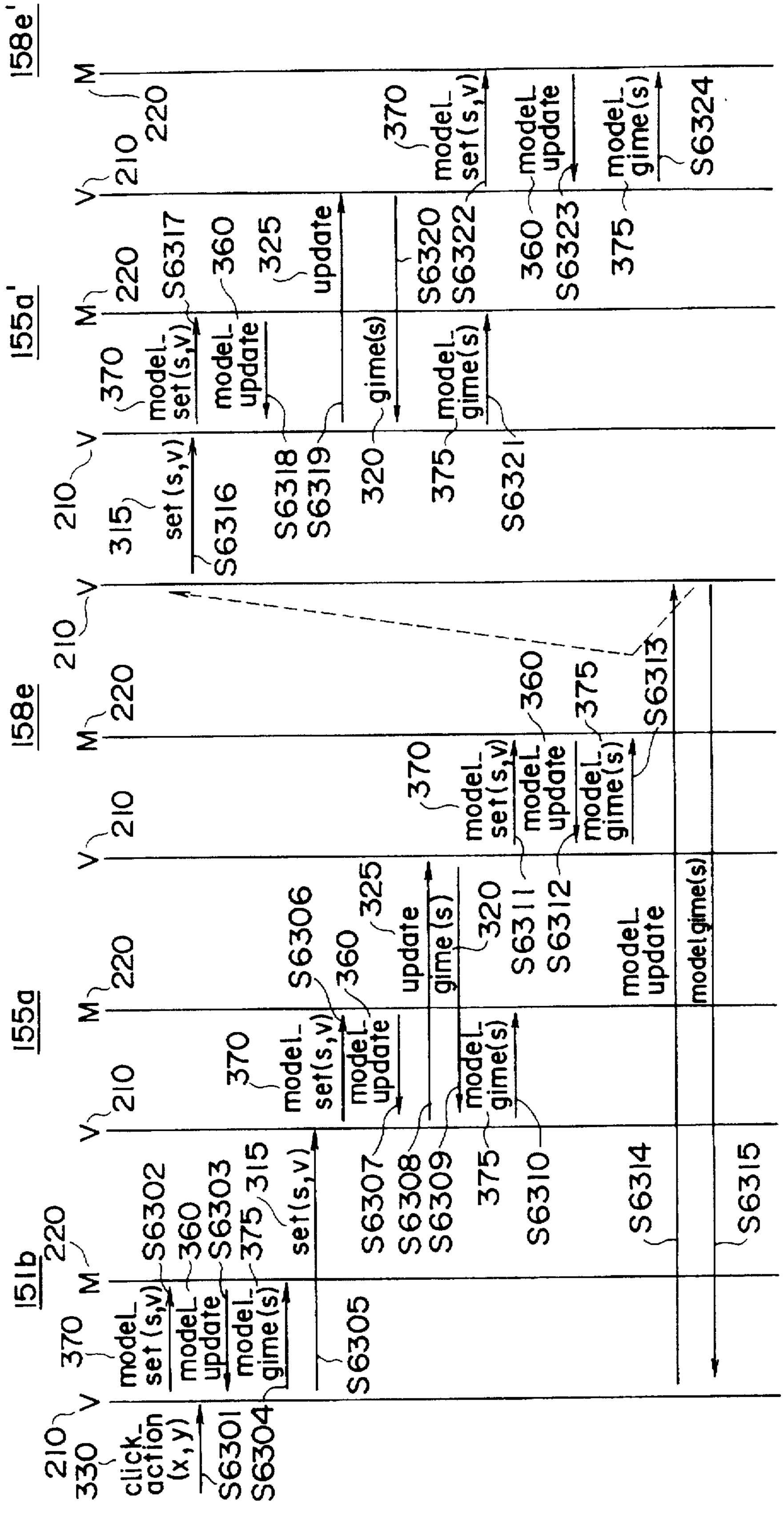
FIG. 69 is a flow chart indicating a series of process steps for transmitting messages among the components in the shared copy or duplication in accordance with an embodiment of this invention.

FIG. 69 is a flow chart indicating a series of process steps to be performed for transmitting the messages between the components when one of the values of the bar meters has been changed.

In FIG. 69, reference numeral 210 denotes a view definition part of each of the components, referred to as "V", and reference numeral 220 denotes a behavior definition part of each of the components, referred to as "M". On the other hand, it is to be noted herein that the bar meter **151*b*' shares the behavior definition part 220 with the bar meter 151*b* because it is a shared copy or duplication of the bar meter 151*b***.

The following is a description of the courses of the messages with reference to FIG. 69.

First, as the user clicks the mouse 110 on the bar meter **151*b*, the view definition part 210 of the bar meter 151*b* receives the click_action (x, y) message 330 (S6301**).

Then, the view definition part 210 of the bar meter **151*b* calculates a value "v" indicated by the user from the click position of the mouse 110 with respect to the height "h" of the bar of the bar meter 151*b*, and then sends to the behavior definition part 220 the model_set (s, v) message 370 (actually, the set ("Value", v) message 1300) (S6302**).

When it has received the model_set (s, v) message 370, the view definition part 210 of the bar meter 151 changes the slot value of the slot "s" to a slot value "v" and sends to the corresponding view definition part 210 (the address being held in the behavior definition part 220) the model_update message 360, for giving notice of the changes of the states of the slot (S6303).

As the model_update message 360 has been received, the view definition part 210 of the bar meter **151*b* sends to its own behavior definition part 220 the model_gime (s) message 375 (actually, the model-gime ("Value") message 1301) and receives the slot value "v" as a return value from the behavior definition part 220. As a result, the height "h" of the bar of the bar meter 151*b* on the display screen is changed (S6304**).

As the slot value of the bar meter **151*b* has been changed, the set (s, v) message 315 (actually, the set ("Sapporo", v) message 1302) for setting the value of the "Sapporo" slot 640 to the slot value "v" is sent to the view definition part 210 of the Japanese map component 155*a* as the component to which the slot of the bar meter 151*b* is connected (S6305**).

Upon receipt of the set (s, v) message 315, the view definition part 210 of the Japanese map component **155*a* sends to its own behavior definition part 220 the model_set (s, v) message 370 (actually, the model_set ("Sapporo", v) message 1302) (S6306), leading to the changes of the value of the "Sapporo" slot 640 of the Japanese map component 155*a*** to the slot value "v".

Then, the behavior definition part 220 of the Japanese map component **155*a* sends to its own view definition part 210 the model_update message 360 for giving notice of the changes of the slot value of the "Sapporo" slot 640 (S6307**).

When it has received the model_update message 360, the view definition part 210 of the Japanese map component **155*a* sends the update message 325, for giving notice of the changes of the states, to the view definition part 210 of the numeric display device 158*c* to which the slot is connected (S6308**).

Thereafter, the view definition part 210 of the numeric display device **158*c* sends to the view definition part 210 of the Japanese map component 155*a* the gime (s) message 320 (actually, gime ("Sapporo", v) message 1304) for requiring the updated value (S6309**).

Upon receipt of the gime (s) message 320, the view definition part 210 of the Japanese map component **155*a* sends to its own behavior definition part 220 the model_gime (s) message 375 for requiring the value (S6310), and transmits the acquired value to the view definition part 210 of the numeric display device 158*c***.

Actually, the view definition part 210 of the Japanese map component **155*a* executes the process S6310 at the time when it has received the message at step S6309 and sends to the view definition part 210 of the numeric display device 158*c* the value of the "Sapporo" slot 640 as a return value of the process S6309**.

Then, the view definition part 210 of the numeric display device **158*c* sends to its own behavior definition part 220 the model_set (s, v) message 370 (actually, the model_set ("Value", v) message 1300) for setting the received value of the "Sapporo" slot 640 to its own behavior definition part 220 (S6311**).

When it has received the model_set (s, v) message 370, the behavior definition part 220 of the numeric display device **158*c* changes the slot value of the "Value" slot and sends to its own view definition part 210 the model_update message 360 for giving notice of the changes of the slot value (S6312**).

Then, the view definition part 210 of the numeric display device **158*c* sends to its own behavior definition part 220 the model_gime (s) message 375 for acquiring the changed slot value of the "Value" slot and acquires the changed value (S6313**).

Thereafter, the view definition part 210 of the bar meter **151*b*, sends to the view definition part 210 of the bar meter 151*b*' as a copy or duplication destination, the model_update message 360 for giving notice of the changes of the value of the behavior definition part 220 of the bar meter 151*b* (S6314**).

When it has received the model_update message 360, the view definition part 210 of the bar meter **151*b*' sends the model_gime (s) message 375 (actually, the model gime ("Value", v) message 1301) for requiring the value to the view definition part 210 of the bar meter 151*b*, and acquires the slot value "v" as a return value from the view definition part 210 of the bar meter 151*b* (S6315**).

It is to be noted herein that a description of the processes that follow thereafter is omitted for brevity of explanation, because the processes (from step S6316 to step S6324) of transmission and receipt of the messages from and by the another bar meter 151 as a copy or duplication destination, as well as the numeric display device **158*c* and the Japanese map component 155, are substantially the same as the processes from steps S6315 to S6335**.

It is further to be noted herein that the shared copy or duplication can be realized by one behavior definition part 220 and by plural view definition parts 210 sharing the same behavior definition part 220 in the same manner as described hereinabove by making transmissions and receipts of the messages between the view definition part 210 and the behavior definition part 220 of each of the components.

This invention can recognize the changes of a component of a tool or a program to be newly configured as a shared copy or duplication on the same display screen as the changes of another component, because the behavior definition part of a duplication source is shared with a component as a duplication destination in a duplication operation for the object-oriented component.

By the shared copy or duplication in the manner as described hereinabove, the present invention can achieve the effect that a single user or users at plural locations can simultaneously make reference to the same status of a data management system.

Now, a description will be made of the method for the assignment of the retrieval key words for the components, and the method for the retrieval of the components assigned by the assignment method.

Figure 70:
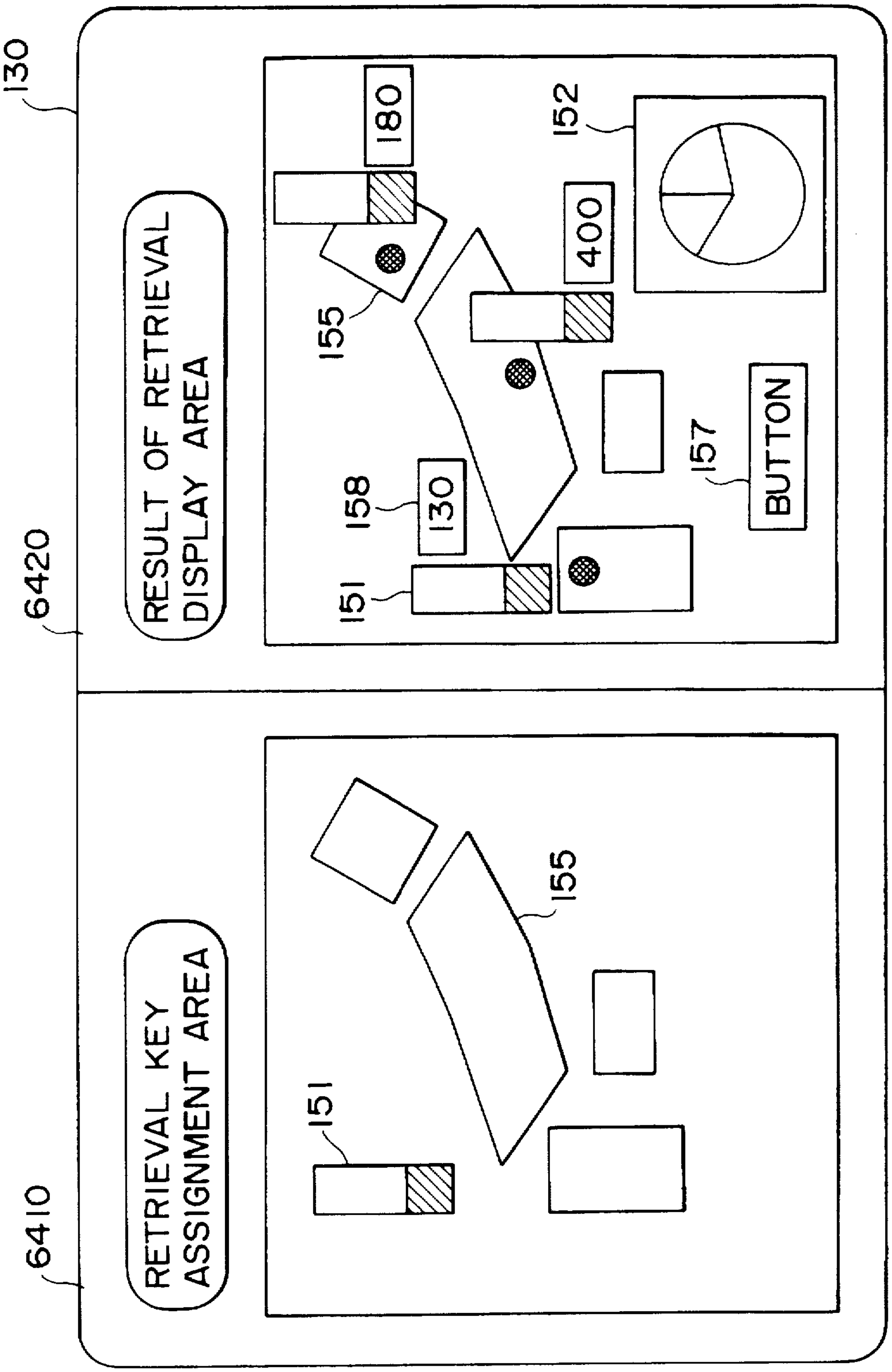
FIG. 70 is a schematic representation showing a method for specifying a component retrieval key word for retrieving the component of the statistics data display tool and describing the retrieval of the component from the component retrieval key word specified.

FIG. 70 shows the methods for assigning a component retrieval key word for the statistics data tool and for retrieving the component from the indicated component retrieval key word. In FIG. 70, the bar meter 151 is superimposed on the Japanese map component 155 in a retrieval key assignment area 6410 on the display 130, and is assigned as a retrieval key word.

Then, a composite component in which the bar meter 151 is superimposed on the Japanese map component 155 is retrieved and displayed as shown on a result-of-records display area 6420 in FIG. 70.

The composite component containing the superimposed structure as a partial structure, which is assigned by the user, can be retrieved in the manner as described hereinabove.

Figure 71A:
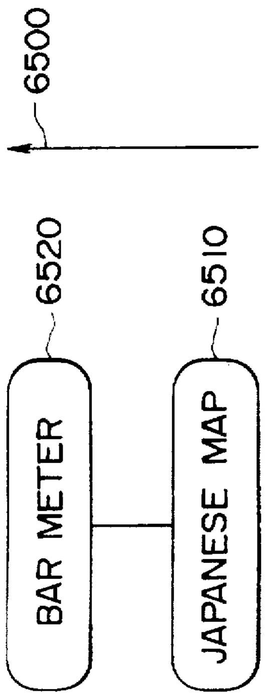
FIGS. 71(A) and 71(B) are illustrations indicating a pasted or superimposed structure of the components as a graph structure in accordance with an embodiment of this invention.
Figure 71B:
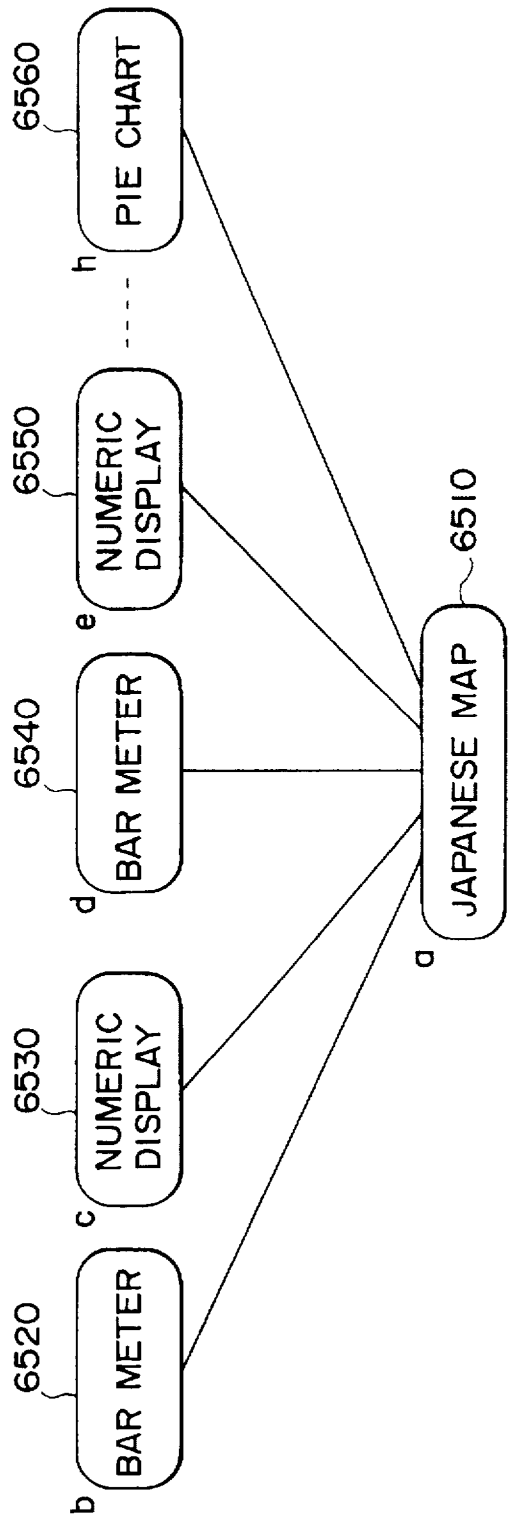

FIGS. 71(A) and 71(B) are illustrations indicating a superimposed structure of the components assigned by the user in the form of a graph structure. As shown in FIG. 71(A), the superimposed structure of the components is the one sought to be assigned as a retrieval key by the user, which represents the structure in which a bar meter 6520 is superimposed on a Japanese map 6510. In FIG. 71(A), the arrow 6500 indicates the direction in which the components are superimposed.

By assigning the retrieval key in the manner as described hereinabove, a statistics data tool is displayed as the result of retrieval in the manner as shown in FIG. 71(B).

In FIG. 71(B), bar meters (6520, 6540) for each city, numeric display devices (6530, 6550) and a pie chart 6560 are superimposed in this order on the Japanese map 6510, and the superimposed structure of the components assigned by the retrieval key as shown in FIG. 71(A) is contained.

FIGS. 72(A) and 72(B) are each an illustration indicating another retrieval method for retrieving the component on the basis of a superimposed structure of the components. When the superimposed structure of the components is to be assigned by the retrieval key, there are occasions that part of the structure is not known specifically or part is not required to be specified.

In such cases, it is possible to use a component called a wild card. In the embodiments of this invention, a wild card component 6600 is provided with the symbol "*" 6610.

FIG. 72(A) shows a superimposed structure assigning a structure in which the bar meter 6520 and a pie chart 6560 are superimposed on an optional component. In FIG. 72(A), the optional component is indicated as the wild card component 6600 provided with the symbol "*" 6610.

FIG. 72(B) represents the manner in which the superimposed structure is assigned on the display screen. In FIG.

72(B), the assignment can be made by superimposing the bar meter 151 and the pie chart 152 on the wild card component 6600.

Figure 73A:
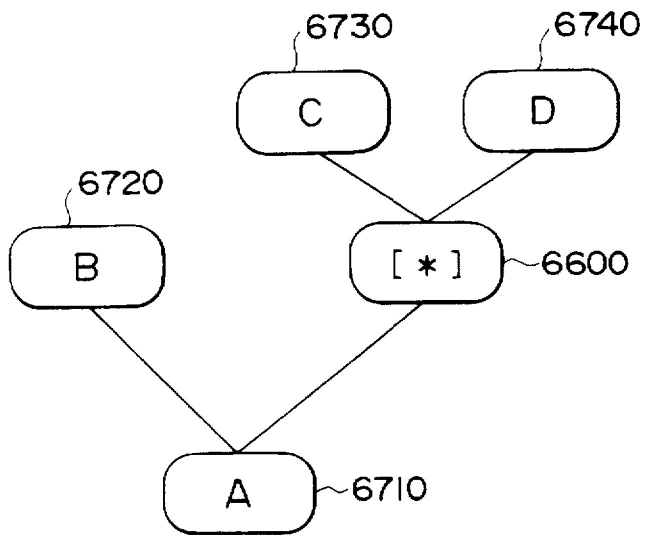
FIGS. 73(A) and 73(B) are illustrations for describing a retrieval method for retrieving a component on the basis of the pasted or superimposed structure of the components in accordance with an embodiment of this invention.
Figure 73B:
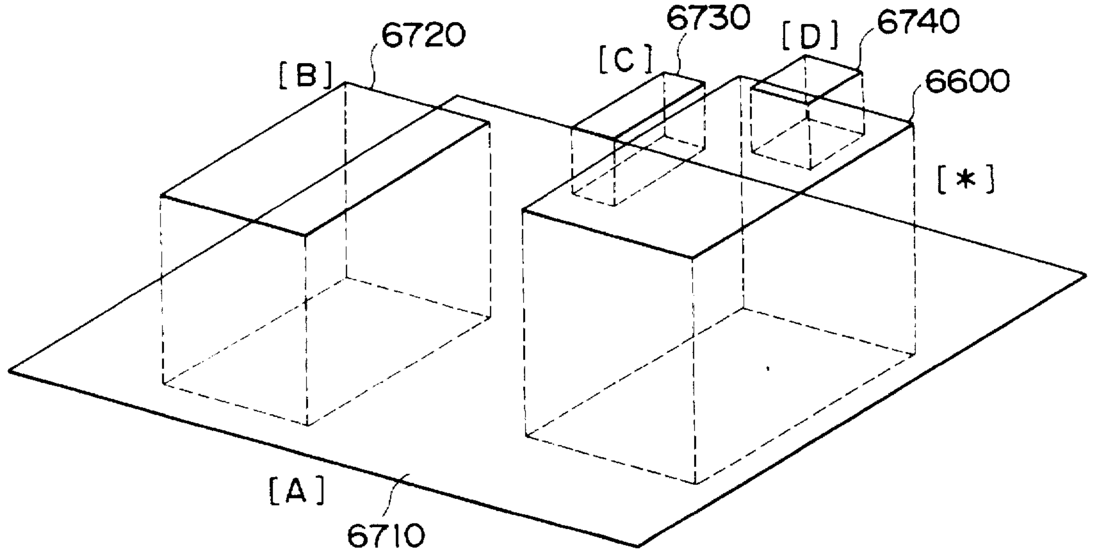

FIGS. 73(A)–73(C) represent another example of assigning a superimposed structure utilizing the wild card component. FIG. 73(A) shows an illustration representing the superimposed structure in which a component B 6720 and an optional wild card component 6600 are superimposed on a component A 6710, and a component C 6730 and a component D 6740 are in turn superimposed on the wild card component 6600.

FIG. 73(B) indicates an illustration showing the superimposed structure on the display screen. In reality, the superimposed structure of the components is assigned and utilized for retrieval.

In FIG. 73(C), it can be clearly recognized that the component B 6720 and the wild card component 6600 are superimposed on the component A 6710, and the component C 6730 and the component D 6740 are superimposed on the component A 6710.

FIG. 74 is a flow chart indicating a series of process steps for the retrieval method for retrieving the component by assigning the superimposed structure. As shown in FIG. 74, all the components in the component objects database 150 are retrieved for all the components containing the superimposed structures as a partial structure, which are assigned as retrieval keys by the user.

A decision to determine if the assigned superimposed structure contains such a partial structure is made through an "OK routine". When the retrieval process for retrieving all the components contained in the component object database 150 has been finished, the results of data retrieval are generated and the process is allowed to end.

In FIG. 74, first, the first component in the component object database 150 is indicated by reference symbol "a" (S6810) and, next, it is decided to determine if the first component "a" contains the superimposed structure assigned by the retrieval key as a partial structure (S6820). It is to be noted herein that the process S6810 is referred to as the "OK routine".

When the first component "a" contains such a superimposed structure assigned by the retrieval key as a partial structure (S6820: Yes), the first component "a" is added to the results of retrieval (S6830).

On the other hand, when the first component "a" does not contain such a superimposed structure assigned by the retrieval key as a partial structure (S6820: No), it is further decided to determine if a component is still remaining in the component object database 150 (S6840).

If no component is remaining in the component object database 150 (S6840: No), the retrieval process is allowed to end.

On the other hand, if a component is remaining in the component object database 150 (S6840: Yes), the next component is extracted from the component object database 150 and indicated by reference symbol "a" (S6850) and the processes at steps S6820 et seq are executed in substantially the same manner as described hereinabove.

Figure 75A:
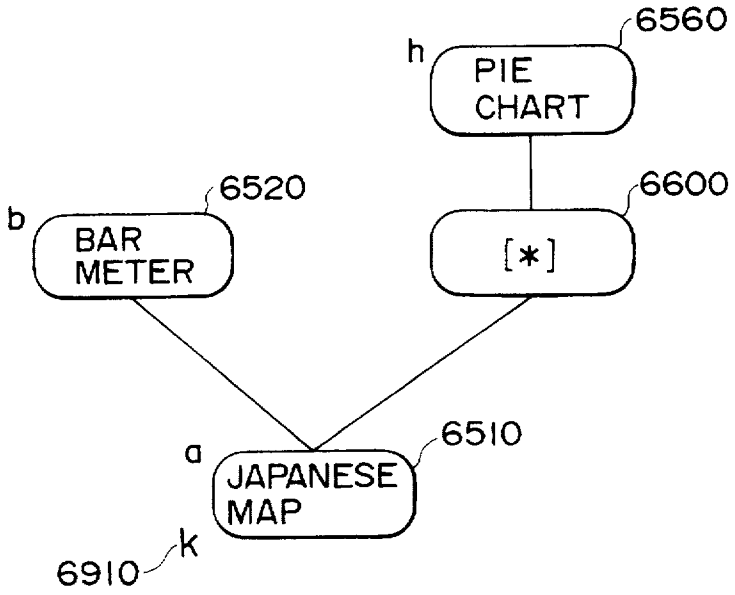
FIGS. 75(A) and 75(B) are illustrations for describing a structure tree containing a pasted or superimposed structure specified by the retrieval key word as a partial structure in accordance with an embodiment of this invention.
Figure 75B:
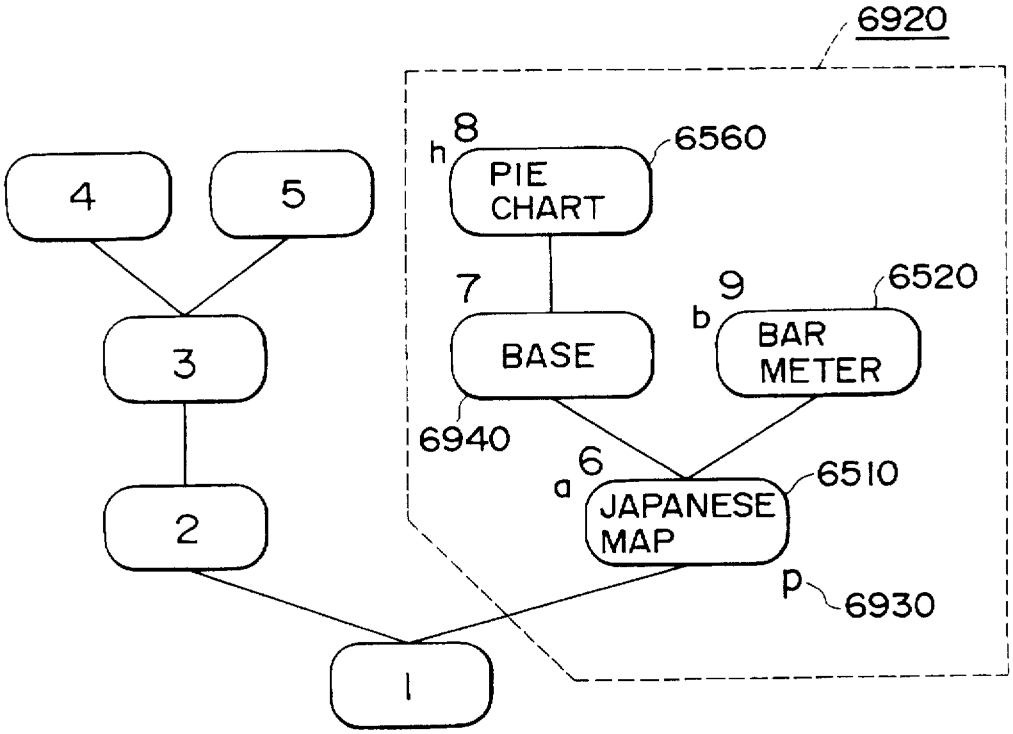

FIGS. 75(A) and 75(B) are each an illustration indicating a structure tree containing, as a partial structure, a superimposed structure assigned by the retrieval key word. In FIG. 75(A), the superimposed structure as shown in FIG. 69(A), in which the bar meter 6520 and the wild card component 6600 are superimposed on the Japanese map 6510 and furthermore the pie chart 6560 is superimposed on the wild card component 6600, is assigned as a retrieval key.

FIG. 75(B) shows the components as an object of retrieval in the manner as displayed on the display screen. It is to be noted herein that, as the component having the superimposed structure contains the superimposed structure assigned and enclosed by the broken line 6920 in FIG. 75(B), the result of decision through the "OK routine" is given as "OK".

It is further to be noted herein that, in FIG. 75(A), a parameter "k" 6910 denotes a root node of the tree structure of the pasted structure (i.e. a "node" as an origin of the retrieval key), and the retrieval is to be started from the root node "k" 6910, from which the retrieval key starts moving.

Accordingly, the retrieval for the component as an object of retrieval, as shown in FIG. 75(B), starts the retrieval by setting a node "p" 6930 in the portion 6920 enclosed by a broken line, as a root node. A decision to determine if the components as objects for retrieval contains the pasted structure assigned by the retrieval key is made by the serial retrieval for a component 6 corresponding to the Japanese map 6510, a component 7 corresponding to the wild card component 6600, a component 8 corresponding to the bar meter 6520 and a component 9 corresponding to the pie chart 6560.

Figure 76:
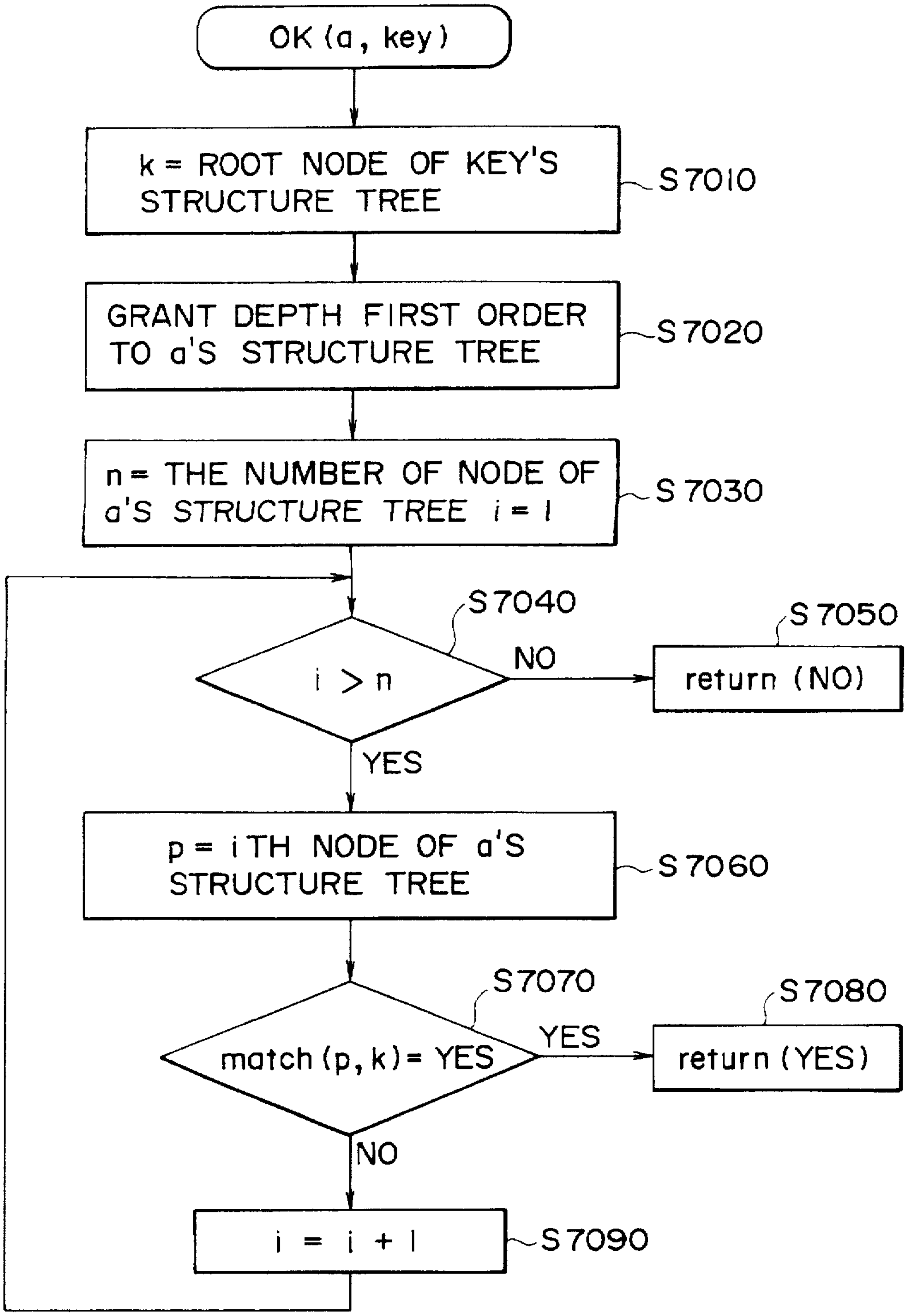
FIG. 76 is a flow chart showing a series of process steps for processing an "OK" routine in accordance with an embodiment of this invention.

FIG. 76 is a flow chart showing a series of process steps for processing the "OK" routine of FIG. 74.

First, the node "k" 6910 is set as a root node of the structure tree of the pasted structure assigned as a retrieval key (S7010). For example, as shown in FIG. 75(A), the Japanese map 6510 corresponds to the root node "k" 6910.

In FIG. 76, the parameter "a" refers to a component as an object of retrieval for which a decision is made to determine if it contains the retrieval key. The node of each of the components to be indicated by the parameter "a" is granted with a node number in accordance with the depth first order (S7020). The process of granting the depth first order to the components "a" of the structure tree can be realized in a conventional manner known per se to the art.

The parameter "n", indicative of the number of nodes of the structure tree of the components to be indicated by the parameter "a", is provided with the node number ("i") of the component "a" (S7030). If the decision process has been executed for all the nodes, that is, if it is decided that the node number "i" is smaller than or equal to the parameter "n" (S7040: No), "return (NO)" is returned to step S6820 in FIG. 74 (S7050).

On the other hand, when it is decided that the node number "i" is larger than the node number "n" (S7040: Yes), the node "p" 6930 is then set to the i-th node of the component "a" (S7060). This means that the node "p" 6930 becomes a root node of the structure tree of the components, as an object of retrieval, in the component "a".

The structure tree of the partial structure having the node "p" 6930 as a root node is matched with the previously indicated retrieval key (i.e. the structure tree having the node "k" 6910 as a root node). This matching is equivalent to a decision to be made to determine if the structure tree of the partial structure having the node "p" 6930 as a root node contains the structure tree having the node "k" 6910 as a root node (in other words, the two nodes "p" and "k" are required to coincide with each other).

For example, as shown in FIGS. 75(A) and 75(B), given the node "k" 6910 for a component 6, when the structure tree of the partial structure having the node "p" 6930 is allowed to coincide with the Japanese map component 6510, it is found that the structure tree of the partial structure having the node "p" 6930 as a root node contains the structure tree having the node "k" 6910 as a root node.

Therefore, when it is decided that the structure tree of the partial structure having the node "p" 6930 as a root node contains the structure tree having the node "k" 6910 as a root node (S7070: Yes), "return (Yes)" is returned to step S6820 of FIG. 74 (S7080).

On the other hand, if the structure tree having the node "k" 6910 as a root node is not contained (S7070: No), an increment "1" is added to the parameter "i" and this process is repeated until it becomes equal to the parameter "n".

Figure 77A:
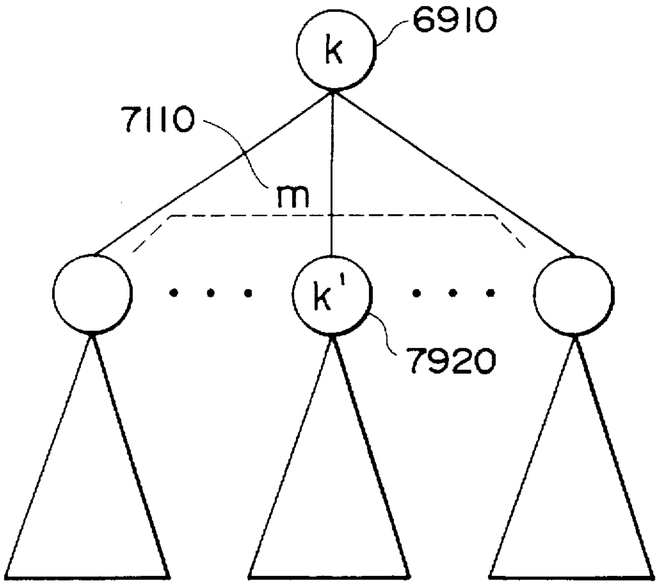
FIGS. 77(A) and 77(B) are illustrations indicating a decision method for determining if a structure tree containing a root node "k" is contained in a structure tree having an identical root node "p" according to an embodiment of the invention.
Figure 77B:
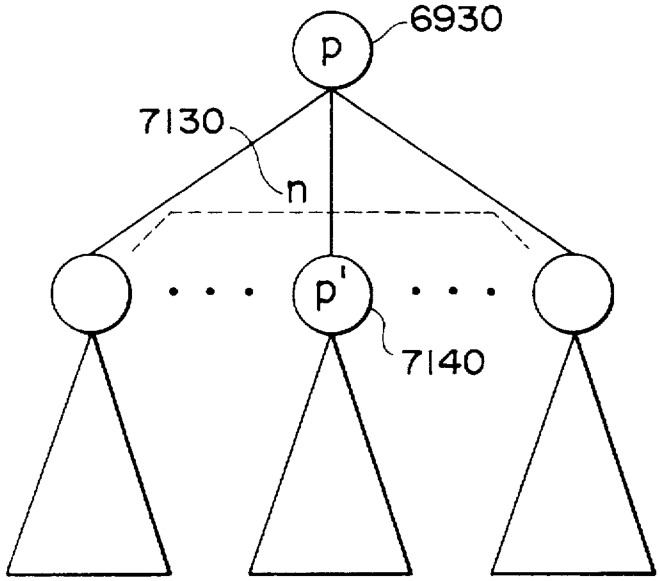

FIGS. 77(A) and 77(B) are illustrations for describing the decision method for determining if the structure tree having the node "p" as a root node contains the structure tree having the node "k" as a root node, in such a state that the root nodes "p" and "k" are allowed to match with each other.

In FIG. 77(A), a node "m" 7110 represents the number of child nodes of the root node "k" 6910 and a node "k'" 7920 represents an i-th child node in the child node "m" 7110.

FIG. 77(B) illustrates the structure of a superimposed structure of the components as an object of retrieval. In 77(B), the node "p" 6930 is set as a root node acting as the origin of retrieval. A node "n" 7130 represents the number of child nodes of the root node "p" 6930 and a node "p'" 6940 represents an i-th child node of the child node "p" 6930.

By matching the tree structure having the root node "k" 6910 as the origin with the tree structure having the root node "p" 6930 as the origin, a component having the necessary structure can be retrieved.

Figure 78:
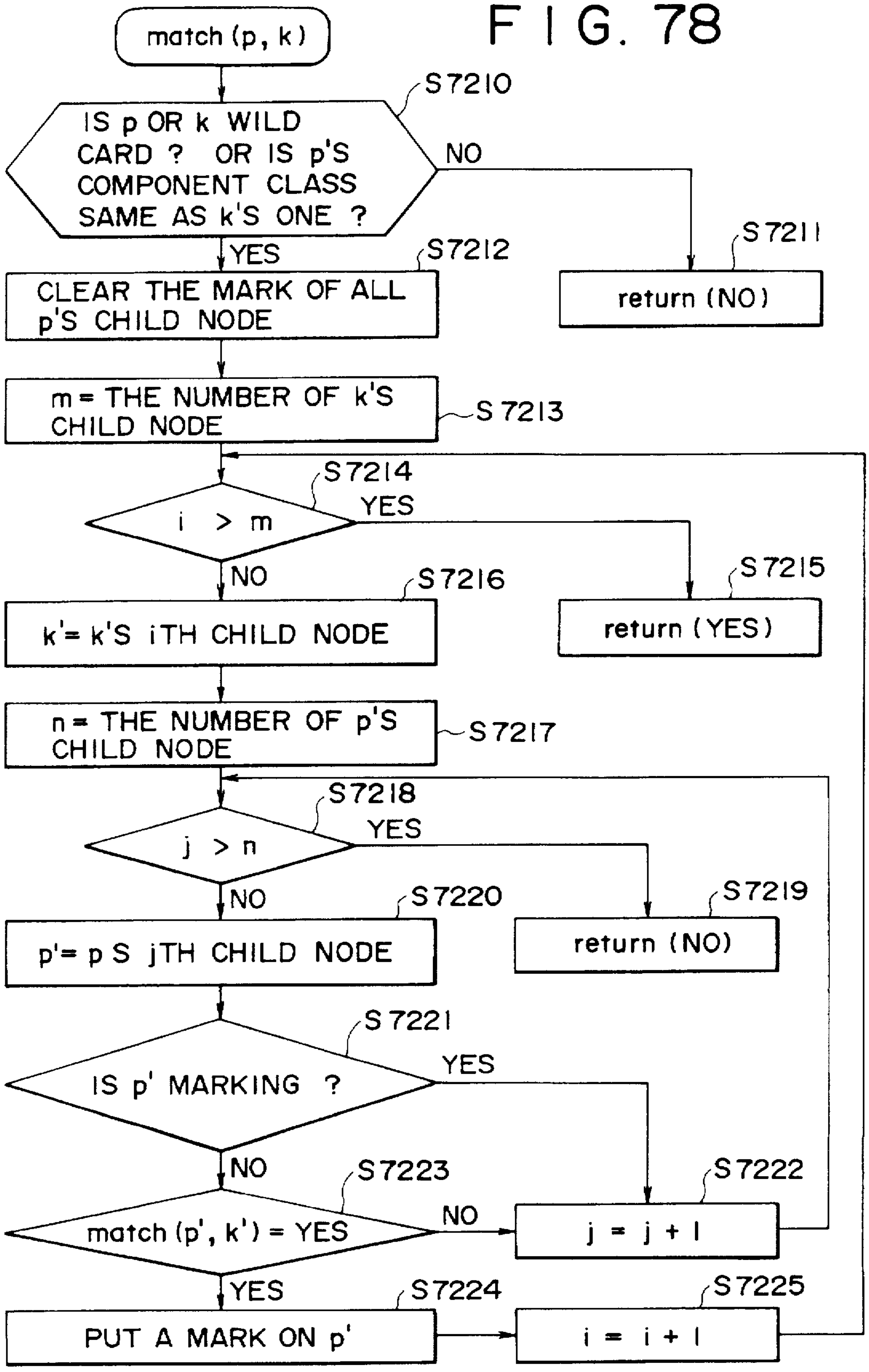
FIG. 78 is a flow chart showing a series of process steps for comparing the structures of the structure trees in accordance with an embodiment of this invention.

FIG. 78 is a flow chart showing a series of process steps for matching the structure trees with each other.

As shown in FIG. 78, a decision is made to determine if the root nodes (a root node "k" 7210 and the root node "p" 6930) coincide with each other (S7210). If it is decided that they do not coincide with each other (S7210: No), "return (NO)" is returned to step S7070 in FIG. 76 (S7211).

In this decision process, any of the following is regarded as indicating that the root nodes are identical to each other:

(1) when either of the root nodes is a wild card component; or (2) when a component class of the root node "p" is the same as a component class of the root node "k".

Further, it is to be noted herein that, in this embodiment of the present invention, the node out of the child nodes "p'" 7140 of the node "p" 6930 which once became an object of decision is provided with a mark (apostrophe) in order to avoid being a duplicate object for the decision process.

Hence, first, the marks provided for all the child nodes having the node "p" 6930 as a root node are initialized or cleared (S7212).

Then, the number of child nodes of the node "k" 6910 is set to the node number "m" 7110 (S7213).

Thereafter, it is decided to determine if the processes for all the child nodes "k'" 7920 of the node "k" have been finished by making a decision to determine if the node number "i" is larger than the node number "m" 7110 (S7214). When it is decided that the processes for all the child nodes "k'" 7920 have been finished (S7214: Yes), then "return (YES)" is returned to step S7070 in FIG. 70 (S7215). On the other hand, if the processes for all the child nodes "k'" 7920 have been yet finished (S7214: No), then the i-th child node of the node "k" 6910 is set as a child node "k'" 7920 (S7216).

It is to be noted herein that the following processes are to be implemented in order to give a child node "p'" 7140 of the node "p" 6930 which satisfies a condition as will be described hereinafter.

Condition: A structure tree of the partial structure having the child node "p'" 7140 as a root node should contain a structure tree having the node "k" 6910 as a root node in the state that the root nodes of the two structure trees coincide with each other.

First, the number of the child nodes of the node "p" 6930 is set as the node number "n" 7130 (S7217). Then, it is decided to determine if the processes as described hereinabove have been finished for all the child nodes of the node "p" 6930 by making a decision to determine if the node number "j" is larger than the node number "m" 7110 (S7218). When it is decided that the processes for all the child nodes "k'" 7920 have been finished (S7218: Yes), then "return (YES)" is returned to step S7070 in FIG. 76 (S7219).

Then, the j-th child node of the node "p" 6930 is set as the child node "p'" 7140 (S7220), followed by a decision to determine if the child node "p'" 7140 is provided with a mark (S7221). If it is decided that the child node "p'" 7140 is provided with a mark (S7221: Yes), an increment "1" is added to the node number "j" (S7222), followed by the return to step S7218.

On the other hand, if no mark is provided (S7221: No), the two components are matched with each other in the state that the child node "k'" 7920 agrees with the child node "p'" 7140 (S7223).

If the result of the matching does not coincide with each other (S7223: No), an increment "1" is added to "j", followed by the return to step S7218 (S7222).

On the other hand, when the result of the matching coincides with each other (S7223: Yes), that is, when the structure tree of the partial structure having the child node "p'" 7140 as a root node contains the structure tree having the node "k'" 7920 as a root node in the state that the root nodes of the two structure trees coincide with each other (S7223: Yes), the child node "p'" is provided with a mark (S7224) and a decision is repeated for the next child node "k" 6910 (S7225).

The processes as described hereinabove according to this invention enable the necessary composite component to be retrieved, even if the structure of the composite component as an object of retrieval would be uncertain. The reasons for enabling such a retrieval are that, by assigning the structure tree of the superimposed structure of the components on the display screen, the root nodes of the two components can be first matched with each other, and the matched root nodes can be utilized as a key for retrieval.

It is further to be noted herein that the embodiments of this invention can readily assign the retrieval key word for the component because the retrieval key word for assigning part of a whole of the superimposed structure having an object-oriented component as an object of retrieval can be created by the superimposing operation for superimposing a plurality of object-oriented components on each other, and the retrieval key word itself can be assigned as a component retrieval key word of the object-oriented component as the object of retrieval.

In addition, the present invention can greatly improve the work for providing the component with the component retrieval key word even if part of the composite component would be uncertain or unknown because the component retrieval key word can be assigned simply by carrying out the superimposing operation of the components on the display screen.

Furthermore, the embodiments of this invention enable the necessary object-oriented component to be readily retrieved because the retrieval key word for assigning part of a whole of the superimposed structure having an object-oriented component as an object of retrieval can be created by the superimposing operation for superimposing a plurality of object-oriented components on each other, and the object-oriented component as an objective can be retrieved by assigning the retrieval key word itself as a component retrieval key word of the object-oriented component as the object of retrieval.

Now, a description will be made of the method for conditioning a component with a hyperlink.

Figure 79:
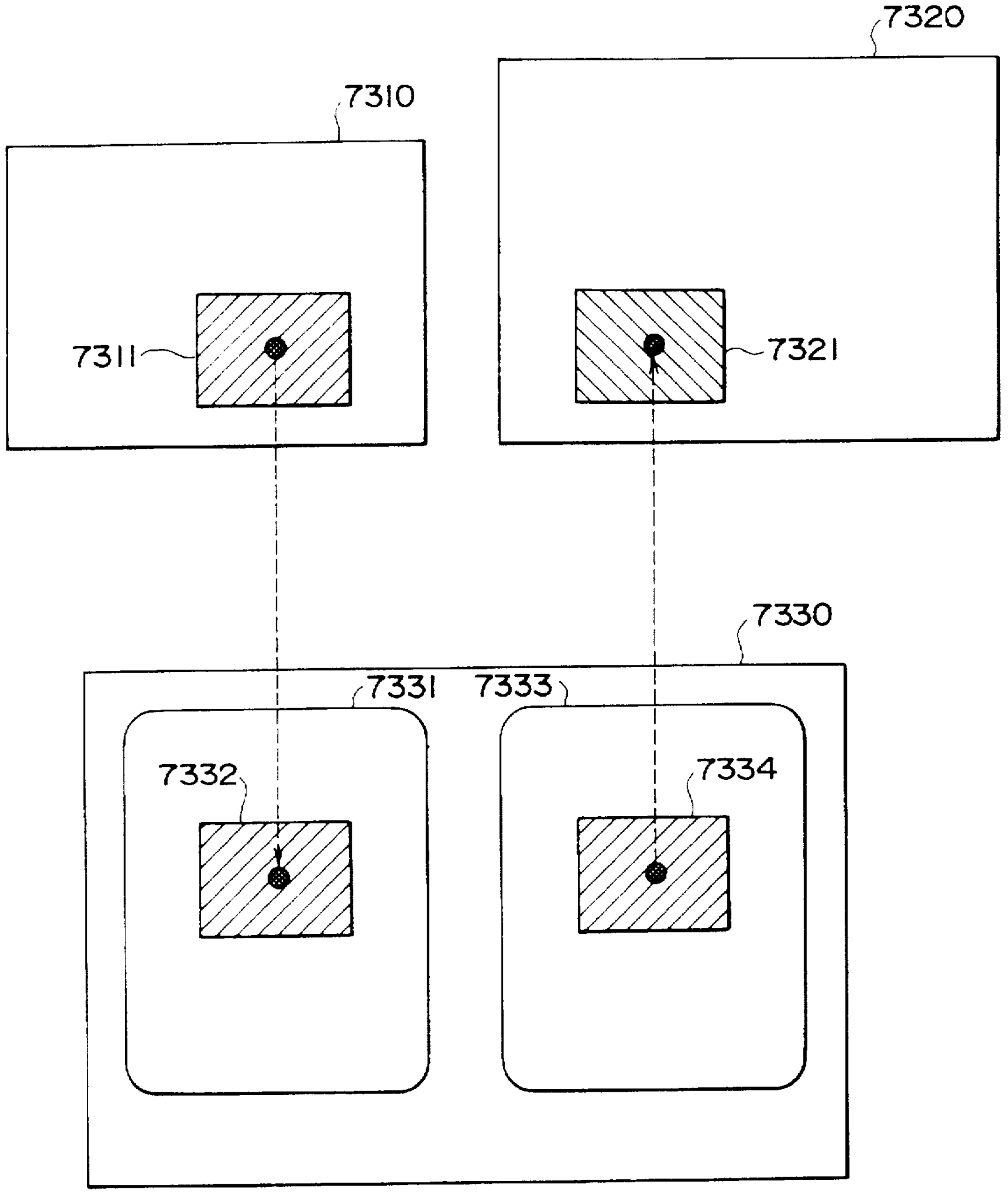
FIG. 79 is an illustration indicating the association relationship of a source window with a target window in accordance with an embodiment of the present invention.

FIG. 79 is an illustration for describing the association or link relationship of a source window and a target window. As shown in FIG. 79, reference numeral 7310 denotes a source window on which a start source anchor 7311 is pasted or superimposed and reference numeral 7320 denotes a target window on which a destination target anchor 7321 is pasted or superimposed.

Reference numeral 7330 denotes a link-establishing window consisting of a source anchor territory 7331 and a target anchor territory 7333. A destination source anchor 7332 is pasted or superimposed on the source anchor territory 7331 and a start target anchor 7334 is pasted or superimposed on the target anchor territory 7333.

The superimposing operation for these components can be implemented by executing the drag operation for the components with the mouse 110 in the manner as described with respect to FIG. 8.

After having implemented the superimposing operation in the manner as described hereinabove, the mouse 110 is positioned on the start source anchor 7311 of the source window 7310 and the left button **110*b* is clicked in such a state that the target window 7320 is closed, thereby allowing this click operation to be led to the destination target anchor 7321 of the target window 7320 through the link-establishing window 7330 and then opening the target window 7320**.

Figure 80:
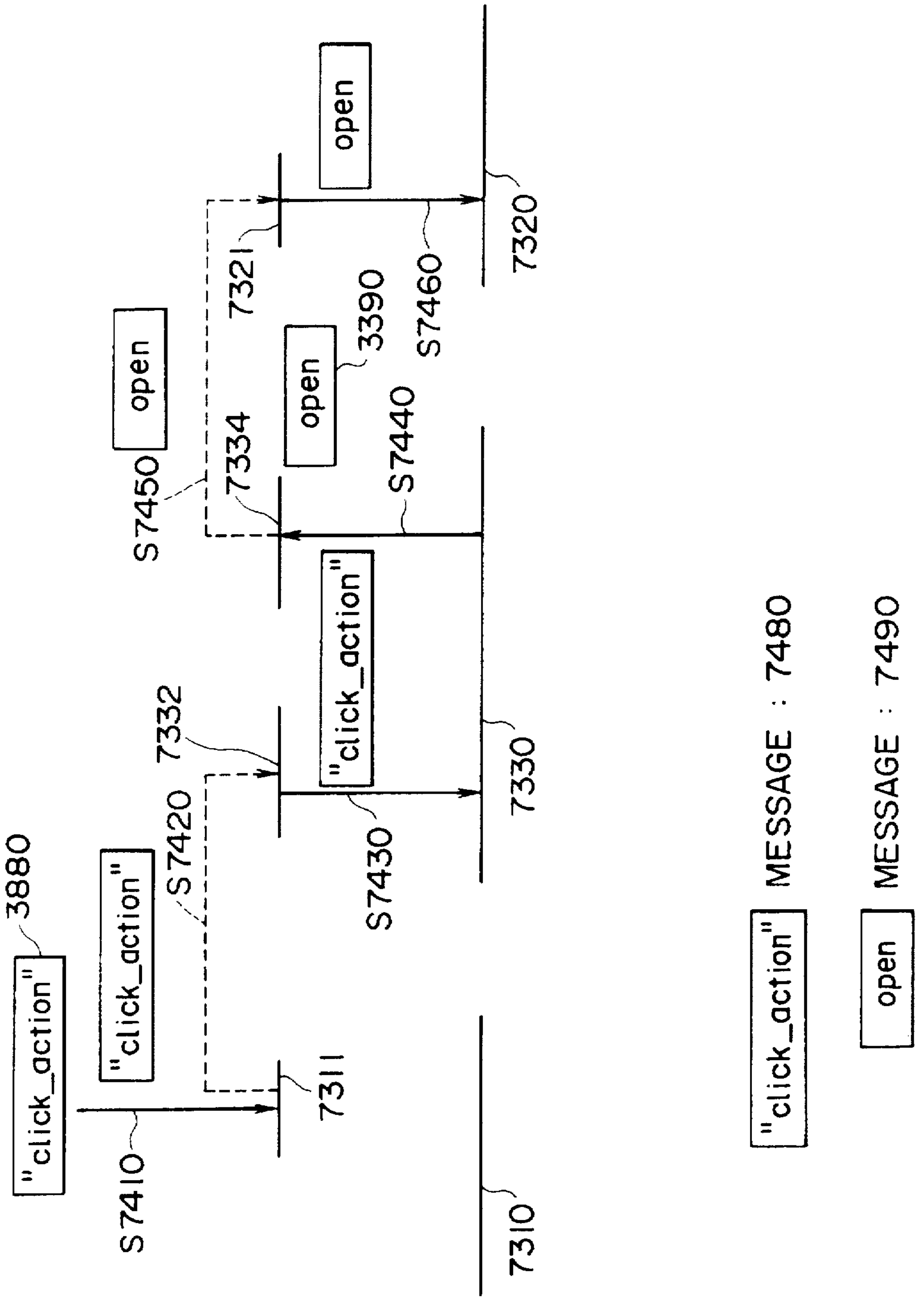
FIG. 80 is an illustration indicating the relationship in transmission of messages between each of the components in accordance with an embodiment of this invention.

FIG. 80 is an illustration describing the relationship in transmission of the messages among the components.

It is noted herein that, in this drawing, the messages are transmitted from or to as well as received by the view definition part 210 of each of the components.

As shown in FIG. 80, as the user clicks the start source anchor 7311, a message, "click_action" 3880, is sent to the view definition part 210 (as shown in FIG. 4) of the start source anchor 7311 through the window system 142 (S7410). Upon receipt of the click_action message 3880, the start source anchor 7311 transmits the click_action message 3880 to the corresponding destination source anchor 7332 (S7420).

When it has received the click_action message 3880, the destination source anchor 7332 transmits the message to a window placed thereunder (in this embodiment, the link-establishing window 7330) (S7430).

When the link-establishing window 7330 has received the click_action message 3880 from the destination source anchor 7332 as a window in its own source anchor territory 7331, it sends a message, open 3390, to the start target anchor 7334 as a window in its own target anchor territory 7333 (S7440).

Upon receipt of the open message 3390, the start target anchor 7334 transmits the open message 3390 to the corresponding destination target anchor 7321 (S7450).

When the open message 3390 has been received, the destination target anchor 7321 transmits the open message 3390 to a window placed thereunder (in this embodiment, the target window 7320) (S7460).

After it has received the open message 3390, the target window 7320 is opened.

Further, it can be noted that by inserting a variety of windows between the source window 7310 and the link-establishing window 7330, various conditions can be assigned or specified for opening the target window 7320.

Figure 81:
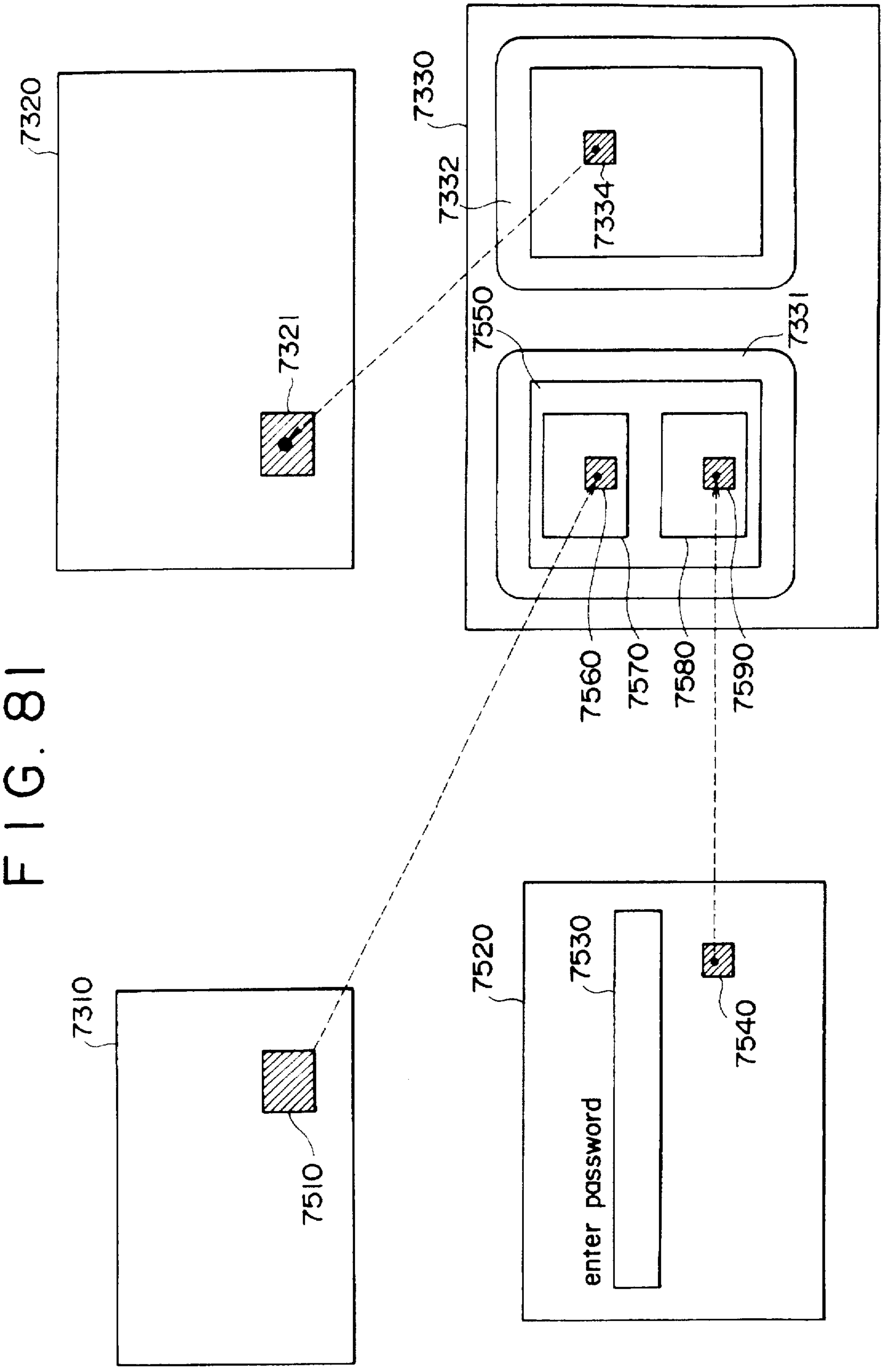
FIG. 81 is an illustration indicating an example of a link-establishing window in which a window for conditioning is interposed between a destination source anchor and a source anchor territory of the link-establishing window.

FIG. 81 is an illustration in which a window for conditioning is inserted into and between the destination source anchor and the source anchor territory of the link-establishing window.

In FIG. 81, there are utilized the source window 7310 and a password window 7520. This arrangement enables the target window 7320 to be opened only when the user inputs a particular password in the password window 7520 and when the user clicks a start source anchor (1) 7510 of the source window 7310.

In FIG. 81, first, the start source anchor (1) 7510 is superimposed on the source window 7310 and a start source anchor (2) 7540 is superimposed on the password window 7520.

It is noted herein that a dummy window (not shown) is superimposed on the start source anchor (2) 7540. This arrangement enables a click operation for the start source anchor (2) 7540 to be made inactive. In other words, even if the user clicks the start source anchor (2) 7540, the dummy window is actually clicked, preventing the start source anchor (2) 7540 from actually being clicked.

The password window 7520 is so arranged as to send the click_action message 3880 to a window superimposed thereon (in this embodiment, the start source anchor (2) 7540), when the user inputs the particular password in a password input territory 7530.

Then, an AND window 7550 is superimposed on the source anchor territory 7331 and a button "a" 7570 and a button "b" 7580 are in turn superimposed on the AND window 7550. Further, a destination source anchor (1) 7560 and a destination source anchor (2) 7590 are superimposed on the button "a" 7570 and the button "b" 7580, respectively.

The button "a" 7570 and the button "b" 7580 are provided with a value slot 610 and, upon receipt of the click_action message 3880, the slot value of the value slot 610 is changed to "1".

The value slot 610 for the button "a" 7570 and the button "b" 7580 is connected with two slots S1 and S2 (not shown) of the AND window 7550. When the values of the two slots S1 and S2 each become "1", the click_action message 3880 is sent to the link-establishing window 7330 as a parent window placed thereunder.

It is to be noted herein that the AND window 7550 is arranged in order to send the click_action message 3880 to the window placed thereunder only when the click message 3880 has been received from all the destination source anchors 7560 and 7590, each being superimposed thereon.

Therefore, as shown in FIG. 81, the embodiment of this invention enables the target window 7320 to be opened only when the user inputs the right password and clicks the start source anchor (1) 7510.

Figure 82:
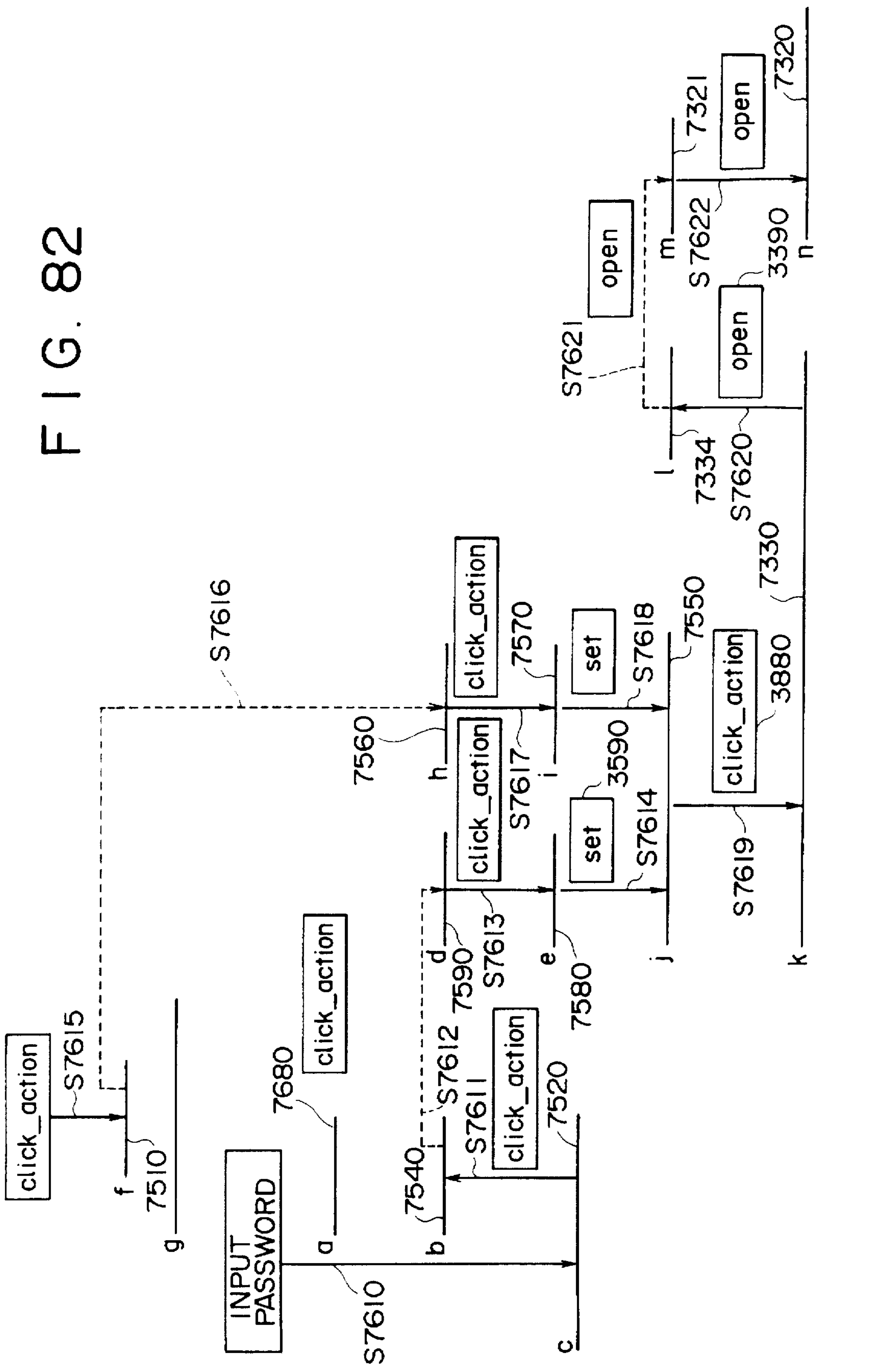
FIG. 82 is an illustration indicating the transmission relationship in transmitting the messages as shown in FIG. 75.

FIG. 82 is an illustration indicating the relationship in transmission of the messages as shown in FIG. 81.

In FIG. 82, first, the user inputs the password (in reality, when the user inputs one character, the password window 7520 receives a message, key_in_action, through the window system 142) (S7610).

When the user inputs the right password, the password window 7520 sends the click_action message 3880 to the window superimposed thereon (in this embodiment, the start source anchor (2) 7540) (S7611). Upon receipt of the click_action message 3880, the start source anchor (2) 7540 transmits the click_action message 3880 to the destination source anchor (2) 7590 (S7612).

The destination source anchor (2) 7590 to which the click_action message 3880 has been transmitted from the start source anchor (2) 7540 further transmits the click_action message 3880 to a component placed thereunder (in this embodiment, the button "b" 7580) (S7613).

When it has received the click_action message 3880, the button "a" 7570 sets the value of its own value slot 610 to "1" and the value slot 610 sends a message, set 3590, to the slot S1 (not shown) of the AND window 7550 to which it is connected. More specifically, there is sent a message, set ("S1", 1), stating "Set a value of slot "S1" to "1"". Upon receipt of the set message 3590, the value of the slot S1 of the AND window 7550 is set to "1" (S7614).

When the start source anchor (1) 7510 is clicked in this state (S7615), the click_action message 3880 is sent to the corresponding destination source anchor (1) 7560 (S7616).

Upon receipt of the click_action message 3880, the destination source anchor (1) 7560 transmits the click message 3880 to the window placed thereunder (in this embodiment, the button "a" 7570) (S7617).

When it has received the click_action message 3880, the button "a" 7570 then sets the value of its own value slot 610 to "1". Then, the value slot 610 sends the set message 3590 (more specifically, a message, set ("S2", 1), stating "Set the slot value of slot "S2" to "1"") to the slot S2 of the AND window 7550. Thus, the slot value of the slot S2 of the AND window 7550 is set to "1" (S7618).

By setting both of the slot values of the two slots of the AND window 7550 to "1", the click_action message 3880 is then sent to the link-establishing window 7330 as a parent window (S7619).

When it has received the click_action message 3880 from the AND window 7550 in its own source anchor territory 7331, the link-establishing window 7330 sends the open message 3390 to the start target anchor 7334 in its own target anchor territory 7332 (S7620).

Upon receipt of the open message 3390, the start target anchor 7334 transmits the open message 3390 to the corresponding destination target anchor 7321 (S7621).

Then, the destination target anchor 7321 which has received the open message 3390 transmits the open message 3390 to the target window 7320 placed thereunder (S7622).

Upon receipt of the open message 3390, the target window 7320 is allowed to open.

It is to be noted herein that reference numeral 7680 denotes a dummy window that makes the click operation inactive even if the user clicks the start source anchor (2) 7540.

Figure 83:
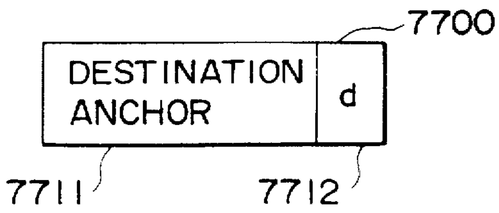
FIG. 83 is an illustration indicating an internal table of a start anchor according to an embodiment of the invention.

FIG. 83 is an illustration indicating an internal table of a start anchor. A start anchor table 7700 comprises a name of a destination anchor, as indicated by reference numeral 7711, to which various messages are to be transmitted and its address as indicated by reference numeral 7712.

Figure 84A:
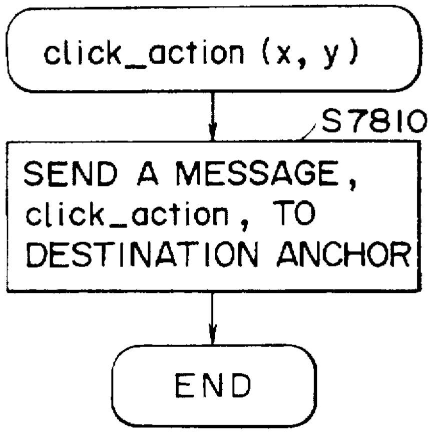
FIGS. 84(A) and 84(B) are each a flow chart showing a series of process steps to be performed when the start anchor has received a message.
Figure 84B:
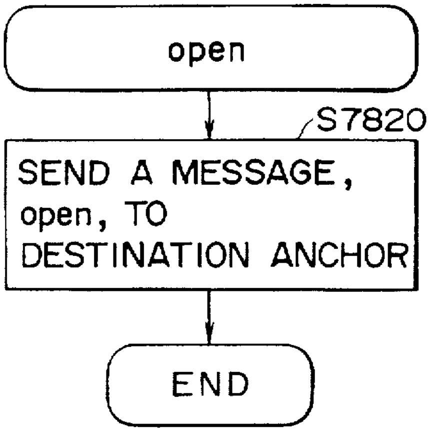

FIGS. 84(A) and 84(B) are each a flow chart showing a series of process steps to be performed when the start anchor has received messages. As shown in FIG. 84(A), when the start anchor has received the click message 3880, it transmits the click_action message 3880 to a transmission destination (in this embodiment, a destination anchor described in the table 7700) (S7810).

Referring to FIG. 84(B), when the start anchor has received the open message 3390, it transmits the open message 3390 to a transmission destination (in this embodiment, a destination anchor described in the table 7700) (S7820).

Figure 85:
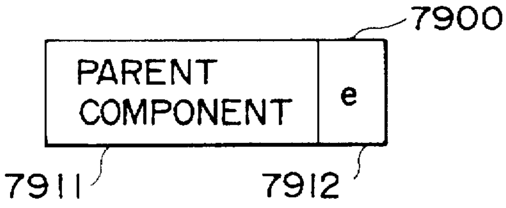
FIG. 85 is an illustration indicating an internal table of a destination anchor according to an embodiment of the invention.

FIG. 85 is an illustration indicating an internal table of a destination anchor. A table 7900 of the destination anchor comprises a name of a parent component, as indicated by reference numeral 7911, to which various messages are to be transmitted and its address as indicated by reference numeral 7912.

Figure 86A:
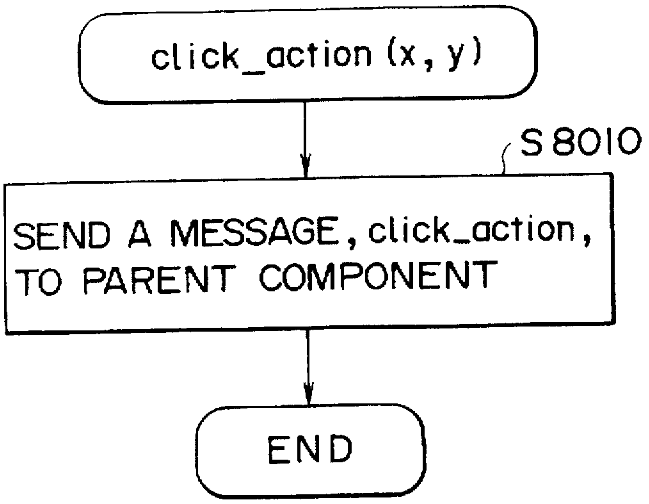
FIGS. 86(A) and 86(B) are each a flow chart showing a series of process steps to be performed when the destination anchor has received a message.
Figure 86B:
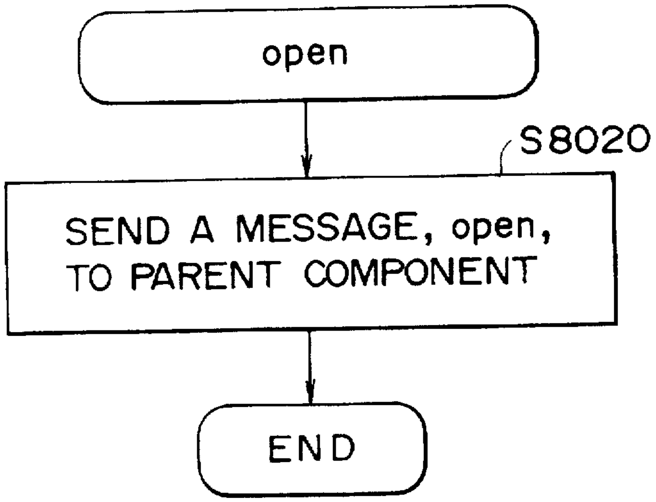

FIGS. 86(A) and 86(B) are each a flow chart showing a series of process steps to be performed when the destination anchor has received messages. As shown in FIG. 86(A), when the destination anchor has received the click action message 3880, it transmits the click_action message 3880 to a transmission destination (in this embodiment, the parent component described in the table 7900) (S8010).

Referring to FIG. 86(B), when the destination anchor has received the open message 3390, it transmits the open message 3390 to a transmission destination (in this embodiment, the parent component described in the table 7900) (S8020).

Figure 87:
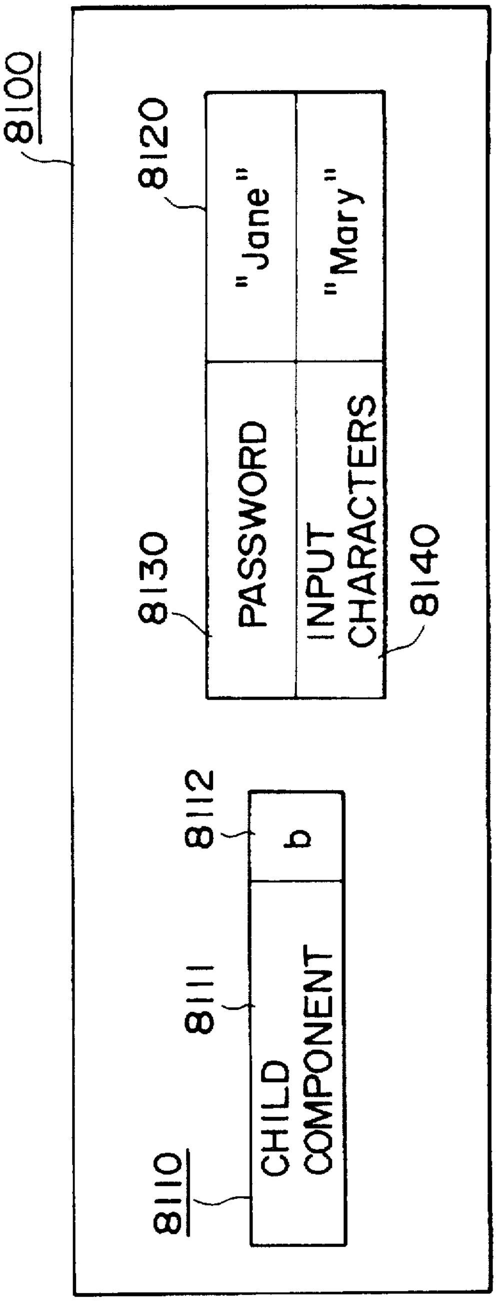
FIG. 87 is an illustration indicating an internal table of a password component according to an embodiment of the invention.

FIG. 87 is an illustration indicating an internal table of a password window. A password window 8100 comprises a parent-child table 8110 and a password table 8120. The password table 8120 holds a territory for an input character string 8140 input by the user. The parent-child table 8110 holds a territory for an address 8112 for a child component.

Figure 88:
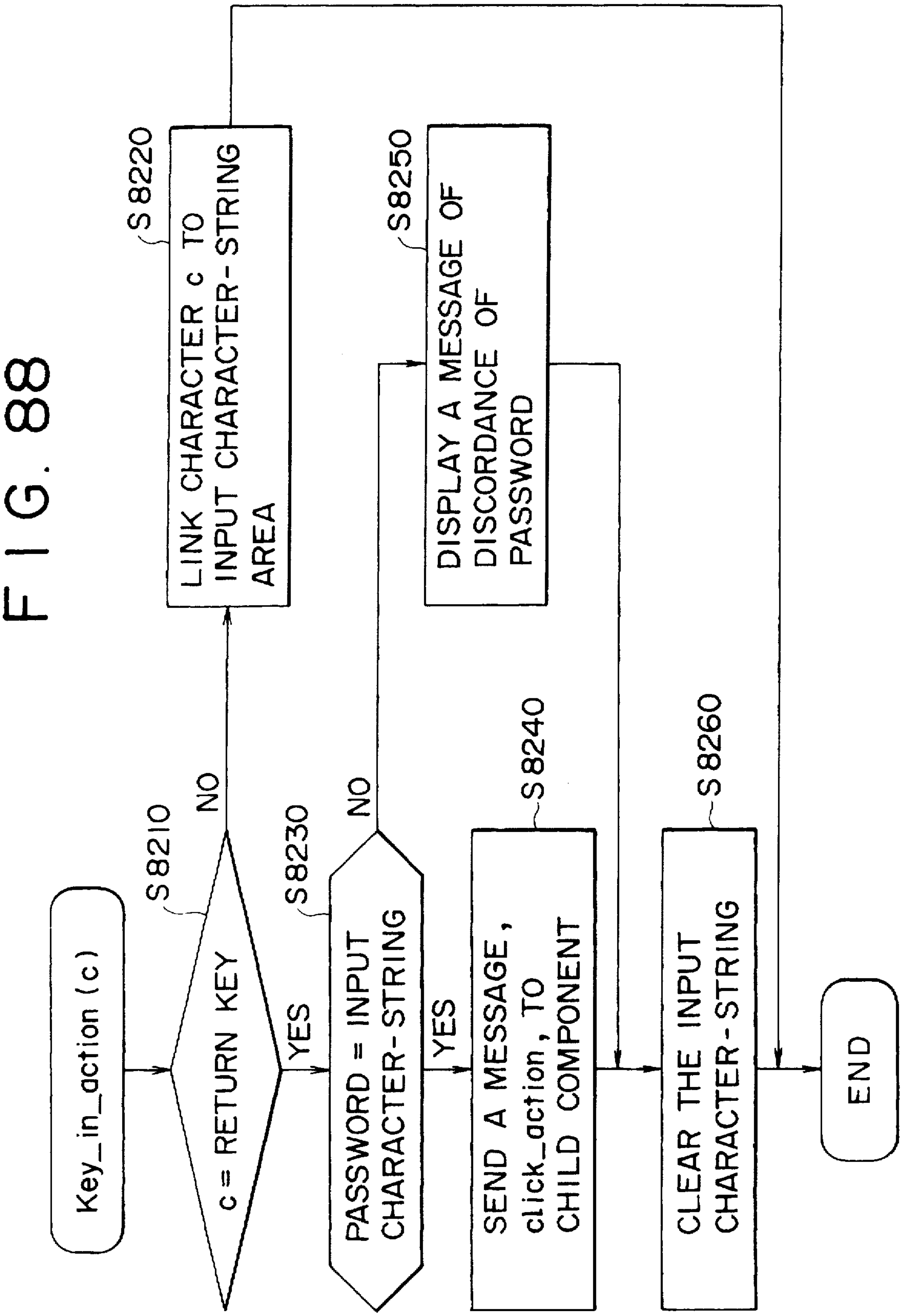
FIG. 88 is a flow chart showing a series of process steps to be performed when a password window has received a message, key_in_action.

FIG. 88 is a flow chart showing a series of process steps to be performed when the password window has received the key_in_action message.

As shown in FIG. 88, whenever the user inputs one character, the view definition part 210 of the password window 7520 receives the key_in_action message through the window system 142. First, it is decided to determine if an input character "c" is a message, "return key" (S8210). If it is decided that the input character "c" means the "return key" message (S8210: Yes), the character "c" is linked to the area of the input characters-string 8140 (S8220), followed by the end of the process.

On the other hand, if it is decided that the input character "c" does not mean the "return key" message (S8210: No), it is further decided to determine if the input character coincides with the password (S8230). If it is decided that the input character agrees with the password (S8230: Yes), then the click_action message 3880 is sent to the child component (S8240).

If it is decided that the input character does not agree with the password (S8230: No), then a message of discordance of the message is displayed (S8250).

Then, finally, the area of the input characters-string 8140 is cleared for the next input that follows (S8260).

FIGS. 89(A) and 89(B) are a slot table and an internal table of a button component, respectively. In FIG. 89(A), a slot table 222 comprises a slot name, as indicated by reference numeral 223, and a slot value, as indicated by reference numeral 224, as described hereinabove with respect to FIG. 7. The slot connection table 225 comprises an own slot as indicated by reference numeral 226, a parent slot as indicated by reference numeral 227, a set area as indicated by reference numeral 228, a gime area as indicated by reference numeral 229, and an update area as indicated by reference numeral 230. The button 157 has a value slot as indicated by reference numeral 610.

In this case, the slot value 224 of the value slot of the slot table 322 is set to "0", as indicated by reference numeral 8320. Further, in the slot connection table 225, the slot name of the parent slot 227 is set to "S1", as indicated by reference numeral 8330.

Figure 90:
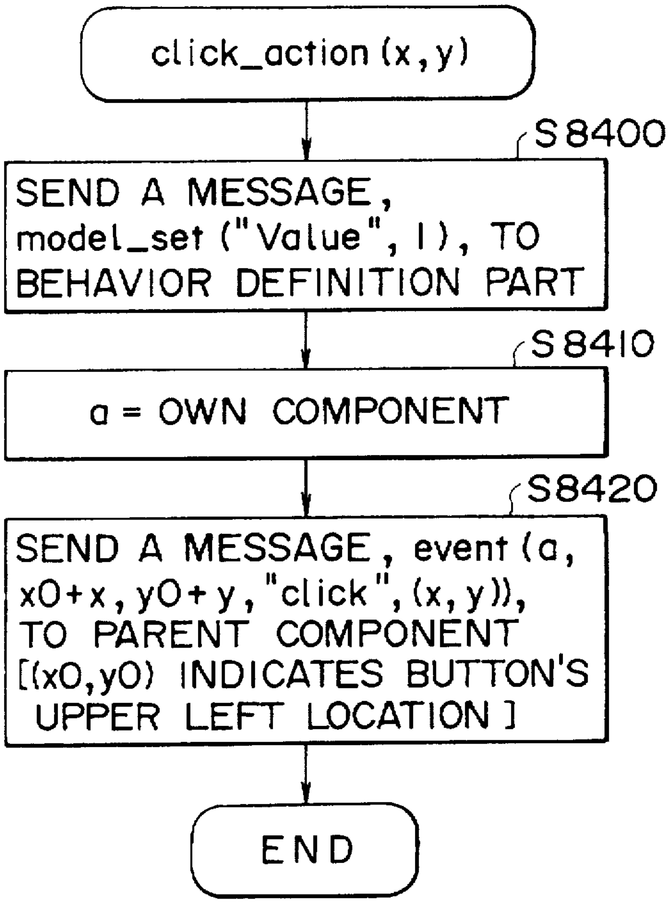
FIG. 90 is a flow chart showing a series of process steps to be performed when the button component has received a message, click_action.

FIG. 90 is a flow chart showing a series of process steps to be performed when the button component has received the click_action message. A further description will be omitted because the processes are to be executed in substantially the same manner as in FIG. 30(A).

FIGS. 91(A) through 91(C) are each a table of an AND component. FIG. 91(A) shows a parent-child table 214 which in turn comprises an area for storing a parent component 215 and a child component 217.

As shown in FIG. 91(B), a slot table 222 is given, which comprises the slot name 223 and the slot value 224. The slot connection table 225 of FIG. 91(C) comprises the own slot 116, the parent slot 227, the set area 228, the gime area 229 and the update area 230. It can be noted herein that the AND window 7550 has two slots S1 8520 and S2 8530.

Figure 92:
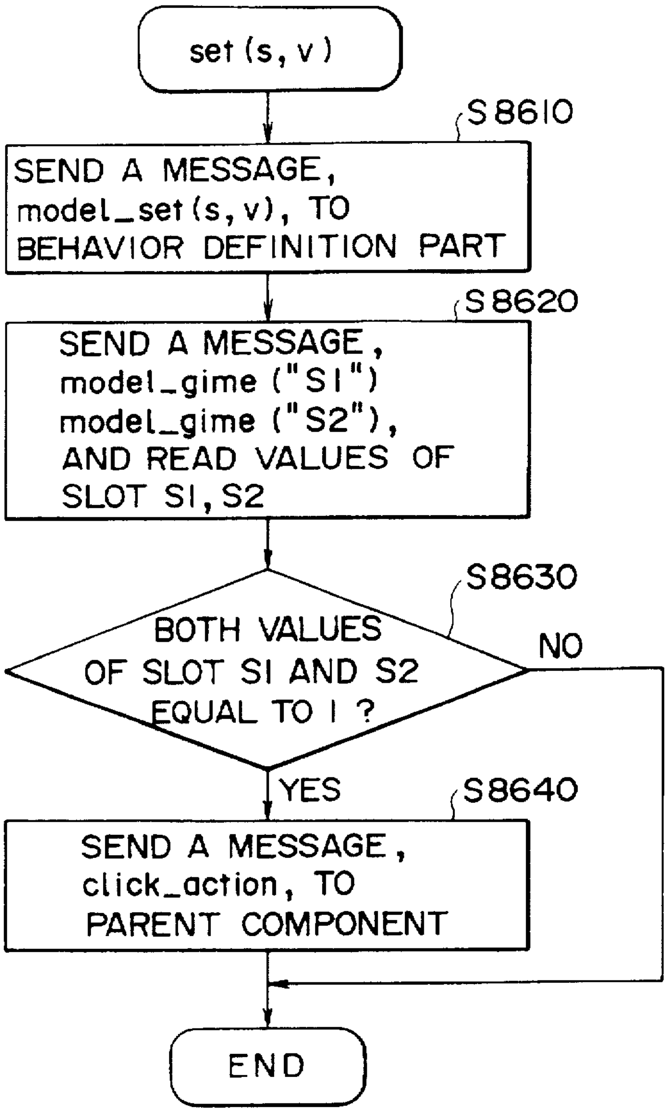
FIG. 92 is a flow chart showing a series of process steps to be performed when the AND component has received a message, set.

FIG. 92 is a flow chart showing a series of process steps to be performed when the AND window has received the set message. As shown in FIG. 92, when it has received the set (s, v) message, the AND window 7550 sends to the behavior definition part 220 a message, model_set (s, v), and changes the slot value 224 (S8610). Further, messages, model_gime ("S1") and model_gime ("S2") are sent to the behavior definition part 220, thereby reading the slot values of the slot S1 8520 and the slot S2 8530 (S8620), followed by a decision to be made to determine if both of the slot values of the slot "S1" 8520 and the slot "S2" 8530 are set each to "1" (S8630). When it is decided that both of the slot values are set each to "1" (S8630: Yes), the click_action message 3880 is sent to the parent component (in this embodiment, the link-establishing window 7330) (S8640). On the other hand, if it is decided that either or both of the slot values are not set to "1" (S8630: No), then the process is allowed to end.

Figure 93:
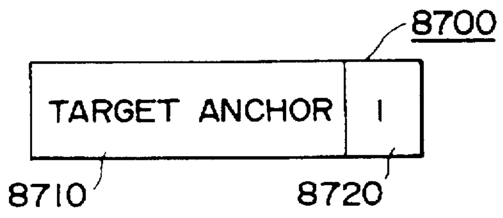
FIG. 93 is a table indicating an internal table of a link-establishing connection component in accordance with an embodiment of the invention.

FIG. 93 shows a slot table of a link-establishing window. The link-establishing window 7330 stores an address 8720 of a target anchor, a transmission destination to which messages are transmitted.

Figure 94:
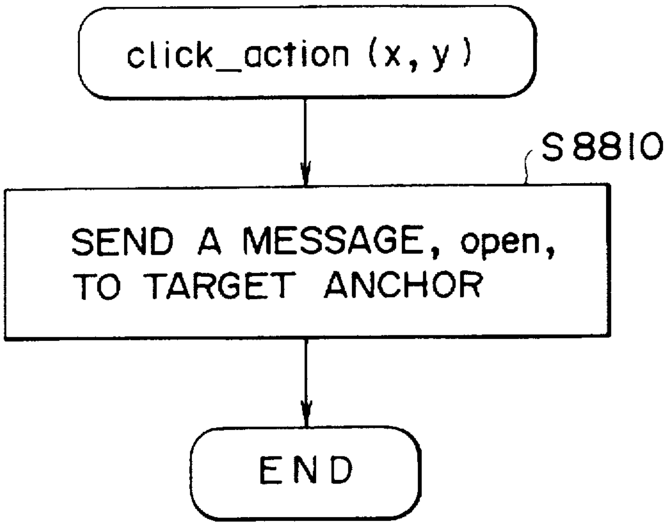
FIG. 94 is a flow chart showing a series of process steps to be performed when the link-establishing connection component has received a message, click_action.

FIG. 94 is a flow chart showing a series of process steps to be performed when the link-establishing window 7330 has received the click_action message. When it has received the click_action (x, y) message, the link-establishing window 7330 sends the open message 3390 to the target anchor (S8810).

Figure 95:
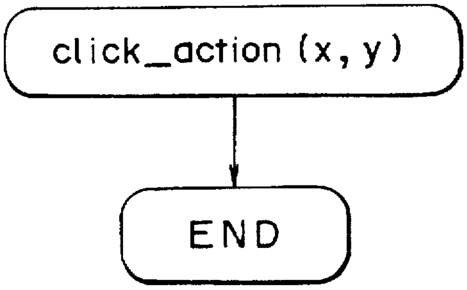
FIG. 95 is a flow chart describing a process by a dummy component according to an embodiment of the invention.

FIG. 95 is a flow chart describing the process of a dummy component. The dummy component cannot execute any process even if the click_action message 3880 has been received.

It can be noted herein that the present invention enables the various components displayed on the display screen to be provided with a condition by a hyperlink by executing the processes by a pasting or superimposing operation in accordance with the component program for each component, and that general users can readily provide the various components with a condition by such a hyperlink in the manner as described hereinabove.

It should further be noted herein that, although this invention is described with reference to the "AND window", this invention is not restricted to that component, and it should be understood that the conditioning can be implemented by various logical circuits or by pasting or superimposing various components displayed on the display screen.

Next, a description will be made of the method for describing a script (words) of the object-oriented component.

Figure 96A:
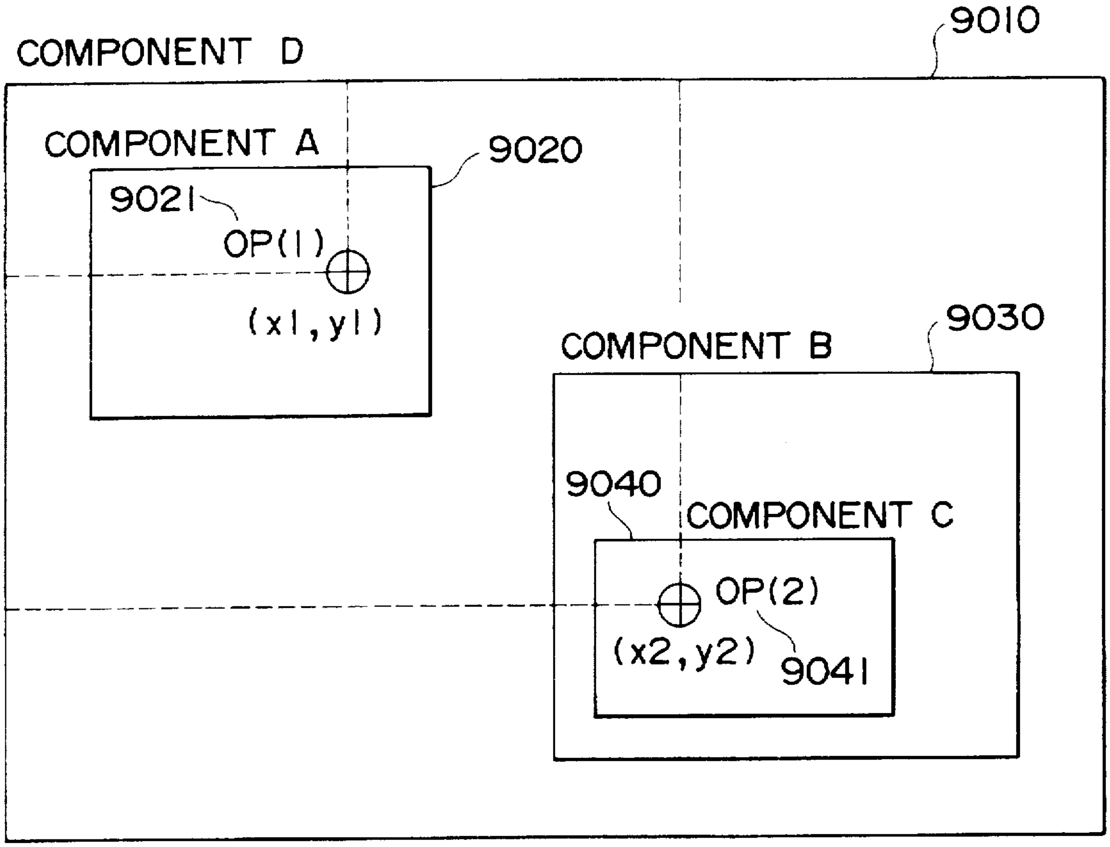
FIGS. 96(A) and 96(B) are illustrations for describing the relationship of the components with a script.
Figure 96B:
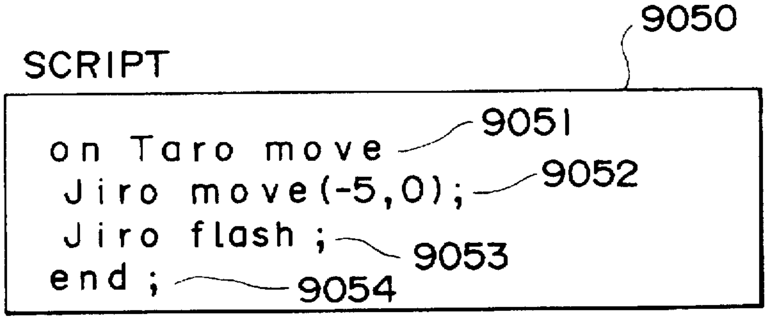

FIGS. 96(A) and 96(B) are illustrations for describing the relationship of each of the components with a script on the display screen. In FIG. 96(A), a component A 9020 is superimposed as a window on a component D 9010. Further, a component B 9030 is superimposed on the component D 9010 and a component C 9040 is in turn superimposed as a window on the component B 9030. An OP(1) 9021 and an OP(2) 9041 each represent an operation point indicated by the user.

FIG. 96(B) shows a script 9050 which is described as follows:

on <Role Name: Taro> <Event Name: move> 9051

<Role Name: Jiro> <Command: move (−5, 0)> 9052

<Role Name: Jiro> <Command: flash> 9053 end 9054

In FIG. 96(B), a pair of the second line stating: <Role Name: Jiro> <Command: move (−5, 0)> 9052, with the third line, stating: <Role Name: Jiro> <Command: flash> 9053, is called a "statement".

Further, the portion starting with "on" and terminating with "end" is called an "on unit". Hence, the script 9050 is a series of on units.

Before the execution of the script 9050, the user indicates the correspondence between a role name and an operation point. For example, a prompt for specifying operation points from the user is displayed on the screen and the user indicates an operation point corresponding to the role name "Taro" by clicking the mouse 110 in an appropriate position on the display screen. This task makes the position to correspond to the role name "Taro" in the script 9050.

In this embodiment, for example, the role name "Taro" is caused to correspond to the OP(1) 9021 and the role name "Jiro" is caused to correspond to the OP(2) 9041.

In FIG. 96(B), the script 9050 expresses the meanings as follows:

on <Role Name: Taro> <Event Name: move> 9051

If the component A 9020 in the operation point (in this embodiment, the OP(1) 9021) corresponding to the role name "Taro" is subjected to an operation, "move";

<Role Name: Jiro> <Command: move (−5, 0)> 9052 then the component C 9040 in the operation point (in this embodiment, the OP(2) 9041) corresponding to the role name "Jiro" is caused to "move" to the left by "5"; and <Role Name: Jiro> <Command: flash> 9053 end 9054 then "flash" the component (component C) in the operation point (the OP(2) 9041) corresponding to the role name "Jiro" and allow the process to end.

Figure 97:
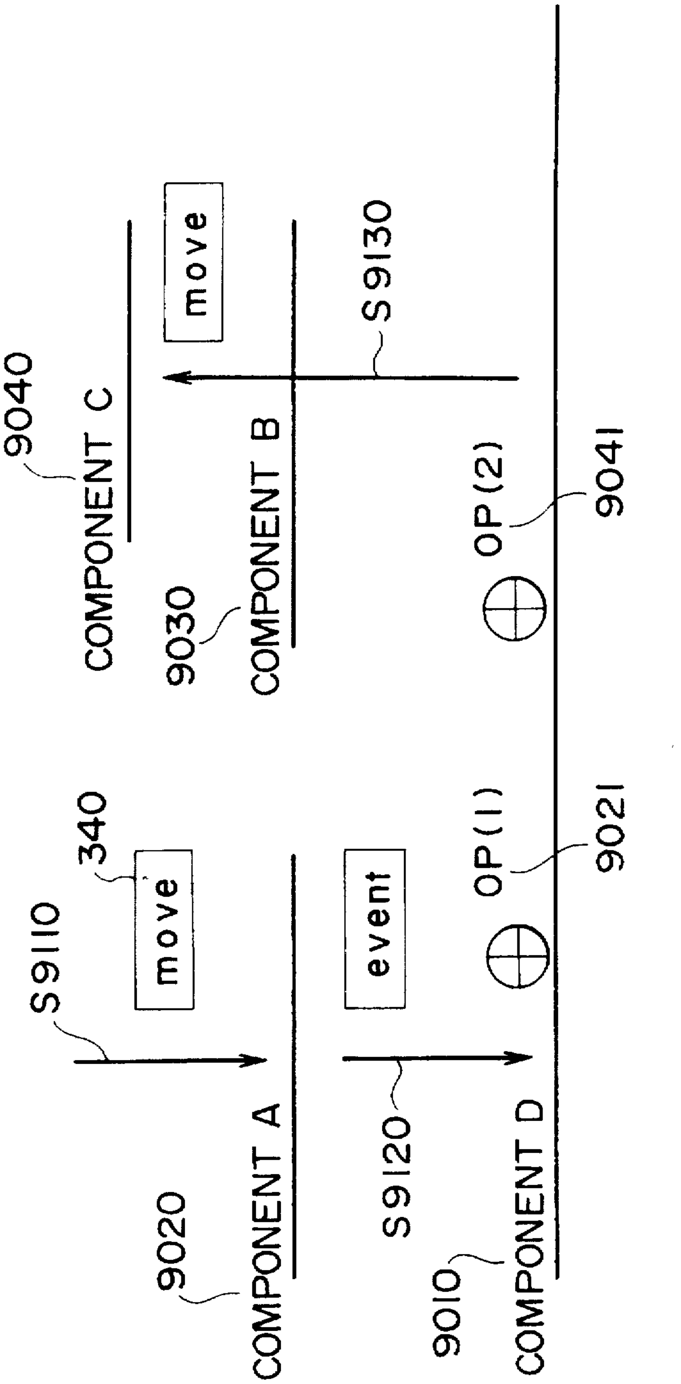
FIG. 97 is an illustration indicating the transmission relationship in transmitting messages among the components according to an embodiment of the invention.

FIG. 97 is an illustration for describing the method for realizing the script. FIG. 97 shows a side view of the superimposed structure of the components of FIG. 96, in which the OP(1) 9021 and the OP(2) 9041 are indicated in the positions in which the component A 9020 and the component C 9040 exist on the component D 9010, respectively.

In FIG. 97, first, when the user moves the component A 9020, the move (x, y) message 340 is sent from the component management kernel program 144 to the component A 9020 (S9110). In this message, reference to (x, y) means an amount of moving (offset). The component A 9020 then sends to the parent component (in this embodiment, the component D 9010) a message, event (a, mx, my, "move", (x, y)), indicative of the occurrence of an event (in which reference to "a" means an address of the component A, reference to (mx, my) means the location of the mouse 110 at the time of the start of the move operation) (S9120). This message allows the component A 9020 to give the notice of the execution of the move operation to the parent component D 9010.

Upon receipt of the event (a, mx, my, "move", (x, y)) message, the component D 9010 detects the existence of the component A 9020 in the operation point PO(1) 9021. As the operation point OP(1) 9021 corresponds to the role name "Taro", this agrees with the line stating "on Taro move 9051", so described in the script 9050 of FIG. 96(B), followed by the execution of the next lines of the statement, stating "Jiro move (−5, 0) 9052" and "Jiro flash 9053" (S9130), and by the end of the process.

In other words, the messages, move (−5, 0) and flash, are sent to the component existing in the uppermost position of the operation point OP(2) 9041 corresponding to the role name "Jiro".

Figures 98A, 98B:
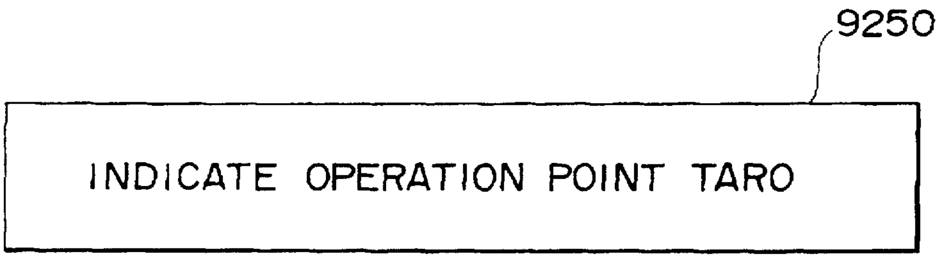
FIGS. 98(A) and 98(B) are examples of an operation points list and of a message of a prompt for specifying operation points, respectively.

FIG. 98(A) shows an operation points list 9240 which describes an operation point 9241, role name 9242 and location 9243.

FIG. 98(B) shows an example of messages 9250, indicating a prompt for specifying the operation points. Such a message can be displayed on the display screen in order to call upon the user to perform an indication.

Figure 99:
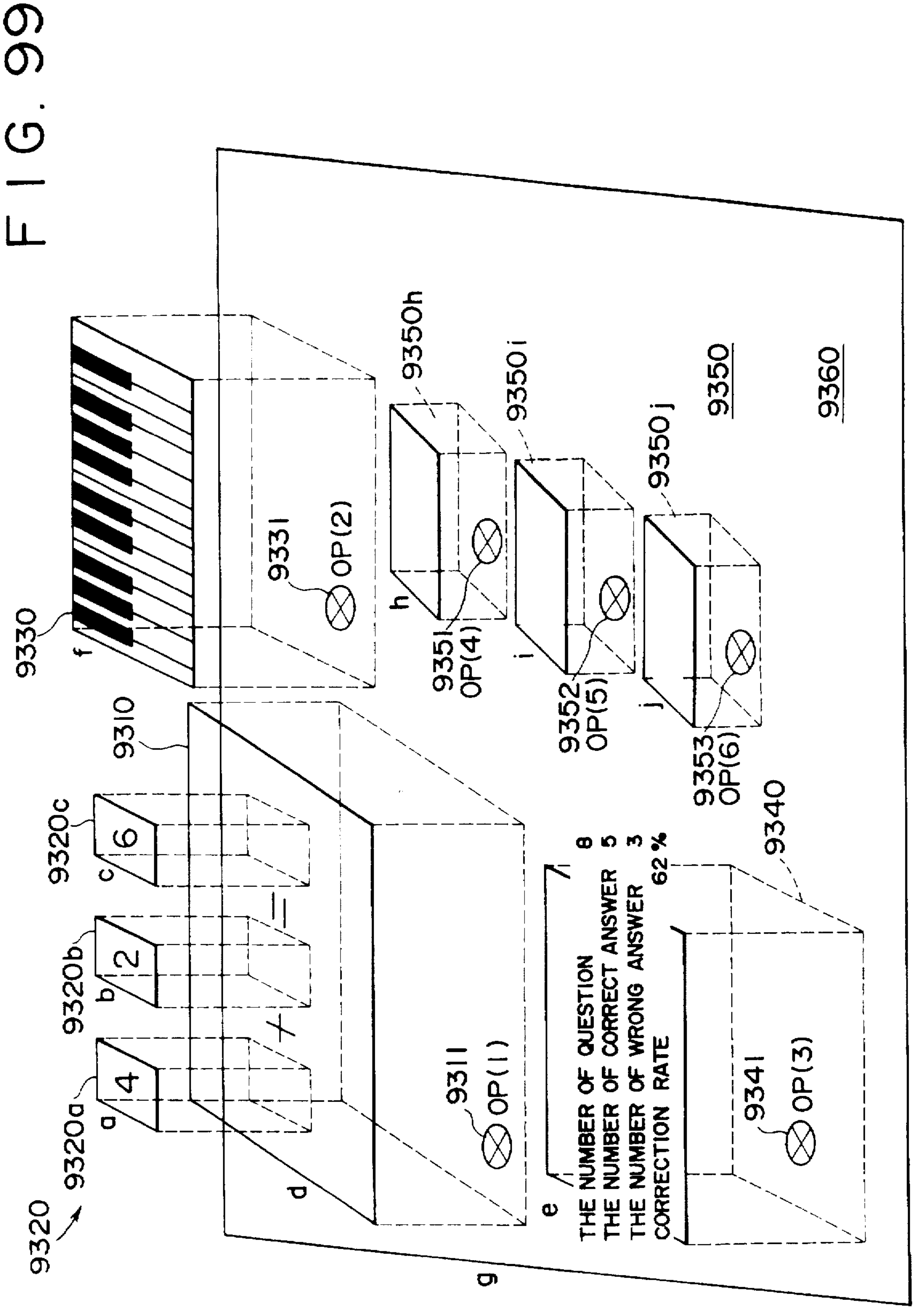
FIG. 99 is an illustration indicating the configuration of a CAI tool according to an embodiment of the invention.

FIG. 99 is an illustration indicating an example of a CAI (Computer Assisted Instruction) tool, which is configured by the application of this invention. In this embodiment, the tool is so arranged as to automatically make correct/wrong decisions for answers to questions and display the number of correct answers and the number of wrong answers. Further, it is so arranged as to produce and send an appropriate melody when each of the processes starts, each of the correct answers is given and each of the wrong answers is given, in order to attract the user's attention.

A series of procedures from the start of giving questions to the end is described in the script. Further, an appropriate melody can be described in the script.

As shown in FIG. 99, the component existing at the bottom is a script component 9360 for describing the script. On the script component 9360 there are superimposed an arithmetic text component 9310 for giving questions, an organ component 9330 for playing a melody, a table type total component 9340 for totaling the results, and a button component 9350.

In FIG. 99, a numeric value input/output component 9320 (9320*a*, 9320*b* and 9320*c*) is further superimposed on the arithmetic text component "d" 9310.

The button component 9350 has a bar meter component 9350*h* for the start, a bar meter component 9350*i* for displaying correct answers and a bar meter component for the total superimposed in this order, and operation points OP(4) 9351, OP(5) 9352 and OP(6) 9353 exist on the script component "g" 9360, respectively.

Further, operation points OP(1) 9311 for the arithmetic text component 9310, OP(2) 9331 for the organ component 9330 and OP(3) 9341 for the table type total component 9340 exist on the script component 9360.

The CAI tool of FIG. 99 starts its execution by clicking the bar meter component 9350*h* for the start. A melody is played by and given from the organ component 9330 at the time of the start of execution.

At the time of the end of the melody, a value is input to the numeric value input output component 9320 (9320*a*, 9320*b* and 9320*c*) in order to become "a+b=c".

When the value has been input to the numeric value input output component 9320, a decision is made to determine if the sum of "a+b" becomes "c", and an appropriate melody is given in both cases, whether the sum is correct or wrong.

When the user clicks the button 9350 for the total, there are displayed the number of questions, the number of correct answers, the number of wrong answers and success rates.

FIG. 100 shows an example of the script of the CAI tool. The script 9410 of FIG. 100 is described in the script component 9360.

In FIG. 100, the description on the first line 9411 causes the role name "Start Button" to correspond to the button component 9350*h* for the start. When the button component 9350*h* is clicked, this on unit is executed.

In the description from the second line 9412 to the fourth line 3614, the role name "Melody" is caused to correspond to the organ component 9330. When a message, set ("Sound", "do"), is sent to the organ component 9330, it outputs tones, each being indicated by the second parameter, so as to agree with each of the components. In this line, the organ component 9330 outputs the sound "do" of the musical scale, having an organ-like tone. Likewise, the descriptions on the third line 9413 and on the fourth line 9414 allow the sounds "re" and "mi" of the musical scale to be output, respectively.

The melody for the start of execution is played on the basis of the descriptions from the first line 9411 to the fourth line 9414.

The description on the fifth line 9415 allows the role name "Problem" to correspond to the arithmetic text component 9310 as the component for giving questions. When a message, set ("Reset", Null), is sent to the arithmetic text component 9310 on the basis of the description on the fifth line 9415, the arithmetic text component 9310 allows the necessary processes to start.

Likewise, the description on the sixth line 9416 allows the role name "Summary" to correspond to the table type total component 9340. When a message, set ("Reset", Null), is sent to the table type total component 9340 on the basis of the description on the sixth line 9416, the table type total component 9340 allows the necessary processes to start and the necessary initialization processes to quit on the basis of the description on the seventh line 9417.

Further, the description on the eighth line 9418 allows the role name "Answer Button" to correspond to the button component 9350*i* for displaying correct answers. When the button component 9350*i* is clicked, the on unit from the eighth line 9418 to the tenth line 9420 is executed.

More specifically, when a message, set ("Answer", Null), is sent to the arithmetic text component 9310, it receives the message and displays correct answers on the basis of the description on the ninth line 9419.

By the description on the tenth line 9420, the role name "Summary Button" is allowed to correspond to the button component 9350*j* for the total. When the button component 9350*j* is clicked, the on unit from the tenth line 9420 to the thirteenth line 9423 is executed.

More specifically, when a message, set ("Display", Null), is sent to the table type total component 9340, it receives the message and displays the results of the total, such as the number of correct answers, the number of wrong answers, and so on, on the basis of the description on the twelfth line 9422.

When a solver gives a correct answer, the arithmetic text component 9310 gives to the script component 9360 the notice of a "correct" event on the basis of the description on the fourteenth line 9424. When it has received the notice of the event, the script component 9360 executes the on unit from the fifteenth line 9425 to the nineteenth line 9429.

More specifically, when a message, set ("Correct", 1), is sent to the arithmetic text component 9310, it adds an increment "1" to the number of correct answers on the basis of the description on the fifteenth line 9425. Further, a melody for playing at the time of correct answers is played with the organ component 9330 on the basis of the description from the sixteenth line 9426 to the nineteenth line 9429.

Further, when a solver gives a wrong answer, the arithmetic text component 9310 gives to the script component 9360 the notice of a "wrong" event on the basis of the description on the twentieth line 9430. When it has received the notice of the event, the script component 9360 executes the on unit from the twenty-first line 9431 to the twenty-fifth line 9435.

More specifically, when a message, set ("Wrong", 1), is sent to the arithmetic text component 9310, it adds an increment "1" to the number of wrong answers on the basis of the description on the twenty-first line 9431. Further, a melody for playing at the time of wrong answers is played from the organ component 9330 on the basis of the description from the twenty-second line 9432 to the twenty-fifth line 9435.

It is further to be noted herein that in this embodiment of the present invention, as the script is allowed to correspond to each of the components with the aid of the role name, a series of the procedures can also be independent from these components.

Therefore, even when the component used in this embodiment is replaced with another component by a superimposing operation, the description of the script component 9360 can be utilized as it is—in other words, the script 9410 can be used intact.

FIGS. 101(A), 101(B) and 101(C) are illustrations indicating an example of an exchange component. FIG. 101(A) shows a place text component 9510 that can be utilized in order to make a decision to determine if an input of a city name is correct. FIG. 101(B) shows a guitar component 9520 that can give guitar-like sounds, in place of the organ component 9330, for producing guitar-like sounds at the time when correct or wrong answers are given. Further, FIG. 101(C) shows a graph form total component 9530 that can be utilized, in place of the character-string input/output component 9340, so as to display the number of correct answers and/or the number of wrong answers in a graph form.

As shown in FIG. 101(A), a character-string input output component 9540 is superimposed on the place text component 9510. The character-string input output component 9540 comprises, for example, city name components having city names "Sapporo" 9541, "Yokohama" 9542 and "Fukuoka" 9543.

FIG. 102 is an operation points list table of the script component. In FIG. 102, an operation points list table 9610 of the script component 9360 comprises a column "Operation Point" 9611, a column "Role Name" 9612 and a column "Location" 9613. The operation points 9612 can be allowed to correspond to the operation point 9611 on the basis of the operation points list table 9610. In the table, the column "Locations" 9613 stores the locations of the operation points 9611 indicated by the user.

Further, in the column "Operation Points" 9611, the operation points for the components, such as OP(1) 9311 through OP(6) 9353, are stored.

Figure 103A:
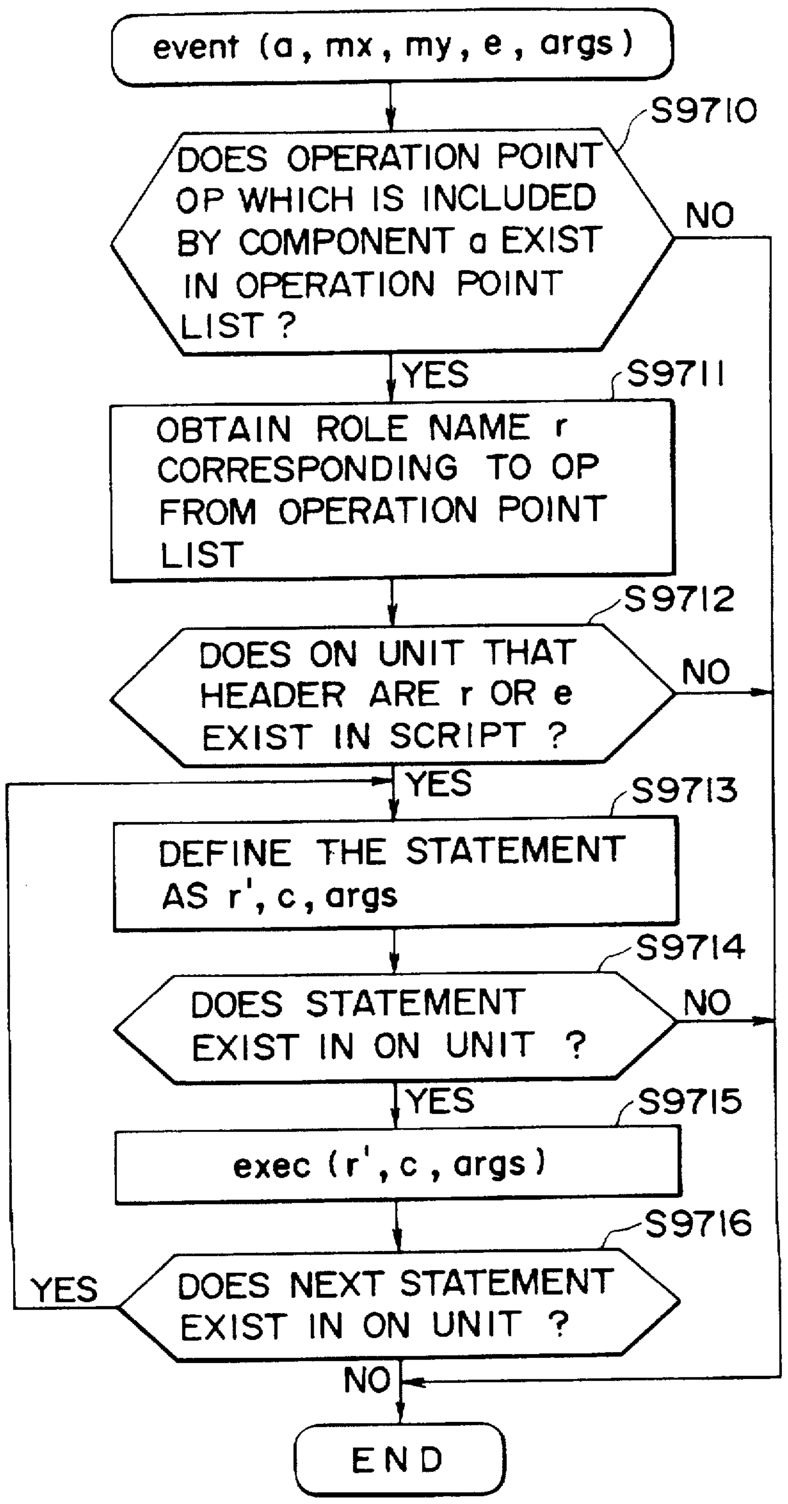
FIGS. 103(A) and 103(B) are each a flow chart showing a series of process steps to be performed when the script component has received a message.
Figure 103B:
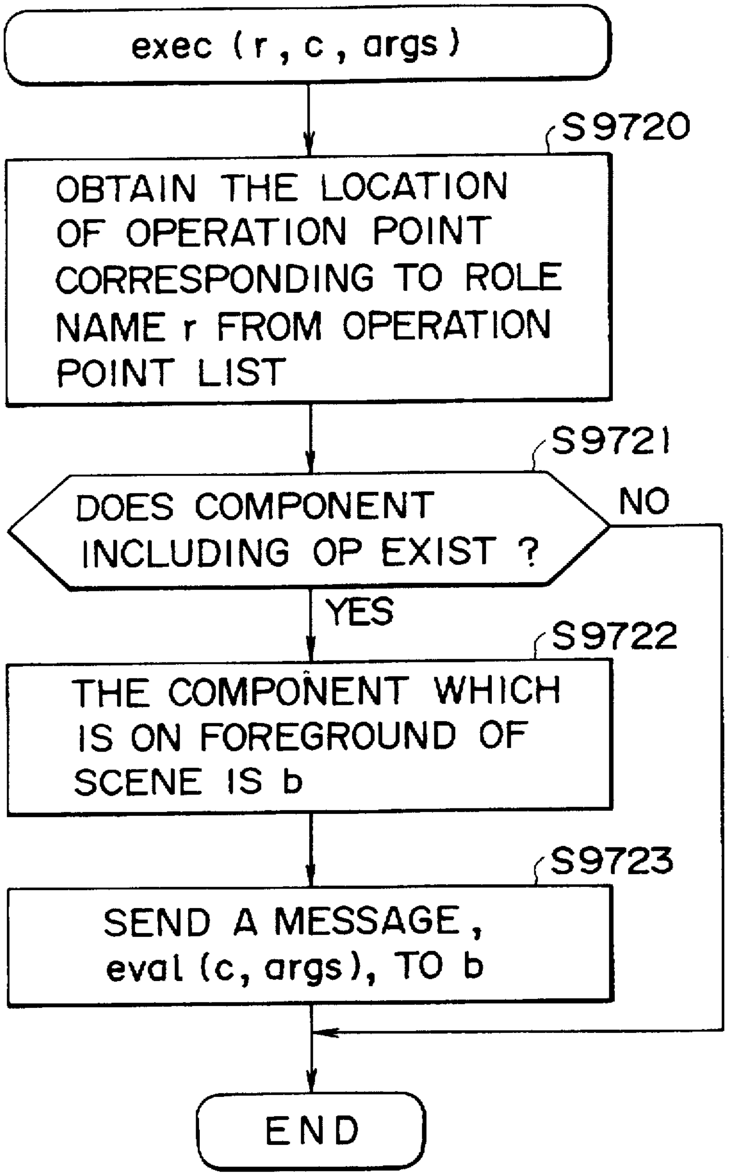

FIGS. 103(A) and 103(B) are each a flow chart showing a series of process steps to be performed when the script component has received the messages.

FIG. 103(A) is a flow chart describing process steps of the script component when a message, event (a, mx, my, e, args) is received. This message is a message for giving notice that an operation is to be executed for the component "a", given a parameter "args" as an argument, and that the location of the mouse 110 at the time of the start of an operation is indicated as (mx, my).

When it has received the event (a, mx, my, e, args) message, the script component 9360 makes a decision to determine if an operation point 9611 included by the component "a" exists in the operation points list table 9610 of the script component 9360 (S9710). When the operation point 9611 exists (S9710: Yes), there is obtained a role name "r" 9612 corresponding to the operation point 9611 from the operation points list table 9610 (S9711).

Then, a decision is made to determine if an on unit exists in which the role name "r" 9612 is included in the script 9410 and an operation "e" is a header (S9712). If such an on unit exists (S9712: Yes), the statement involved is defined as "r', c" (S9713). In addition, it is decided to determine if such a statement exists in the on unit (S9714). When the statement exists (S9714: Yes), the statement is executed.

In reality, the statement is to be executed using an exec routine. FIG. 103(B) is a flow chart for describing process steps of the exec routine. In this routine, first, the location of the operation point 9611 corresponding to the role name 9612 "r" is obtained from the operation points list table 9610 (S9720). Then, it is decided to determine if the component included in the operation point 9611 exists (S9721). When the component involved exists (S9721: Yes), the component existing in the forefront of the components on the display screen is indicated by reference symbol "b" (S9722).

Then, a message, eval (c, args), is sent to the component "b" (S9723), followed by the return to step S9716 in FIG. 103(A) and by execution of the decision to determine if the next statement exists in the on unit (S9716). If the next statement exists (S9716: Yes), then the process is returned to step S9713 and the involved processes are repeated. On the other hand, when no such statement exists (S9716: No), then the process is allowed to end.

Figures 104A, 104B, 105, 106A, 106B:
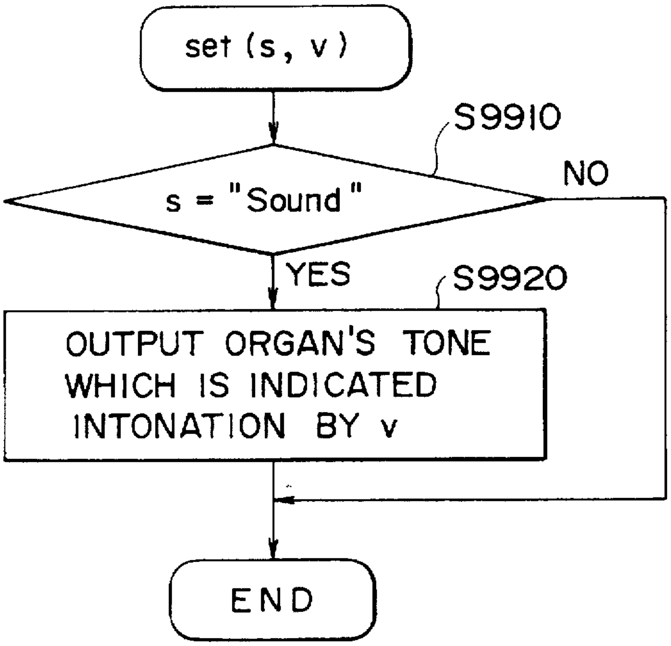
FIGS. 104(A) and 104(B) respectively show a slot table and a parent-child table of an organ component according to an embodiment of the invention.
FIG. 105 is a flow chart showing a series of process steps to be performed when the organ component has received a message, set (s, v).
FIGS. 106(A) and 106(B) respectively show a slot table and a parent-child table of a guitar component according to an embodiment of the invention.

FIGS. 104(A) and 104(B) are each a table indicating a slot table and a parent-child table of the organ component 9330. As shown in FIG. 104(A), a slot table 9810 of the organ component 9330 comprises a slot name 9811 and a slot value 9812. In FIG. 104(B), a parent-child table 9820 for storing the parent-child relationship of the organ component 9330. In the parent-child table 9820, the organ component 9330 is stored as the parent component and its address is stored as "g".

FIG. 105 is a flow chart showing a series of process steps when the organ component 9330 has received the set (s, v) message. As shown in FIG. 105, as the organ component 9330 is provided with a Sound slot 9813, first, it is decided to determine if the slot name "s" 9811 in the set (s, v) message 315 is set to "Sound" (S9910). If the "Sound" slot "s" exists (S9910: Yes), then an organ-like tone having an intonation as indicated by a value "v" is output from the organ component 9330 (S9920). On the other hand, when no "Sound" slot "s" exists (S9910: No), then the process is allowed to end.

FIGS. 106(A) and 106(B) are each a table indicating a slot table and a parent-child table of the organ component 9520. As shown in FIG. 106(A), a slot table 10010 of the guitar component 9520 comprises a slot name 10011 and a slot value 10012. In FIG. 106(B), a parent-child table 10020 is shown for storing the parent-child relationship of the component. In the parent-child table 10020, the script component 9360 is stored as the parent component and its address is stored as "g".

Figure 107:
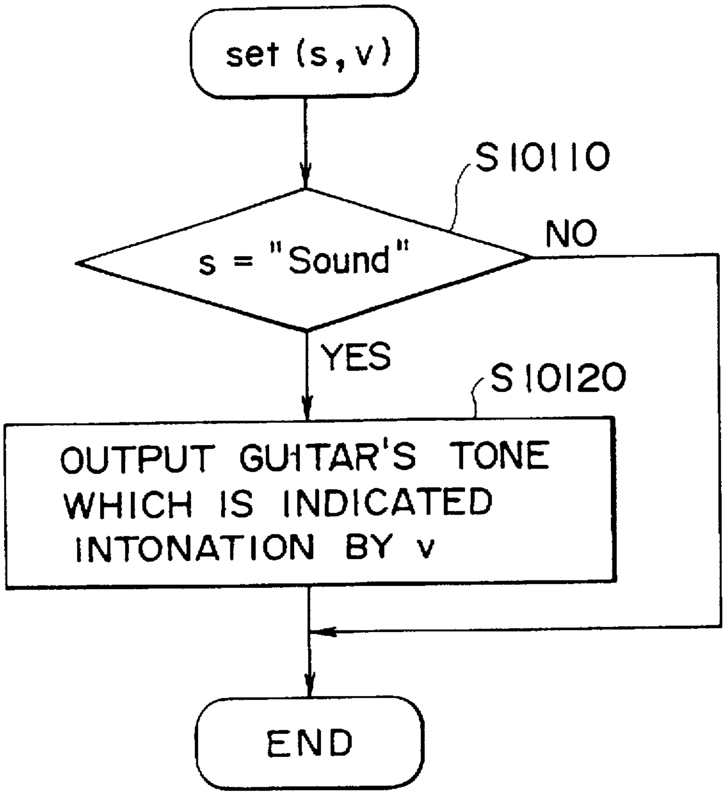
FIG. 107 is a flow chart showing a series of process steps to be performed when the guitar component has received a message, set (s, v).

FIG. 107 is a flow chart showing a series of process steps to be performed when the guitar component 9520 has received the set (s, v) message. As shown in FIG. 107, as the guitar component 9520 is provided with a Sound slot 10013, first, it is decided to determine if the slot name "s" 10011 in the set (s, v) message 315 is set to "Sound" (S10110). If the "Sound" slot "s" exists (S10110: Yes), then a guitar-like tone having an intonation as indicated by a value "v" is output from the guitar component 9520 (S10120). On the other hand, when no "Sound" slot "s" exists (S10110: No), then the process is allowed to end.

In the description of the internal structures of the components which follow, the components with their slot connection tables omitted therefrom are intended to mean no slot connection with their parent components. Further, the flow charts indicating the process steps for processing the components are flow charts for the messages to be received by the view definition part of each of the components. In addition, the read and update operations for reading and updating the slot values are executed by sending the model_gime (s) message and the model_set message to the corresponding behavior definition part.

Figures 108A, 108B, 108C, 108D:
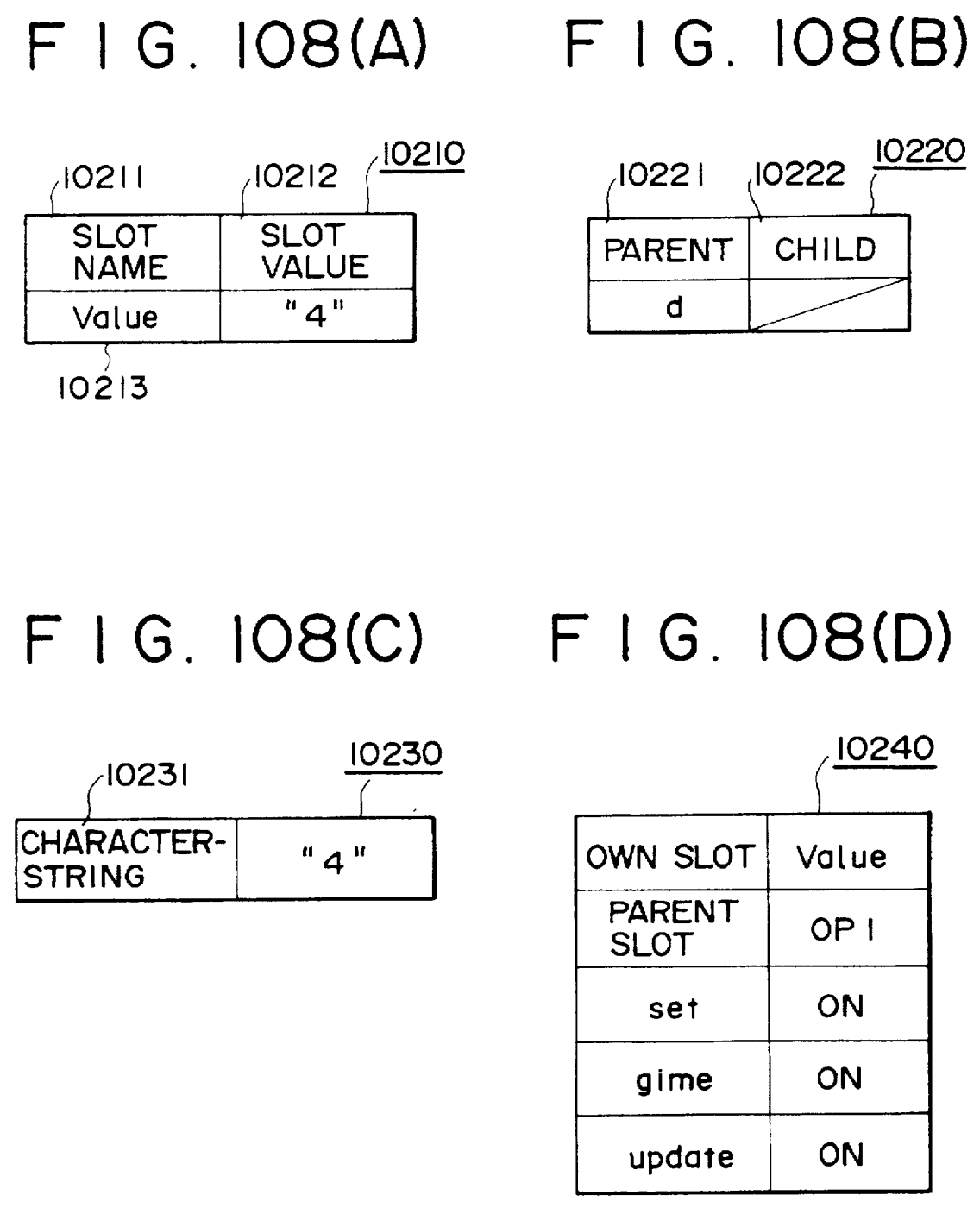

FIGS. 108(A) through 108(D) show the configurations of a slot table, a parent-child table, a character-string store table and a slot connection table of the numeric value input/output component 9320. As shown in FIG. 108(A), reference numeral 10210 denotes a slot table of the numeric value input output component 9320, which comprises a slot name 10211 and a slot value 100212. Further, FIG. 108(B) shows a parent-child table 10220 in which the arithmetic text component 9310 is set as the parent component and its address is set to "d". As shown in FIG. 108(C), reference numeral 10230 denotes a character-string store table 10230 that is an area in which the character string 10231 input by the user is temporarily stored.

In addition, FIG. 108(D) shows a slot connection table 10240 which represents the connection of a Value slot 10213 of the numeric value input output component 9320 with the OP(1) slot of the parent component.

FIGS. 109(A) and 109(B) are each a flow chart showing a series of process steps to be performed when the numeric value input/output component 9320 has received the key_in_action (c) message. As shown in FIG. 109(A), the view definition part 210 of the numeric value input/output component 9320 is arranged in order to receive the key in_action (c) message 310 through the window system 142 whenever the user inputs a one key input. In the message, the character "c" enclosed by the parentheses is intended to mean an input character.

In FIG. 109(A), the input character strings are stored in a character-string store area 10231 until the user inputs a "return" key. First, it is decided to determine if the input character "c" is a "return" key (S10310). If the input character "c" is a "return" key (S10310: Yes), then a value of the character-string store area 10231 is set as the value of the Value slot 10213 (S10320) and the character-string store area 10231 is cleared (S10330), followed by the end of the process.

On the other hand, if the input character "c" is not a "return" key (S10310: No), then the input character "c" is connected to (or stored in) the value of the character-string store area 10231 (S10340).

FIG. 109(B) describes a series of process procedures to be implemented when the numeric value input output component 9320 has received the set (s, v) message. As shown in FIG. 109(B), when the numeric value input output component 9320 has received the set (s, v) message 315, it is then decided to determine if the slot value 10212 is set to "Value" (S10350). When the slot value 10212 is set to "Value" (S10350: Yes), then a slot value 10212 of the Value slot 10213 of the slot name 10211 is set to a slot value "v" (S10360), followed by the end of the process.

On the other hand, when the slot value 10212 is not set to "Value" (S10350: No), then the process is allowed to end.

Figures 110A, 110B, 110C, 110D:
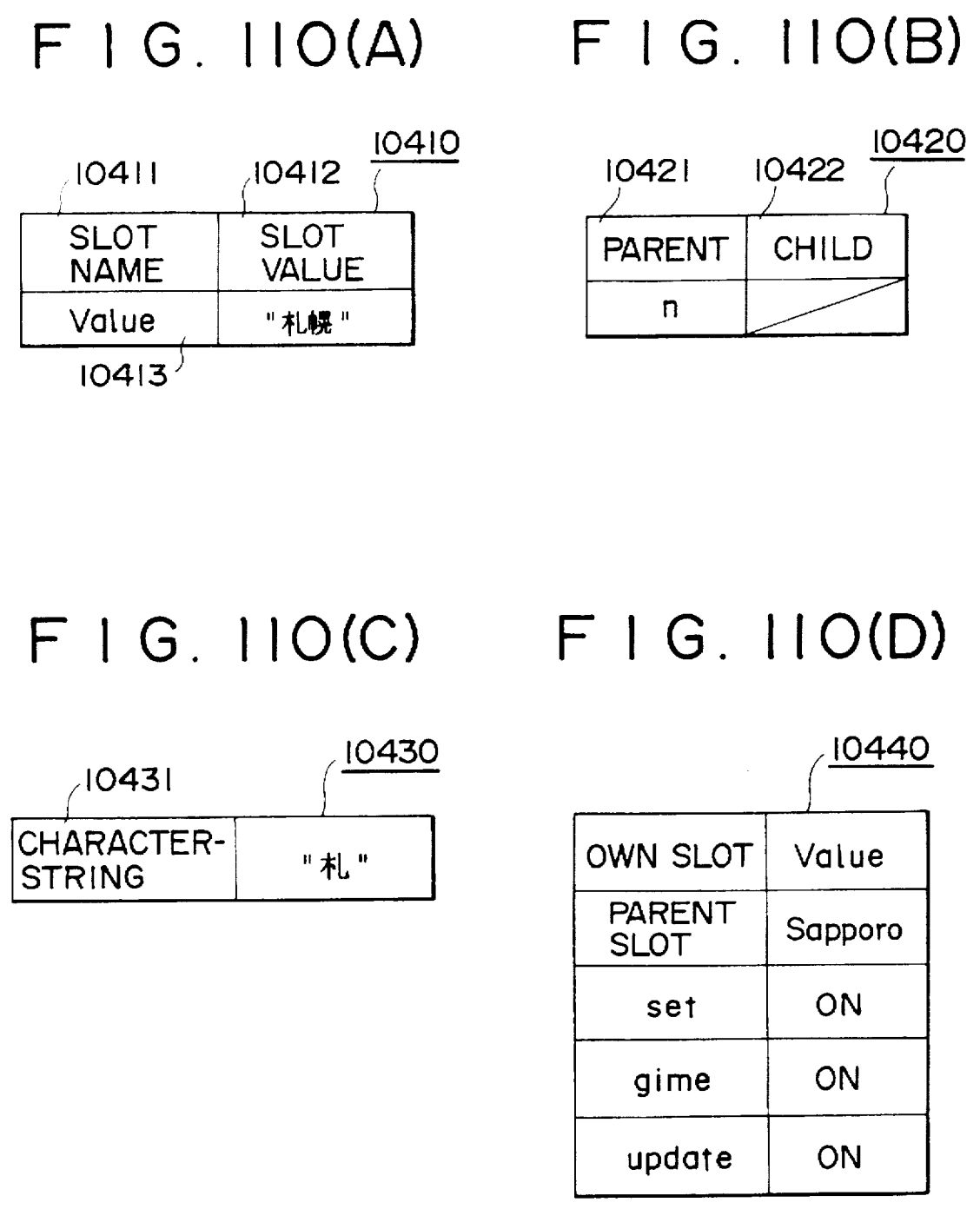

FIGS. 110(A) through 110(D) show the configurations of a slot table, a parent-child table, a character-string store table and a slot connection table of a character-string input/output component. As shown in FIG. 110(A), reference numeral 10410 denotes a slot table of the character-strong input output component 9540, which comprises a slot name 10411 and a slot value 10412. Further, FIG. 110(B) shows a parent-child table 10420 in which the place text component 9510 is set as the parent component and its address is set to "n". As shown in FIG. 110(C), reference numeral 10430 denotes a character-string store table 10431 that is an area in which the character string input by the user is temporarily stored.

In addition, FIG. 110(D) shows a slot connection table 10440 which represents the connection of a Value slot 10413 of the character-string input/output component 9540 with the "Sapporo" slot 640 of the parent component.

Figure 111A:
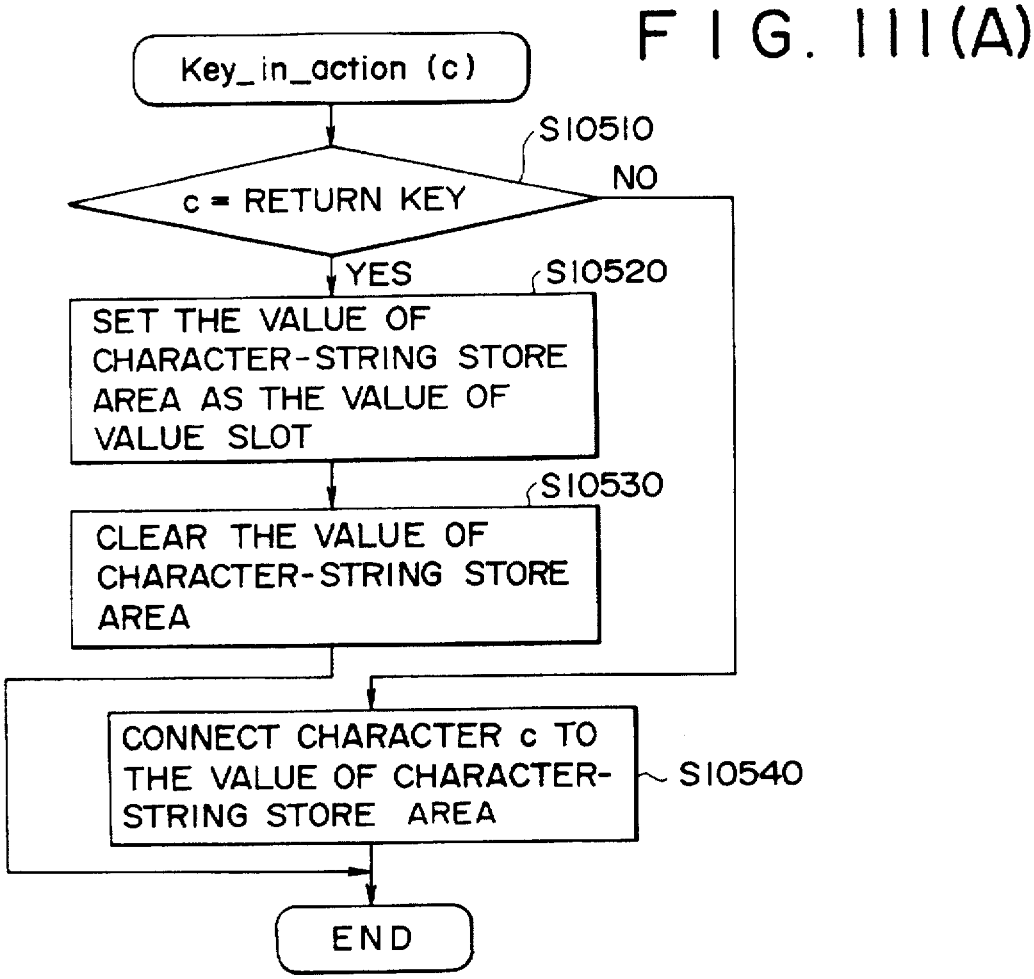
FIGS. 111(A) and 111(B) are each a flow chart showing a series of process steps to be performed when the character-string input/output component has received a message.
Figure 111B:
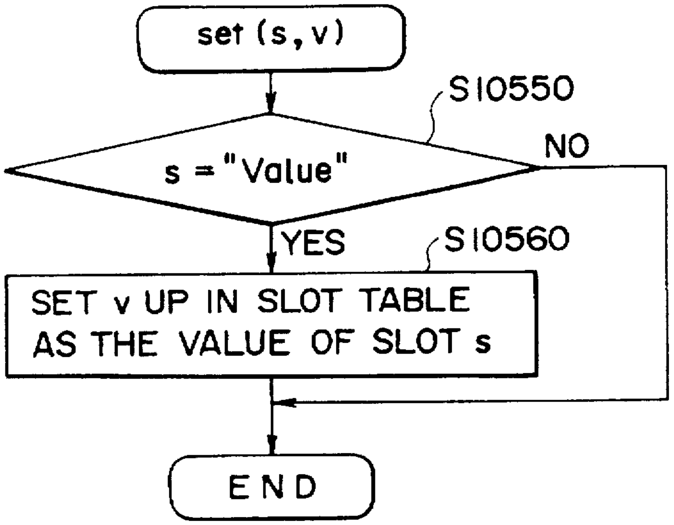

FIGS. 111(A) and 111(B) are each a flow chart showing a series of process steps to be performed when the character-strong input/output component 9540 has received the key_in_action (c) message 310. As shown in FIG. 111(A), the view definition part 210 of the characters-strong input output component 9540 is arranged in order to receive the key_in_action (c) message 310 through the window system 142 whenever the user inputs a one key input. In the message, the character "c" enclosed by the parentheses is intended to mean an input character.

In FIG. 111(A), the input character strings are stored in a character-string store area 10431 until the user inputs a "return" key. First, it is decided to determine if the input character "c" is a "return" key (S10510). If the input character "c" is a "return" key (S10510: Yes), then a value of the character-string store area 10431 is set as the value of the Value slot 10413 (S10520) and the character-string store area 10431 is cleared (S10530), followed by the end of the process.

On the other hand, if the input character "c" is not a "return" key (S10510: No), then the input character "c" is connected to (or stored in) the value of the character-string store area 10431 (S10350).

FIG. 111(B) describes a series of process steps to be implemented when the character-string input output component 9540 has received the set (s, v) message. As shown in FIG. 111(B), when the character-string input output component 9540 has received the set (s, v) message 315, it is then decided to determine if the slot value 10412 is set to "Value" (S10550). When the slot value 10412 is set to "Value" (S10550: Yes), then a slot value 10412 of the Value slot 10413 of the slot name 10411 is set to a slot value "v" (S10560), followed by the end of the process.

On the other hand, when the slot value 10412 is not set to "Value" (S10550: No), then the process is allowed to end.

FIGS. 112(A) and 112(B) describe the configurations of a slot table and a parent-child table of the arithmetic text component 9310, respectively. In FIG. 112(A), a slot table 10610 comprises a slot name 10611 and a slot value 10612. Further, in FIG. 112(B), reference numeral 10620 is a parent-child table storing a parent-child relationship with other components. In this case, as the script component 9360 is a parent component, the address of the parent component is stored as "g" and the addresses of each of the components of the numeric value input/output component 9320 (**9320*a*, 9320*b* and 9320*c***) as the child component are stored as "a", "b" and "c", respectively.

When the user inputs the three numerals for the three components (**9320*a*, 9320*b* and 9320*c*) of the numeric value input output component 9320, respectively, the arithmetic text component 9310 makes a decision to determine if the sum of "a"+"b" is equal to "c", i.e. "a"+"b"="c". At this end, the arithmetic text component 9310 is provided with three slots P(1) 106111, P(2) 106112 and P(3) 106113**.

Further, the arithmetic text component 9310 is provided with a Reset slot 106114 for clearing all the slots and an Answer slot 106115 for calculating and displaying the sum of "a"+"b".

Figure 113:
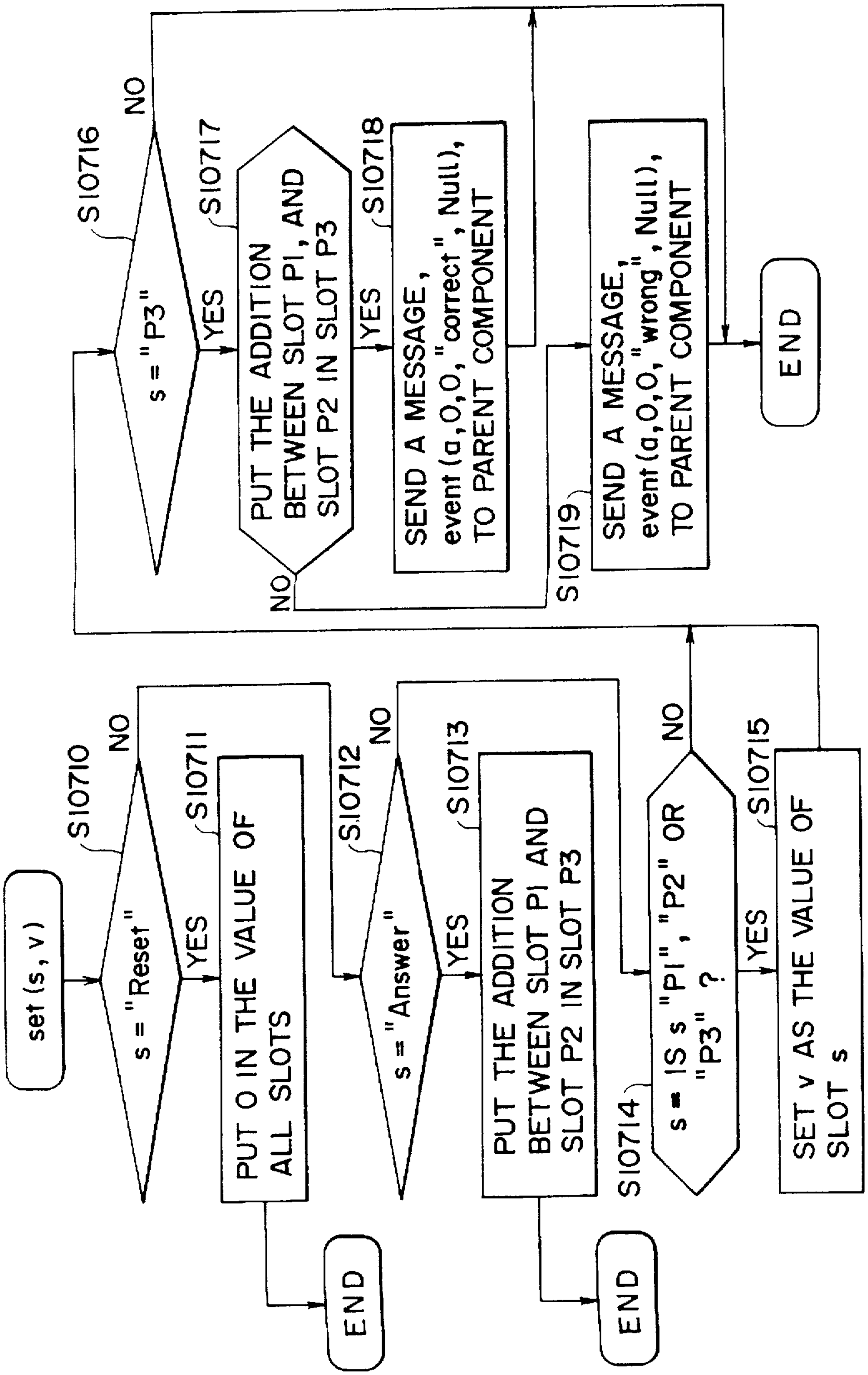
FIG. 113 is a flow chart showing a series of process steps to be performed when the arithmetic text component has received a message, set (s, v).

FIG. 113 is a flow chart showing a series of process steps to be performed when the arithmetic text component 93210 has received set (s, v) message. As shown in FIG. 113, first, it is decided to determine if the slot name "s" 10611 is set to "Reset" (S10710). When the slot name "s" 10611 is set to "Reset" (S10710: Yes), then the slot values for the slots P(1) 106111, P(2) 106112 and P(3) 1061113 are all cleared (S10711).

On the other hand, when the slot name "s" 10611 is not set to "Reset" (S10710: No), then it is decided to determine if the slot name "s" 10611 is set to "Answer" (S10712). When the slot name "s" 10611 is set to "Answer" (S10712: Yes), then the sum of the slot values of the slots P(2) 106112 is set as a slot value of the slot P(3) 1061113 (S10713).

On the other hand, when the slot name "s" 10611 is not set to "Answer" (S10712: No), then it is decided to determine if the slot name 10611 corresponds to which one of the slots P(1) 106111, P(2) 106112 and P(3) 1061113 (S10714).

When it is decided that the slot name "s" 10611 indicates each of the slots P(1) 106111, P(2) 106112 and P(3) 1061113 (S10714: Yes), then a value "v" is set to each of the slot values 10612 of the slot names 10611 as the value of the slot "s" (S10715).

In this case (when a message, set ("P3, v), has been received: S10716: Yes), it is decided to determine if the value of the slot P(3) 106113 is equal to the sum of the values of the slots P(1) 106111 and P(2) 106112, that is, if an answer is correct) (S10717).

If an answer is correct (S10717: Yes), a message, event (a, 0, 0, "correct", Null), stating that the answer is correct, is sent to the parent component (S10718). On the other hand, if an answer is wrong (S10717: No), then an event (a, 0, 0, "wrong", Null), stating that the answer is wrong, is sent to the parent component (S10719), followed by the end of the process. In the messages, a parameter "a" means an address of the arithmetic text component 9310.

FIGS. 114(A) and 114(B) illustrate the configurations of a slot table and a parent-child table of the place text component 9510. In FIG. 114(A), a slot table 10810 comprises a slot name 10811 and a slot value 10812. FIG. 114(B) shows a parent-child table 10820 describing the parent-child relationship with other components. In this case, the parent component is indicated as the script component 9360 and its address is stored as "g". On the other hand, the child component is indicated as the place text component 9510 and its addresses of, for example, "Sapporo" 9541, "Yokohama" 9542 and "Fukuoka" 9543, among others, are stored as "k", "l" and "m", respectively.

As the character-string input/output component 9540, for example, three component character strings, indicative of names of cities (for example, "Sapporo" 9541, "Yokohama" 9542 and "Fukuoka" 9543), are input in the place text component 9510, and it is decided to determine if the input is correct. At this end, the place text component 6510 is provided with, for example, three slots such as the "Sapporo" slot 108111, the "Yokohama" slot 108112 and the "Fukuoka" slot 108113.

Further, the place text component 9510 is provided with a Reset slot 10814 as a command slot for resetting all the slots and an Answer slot 108115 for setting names of cities to the slots relevant to all the cities.

Figure 115:
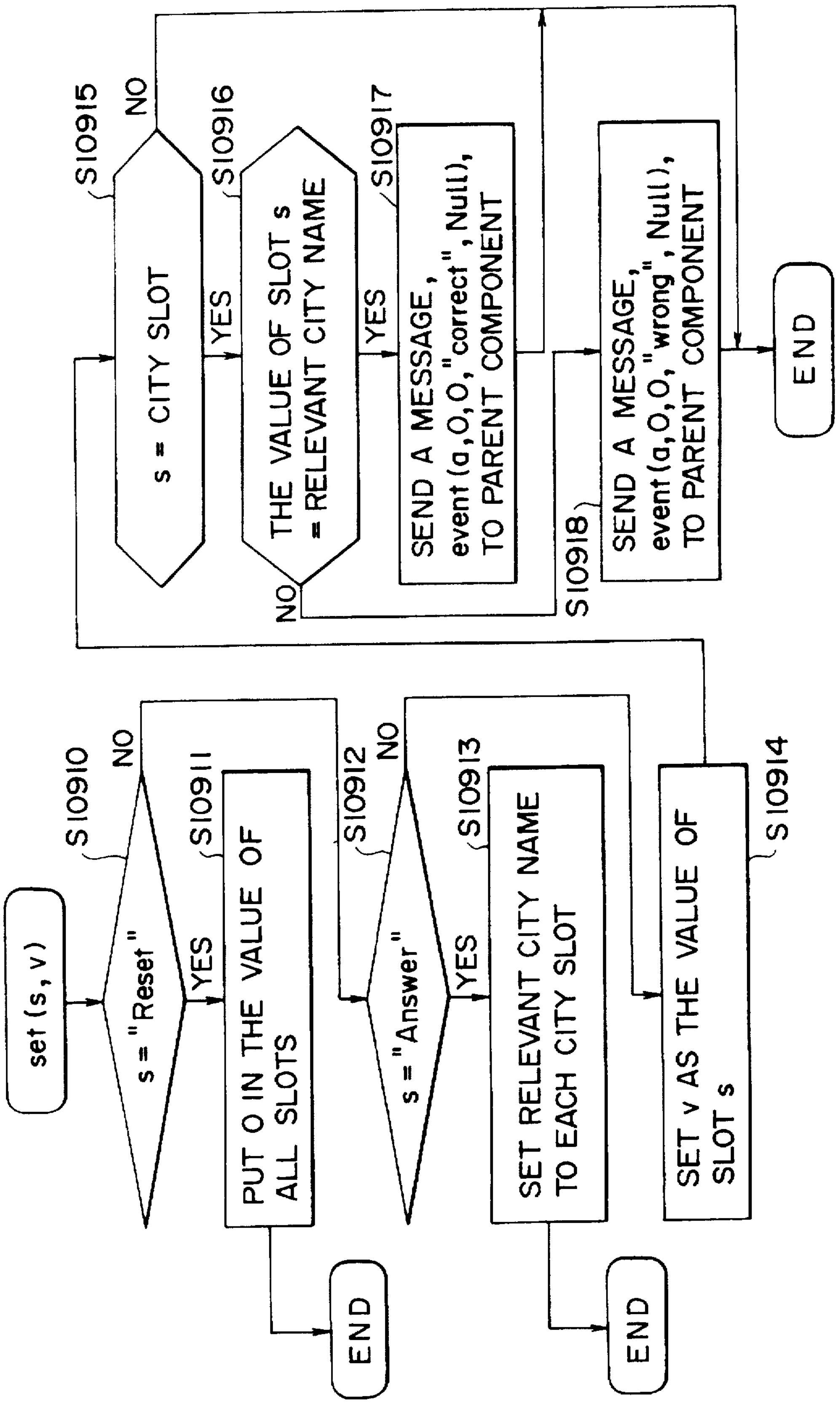
FIG. 115 is a flow chart showing a series of process steps to be performed when the place text component has received a message, set (s, v).

FIG. 115 is a flow chart showing a series of process steps to be performed when the place text component 9510 has received the set (s, v) message. As shown in FIG. 115, first, it is decided to determine if the slot name "s" 10811 is set to "Reset" (S10910). When the slot name "s" 10811 is set to "Reset" (S10910: Yes), then the slot values for the "Sapporo" slot 108111, "Yokohama" slot 108112 and "Fukuoka" 1081113 are all cleared (S10911).

On the other hand, when the slot name "s" 10811 is not set to "Reset" (S10910: No), then it is decided to determine if the slot name "s" 10811 is set to "Answer" (S10912). When the slot name "s" 10611 is set to "Answer" (S10912: Yes), then the names of the sites are set to the corresponding slots for the cities (S10913).

On the other hand, when the slot name "s" 10611 is not set to "Answer" (S10912: No), then the value "v" is set to a slot value 10812 of the slot name "s" 10811 (S10914).

Thereafter, a message, slot_value_changed ("t"), for giving the notice of the changes of the slot value 10812 for all the slots whose slot values have been changed, is sent to the parent component (S10915).

Then, it is decided to determine if the slot name "s" 10811 is set as the name of a city (S10916). If the slot name "s" 10811 indicates the name of the city (S10916: Yes), it is further decided to determine if the name of the city agrees with the relevant city name (S10917).

If it is decided that the name of the city agrees with the relevant city name, that is, if an answer is correct (S10917: Yes), a message, event (a, 0, 0, "correct", Null), stating that the answer is correct, is sent to the parent component (S10918). On the other hand, if an answer is wrong (S10917: No), then an event (a, 0, 0, "wrong", Null), stating that the answer is wrong, is sent to the parent component (S10919), followed by the end of the process. In the messages, a parameter "a" means an address of the place text component 9510.

FIGS. 116(A) and 116(B) illustrate the configurations of a slot table and a parent-child table of the table type total component 9340. In FIG. 116(A), a slot table 11010 comprises a slot name 11011 and a slot value 11012. FIG. 116(B) shows a parent-child table 11020 describing the parent-child relationship with other components. In this case, the parent component is indicated as the script component 9360 and its address is stored as "g". On the other hand, as no child component is indicated in this case, no address is stored.

The table type total component 9340 is so arranged as to display the number of questions, the number of correct answers, the number of wrong answers and success (correctness) rates. The table type total component 9340 is provided with four slots, a Reset slot 110111 as a command slot for resetting all the slots, a Correct slot 110112 for holding the number of correct answers, a Wrong slot 110113 for holding the number of wrong answers, and a Display slot 110114 as a command slot for displaying the number of questions, the number of correct answers, the number of wrong answers, and the success rates.

Figure 117:
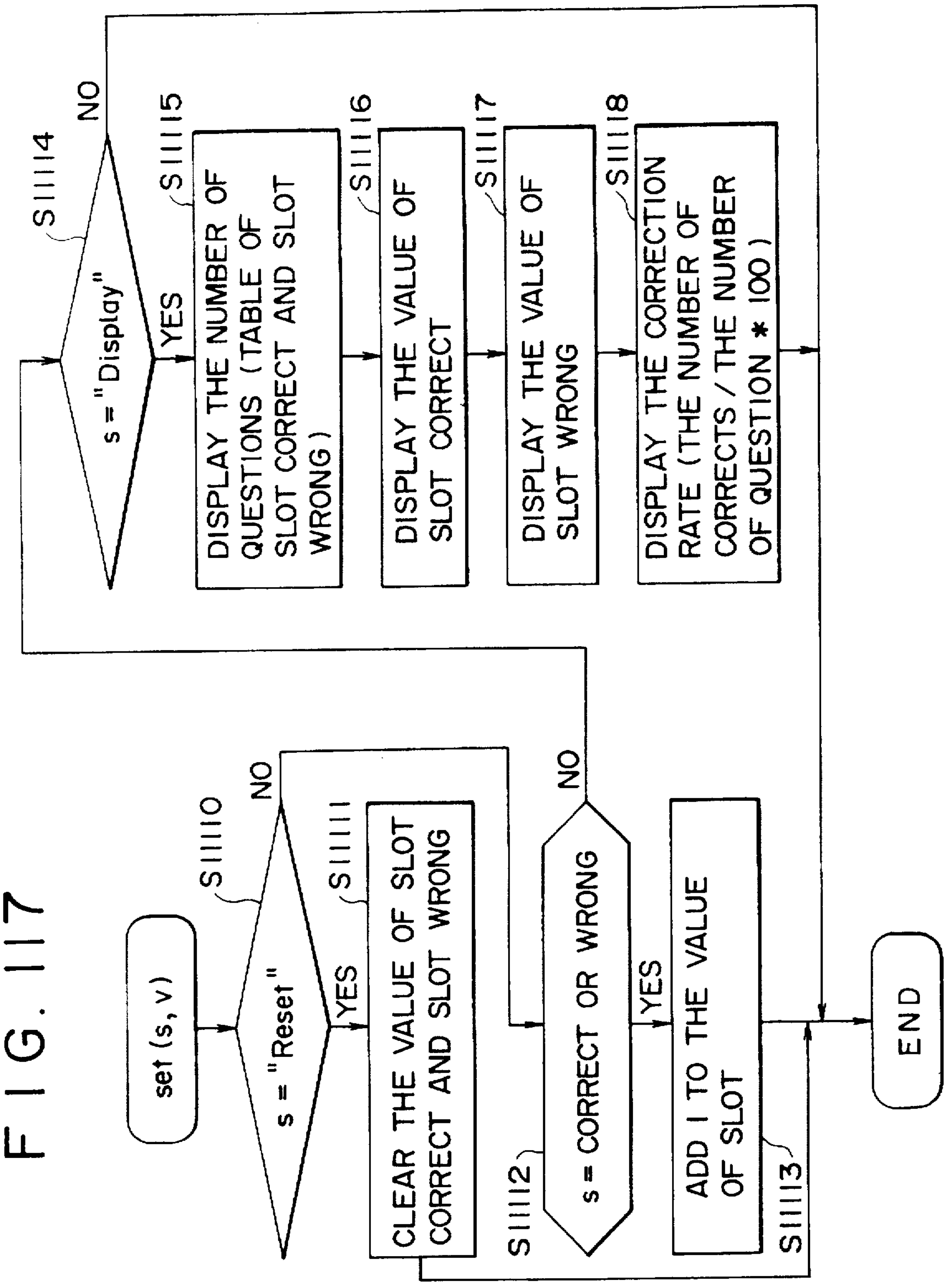
FIG. 117 is a flow chart showing a series of process steps to be performed when the table type total component has received a message, set (s, v).

FIG. 117 is a flow chart showing a series of process steps to be performed when the table type total component 9340 has received the set (s, v) message. As shown in FIG. 117, first, it is decided to determine if the slot name "s" 11011 is set to "Reset" (S11110). When the slot name "s" 11011 is set to "Reset" (S11110: Yes), then the slot values 11012 for the Correct slot 110112 and Wrong slot 110113 of the slot name 11011 are cleared (S11111), followed by the end of the process.

On the other hand, when the slot name "s" 11011 is not set to "Reset" (S11110: No), then it is decided to determine if the slot name "s" 11011 is set to "Correct" or "Wrong" (S11112). When the slot name "s" 11011 is set to "Correct" (S11112: Yes), then an increment "1" is added to the slot value 11212 of the Correct slot 110112 (S11113), followed by the end of the process.

Further, when the slot name "s" 11011 is set to "Wrong" (S11112: Yes), then an increment "1" is added to the slot value 11012 of the Wrong slot 110113 (S11113), followed by the end of the process.

Further, if the slot name "s" 11011 is set to neither "Correct" nor "Wrong" (S11114), then a decision is made to determine if the value of the slot name "s" 11011 is set to "Display" (S11114). When the value of the slot name "s" 11011 is not set to "Display" (S11114: Yes), the number of questions (the sum of the Correct slot 110112 and the Wrong slot 110113 of the slot name 11011) is displayed (S11115); then the number of correct answers (the slot value 11012 of the Correct slot 110112) is displayed (S11116); then, the number of wrong answers (the slot value 11012 of the Wrong slot 110113) is displayed (S11117); and finally, the success rate [(number of correct answers)/(number of questions)×100] is displayed (S11118), followed by the end of the process.

FIGS. 118(A) and 118(B) illustrate the configurations of a slot table and a parent-child table of the graph form total component 9530. In FIG. 118(A), a slot table 12210 comprises a slot name 12211 and a slot value 12212. FIG. 118(B) shows a parent-child table 12220 describing the parent-child relationship with other components. In this case, the parent component is indicated as the script component 9360 and its address is stored as "g". On the other hand, as no child component is indicated in this case, no address is stored.

The graph form total component 9530 is so arranged as to display the number of correct answers and the number of wrong answers in a graph form. The graph form total component 9530 is provided with four slots, a Reset slot 112111 as a command slot for resetting all the slots, a Correct slot 112112 for holding the number of correct answers, a Wrong slot 112113 for holding the number of wrong answers, and a Display slot 112114 as a command slot for displaying these values in the form of a graph.

Figure 119:
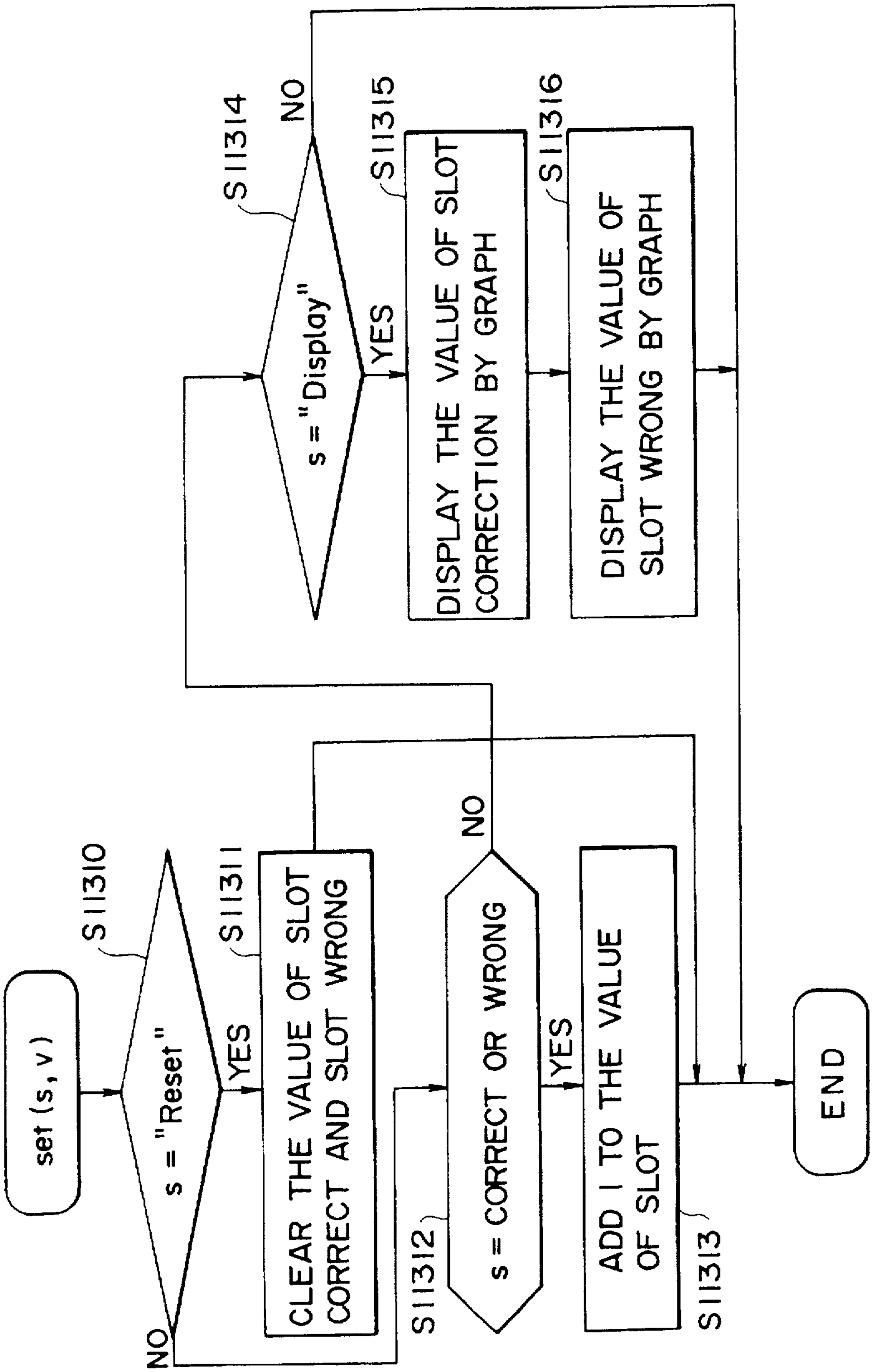
FIG. 119 is a flow chart showing a series of process steps to be performed when the graph form total component has received a message, set (s, v).

FIG. 119 is a flow chart showing a series of process steps to be performed when the graph form total component 9530 has received the set (s, v) message. As shown in FIG. 119, first, it is decided to determine if the slot name "s" 11211 is set to "Reset" (S11310). When the slot name "s" 11211 is set to "Reset" (S11310: Yes), then the slot values 11212 for the Correct slot 112112 and Wrong slot 112113 of the slot name 11011 are cleared (S11311), followed by the end of the process.

On the other hand, when the slot name "s" 11211 is not set to "Reset" (S11310: No), then it is decided to determine if the slot name "s" 11211 is set to "Correct" or "Wrong" (S11312). When the slot name "s" 11211 is set to "Correct" (S11312: Yes), then an increment "1" is added to the slot value 11212 of the Correct slot 112112 (S11313.

Further, when the slot name "s" 11211 is set to "Wrong" (S11312: Yes), then an increment "1" is added to the slot value 11212 of the Wrong slot 112113 (S11113), followed by sending a message, slot_value_changed ("t"), for giving the notice of the changes of the slot values 11212.

On the contrary, if the slot name "s" 11211 is set to neither "Correct" nor "Wrong" (S11312: No), then it is decided to determine if the value of the slot name "s" 11211 is set to "Display" (S11314).

If the value of the slot name "s" 11211 is set to "Display" (S11314: Yes), then the number of correct answers (the slot value 11212 of the Correct slot 112112) is displayed (S11315); then, the number of wrong answers (the slot value 11212 of the Wrong slot 112113) is displayed (S11116), followed by the end of the process.

The embodiments of this invention can create various tools and programs by connecting the slots of the components with each other as "parent" and "child" in object-oriented design in the manner as described hereinabove.

Further, this invention can easily execute the pasting (or superimposing) operation or the move operation of the components while being displayed as visual windows on the display screen.

Furthermore, this invention can offer the advantage that no script is required to be created in advance by specifying the component as an object of operation because both of the contents of the operation for the object-oriented component displayed on the display screen and the on-screen location at which the operation is to be implemented in accordance with its contents are described as a script, and further because the operation is to be implemented by the user operation on the basis of its contents for the object-oriented component disposed at the location involved. In addition, the present invention can present the merits that the script is not required to be described for each of the components when the same operation is to be implemented even for different components.

It is also noted herein that, in practicing the embodiments of this invention, there are occasions where the size of a window displayed on the display screen 130 is required to be resized during the course of creation of a composite component, when a variety of components are displayed on the display screen 130 through the window system 142 and the composite component is created by subjecting the plural components to pasting or superimposing operations.

The window system 142 is conventionally provided with resizing functions (or resizing mechanisms) for setting the size of a window at an optional multiplication rate.

It should be noted herein, however, that, in order to cancel a resize operation of resizing the window, the resize operation should be canceled by a cancel operation, called an "Undo" operation, which is different from the window resize operation. Further, it should also be noted that conventional techniques require laborious and time-consuming operations in order to cancel the resize operation for resizing the window.

FIGS. 120(A) through 120(C) are illustrations describing a conventional method for canceling a resize operation for resizing a window. As shown in FIG. 120(A), first, a cursor "a" 114420 is positioned on a one corner of a window A 114410 in order to resize the window 114410.

Then, as shown in FIG. 120(B), the cursor "a" 114420 is moved in order to execute a resize operation of the window A 114410.

In reality, it should be noted herein that this operation is not implemented by executing the process of changing the size of the window A 114410 and that the size is changed by positioning a rubber band "a" 114430 (a rectangular area drawn by the user by dotted lines for allowing a recognition of the window size after the size changing process) on the position of the cursor "a" 114420.

For various reasons, the resize operation of the window in process may need to be canceled. In this case, as shown in FIG. 120(C), the resize operation for the window A 114410 is first caused to quit in an optional position. Upon the stoppage of the resize operation, the window A 4410 is changed to the size of the rubber band "a" 114430 in this position to create a new window A' 114410'. After the resize operation has been finished, then the new window A' 114410' is subjected to an Undo operation, thereby canceling the resize operation.

As is apparent from the foregoing description, this conventional technique requires a two-step operation for canceling the resize operation. This two-step operation may become laborious.

On the other hand, the present invention has the advantage that the resize operation for a window can be canceled without implementing an Undo operation, unlike the conventional technique as described hereinabove. In the embodiment of this invention, such a mechanism or function for canceling the resize operation of the window is added to the window system 142.

The functions or mechanisms can be configured on the technical concept that, when a particular area is set on the display screen and the resize operation is being executed, the resize operation can be canceled even if the window area after resizing would have an area overlapping with the particular area at the time when the resize operation of the window is to be terminated.

FIG. 121 illustrates a system configuration diagram for describing the method for the cancellation of a resize operation. It is noted herein that the same elements are provided with the same reference symbols and reference numerals.

As shown in FIG. 121, the window system 142 is provided with an event detection process program 14211 for detecting the user operation such as a resize operation for windows and a move operation, a drag process program 14221, a resize condition confirmation program 14231, and a resize process program 14241.

Figure 122A:
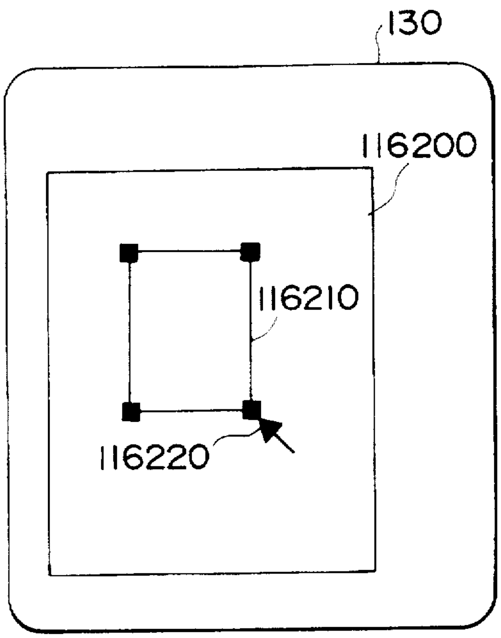

FIGS. 122(A) through 122(D) are illustrations indicating the method for canceling the window resize operation in accordance with this invention. In FIG. 122(A), reference numeral 116200 denotes a cancel area for executing a cancel operation and reference numeral 116210 denotes a window B as an object of a resize operation.

As shown in FIG. 122(A), first, a mouse 110 is moved to the window B 116210 and a cursor "b" 116220 is pointed on a one corner of the window B 116210 and a right button **110*a*** is held down.

Figure 122B:
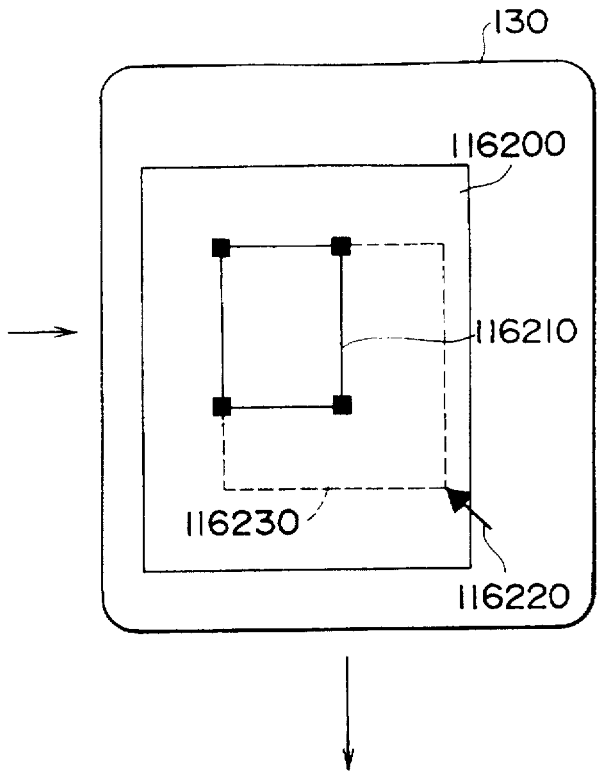

Then, as shown in FIG. 122(B), the cursor "b" 116220 is moved to a desired position while the right button **110*a* of the mouse 110 is being held down (a drag operation), thereby executing an operation for resizing the rubber band "b" 116230**.

Figure 122D:
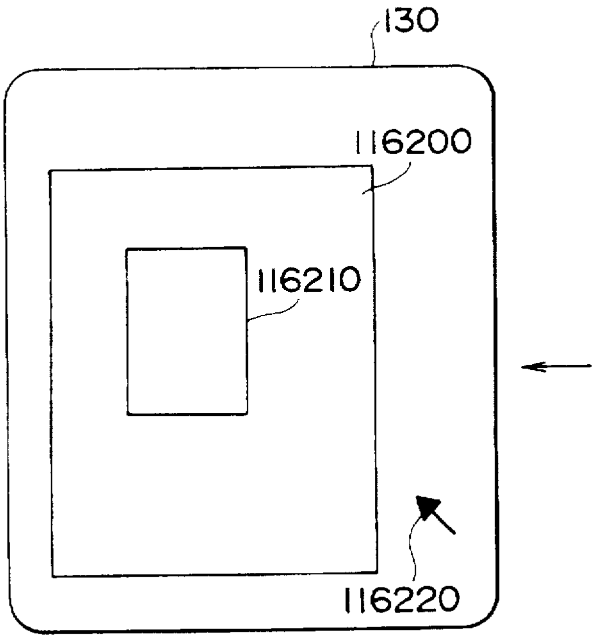
Figure 122C:
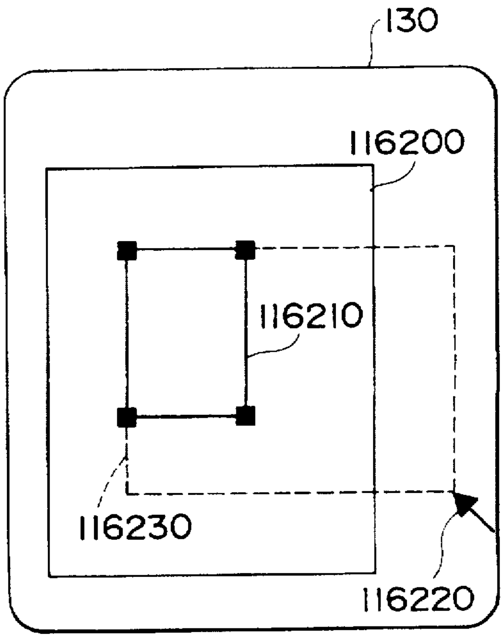

For various reasons, it is supposed at this timing that the resize operation for the window should be canceled. In this case, as shown in FIG. 122(C), the cursor "b" 116220 is moved outside the cancel area A 116200 and stops the resize operation upon releasing the right button **110*a* of the mouse 110**.

When the resize operation has been finished by releasing the right button **110*a* of the mouse 110, the location of the cursor "b" 116220 is detected, thereby finishing the resize process. If the location is inside the cancel operation area A 116200, the resize process is allowed to quit without resizing the window B 116210. As a result, the size of the window B is kept in the same size as shown in FIG. 122**(D) and as prior to the start of the resize operation.

FIG. 123 is a flow chart showing a series of process steps for canceling the window resize operation.

As shown in FIG. 123, first, a resize mode of the window system 142 is allowed to start, thereby starting the event detection process program 1421 built in the window system 142 and bringing it into a condition waiting for the next user operation (S117300).

More specifically, in order to execute the resize operation of the window, the user holds down the right button **110*a* of the mouse 110 (S117310: Yes), thereby bringing the status into a condition waiting for the next user operation (S117320). In this state, the mouse 110 is dragged while the mouse 110 is moved in such a state that the right button 110*a* is being held down (S117330). Then, the window system 142 executes the built-in drag process program 14221, thereby moving the cursor "b" 116220 and, at the same time, resizing the rubber band "b" 116230** up to the cursor position (S117340).

Then, it is decided to determine if the right button 110*a* of the mouse 110 is released (S117350). If the right button 110*a* of the mouse 110 is not released (S117350: No), then the system becomes in a condition awaiting for the occurrence of the next event (S117320).

On the other hand, if the right button 110*a* of the mouse 110 is released (S117350: Yes), the release operation is recognized as an operation for resizing the window B 116210, thereby starting the resize condition confirmation process program 14231 and making a decision to determine resizing conditions (S117360). If the resizing conditions are acceptable (S360: OK), then the window system 142 executes the built-in resize process program 14241, thereby changing the size of the window B 116210 (S117370) and then terminating the execution of a resize_mode.

If the resizing conditions are unacceptable (S117360: NG), the execution of the resize_mode is allowed to quit. Hence, the size of the window B 116210 is the same as the size prior to the resize operation (as shown in FIG. 122(D)).

This method according to this invention can cancel the resize operation without requiring an Undo operation, as required by the conventional technique.

It is further to be noted herein that the present invention can readily set the resizing conditions simply by sensing the location on the display screen at which the right button 110*a* of the mouse 110 is released.

Furthermore, although the above description is restricted to an example in which the cancel operation area is displayed in advance on the display screen, the user may change the size, location and shape of the cancel operation area and so on in substantially the same manner.

In addition, the present invention can offer the advantage that, when a particular area is set on the display screen and the resize operation for the window as a resizing object is being executed, the resize operation can be canceled without completing the resize operation of the window because the resize operation is canceled even if the window area after resizing would have an area overlapping with the particular area at the time when the resize operation of the window is to be terminated.

Therefore, the present invention can improve operability for manipulating windows because no Undo operation is required for canceling the resize operation for resizing the windows.

What is claimed is:

1. An automated machine-implemented interactive programming system processing method, comprising the steps of:

(a) storing an object-oriented component in a first memory as a graphic component;

(b) giving an instruction to establish a link relationship on a display screen between at least two of a plurality of object-oriented components displayed as graphic components by superimposing a first one of the object-oriented components on a second one of the object-oriented components on the display screen, wherein said object-oriented component stored in step (a) is one of the at least two object-oriented components;

(c) storing said link relationship in a second memory;

(d) detecting an external operation designating any of the linked object-oriented components, and transmitting said external operation to a controller for controlling said object-oriented component thereby designated; and (e) in response to step (d), executing a process of each of the linked object-oriented components in combination, in accordance with information concerning the link relationship stored in step (c), by first executing, under control of the controller, the designated object-oriented component.

2. An interactive programming system processing method as claimed in claim 1, further comprising the steps of:

(f) displaying an object-oriented conversion component for converting a user operation in advance on the display screen;

(g) superimposing one of the plurality of object-oriented components on said object-oriented conversion component; and (h) displaying the object-oriented component, which was superimposed in step (g), on the display screen by subjecting the component superimposed in step (g) to a process defined in said object-oriented conversion component.

3. An interactive programming system processing method as claimed in claim 1, further comprising the steps of:

(f) creating a table for linking the superimposed first object-oriented component with a name and a page number of a destination page of a superimposing operation, for the superimposing operation, by superimposing the superimposed first object-oriented component on the second object-oriented component, said second object-oriented component having a plurality of pages; and (g) making an index on a predetermined page of the second object-oriented component the destination page on which the superimposing operation is implemented, on the basis of said table created in step (f).

4. An interactive programming system processing method as claimed in claim 3, wherein the name of the superimposed first object-oriented component is set at the time of the superimposing operation.

5. An interactive programming system processing method as claimed in claim 3, wherein the name of the superimposed first object-oriented component is set at the time of the definition of the second object-oriented component.

6. An interactive programming system processing method as claimed in claim 1, further comprising the steps of:

(f) creating a composition tree structure of the plurality of object-oriented components, which indicates a superimposed status of each of the plurality of object-oriented components, from the link relationship between a name of the superimposed first object-oriented component and the second object-oriented component, for superimposing the first object-oriented component on the second object-oriented component;

(g) displaying the composition tree structure of the components created in step (f); and (h) operating the superimposed first and second components in the composition tree structure of the components displayed in step (g).

7. An interactive programming computer system for configuring an application by using a plurality of object-oriented components, comprising:

(a) component storing means for storing an object-oriented component in a first memory as a graphic component;

(b) link relationship instructing means for giving an instruction to establish a link relationship on a display screen between at least two of a plurality of object-oriented components displayed as graphic components by superimposing a first one of the object-oriented components on a second one of the object-oriented components on the display screen, wherein said object-oriented component stored in said component storing means (a) is one of the at least two object-oriented components;

(c) link relationship storing means for storing said link relationship in a second memory;

(d) external operation detecting means for detecting an external operation designating any of the linked object-oriented components, and transmitting said external operation to a controller for controlling said object-oriented component thereby designated; and (e) process component creating means for executing, in response to the detection by said external operation detecting means (d), a process of each of the linked object-oriented components in combination, in accordance with information concerning the link relationship stored by said link relationship storing means (c), by first executing, under control of the controller, the process of the designated object-oriented component.

8. An interactive programming system as claimed in claim 7, further comprising:

(f) first display means for displaying an object-oriented conversion component for converting a user operation in advance on the display screen, and (g) second display means for displaying the superimposed object-oriented components by the user operation after subjecting the superimposed components to the process defined in t he object-oriented conversion component.

9. An interactive programming system as claimed in claim 7, further comprising:

(f) table creating means for creating a table for linking the superimposed first object-oriented component with a name and a page number of a destination page on which a superimposing operation is implemented, for the superimposing operation, by superimposing the superimposed first object-oriented component on the second object-oriented component, said second object-oriented component having a plurality of pages; and (g) index creating means for making an index on a predetermined page of the second object-oriented component on the destination page on the superimposing operation is implemented, on the basis of said table created by said table creating means (f).

10. An interactive programming system as claimed in claim 9, wherein the name of the superimposed first object-oriented component is set at the time of the superimposing operation.

11. An interactive programming system as claimed in claim 9, wherein the name of the superimposed first object-oriented component is set at the time of the definition of the second object-oriented component.

12. An interactive programming system as claimed in claim 7, further comprising:

(f) creating means for creating a composition tree structure of the plurality of object-oriented components, which indicates a superimposed status of each of the plurality of object-oriented components, from the link relationship between a name of the superimposed first object-oriented component and the second object-oriented component, for superimposing the first object-oriented component on the second object-oriented component;

(g) display means for displaying the composition tree structure of the components created in step (f); and (h) operation means for operating the superimposed first and second components in the composition tree structure of the components displayed in step (g).

* * * * *